(12) United States Patent
Lee et al.

(10) Patent No.: US 12,442,119 B2
(45) Date of Patent: Oct. 14, 2025

(54) LAUNDRY TREATING APPARATUS

(71) Applicant: LG ELECTRONICS INC., Seoul (KR)

(72) Inventors: Yunhi Lee, Seoul (KR); Jaehyun Kim, Seoul (KR); Hyunsun Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 597 days.

(21) Appl. No.: 17/827,165

(22) Filed: May 27, 2022

(65) Prior Publication Data

US 2022/0380956 A1    Dec. 1, 2022

(30) Foreign Application Priority Data

| May 28, 2021 | (KR) | ............... | 10-2021-0069528 |
| Jun. 1, 2021 | (KR) | ............... | 10-2021-0071149 |
| Jul. 7, 2021 | (KR) | ............... | 10-2021-0089232 |
| Aug. 23, 2021 | (KR) | ............... | 10-2021-0110913 |
| Aug. 23, 2021 | (KR) | ............... | 10-2021-0110914 |
| Aug. 23, 2021 | (KR) | ............... | 10-2021-0110915 |
| Sep. 9, 2021 | (KR) | ............... | 10-2021-0120154 |

(Continued)

(51) Int. Cl.
 *D06F 29/00*   (2006.01)
 *D06F 58/10*   (2006.01)
 (Continued)

(52) U.S. Cl.
 CPC ............ *D06F 29/005* (2013.01); *D06F 58/10* (2013.01); *D06F 58/26* (2013.01); *D06F 73/02* (2013.01);
 (Continued)

(58) Field of Classification Search
 CPC .......... D06F 58/26; D06F 73/02; D06F 58/10; D06F 29/005; D06F 58/20; D06F 31/00; D06F 58/206; D06F 58/203; D06F 39/12
 See application file for complete search history.

(56) References Cited

U.S. PATENT DOCUMENTS

| 7,320,234 B2 | 1/2008 | Hershey et al. |
| 2002/0017117 A1 | 2/2002 | Sunshine et al. |
| (Continued) | | |

FOREIGN PATENT DOCUMENTS

| CN | 103348053 A | 10/2013 |
| CN | 104018328 A | 9/2014 |
| (Continued) | | |

*Primary Examiner* — Benjamin L Osterhout
(74) *Attorney, Agent, or Firm* — Birch, Stewart, Kolasch & Birch, LLP

(57) ABSTRACT

The present disclosure relates to a laundry treating apparatus. The laundry treating apparatus according to an aspect of the present disclosure includes: a first laundry treating machine including a first cabinet and a first drum rotatably disposed in the first cabinet; a second laundry treating machine including a second cabinet vertically disposed with respect to the first cabinet and a second drum rotatably disposed in the second cabinet; a third laundry treating machine including a third cabinet disposed on one side of the first cabinet and the second cabinet, and having an inner space for receiving laundry; and a heating device disposed at a lateral side of the third cabinet and for heating air supplied into the inner space of the third cabinet.

17 Claims, 55 Drawing Sheets

(30) Foreign Application Priority Data

Sep. 9, 2021 (KR) .................. 10-2021-0120155
Sep. 9, 2021 (KR) .................. 10-2021-0120161
Sep. 24, 2021 (KR) .................. 10-2021-0126520

(51) Int. Cl.
*D06F 58/26* (2006.01)
*D06F 73/02* (2006.01)
*D06F 31/00* (2006.01)
*D06F 39/12* (2006.01)
*D06F 58/20* (2006.01)

(52) U.S. Cl.
CPC .............. *D06F 31/00* (2013.01); *D06F 39/12* (2013.01); *D06F 58/20* (2013.01); *D06F 58/203* (2013.01); *D06F 58/206* (2013.01)

(56) References Cited

U.S. PATENT DOCUMENTS

| | | |
|---|---|---|
| 2004/0194339 A1 | 10/2004 | Johnson et al. |
| 2005/0155393 A1 | 7/2005 | Wright et al. |
| 2006/0112585 A1 | 6/2006 | Choi et al. |
| 2006/0137210 A1* | 6/2006 | Lee .................. D06F 73/02 34/201 |
| 2006/0156765 A1 | 7/2006 | Sunshine et al. |
| 2007/0151300 A1 | 7/2007 | Sunshine |
| 2007/0151301 A1 | 7/2007 | Kendall et al. |
| 2007/0169519 A1 | 7/2007 | Hershey et al. |
| 2007/0256457 A1 | 11/2007 | Kendall et al. |
| 2008/0229515 A1 | 9/2008 | Hong et al. |
| 2009/0126421 A1 | 5/2009 | Kim et al. |
| 2010/0299976 A1 | 12/2010 | Roselle et al. |
| 2011/0132043 A1 | 6/2011 | Kim |
| 2011/0185511 A1 | 8/2011 | Ryoo et al. |
| 2014/0026433 A1 | 1/2014 | Bison et al. |
| 2016/0186374 A1 | 6/2016 | Ryoo et al. |
| 2018/0340285 A1 | 11/2018 | Chol et al. |
| 2018/0340288 A1* | 11/2018 | Kim .................. D06F 33/48 |
| 2020/0240065 A1 | 7/2020 | Underly et al. |
| 2021/0148029 A1 | 5/2021 | Lv et al. |

FOREIGN PATENT DOCUMENTS

| | | | |
|---|---|---|---|
| CN | 105316890 A | | 2/2016 |
| CN | 106032612 A | | 10/2016 |
| CN | 106283485 A | | 1/2017 |
| CN | 108301165 A | | 7/2018 |
| CN | 109582306 A | | 4/2019 |
| CN | 209652609 U | * | 11/2019 |
| CN | 209686107 U | * | 11/2019 |
| CN | 111996767 A | | 11/2020 |
| DE | 10 2006 015 840 A1 | | 10/2007 |
| DE | 10 2008 006 111 A1 | | 7/2009 |
| DE | 10 2008 064 737 B3 | | 8/2016 |
| EP | 1 029 961 A2 | | 8/2000 |
| EP | 3940134 A1 | * | 1/2022 ............. D06F 39/12 |
| JP | 2004-159859 A | | 6/2004 |
| JP | 2008-307151 A | | 12/2008 |
| KR | 10-2005-0066534 A | | 6/2005 |
| KR | 10-2006-0042568 A | | 5/2006 |
| KR | 10-2006-0046802 A | | 5/2006 |
| KR | 10-2006-0060211 A | | 6/2006 |
| KR | 10-0587360 B1 | | 6/2006 |
| KR | 10-2006-0111128 A | | 10/2006 |
| KR | 10-0658842 B1 | | 12/2006 |
| KR | 10-0674718 B1 | | 1/2007 |
| KR | 10-0839519 B1 | | 6/2008 |
| KR | 10-2008-0100964 A | | 11/2008 |
| KR | 20100025981 A | * | 3/2010 |
| KR | 10-2019-0131259 A | | 11/2019 |
| KR | 10-2120993 B1 | | 6/2020 |
| KR | 10-2020-0109194 A | | 9/2020 |
| KR | 102200698 B1 | * | 1/2021 |
| KR | 10-2254903 B1 | | 5/2021 |
| WO | WO 2007/148894 A2 | | 12/2007 |
| WO | WO 2008/066539 A1 | | 6/2008 |
| WO | WO 2011/149320 A2 | | 12/2011 |
| WO | WO 2014/017004 A1 | | 1/2014 |
| WO | WO 2017/119673 A1 | | 7/2017 |
| WO | WO 2019/141063 A1 | | 7/2019 |
| WO | WO 2019/154266 A1 | | 8/2019 |
| WO | WO 2021/083006 A1 | | 5/2021 |

* cited by examiner

[FIG 1]
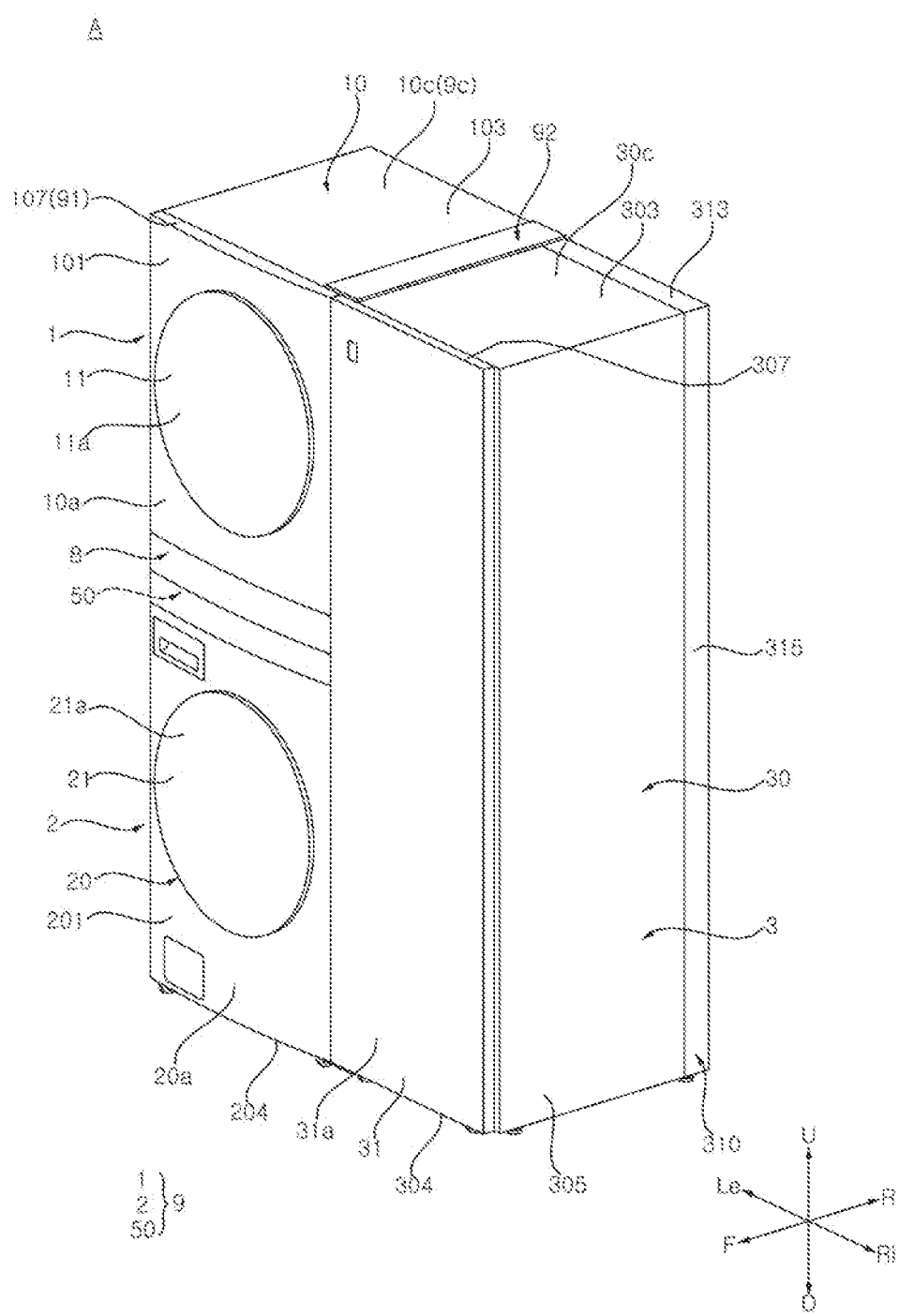

[FIG 2]
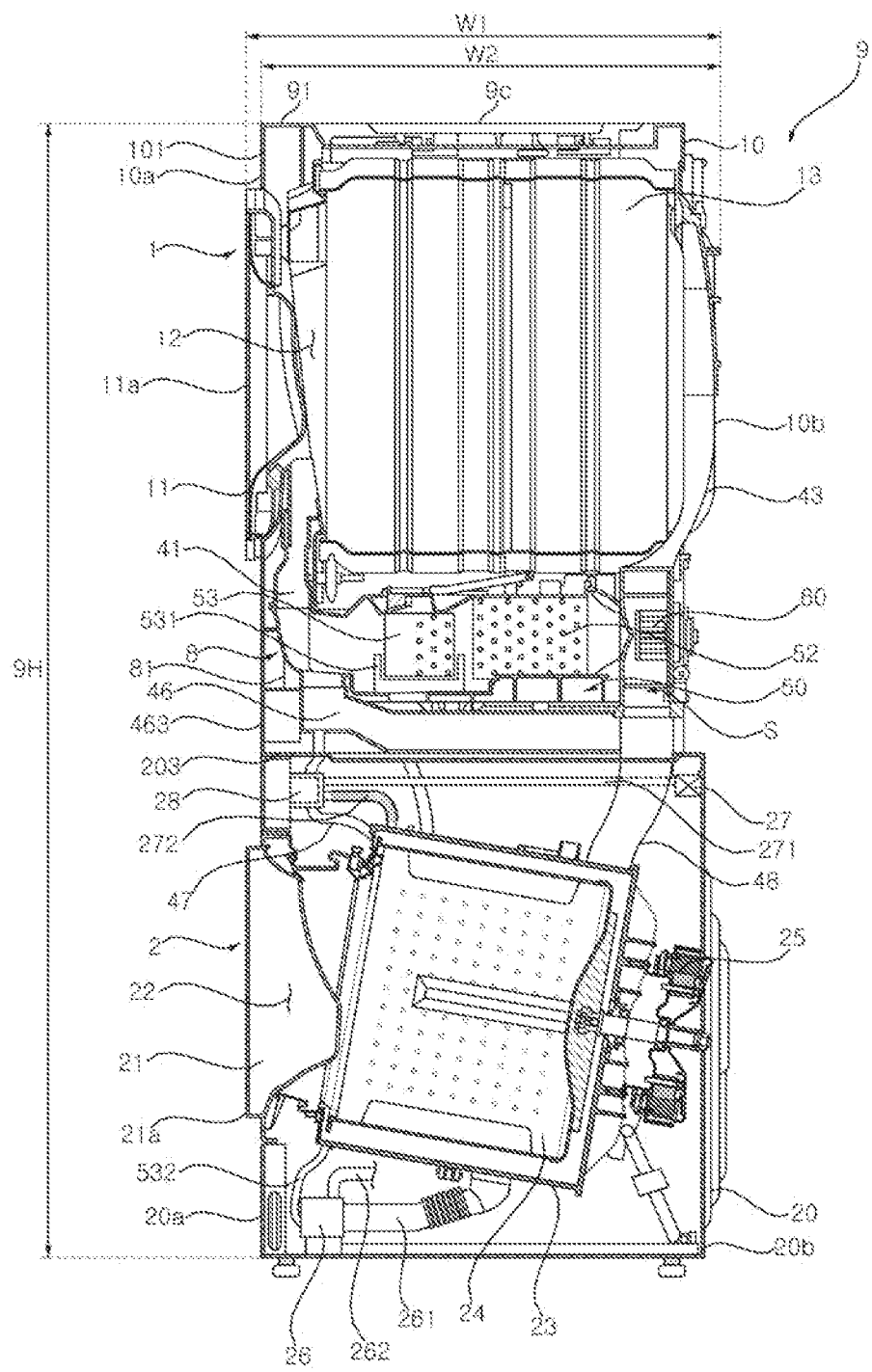

[FIG 3]
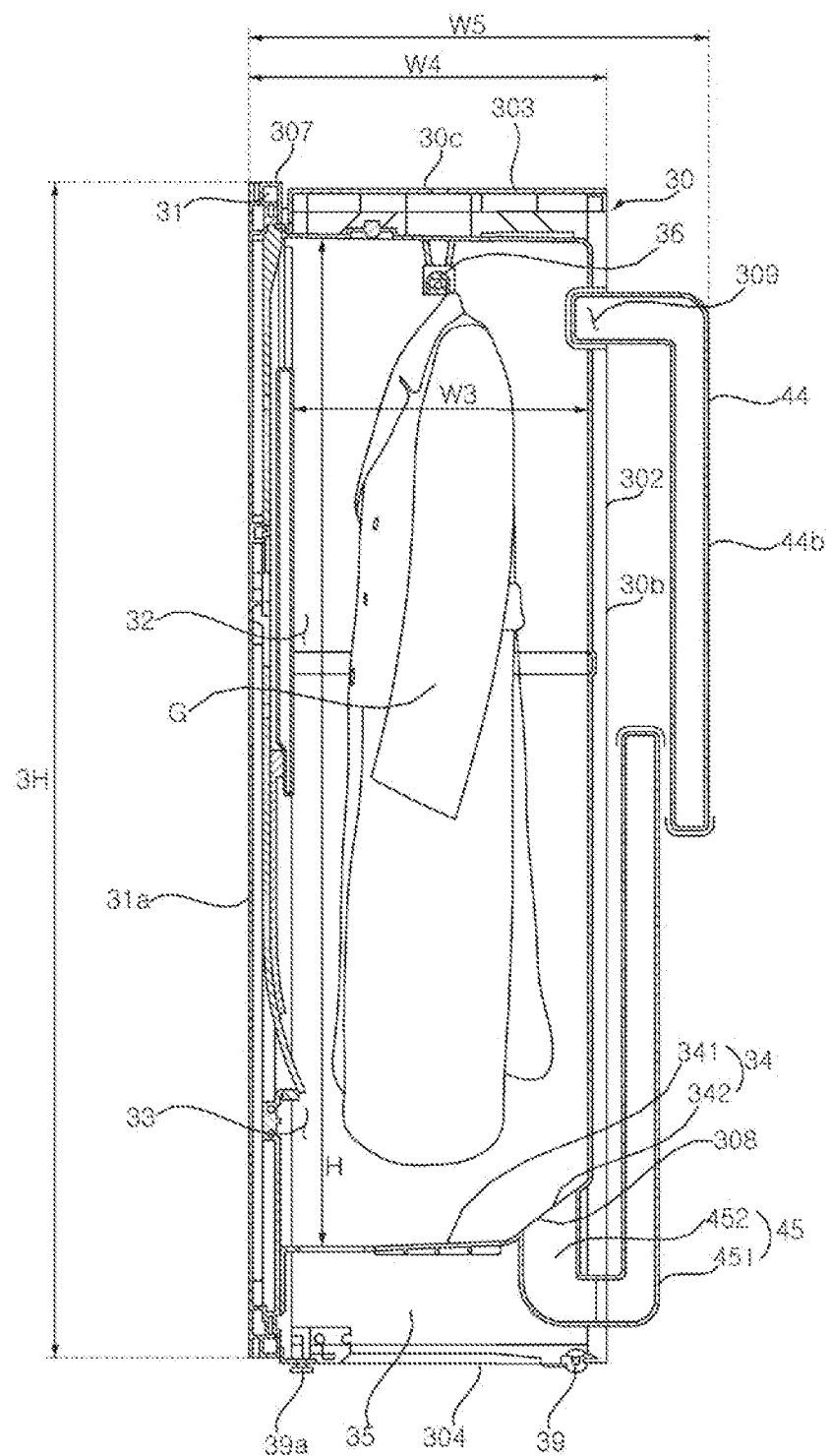

[FIG 4]
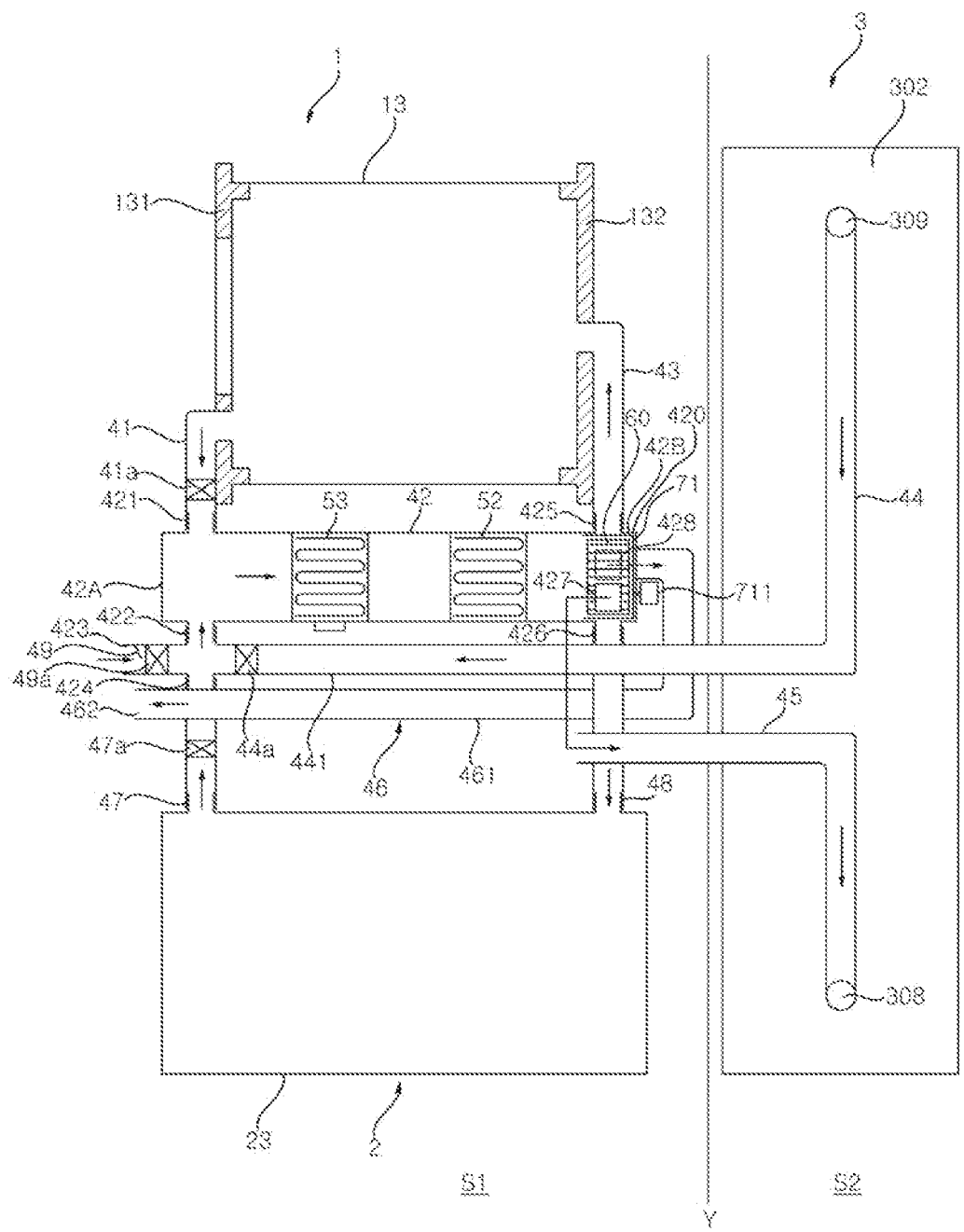

[FIG 5]
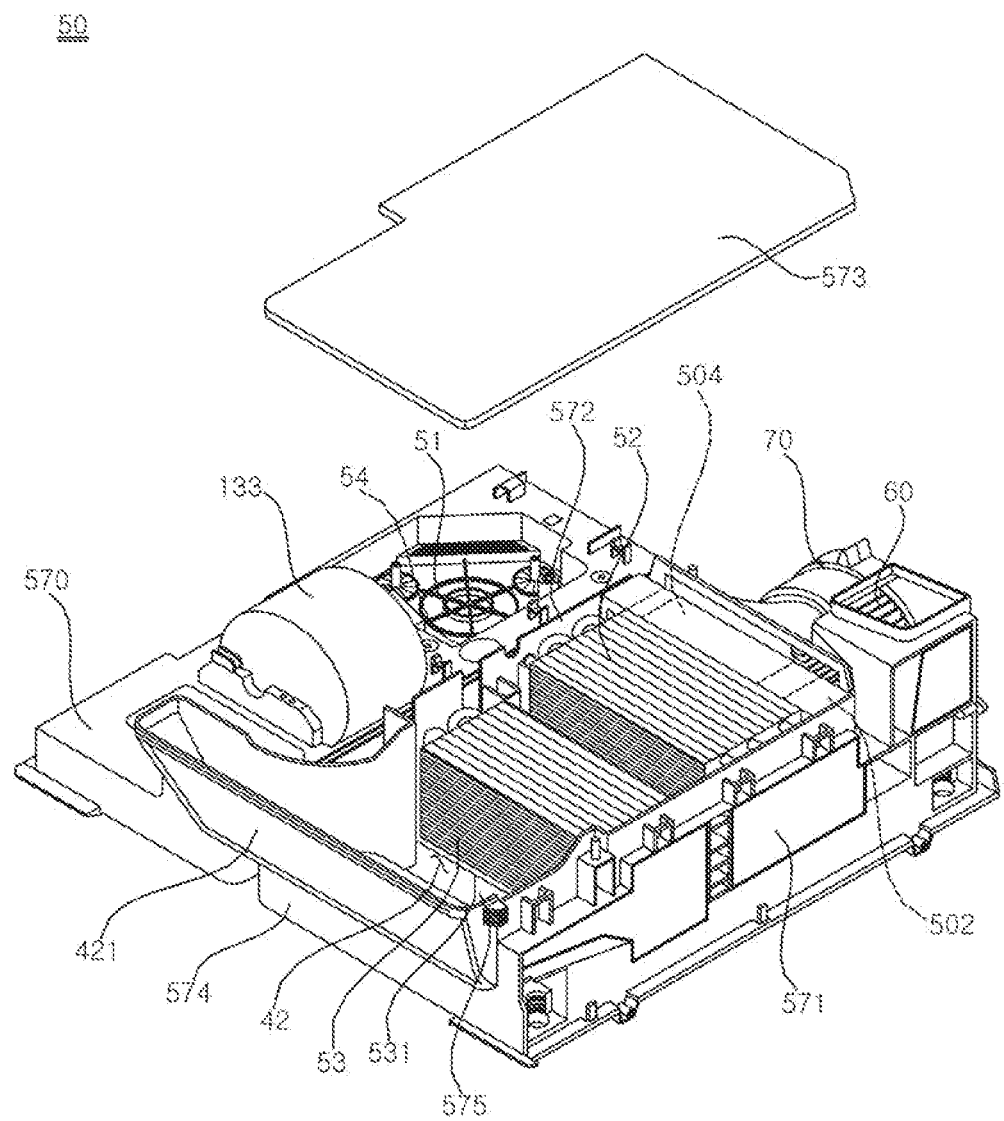

[FIG 6]
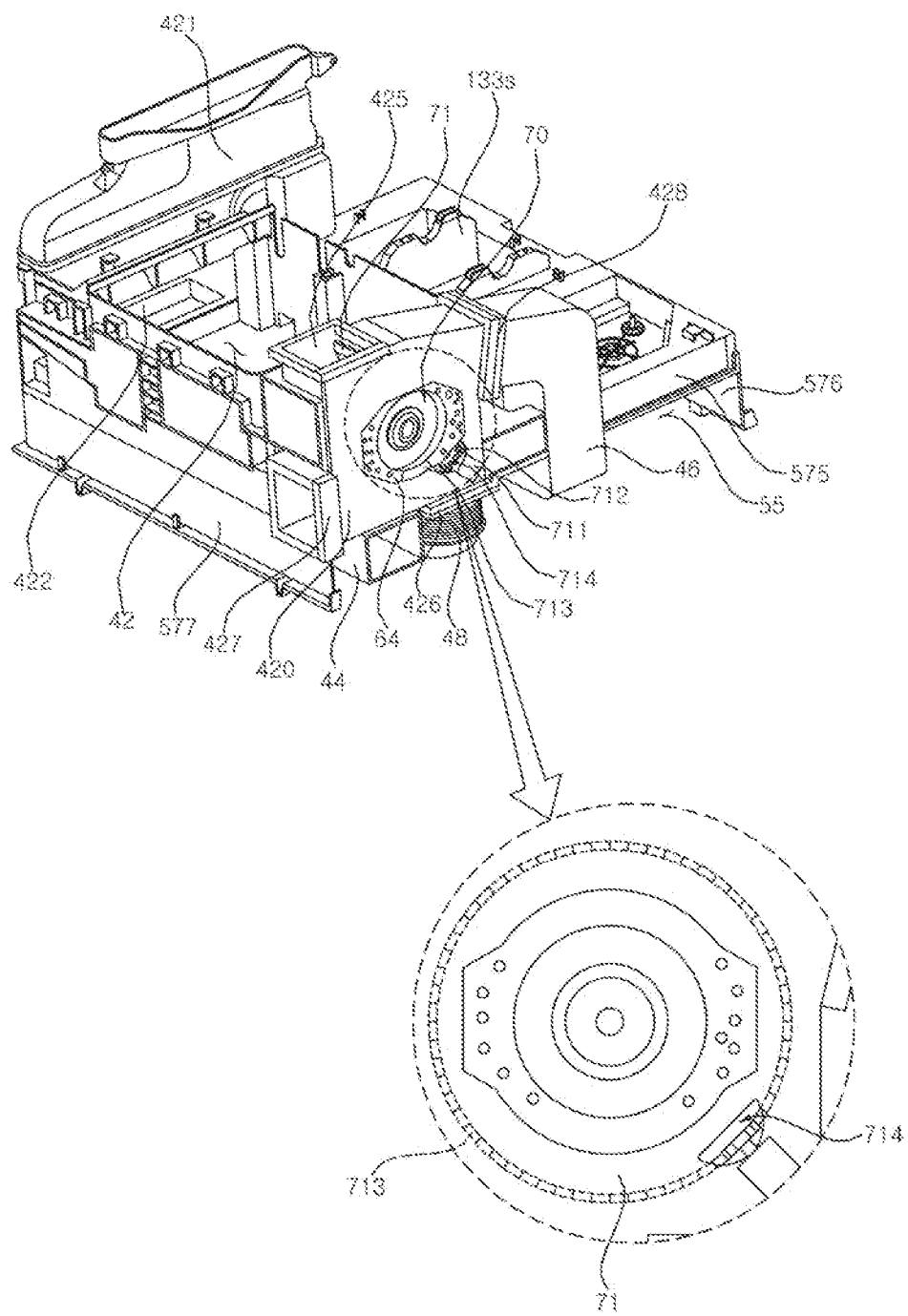

[FIG 7]
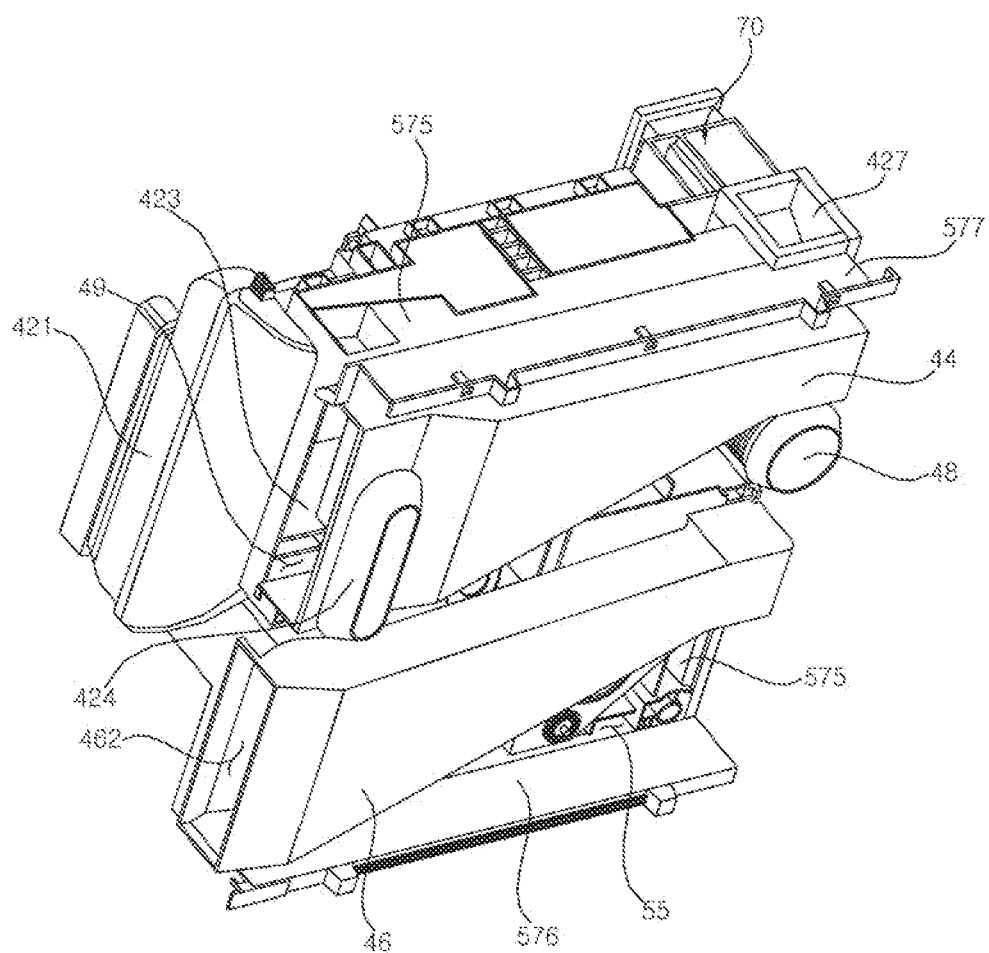

[FIG 8]
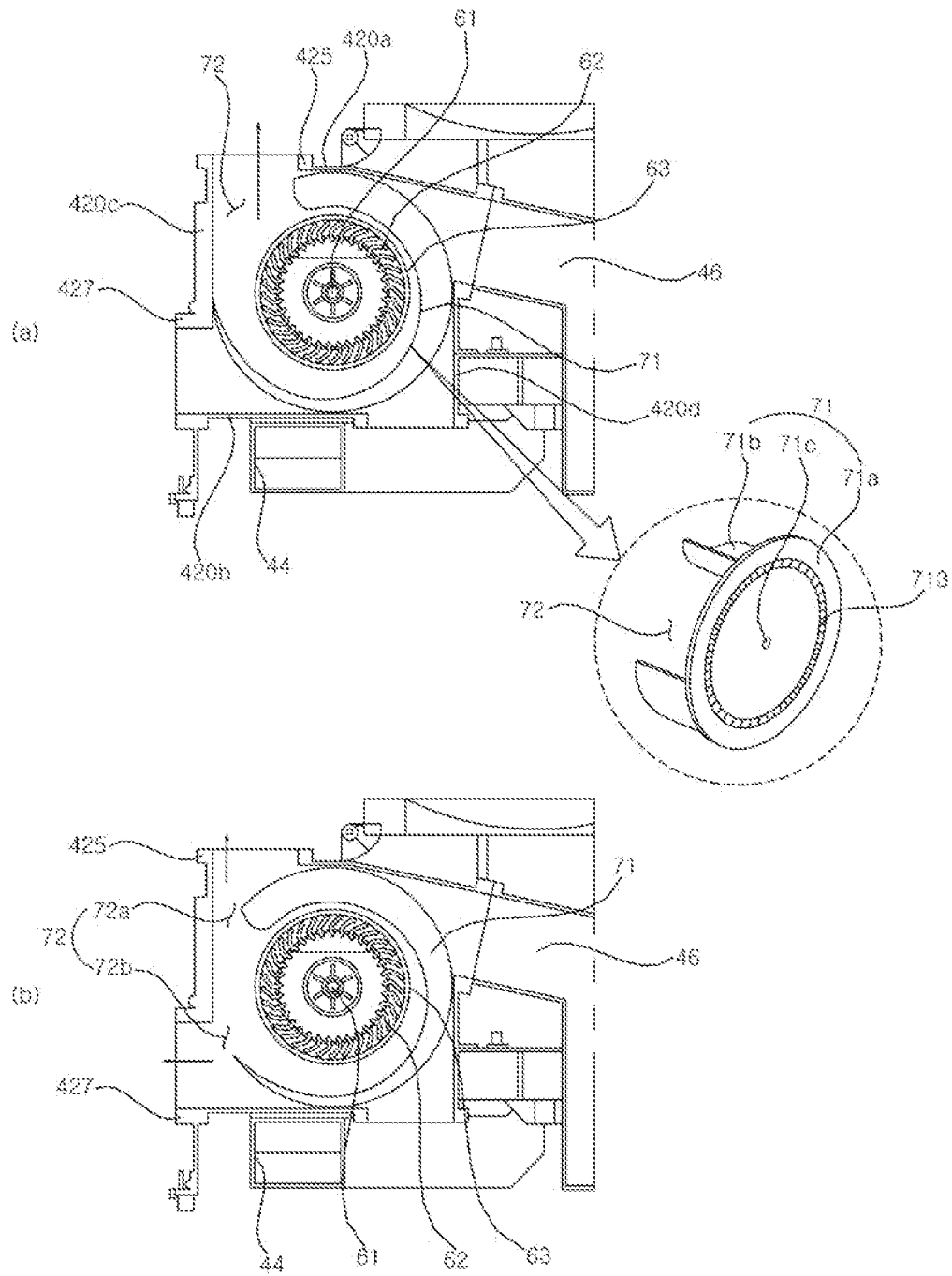

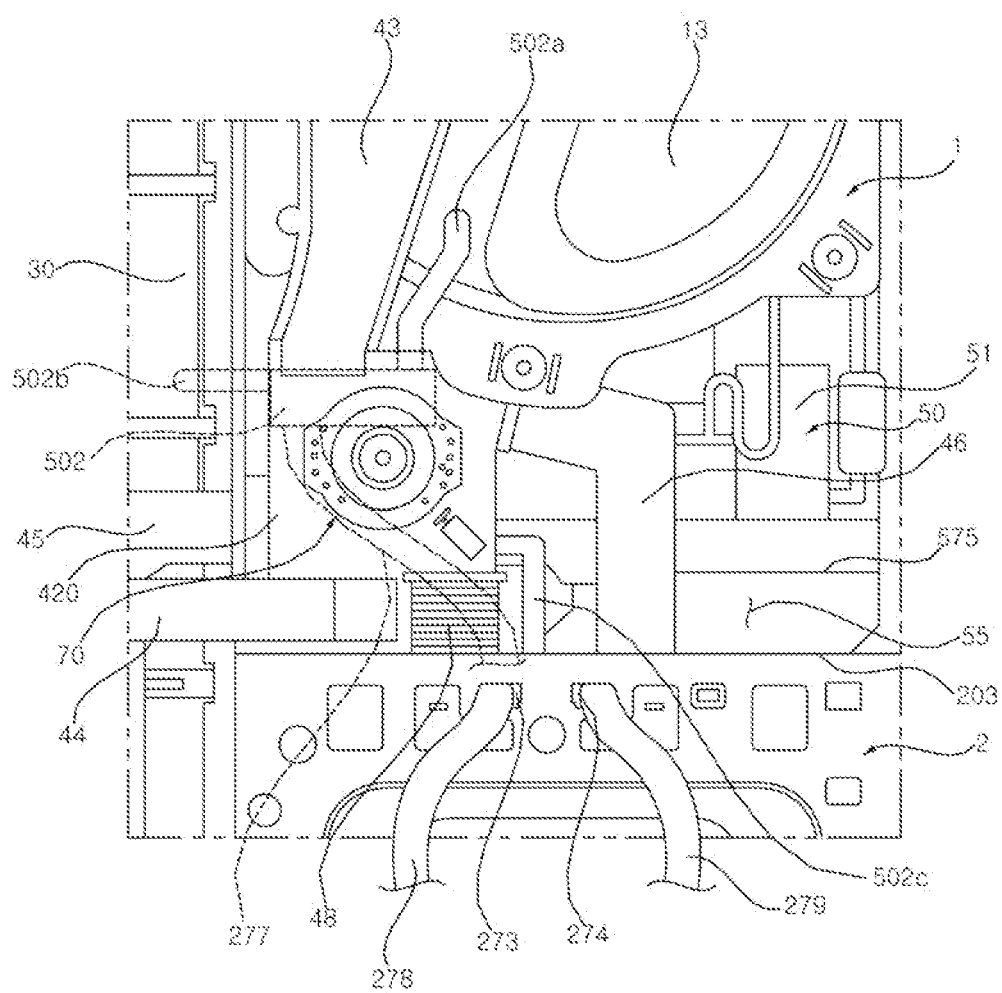
[FIG 9]

[FIG 10]
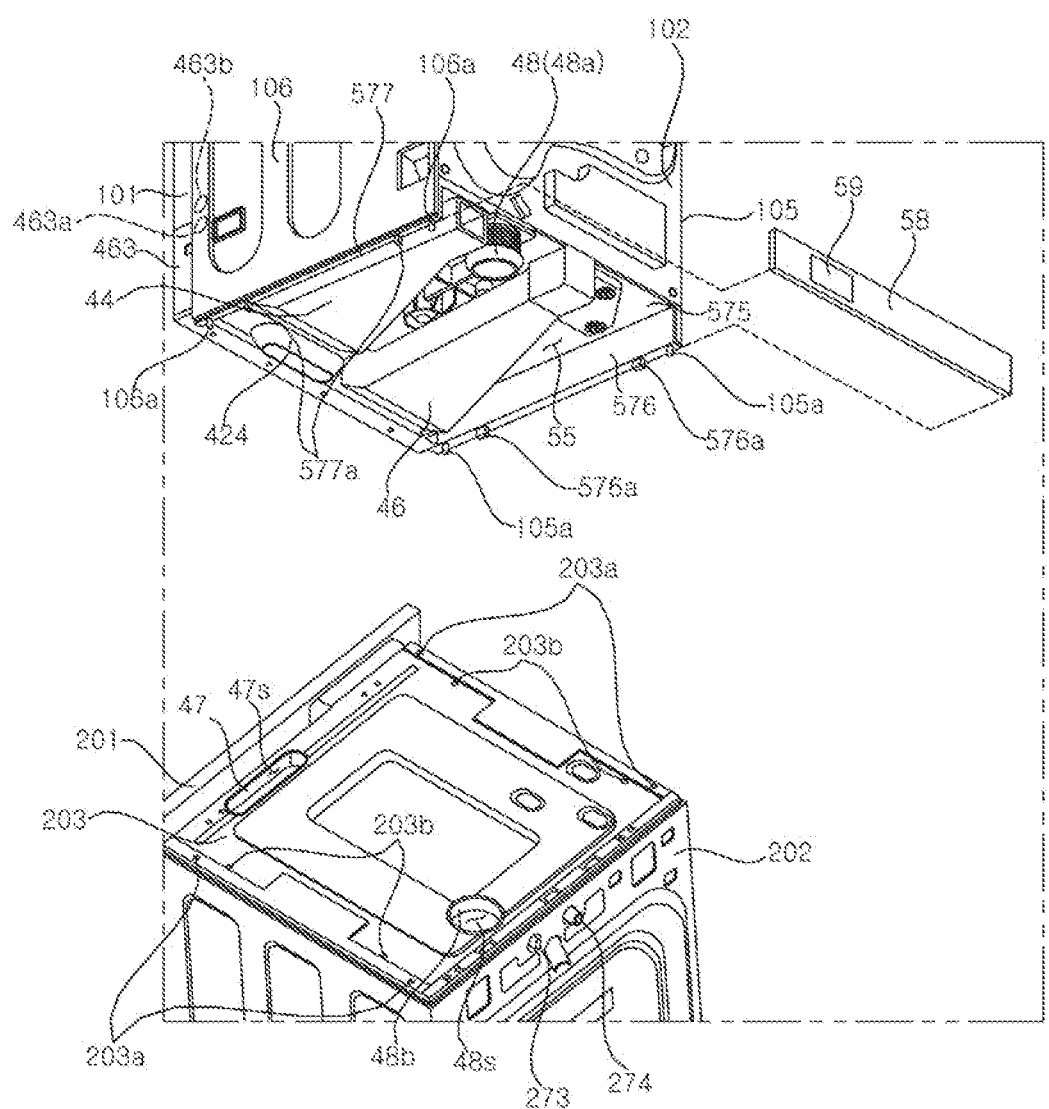

[FIG 11]
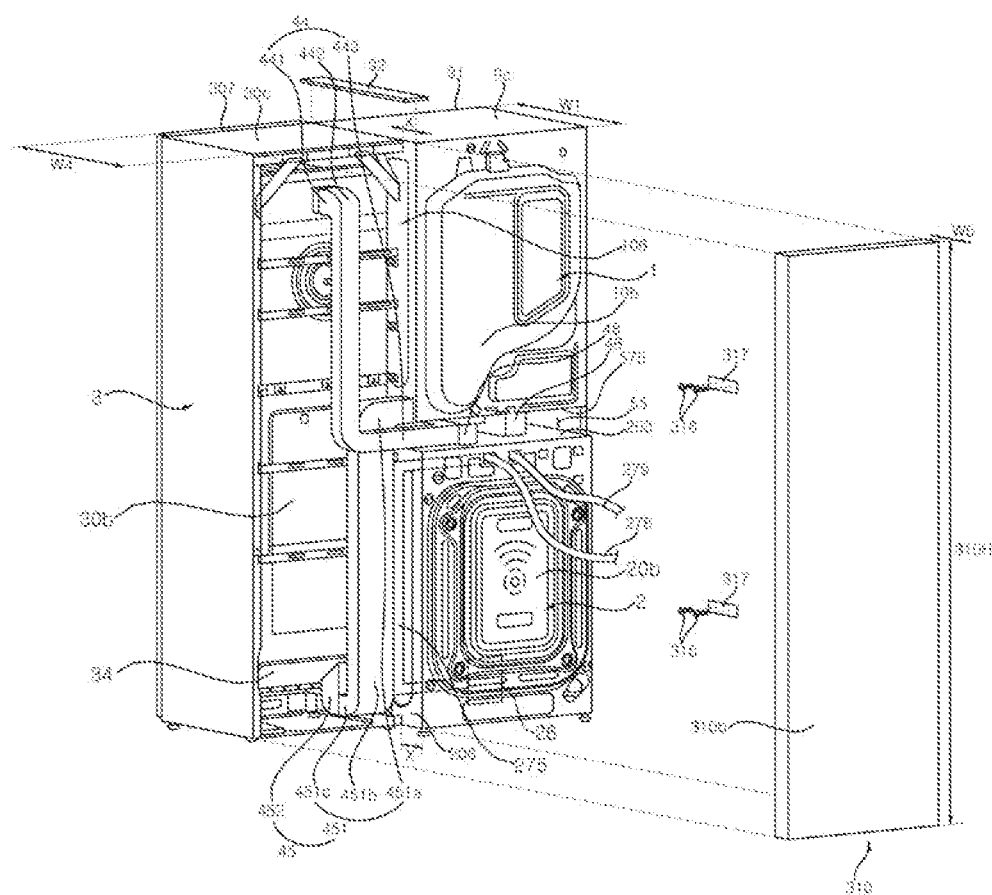

[FIG 12]
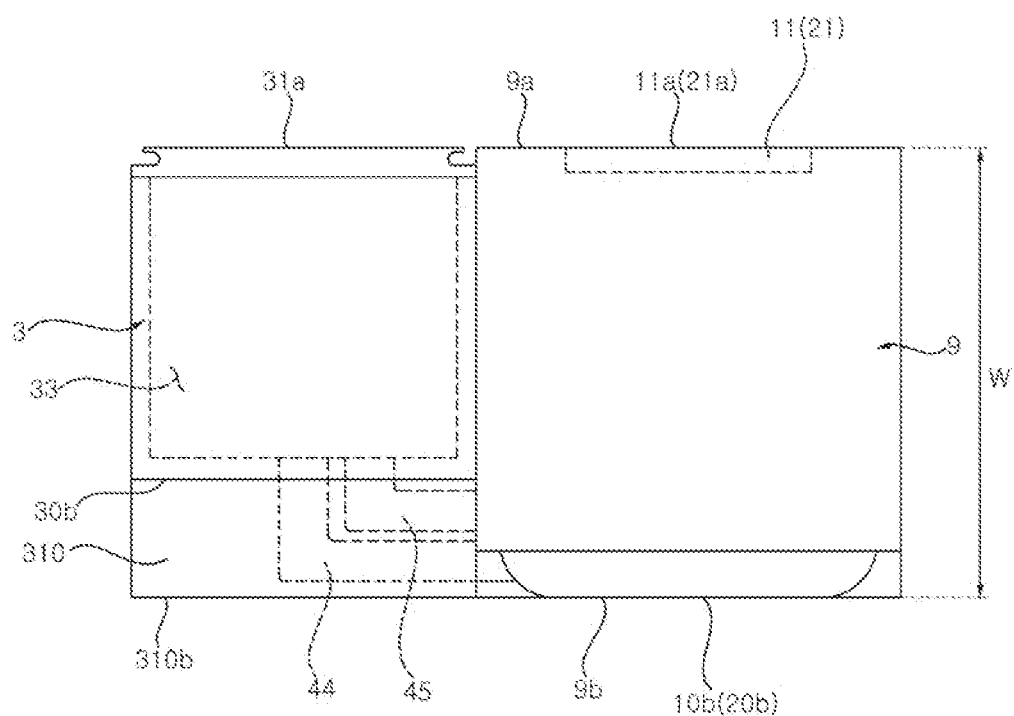

[FIG 13]
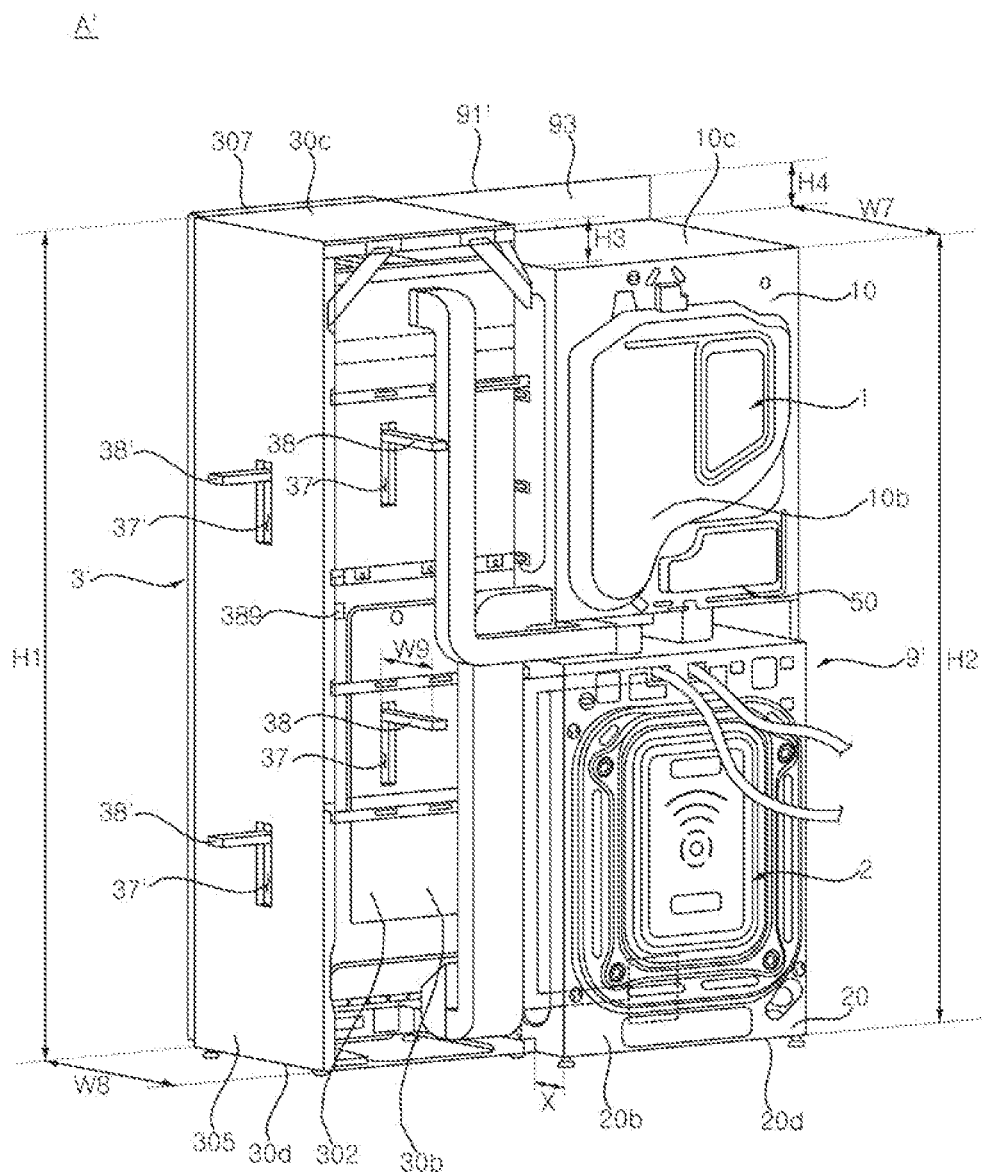

[FIG 14]
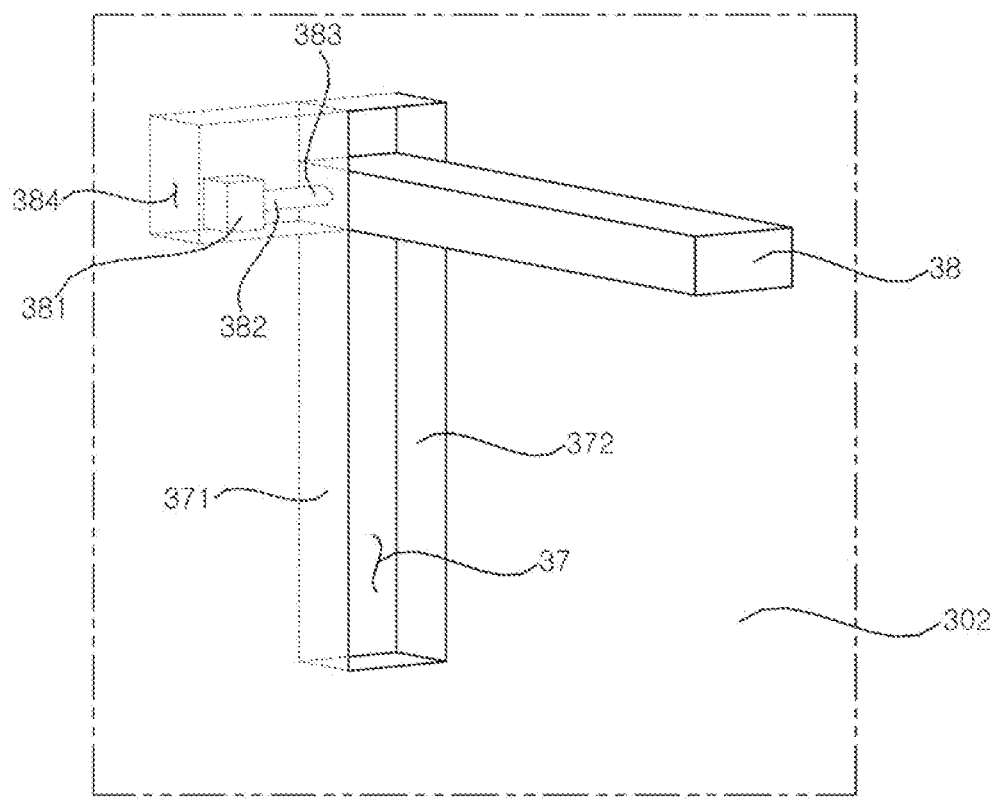

[FIG 15]
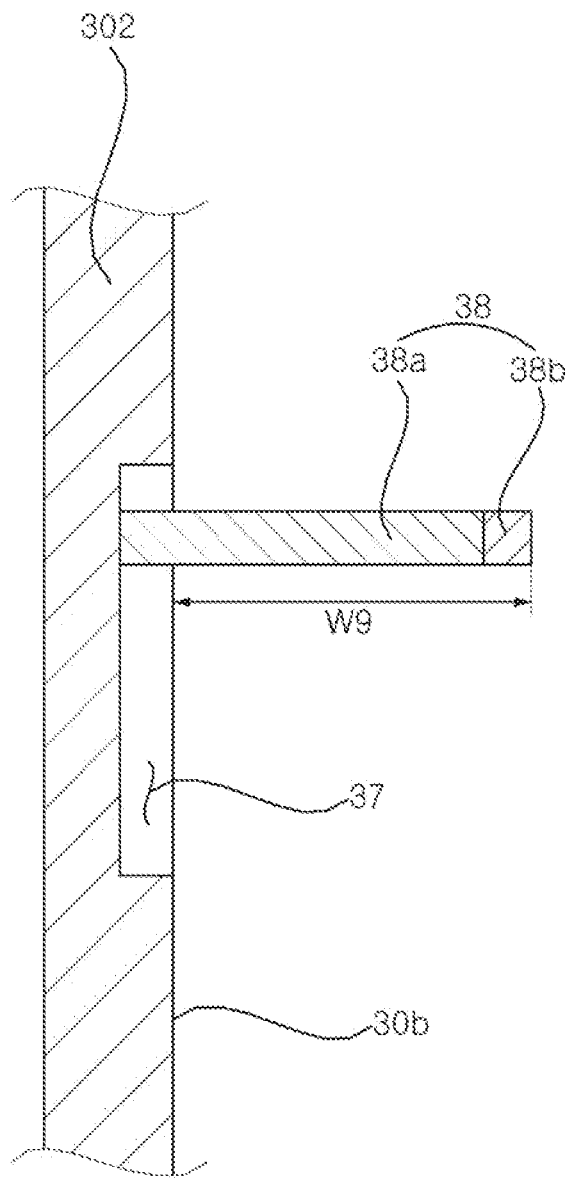

[FIG 16]
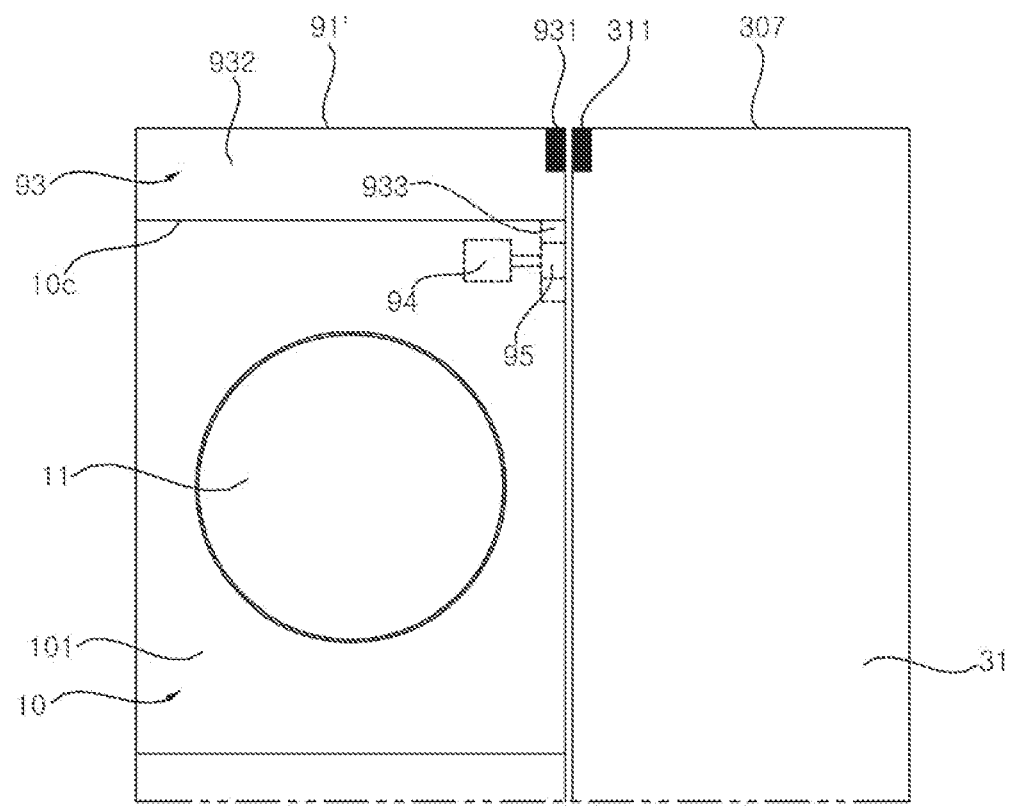
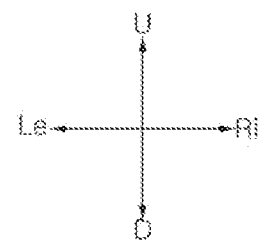

[FIG 17]
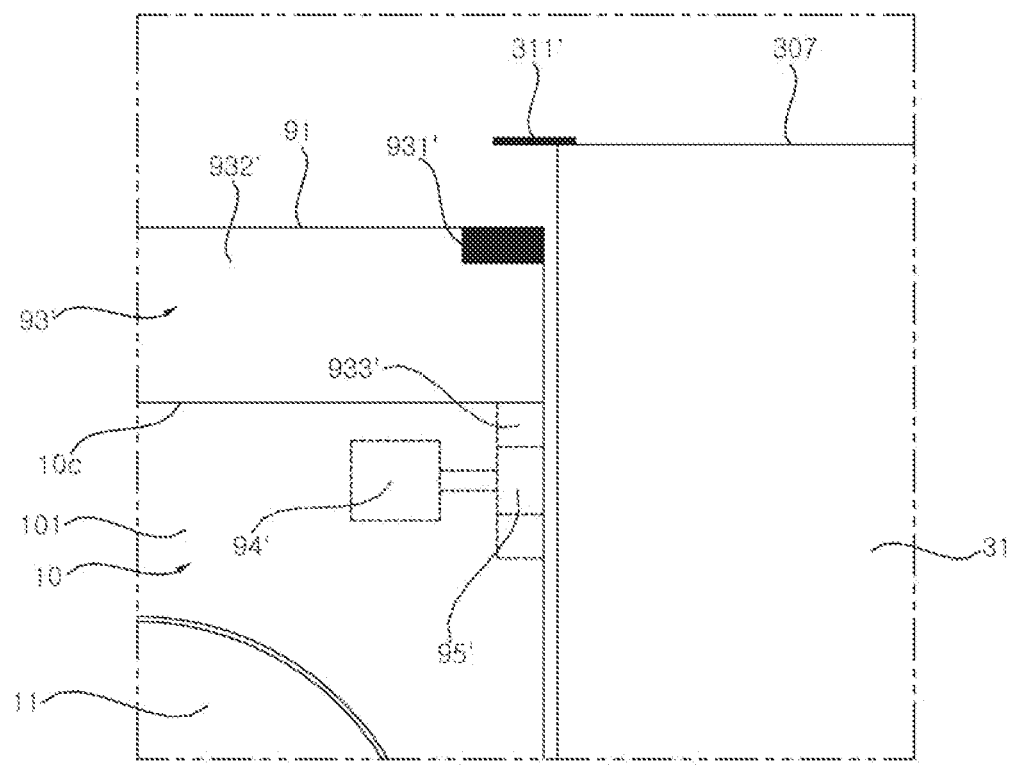
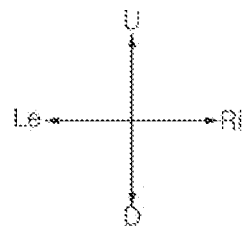

[FIG 18]
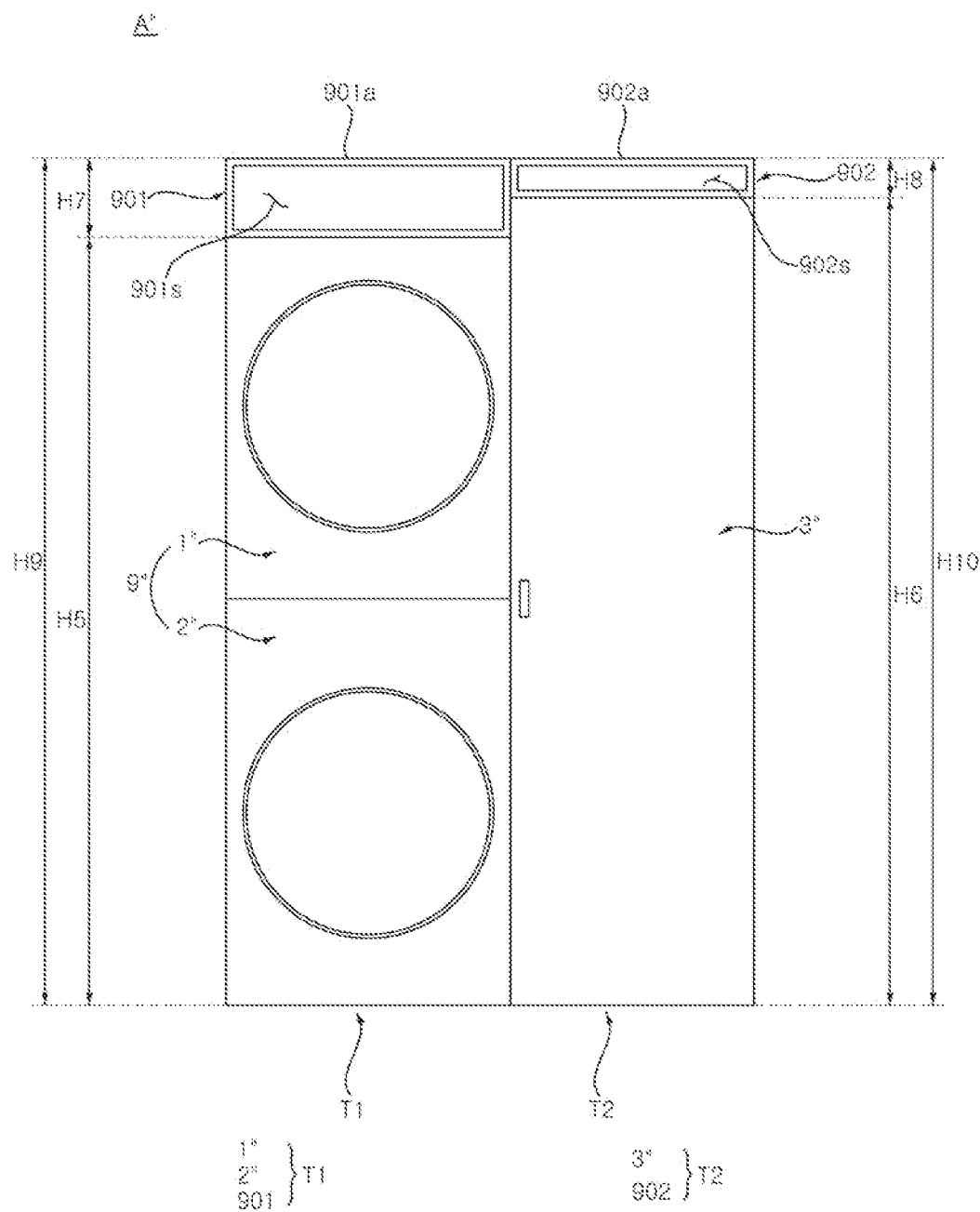

[FIG 19]
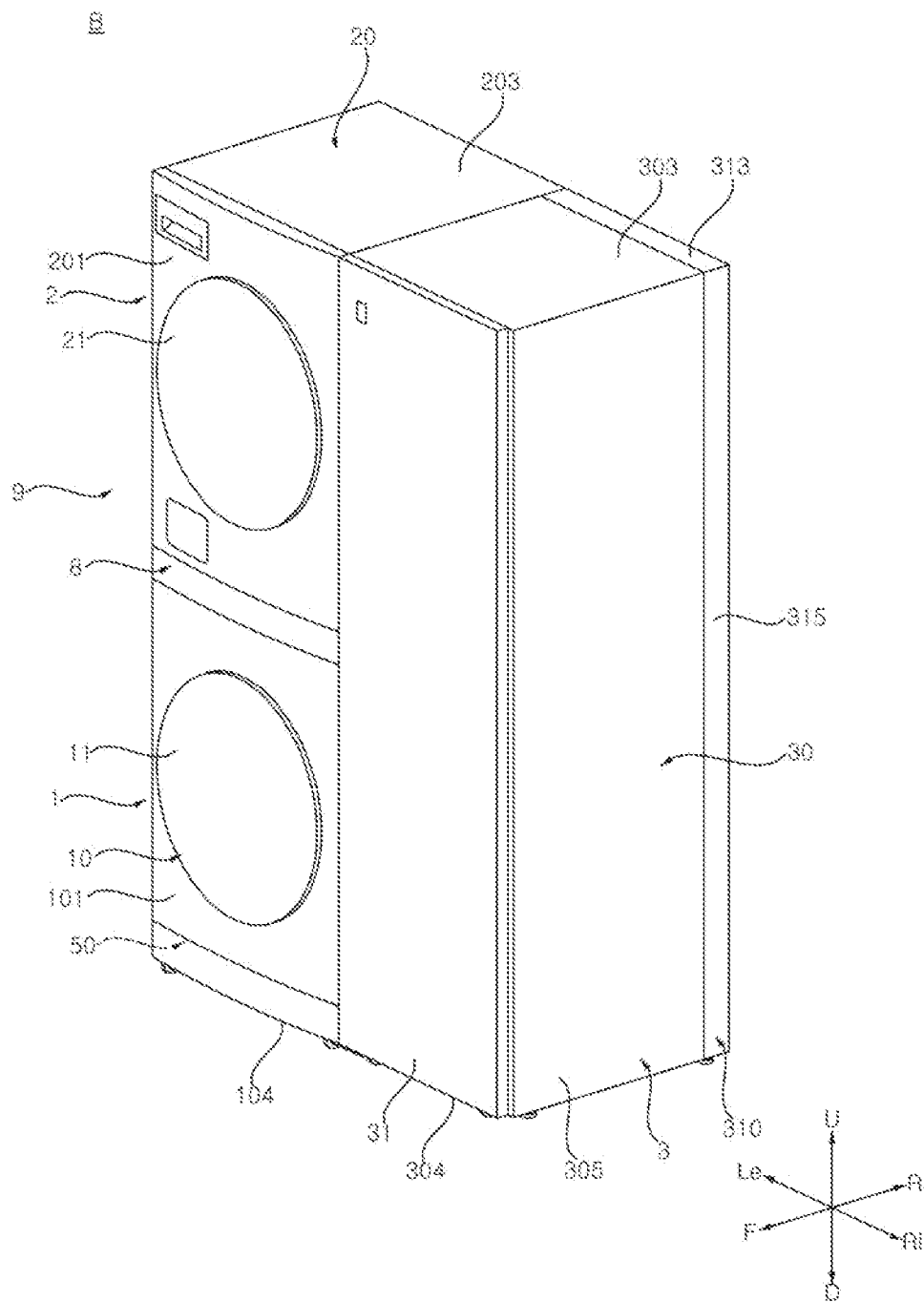

[FIG 20]
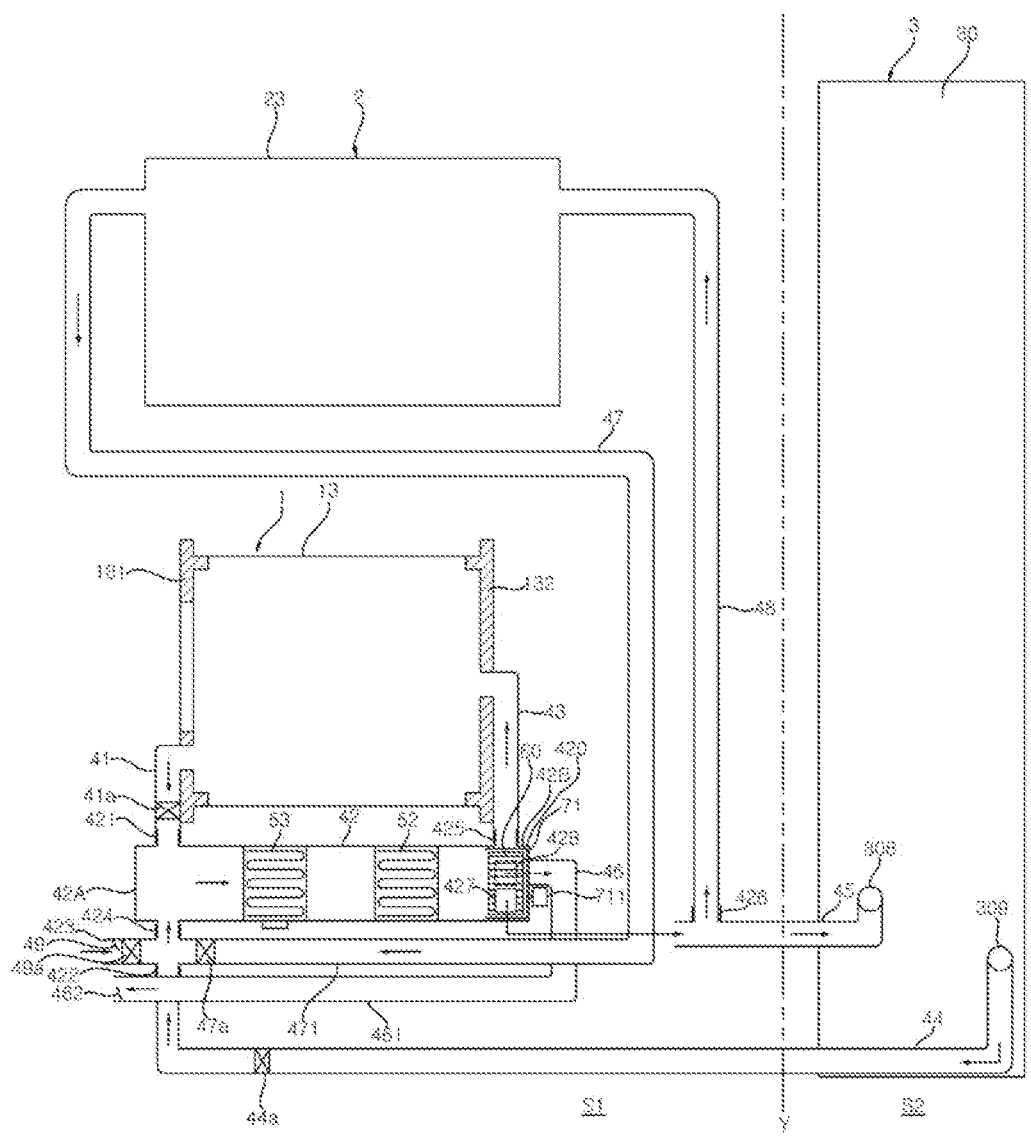

[FIG 21]
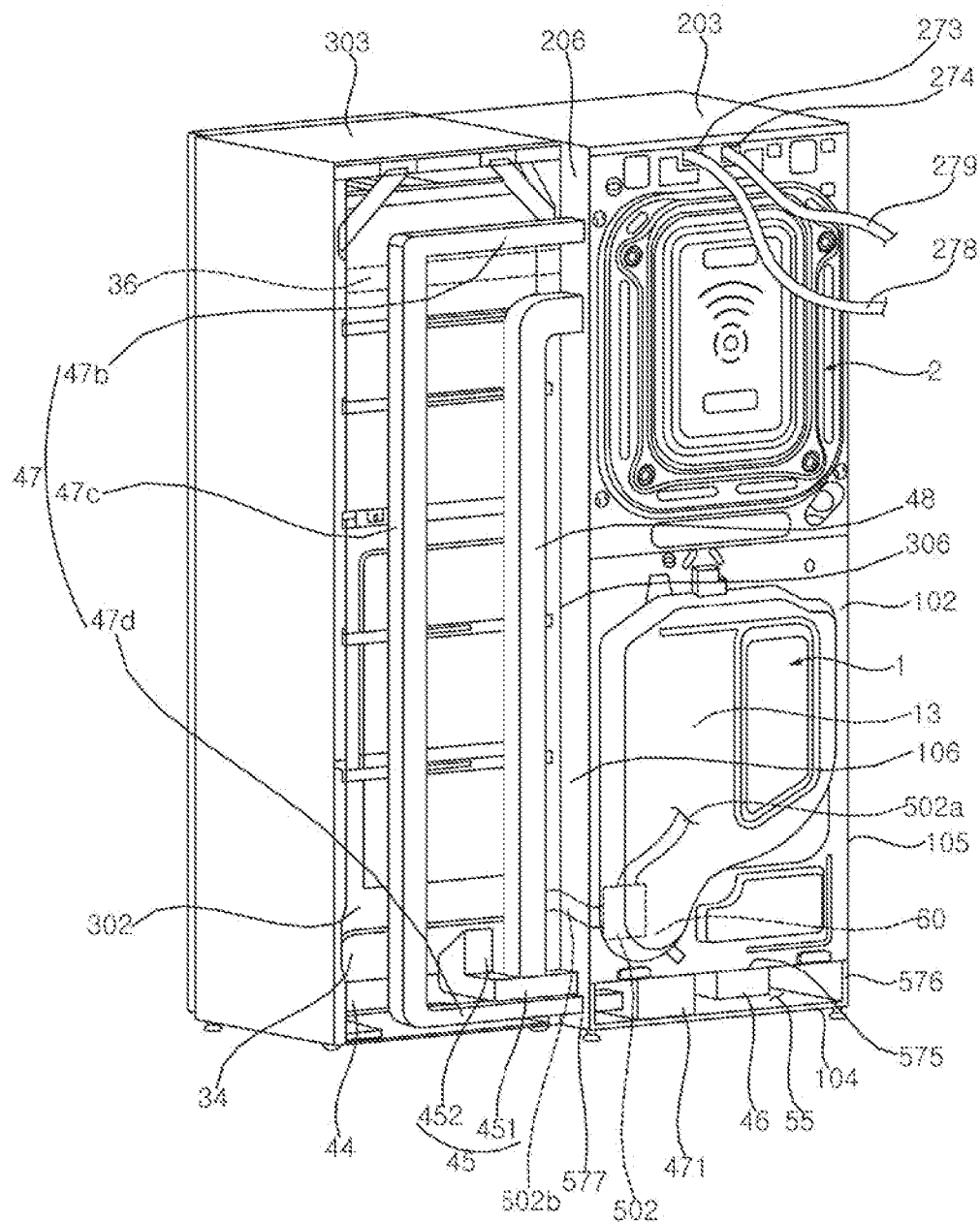

[FIG 22]
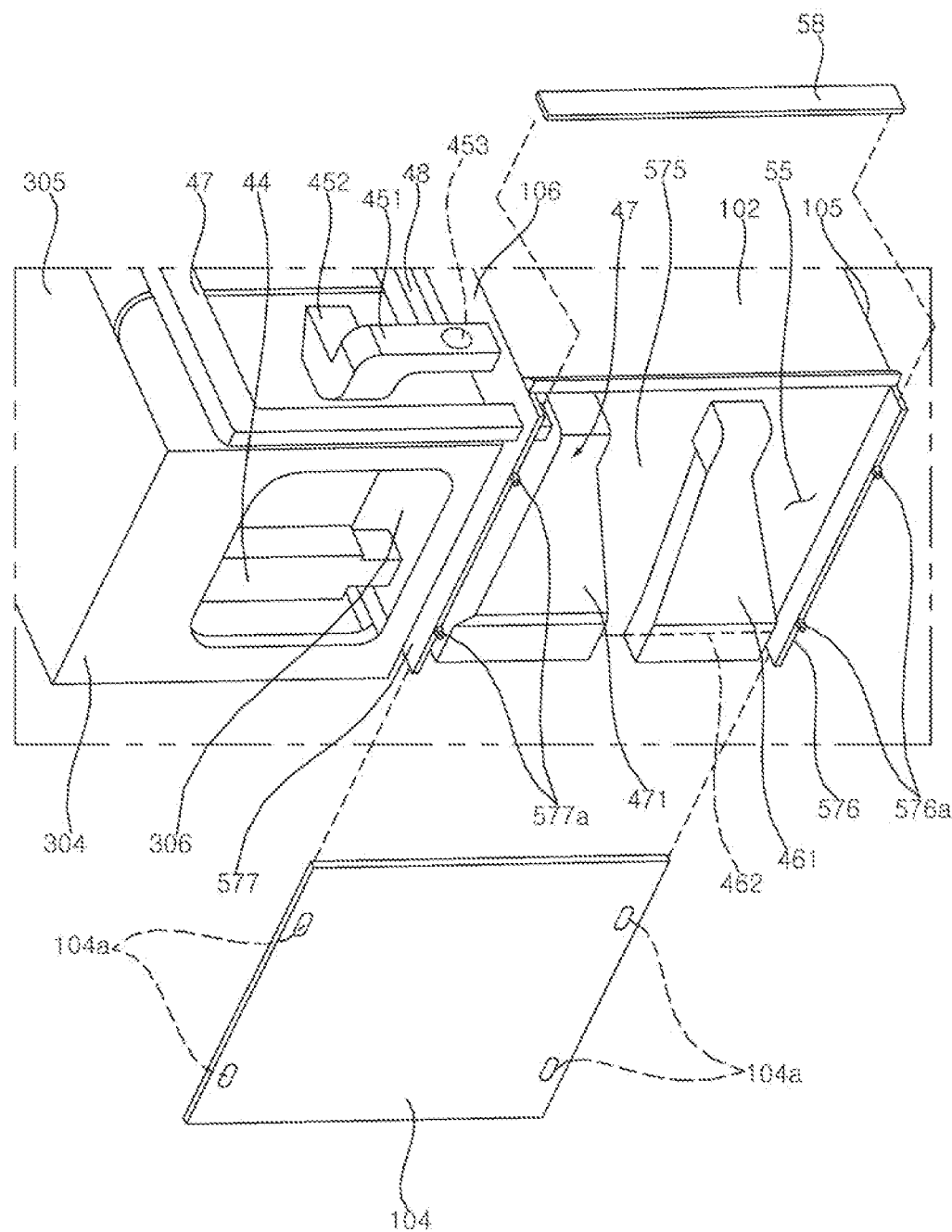

[FIG 23]
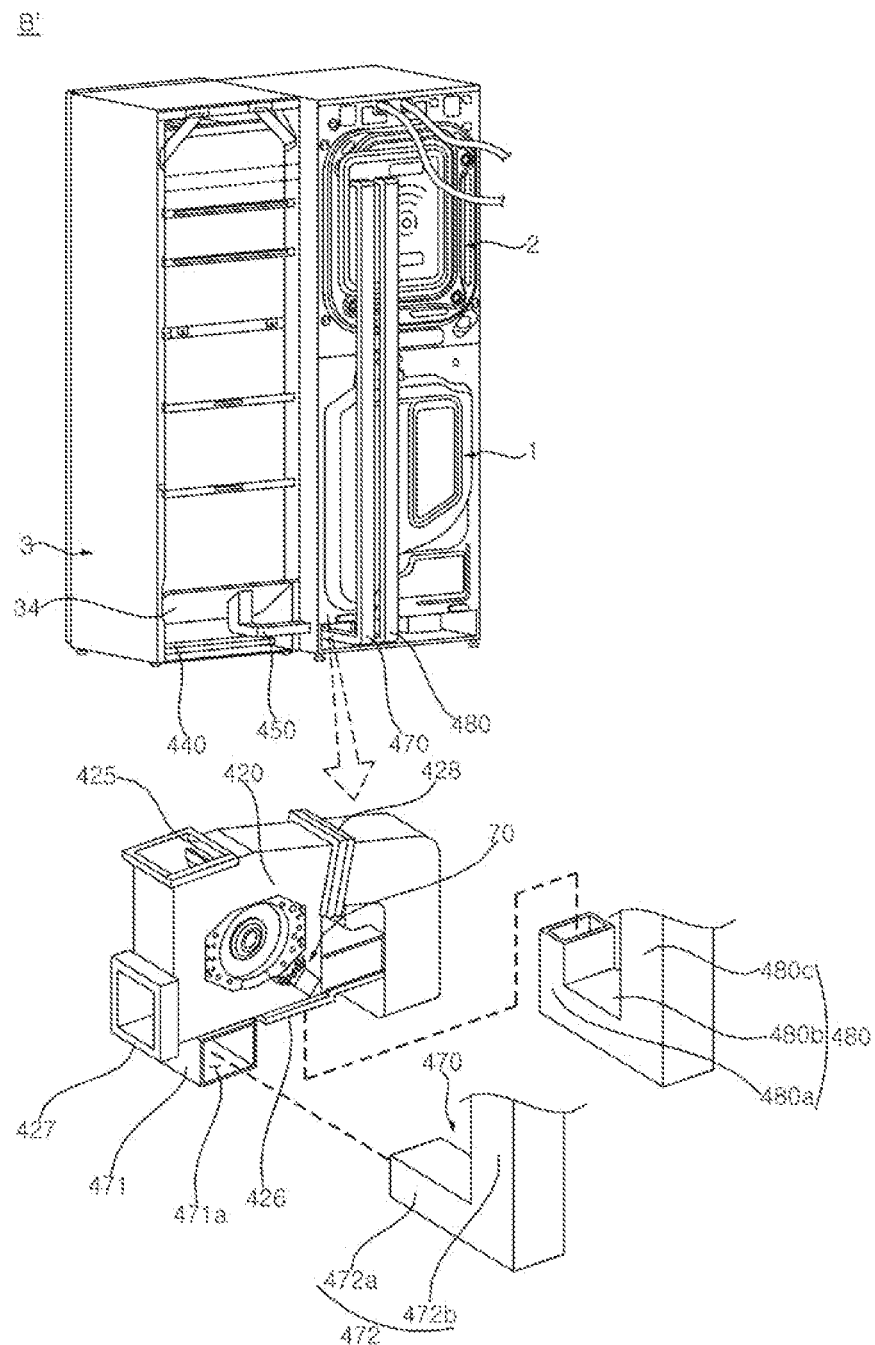

[FIG 24]
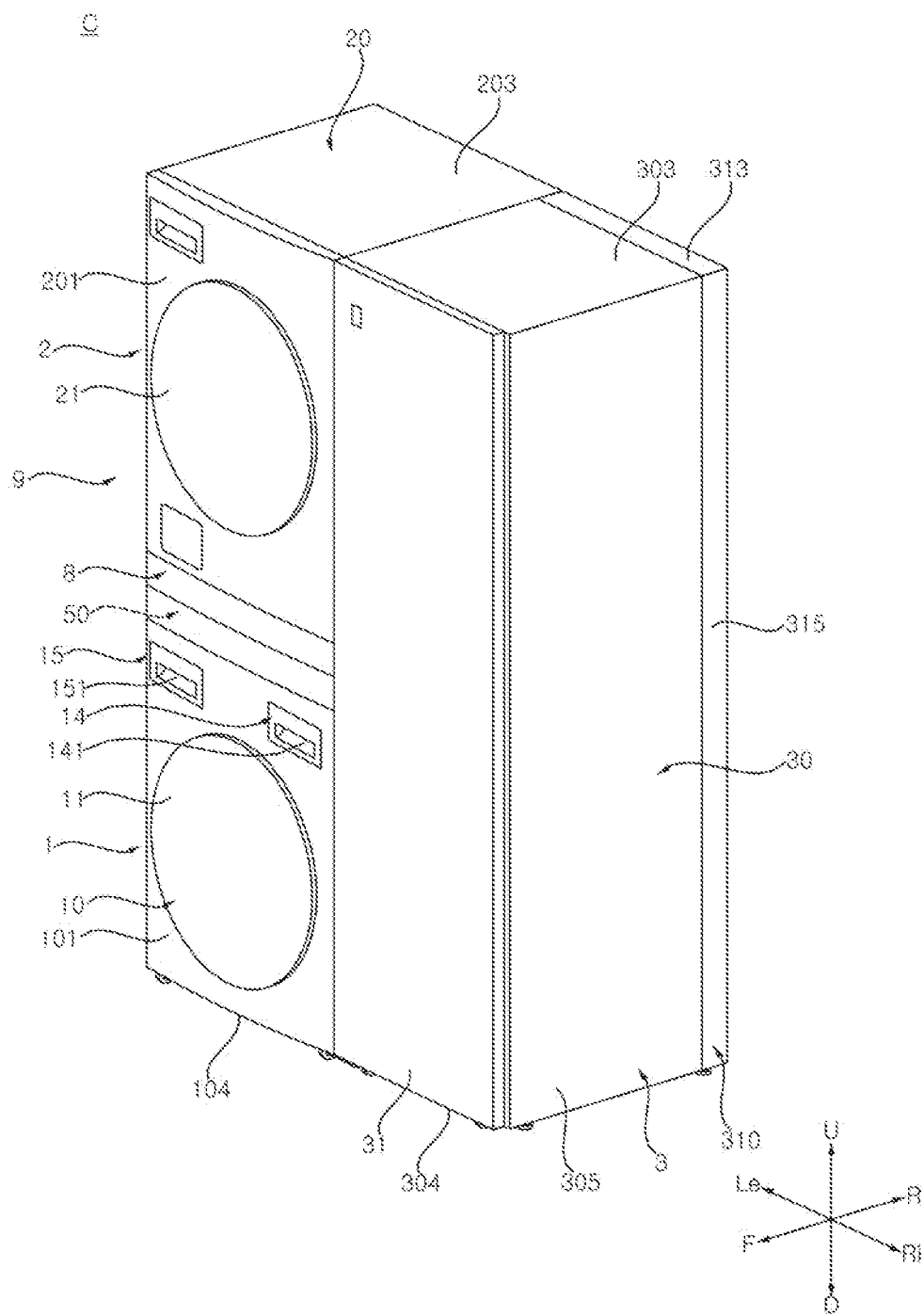

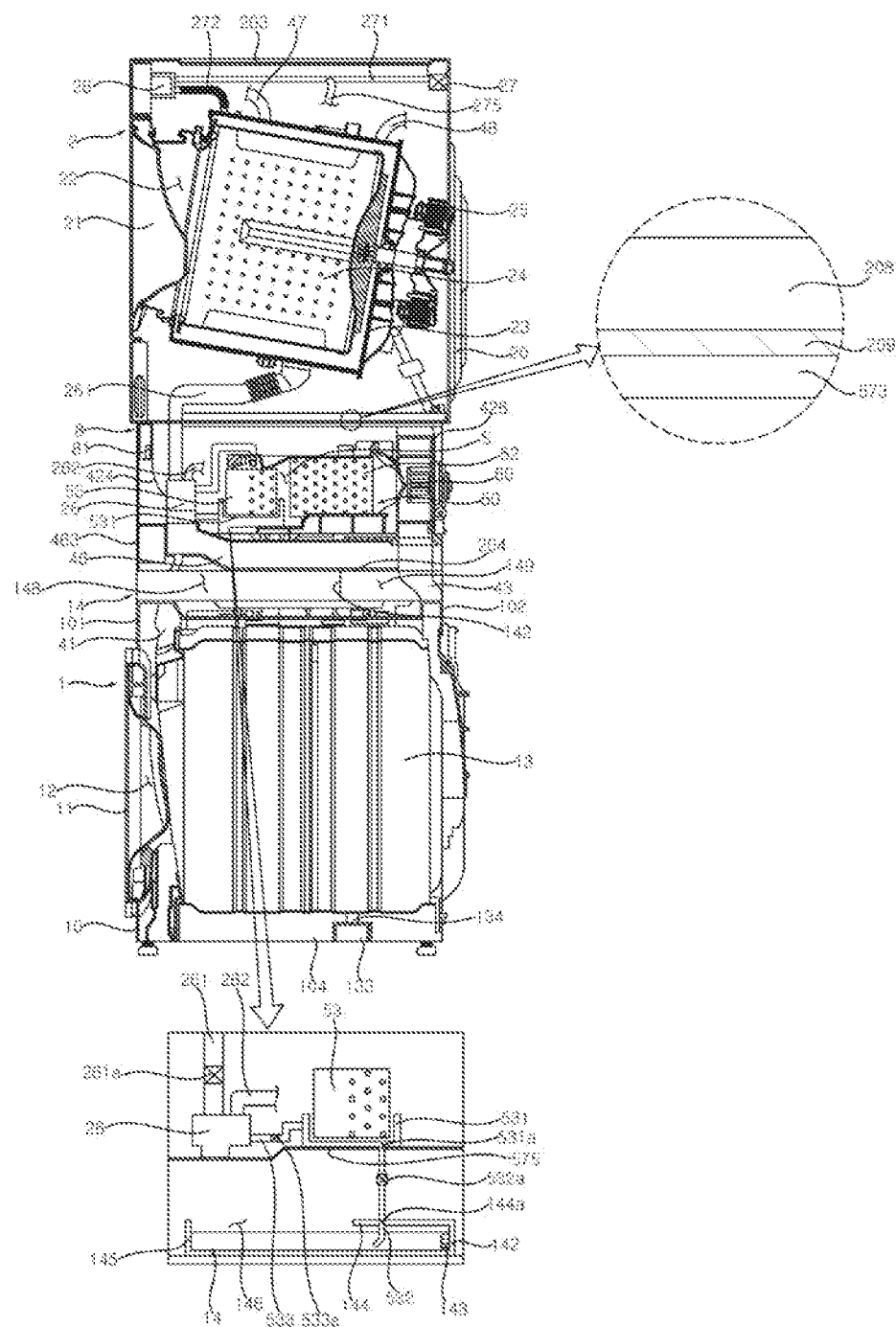
[FIG 25]

[FIG 26]
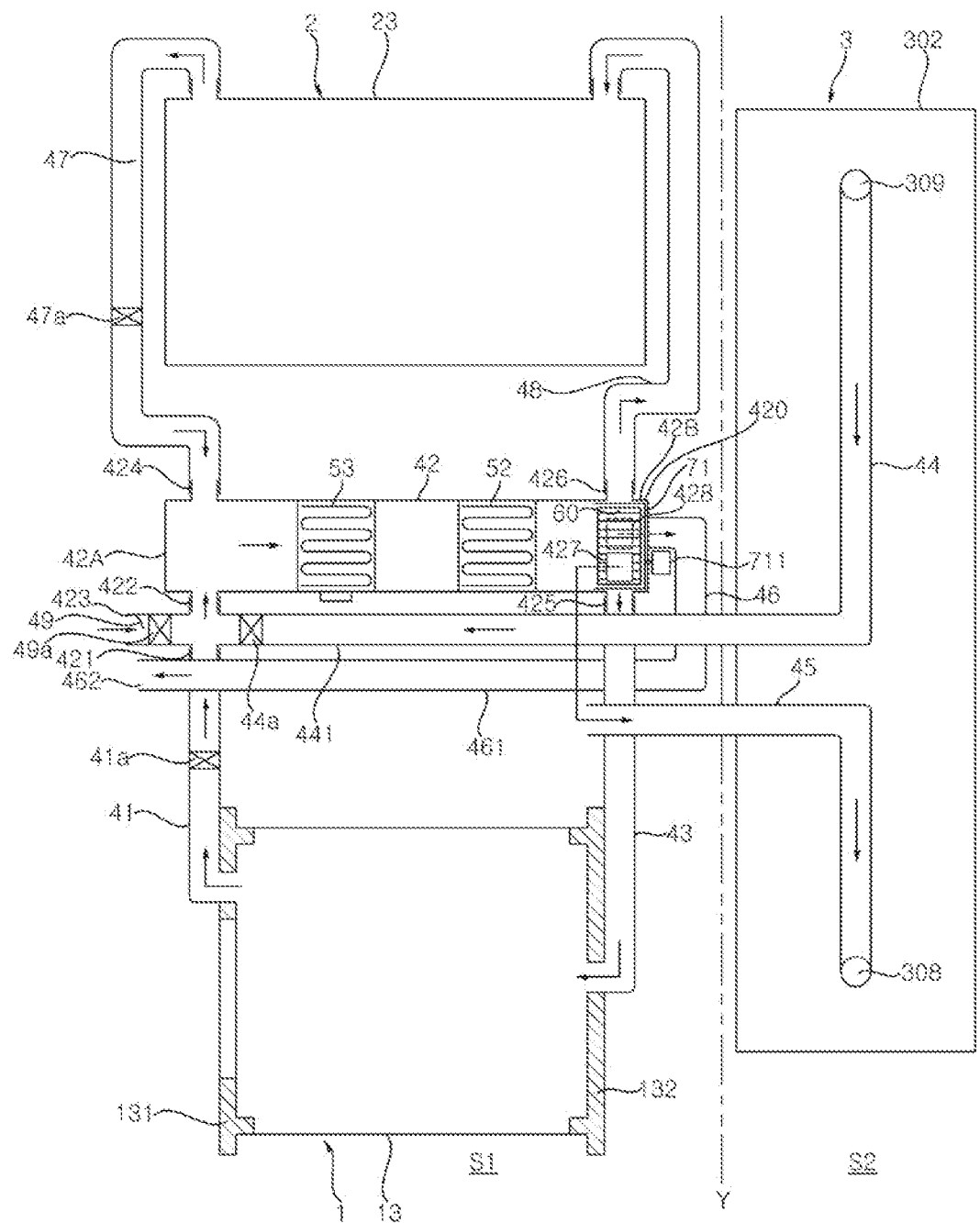

[FIG 27]
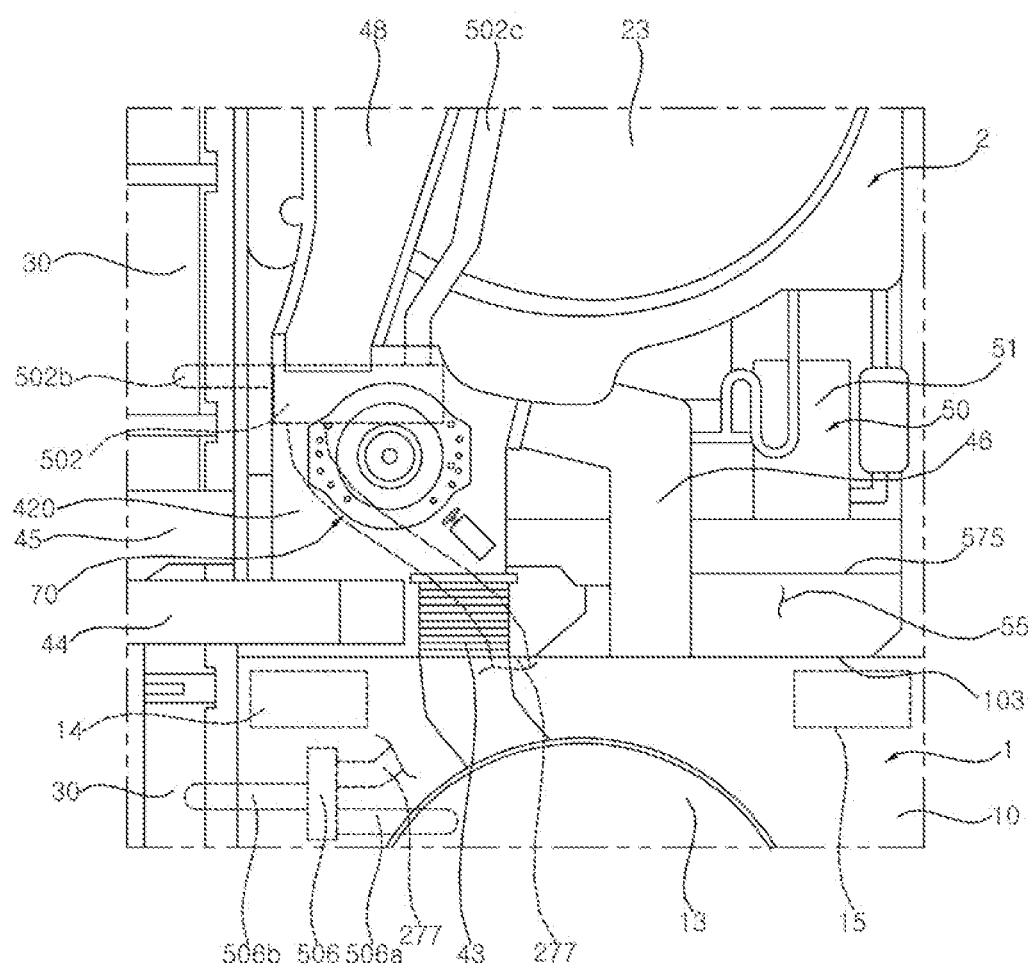

[FIG 28]
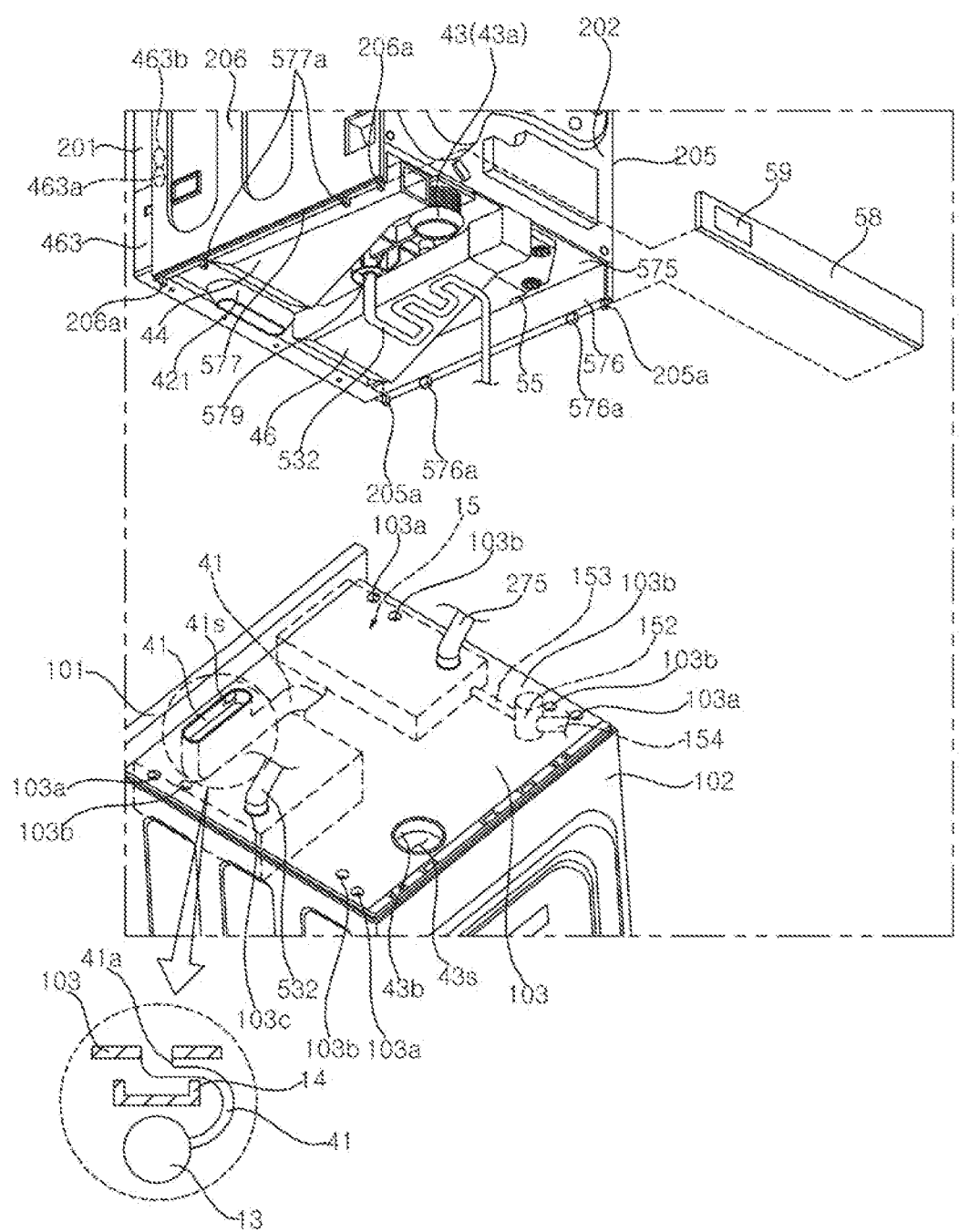

[FIG 29]
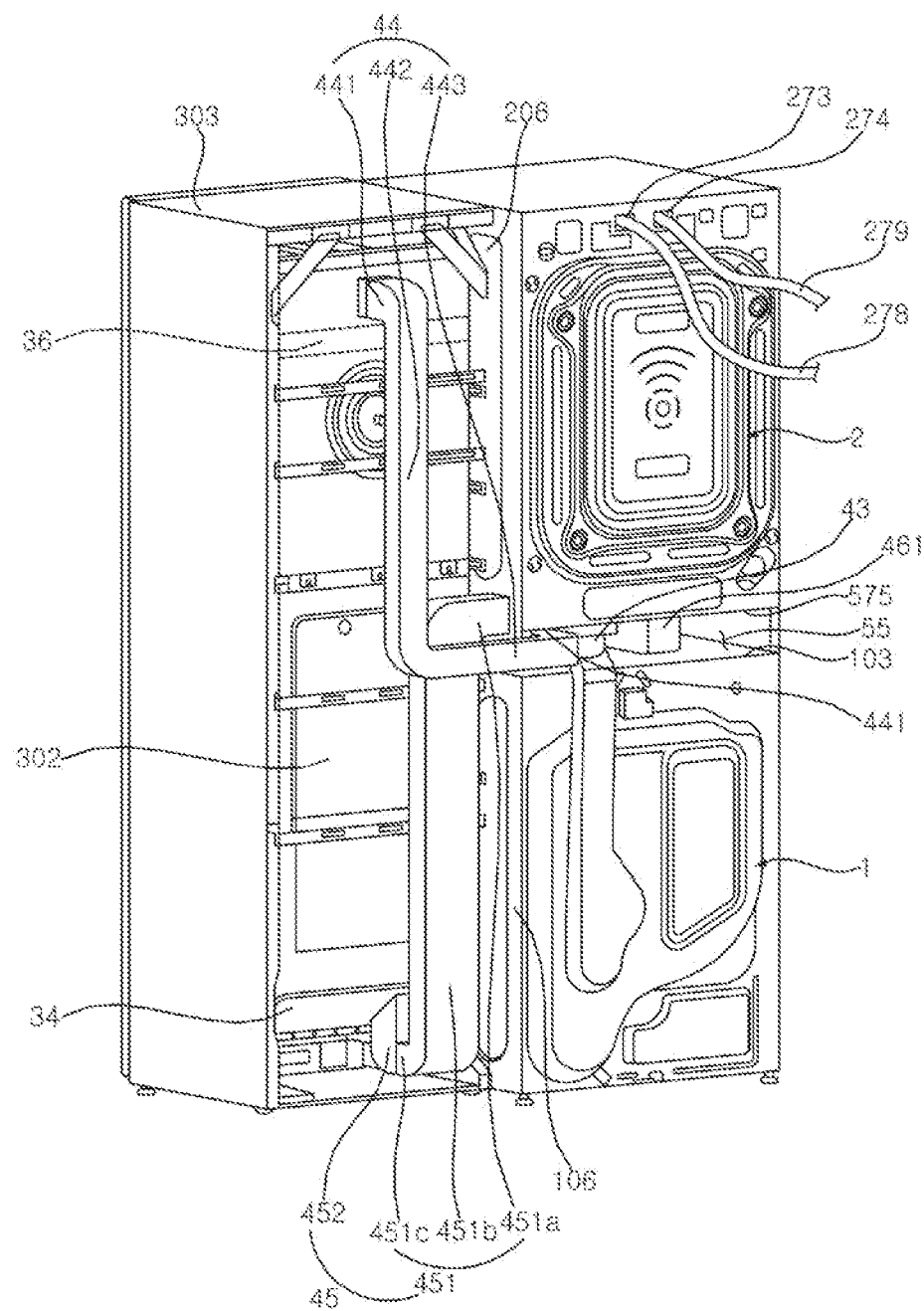

[FIG 30]
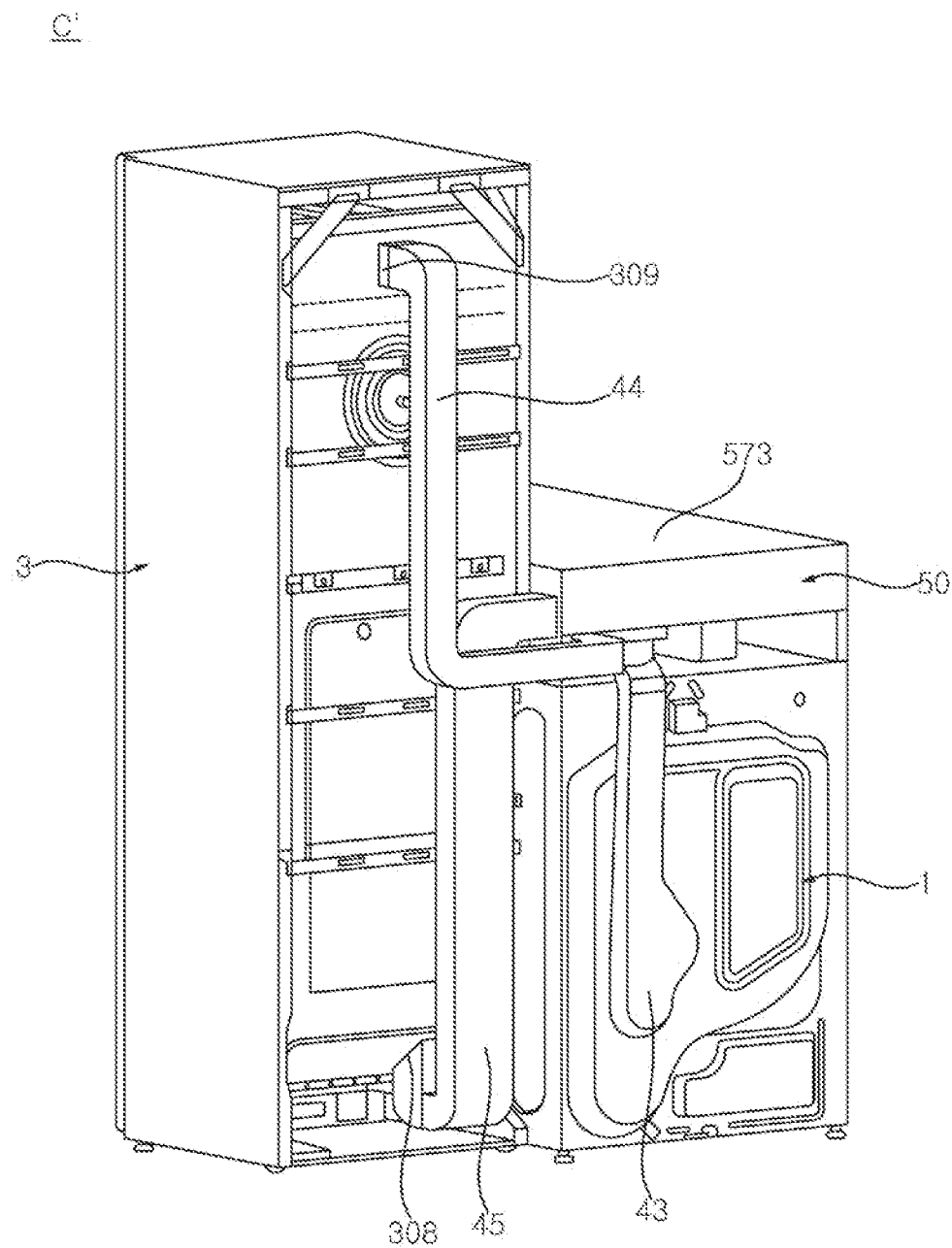

[FIG 31]
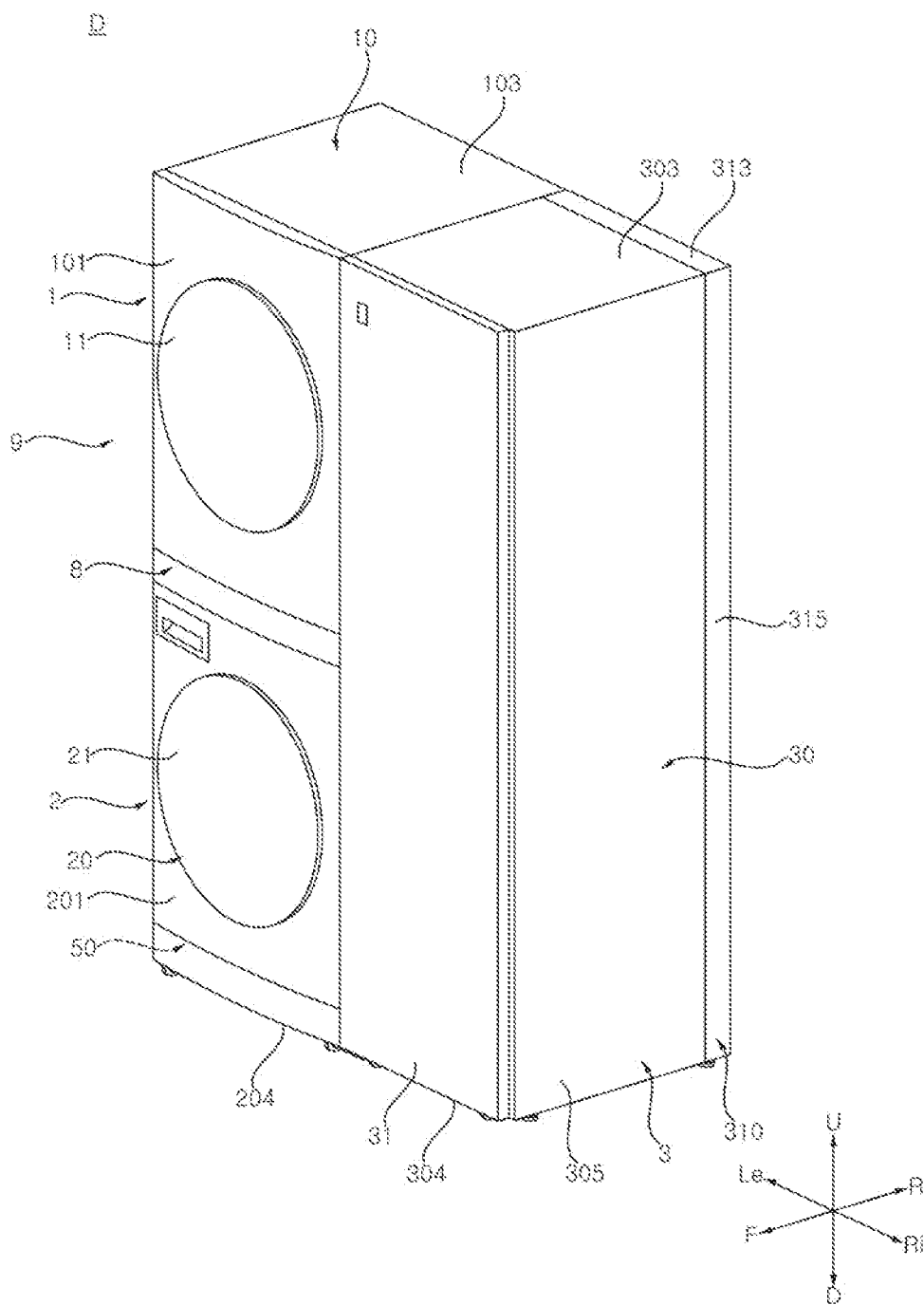

[FIG 32]
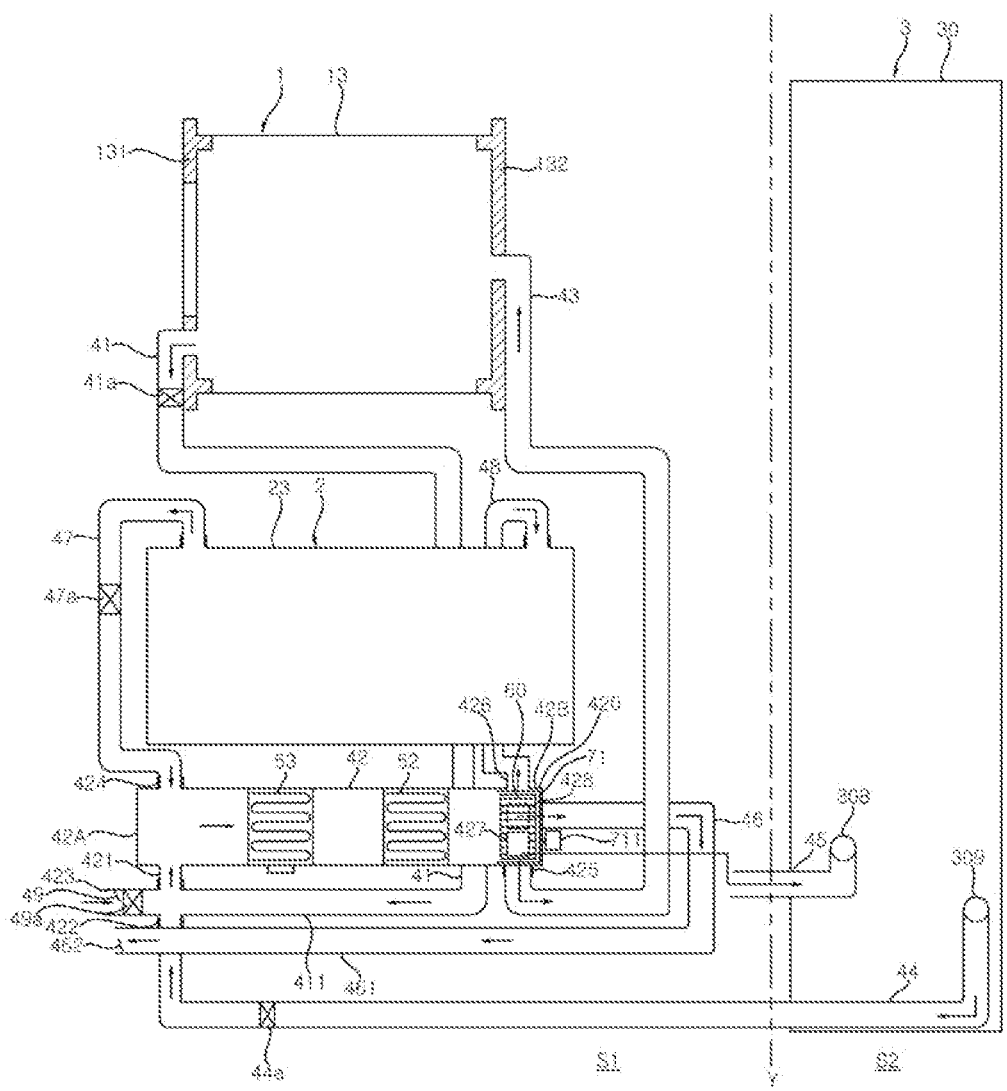

[FIG 33]
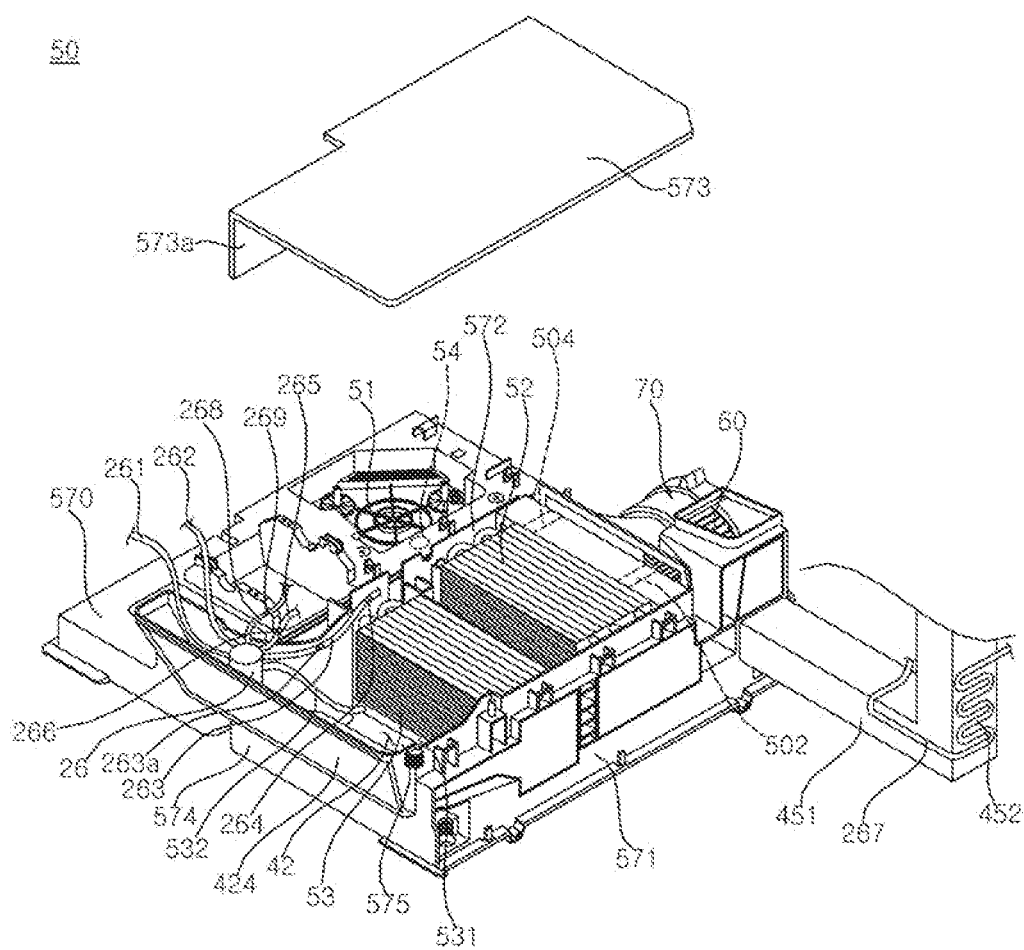

[FIG 34]
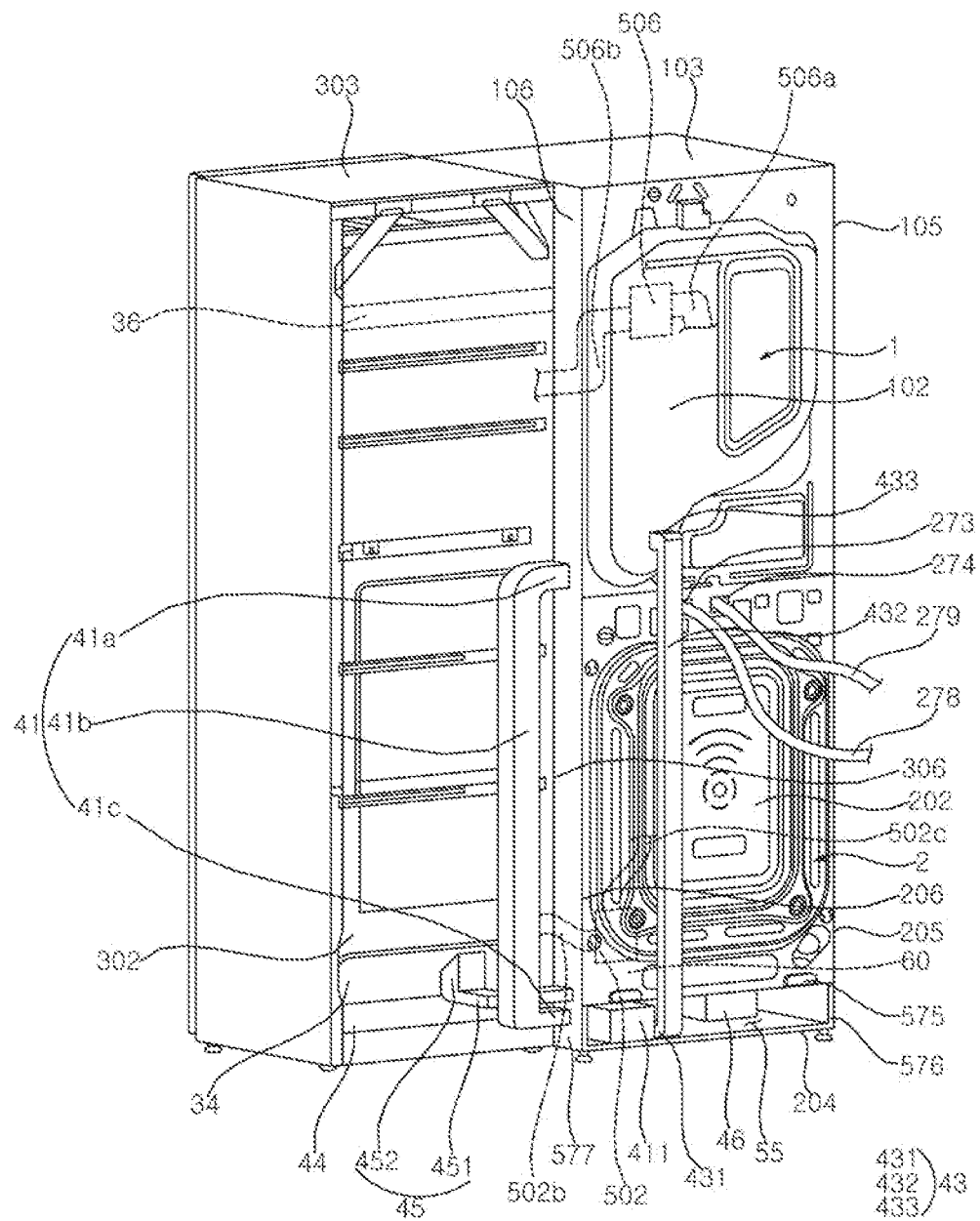

[FIG 35]
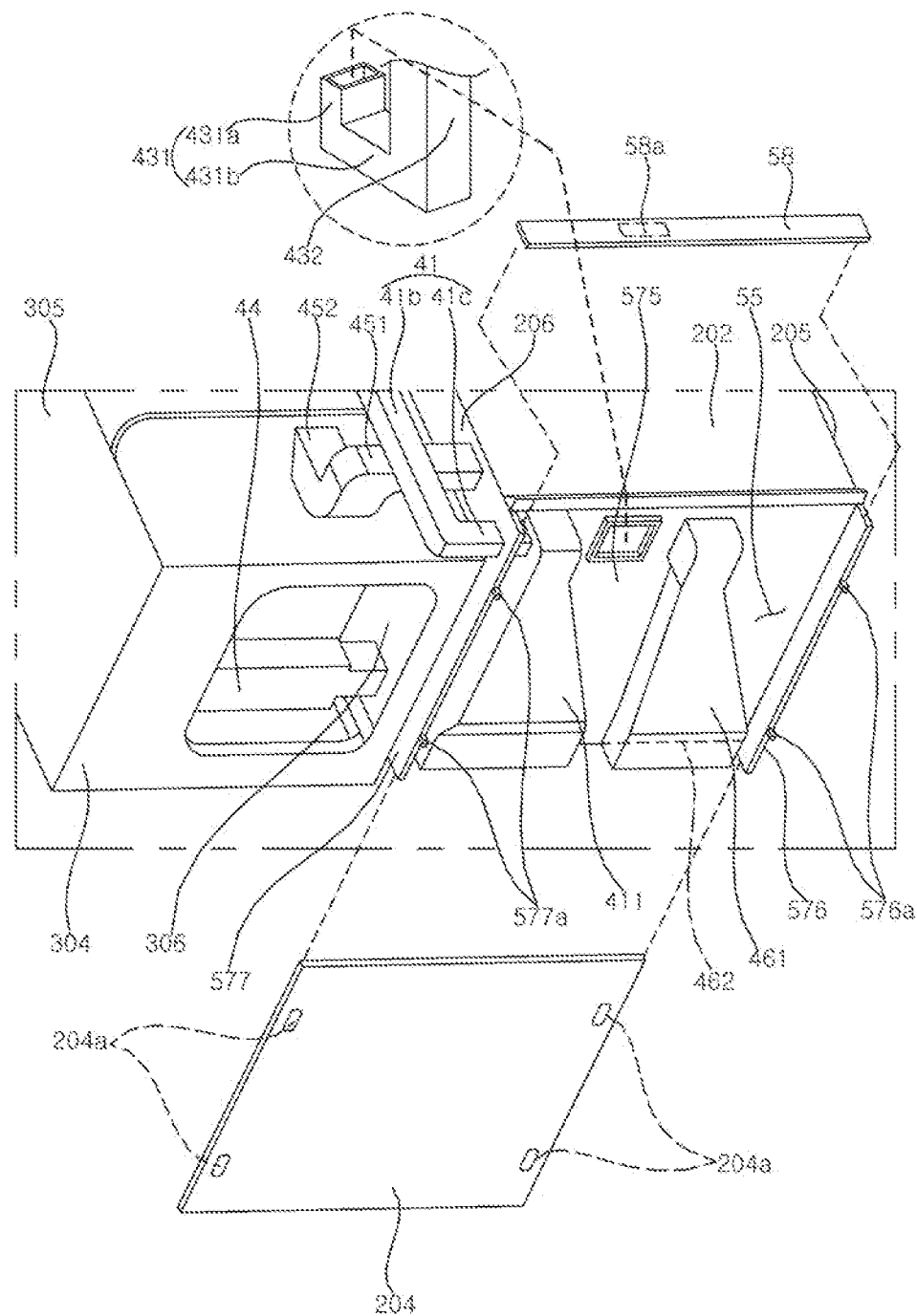

[FIG 36]
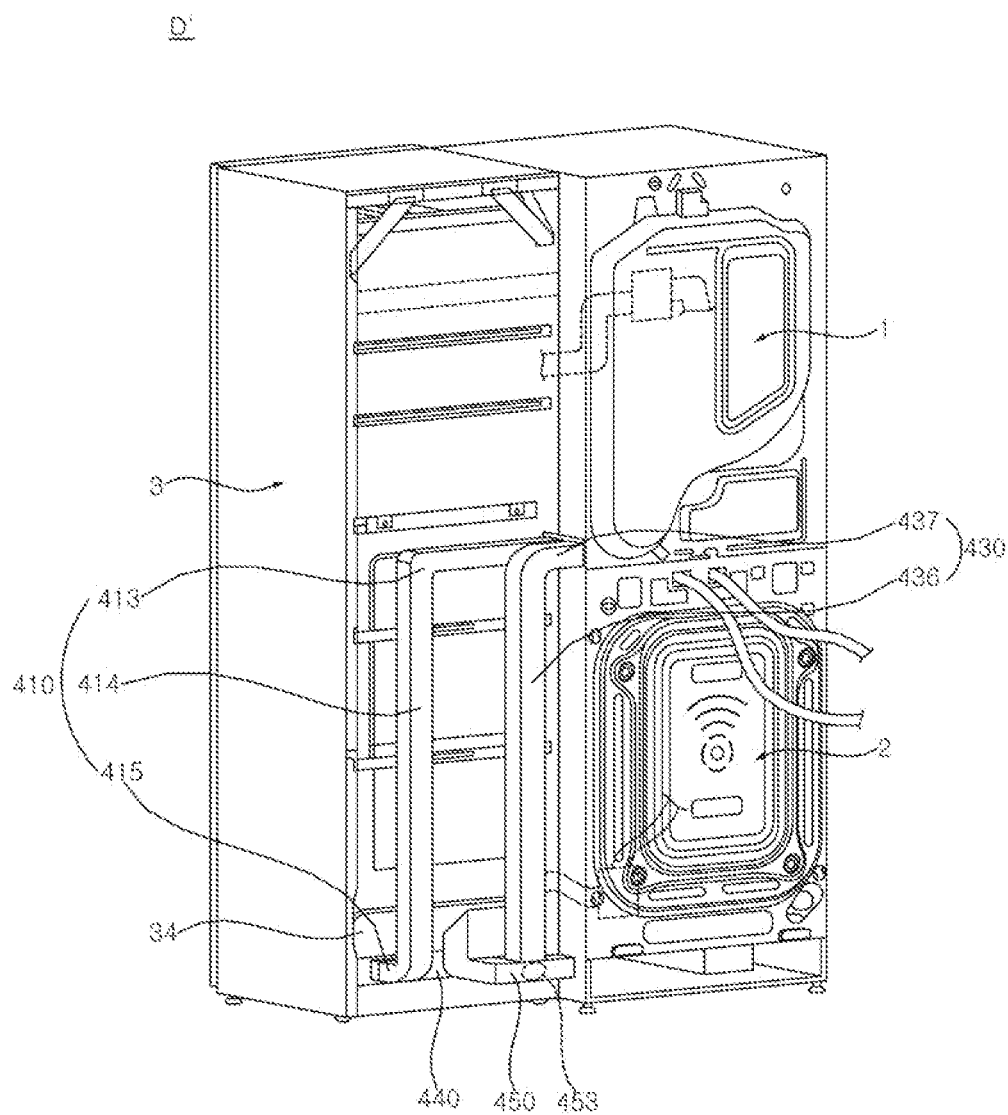

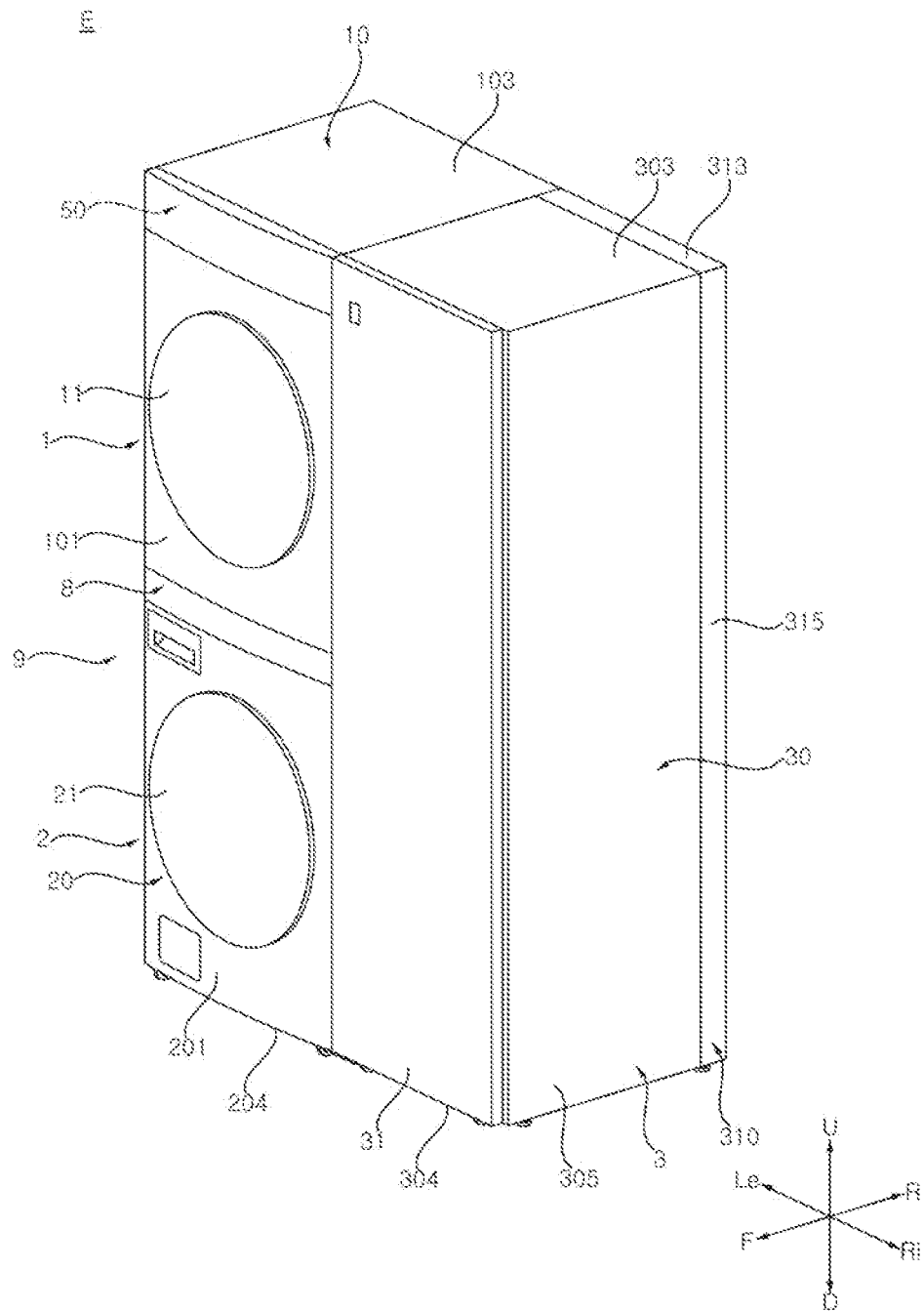
[FIG 37]

[FIG 38]
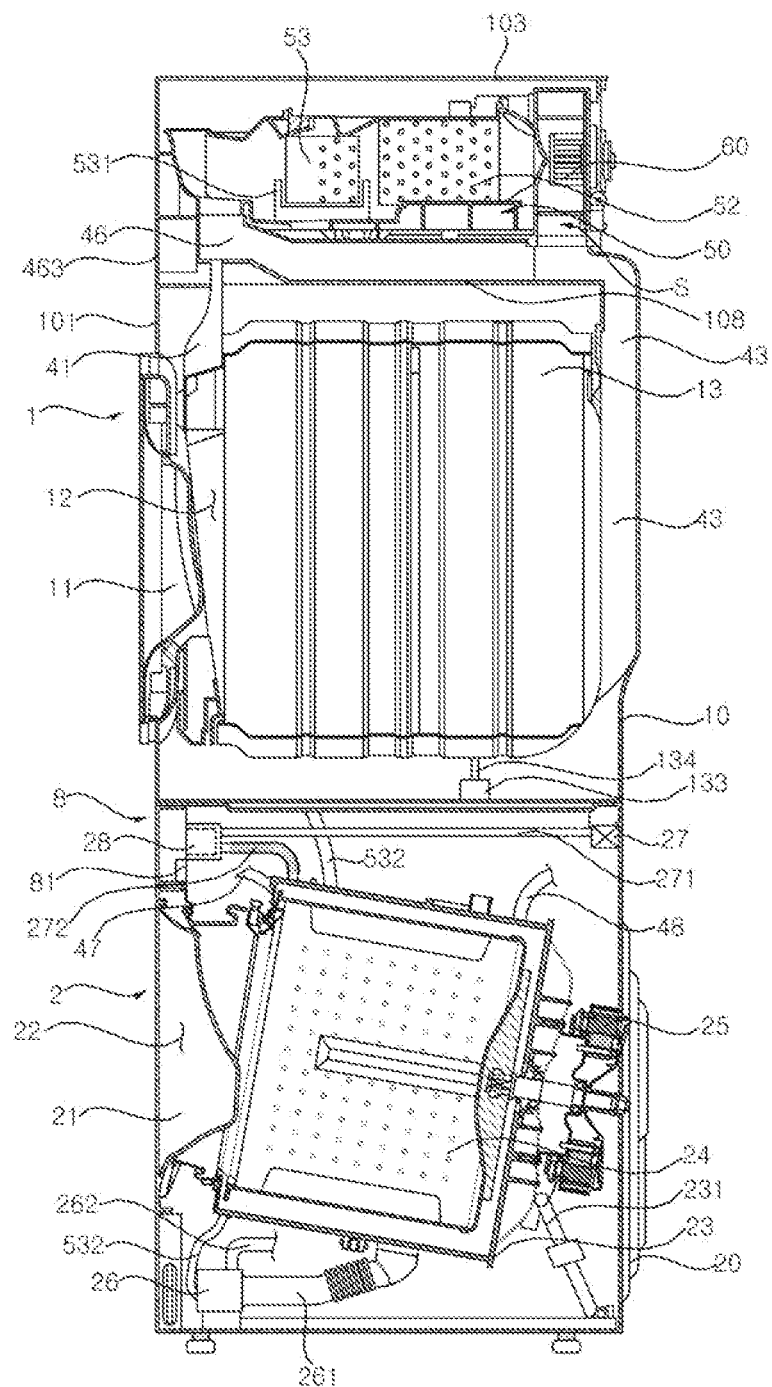

[FIG 39]
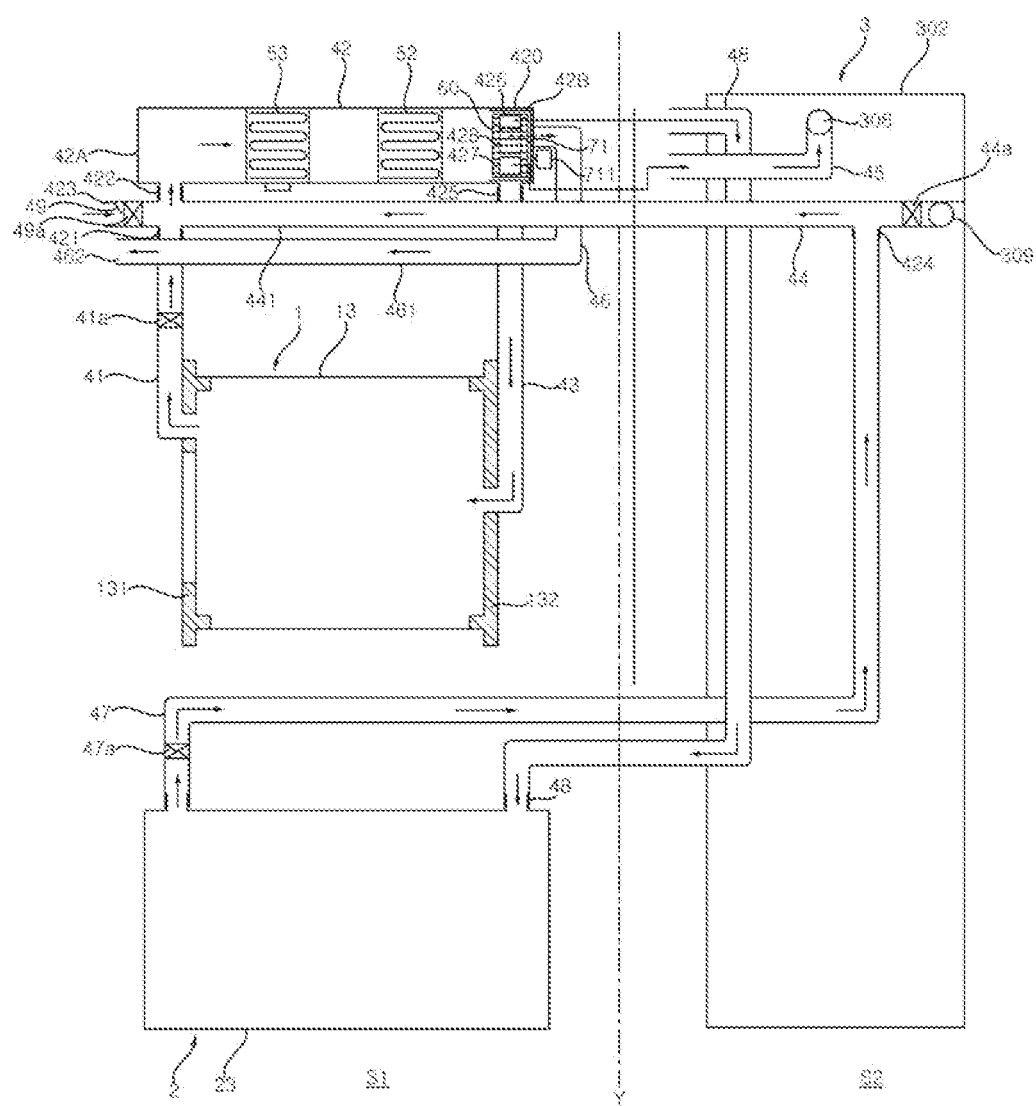

[FIG 40]
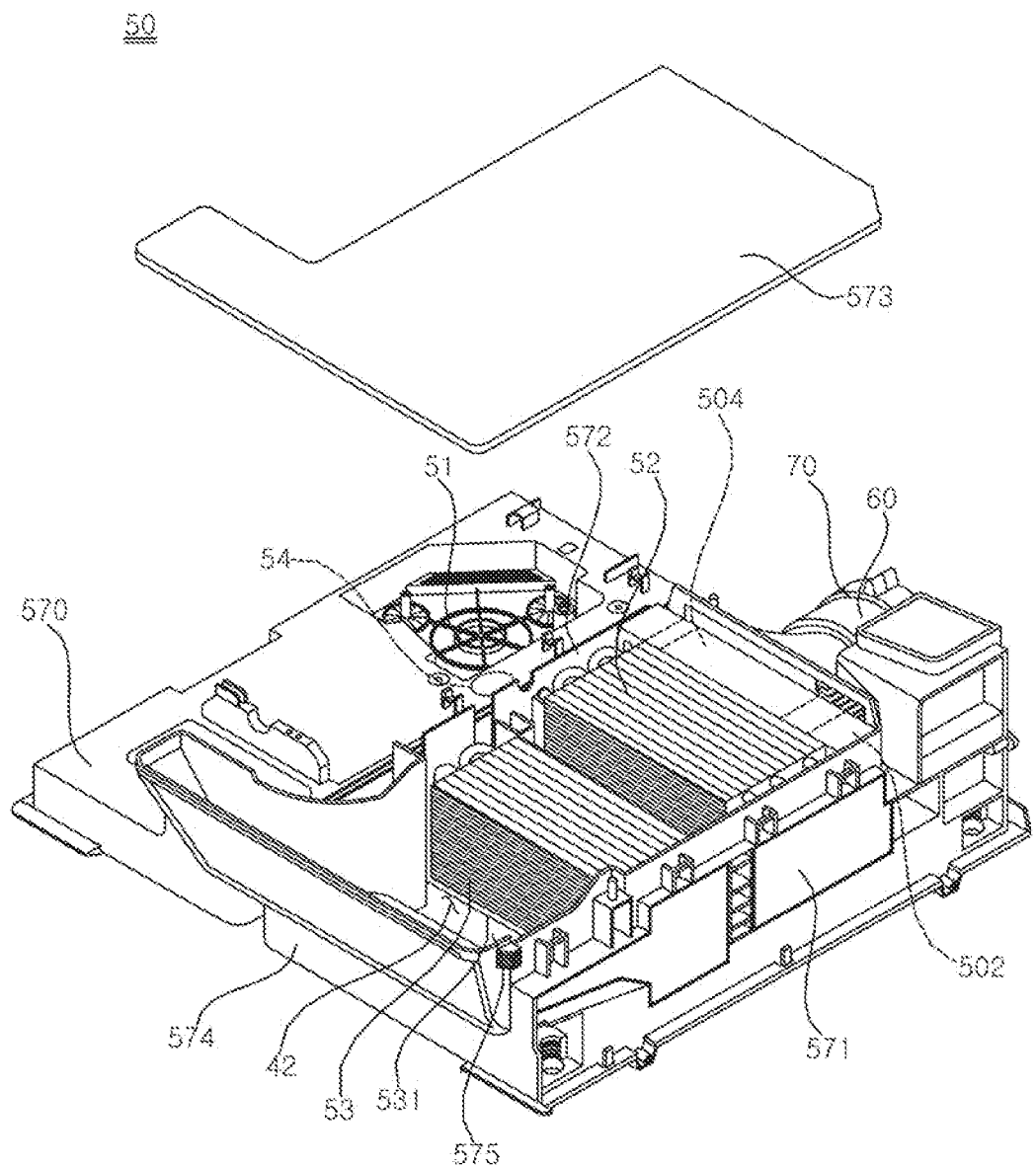

[FIG 41]
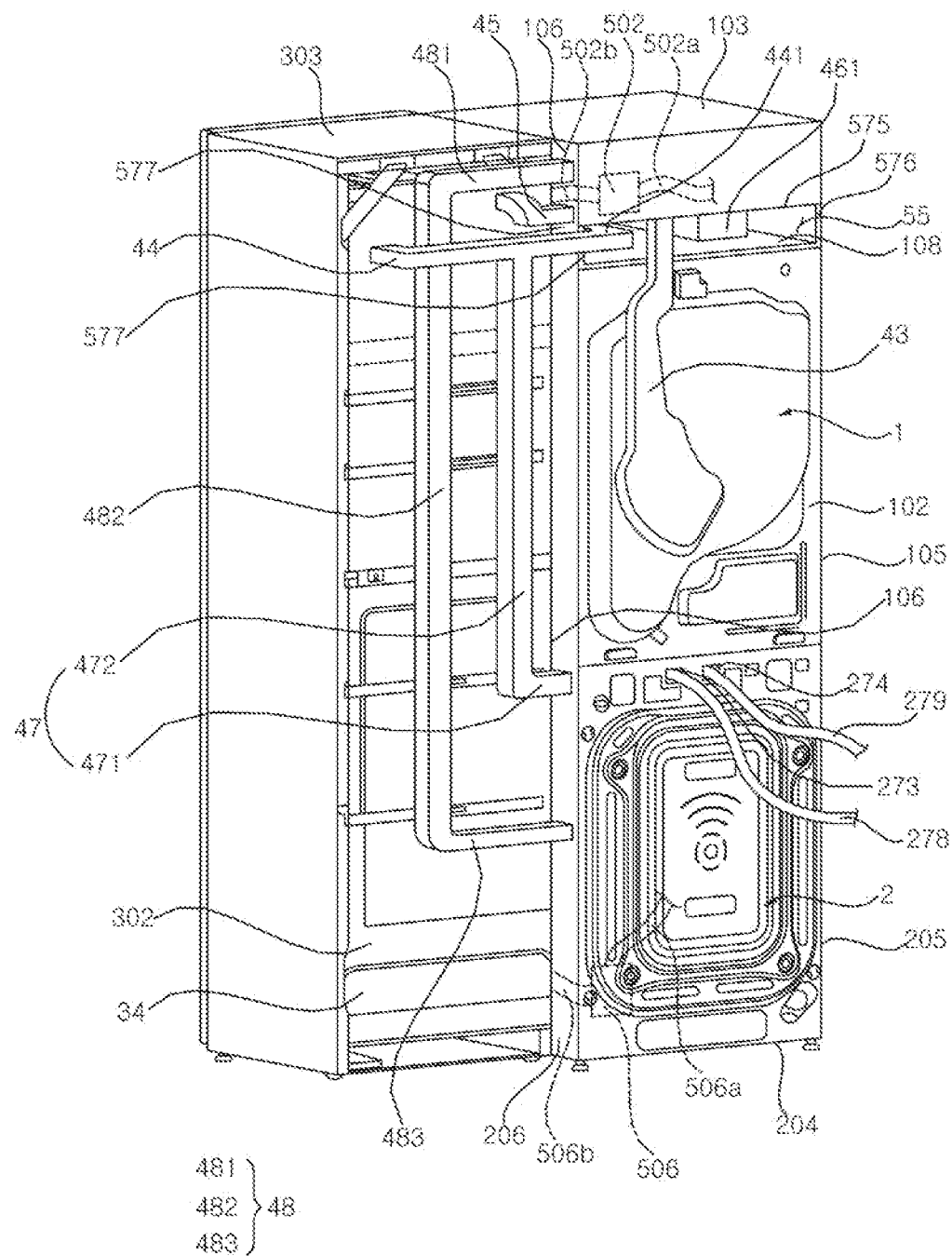

[FIG 42]
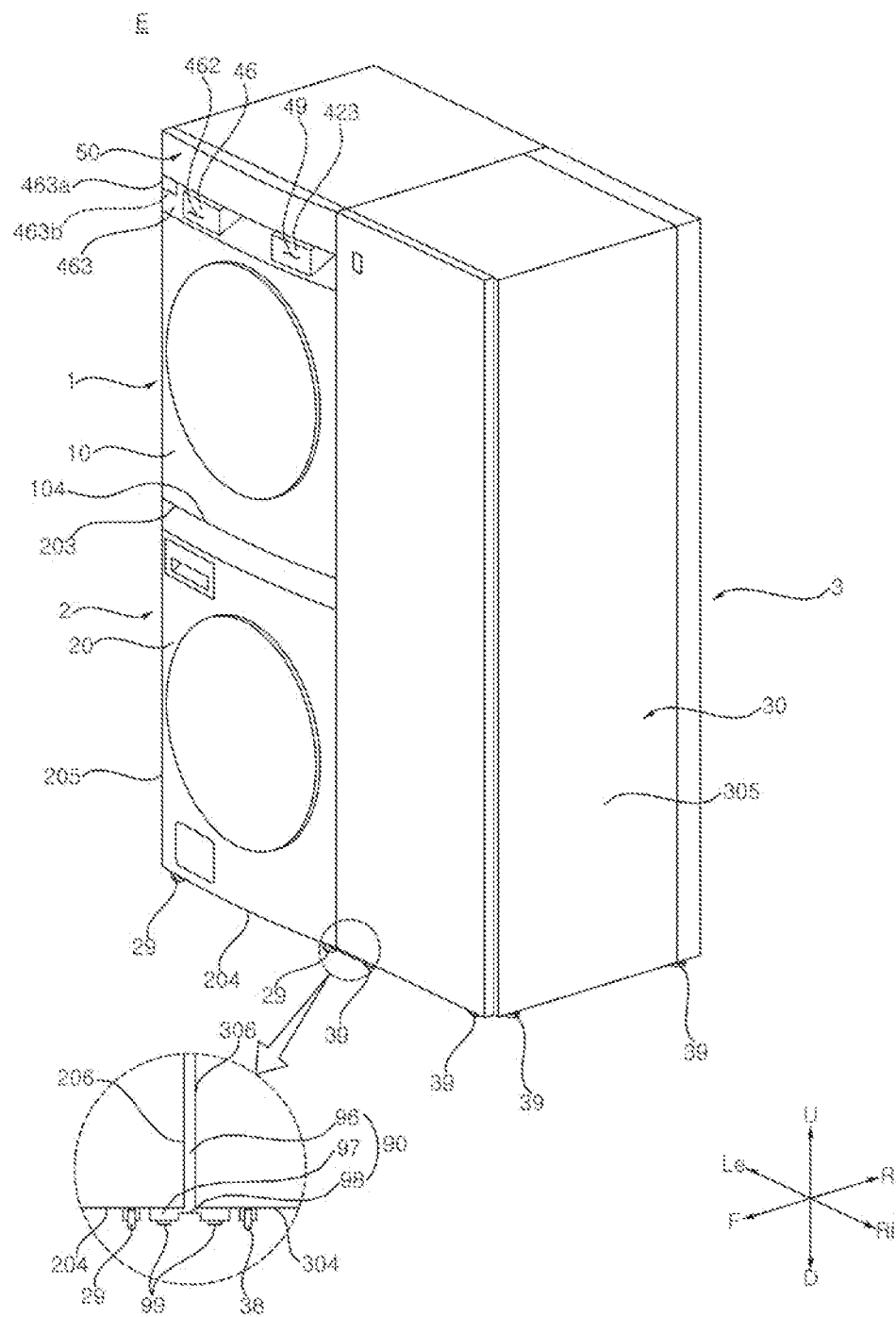

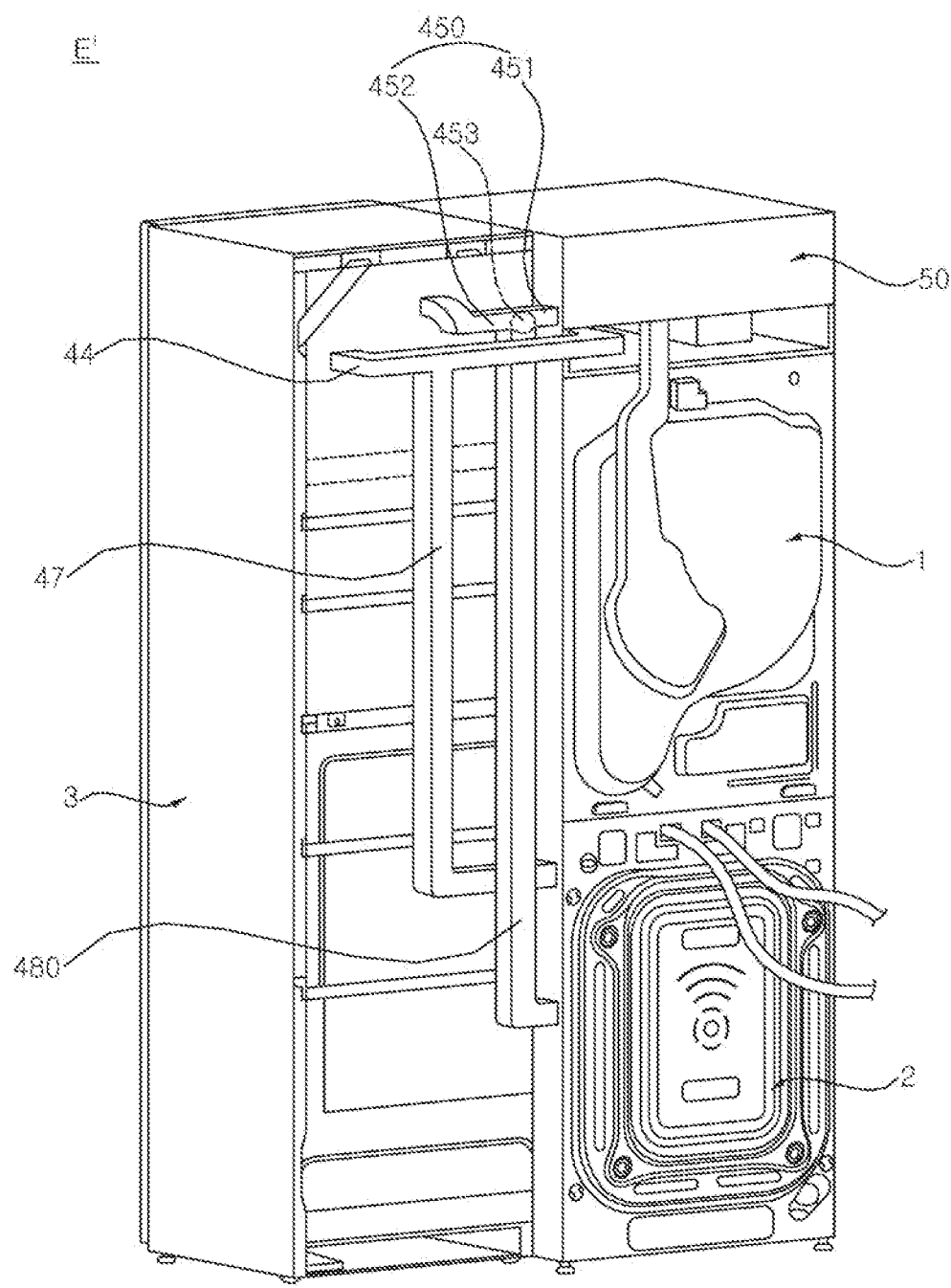
[FIG 43]

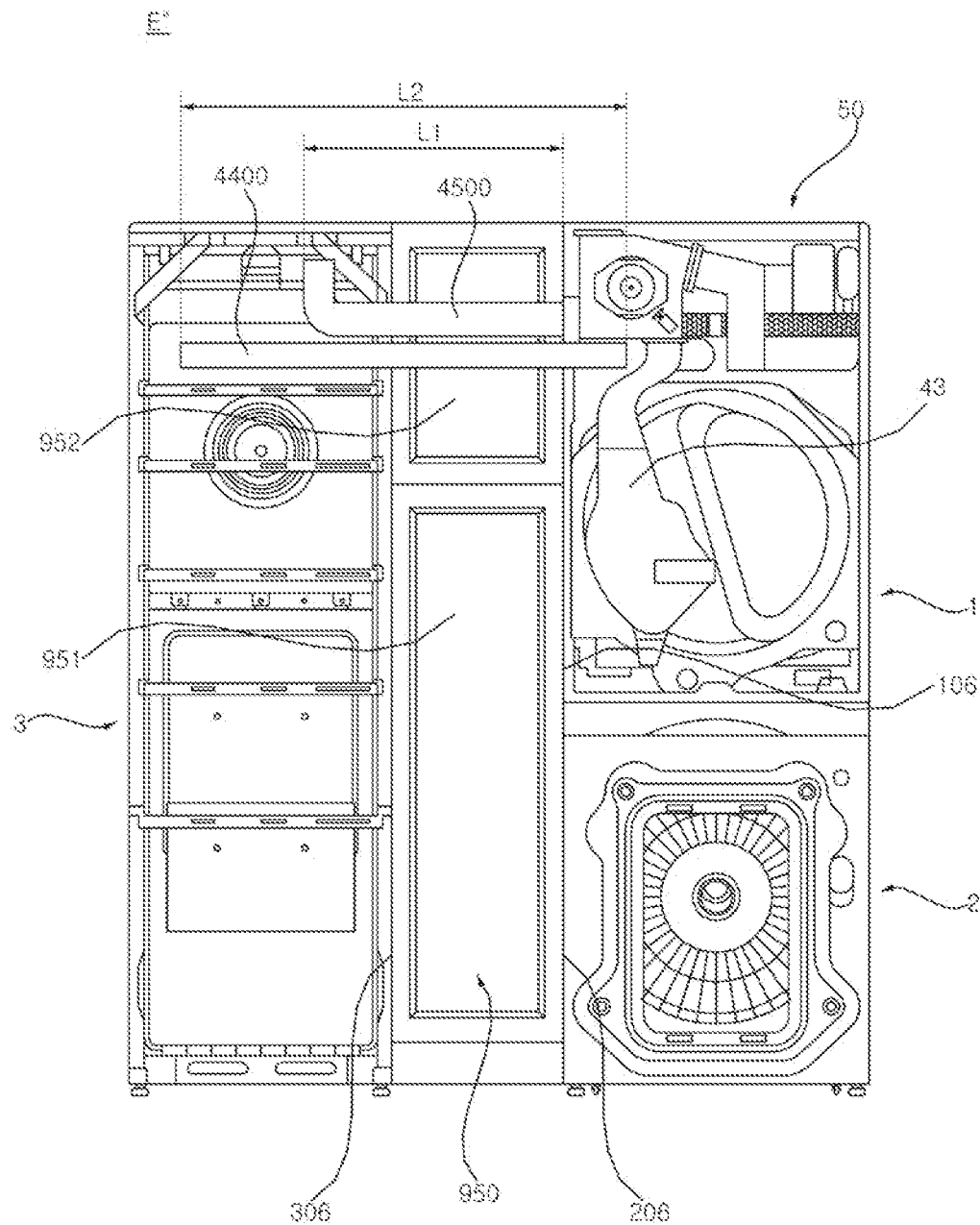
[FIG 44]

[FIG 45]
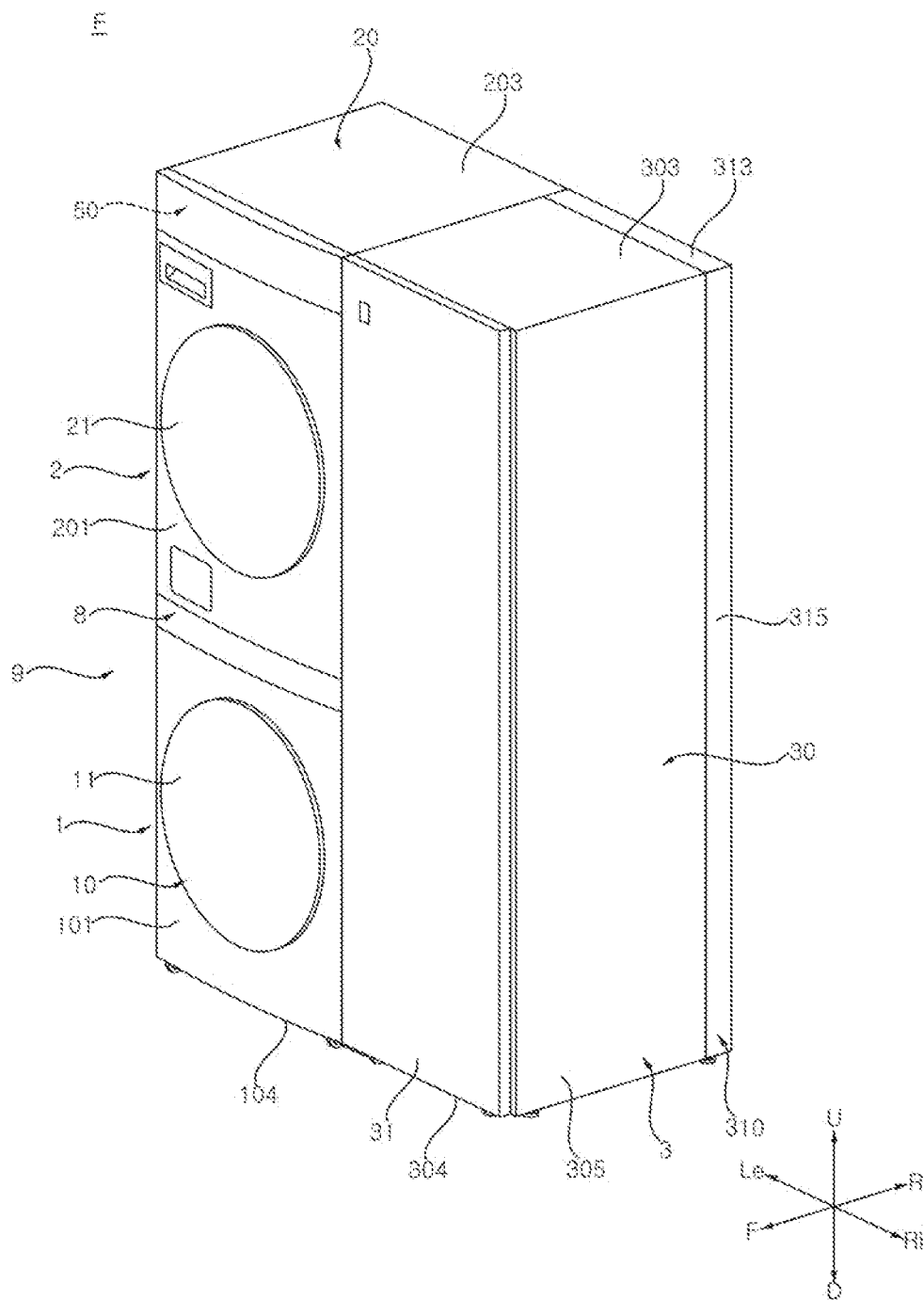

[FIG 46]
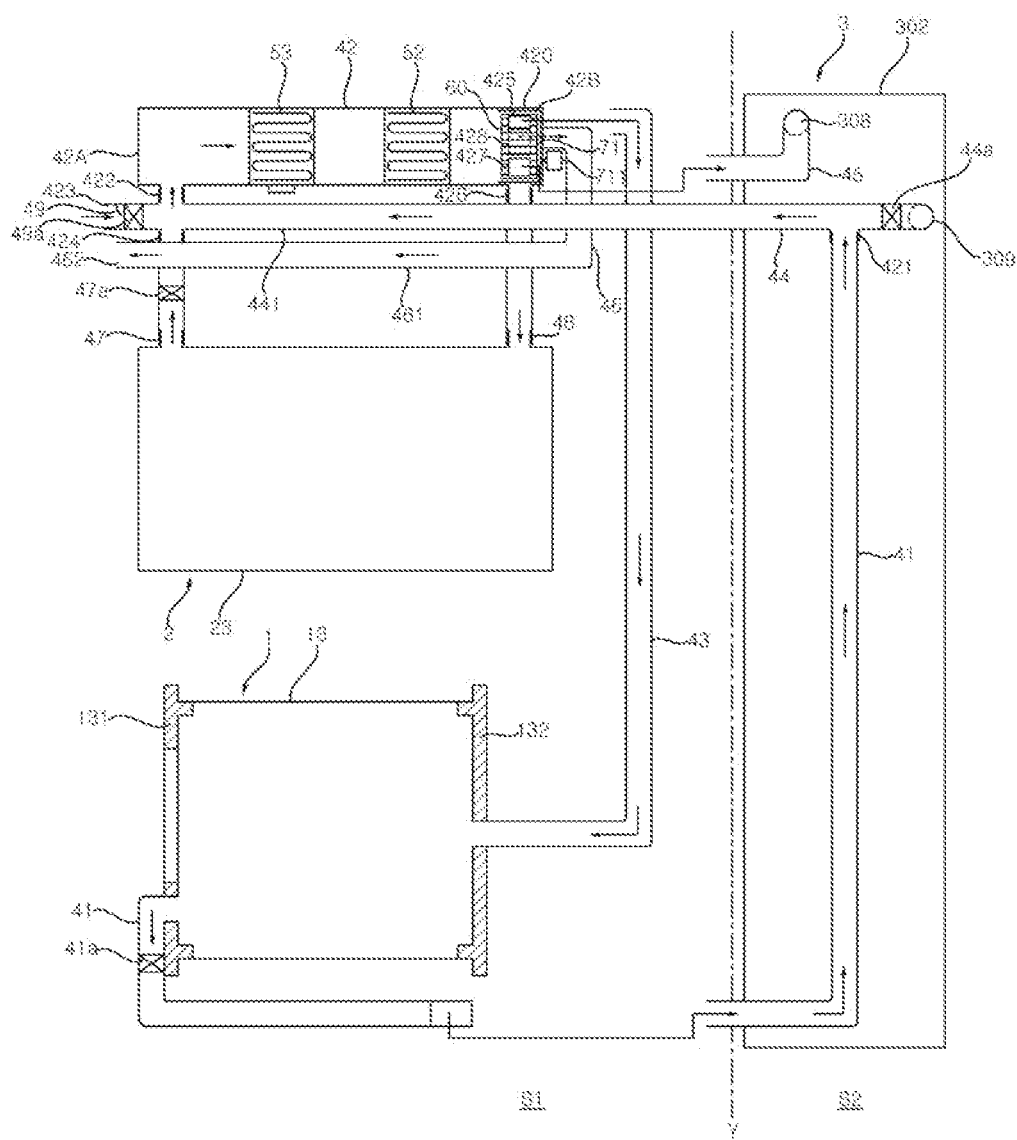

[FIG 47]
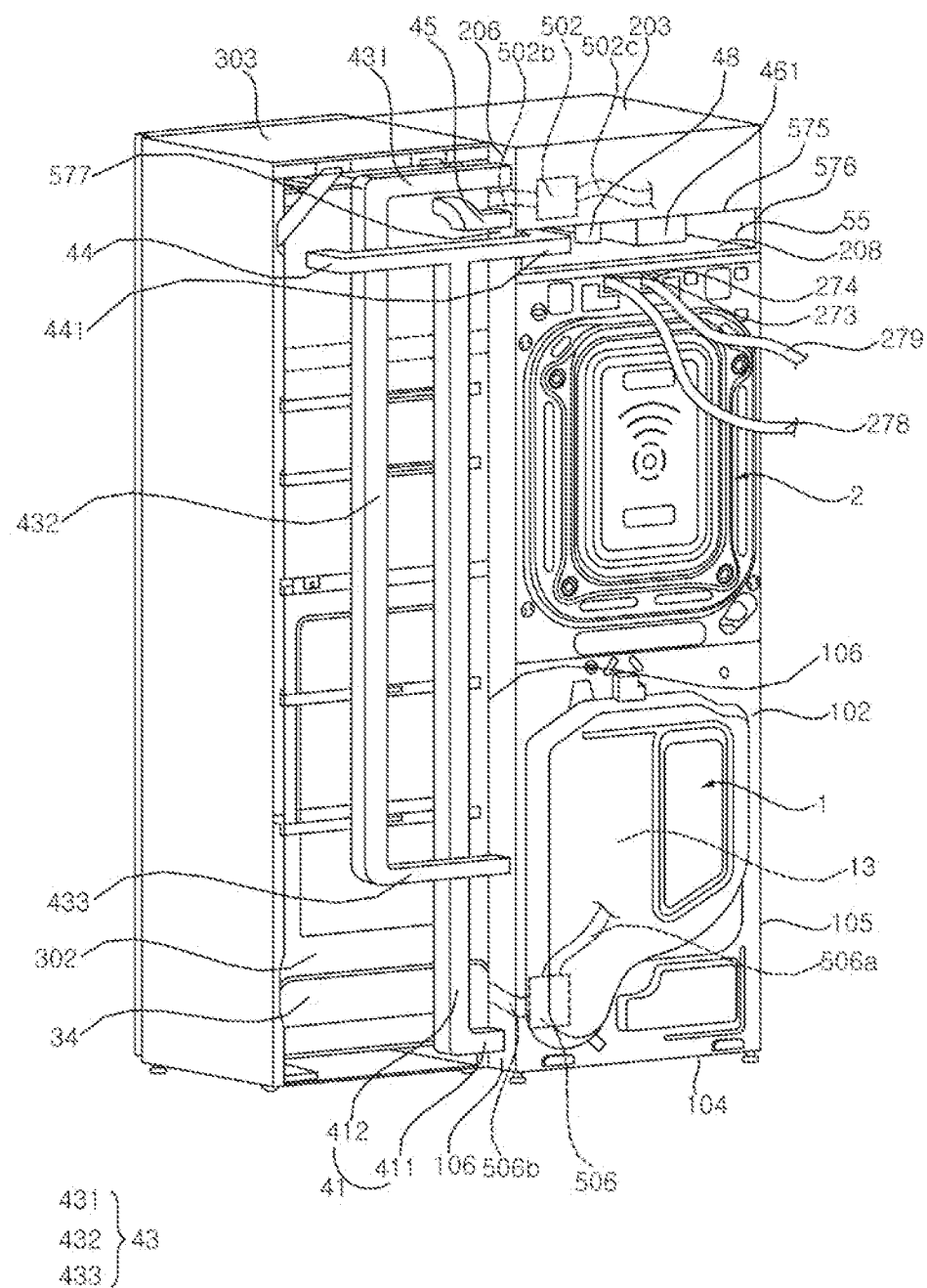

[FIG 48]
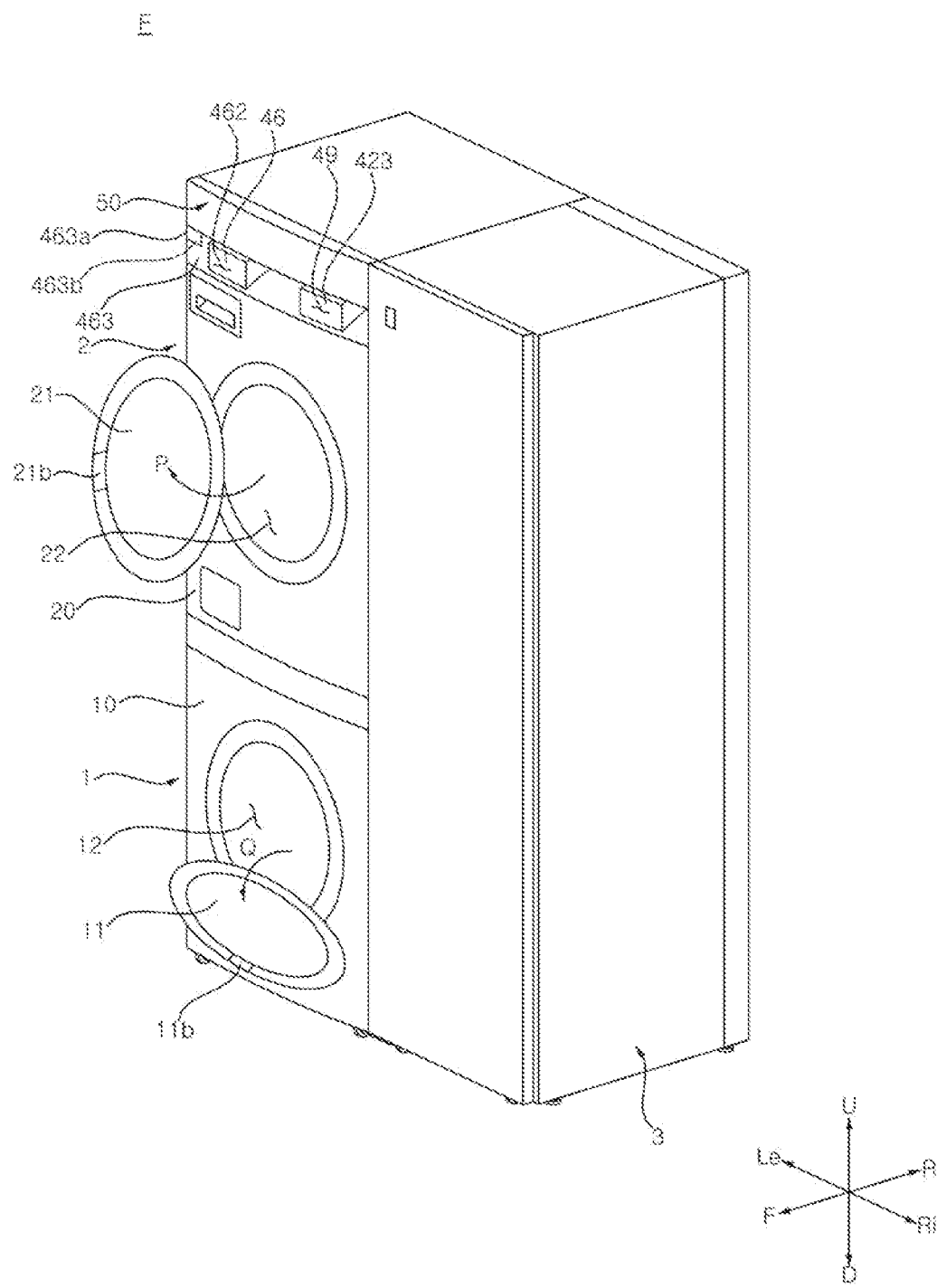

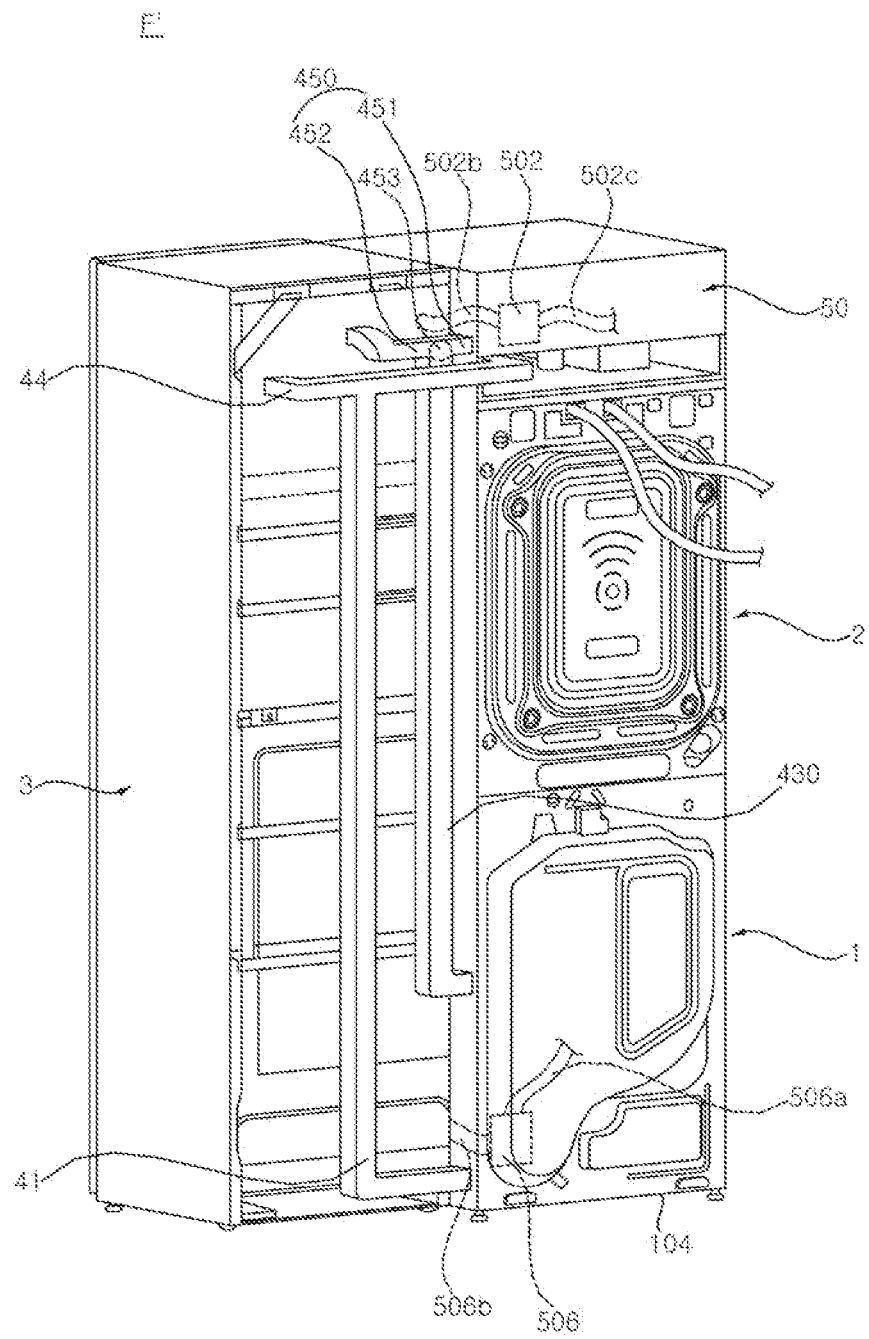
[FIG 49]

[FIG 50]
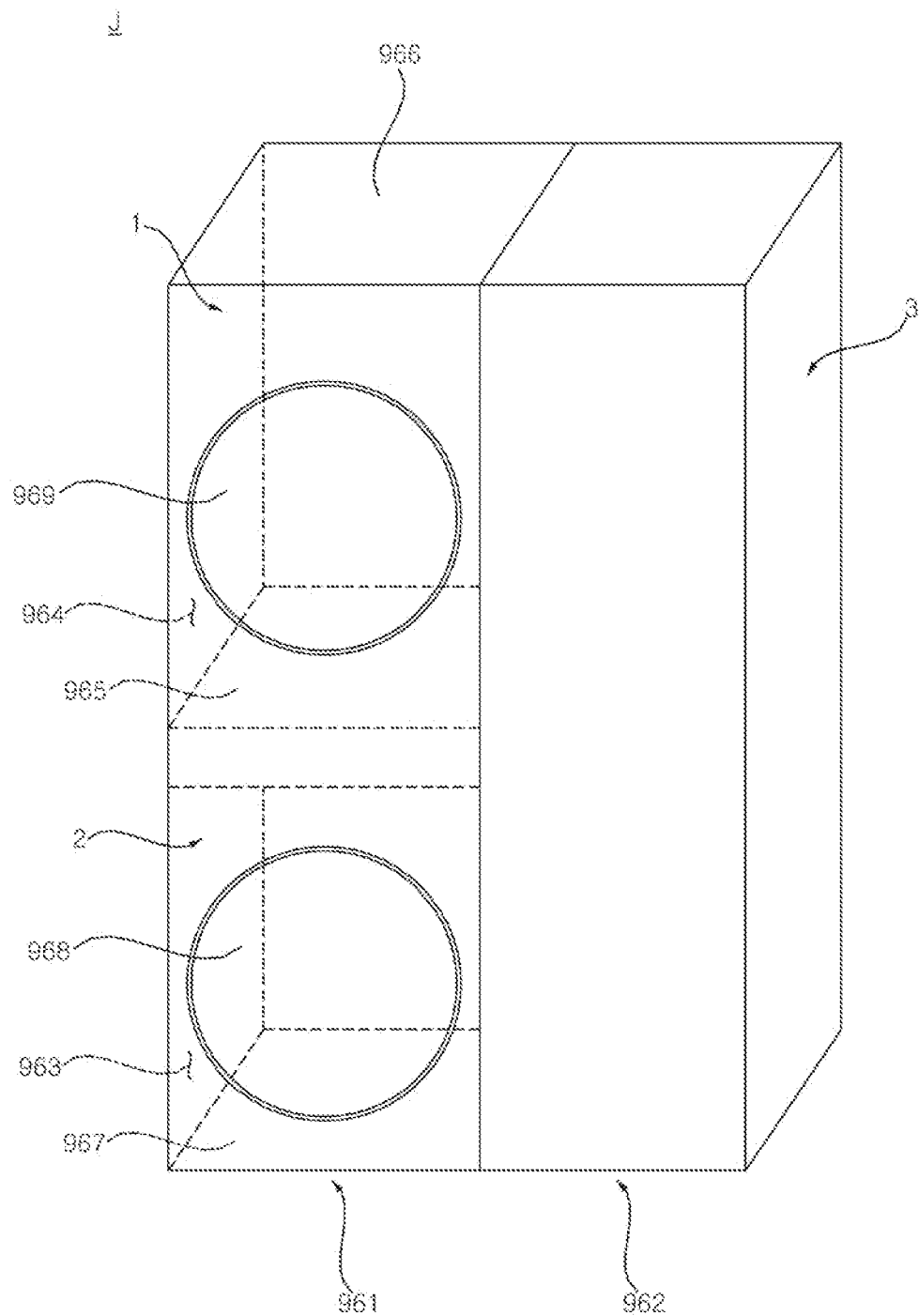

[FIG 51]
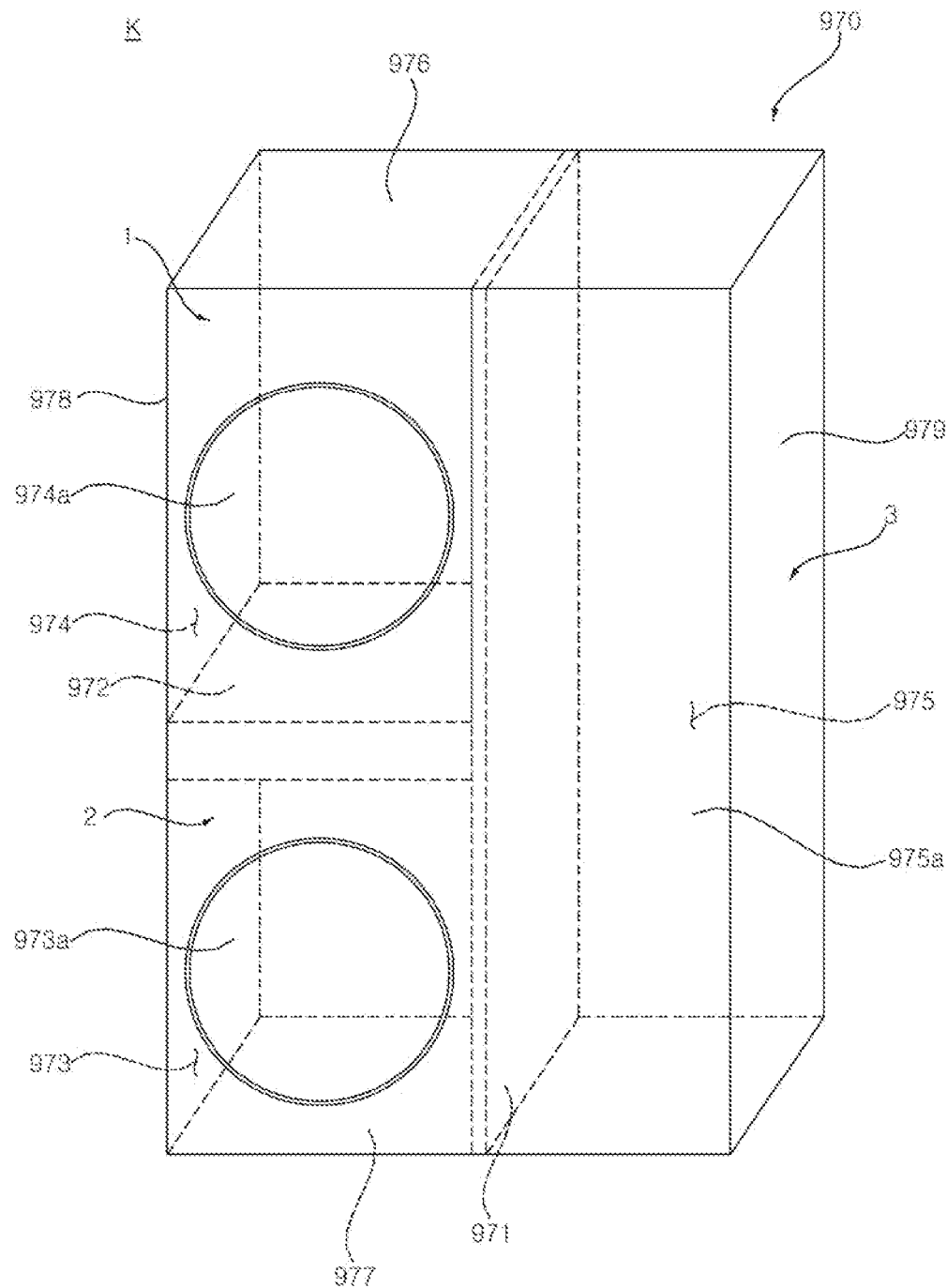

[FIG 52]
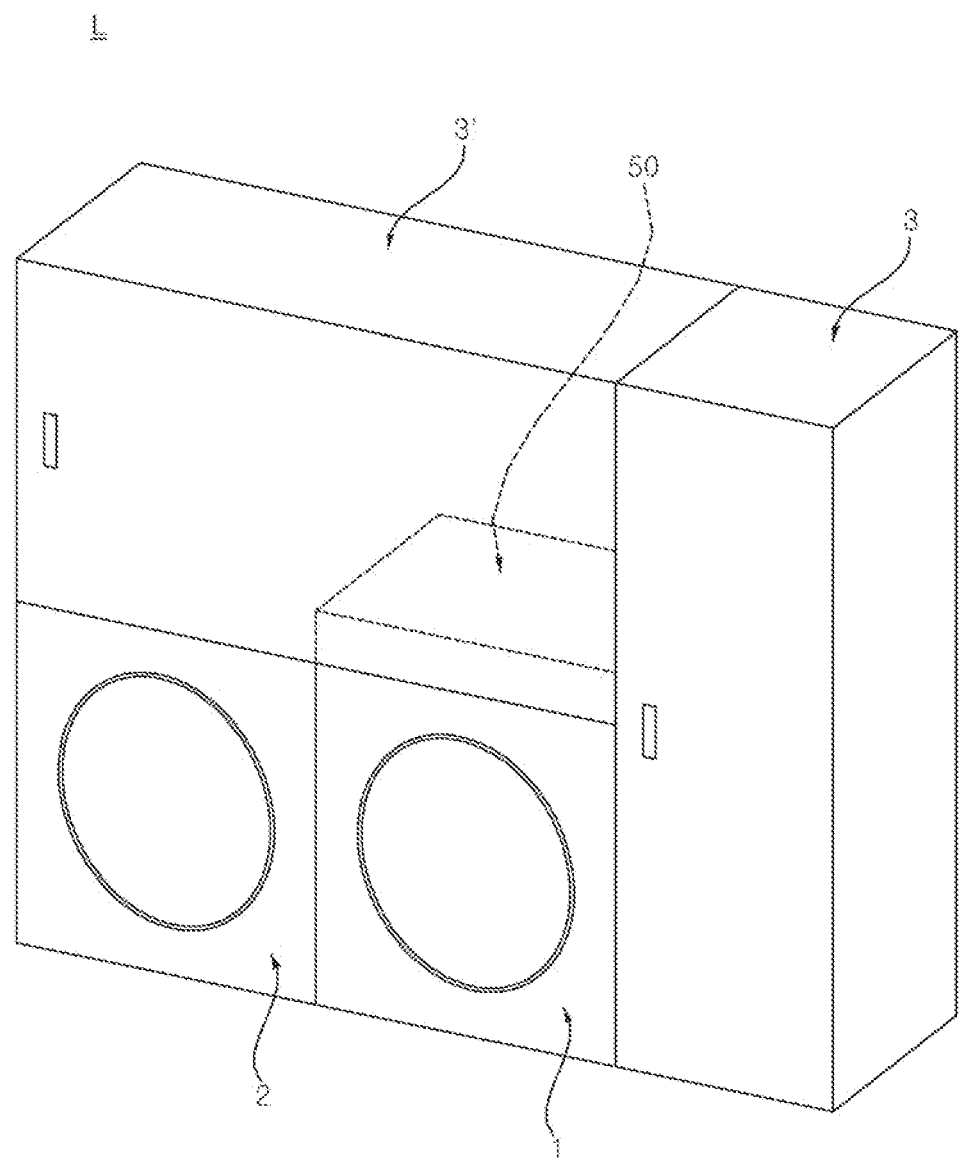

[FIG 53]
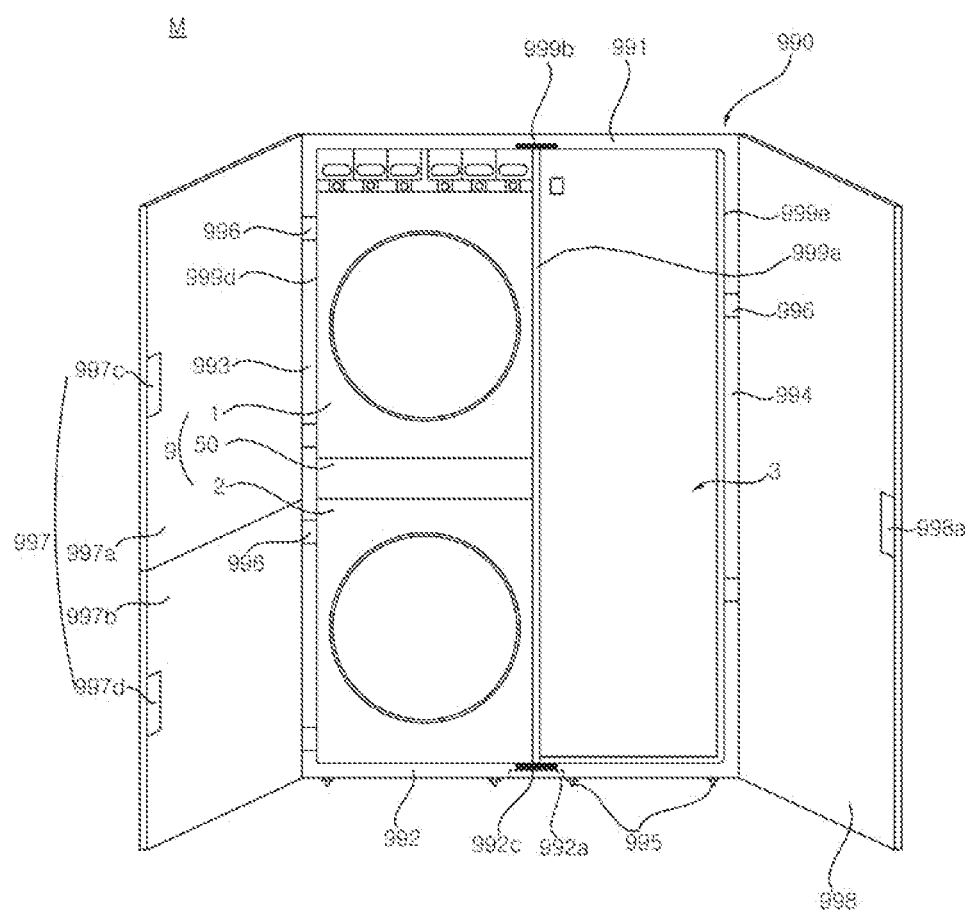

[FIG 54]
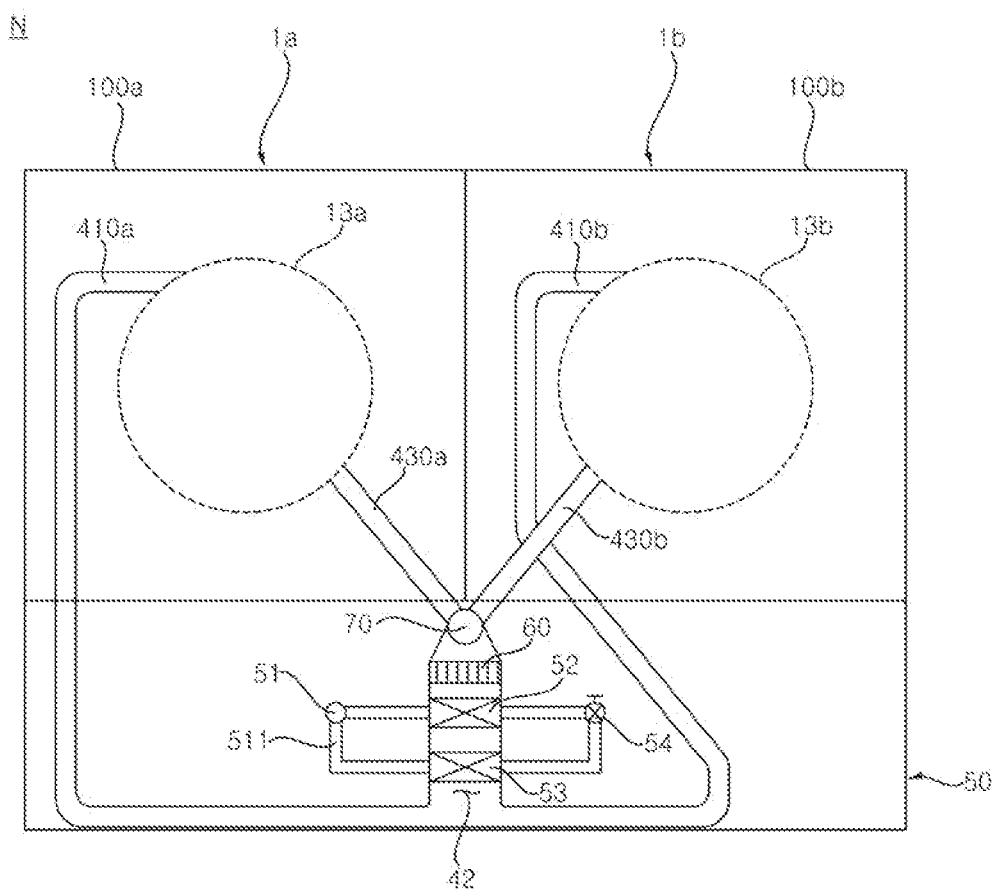

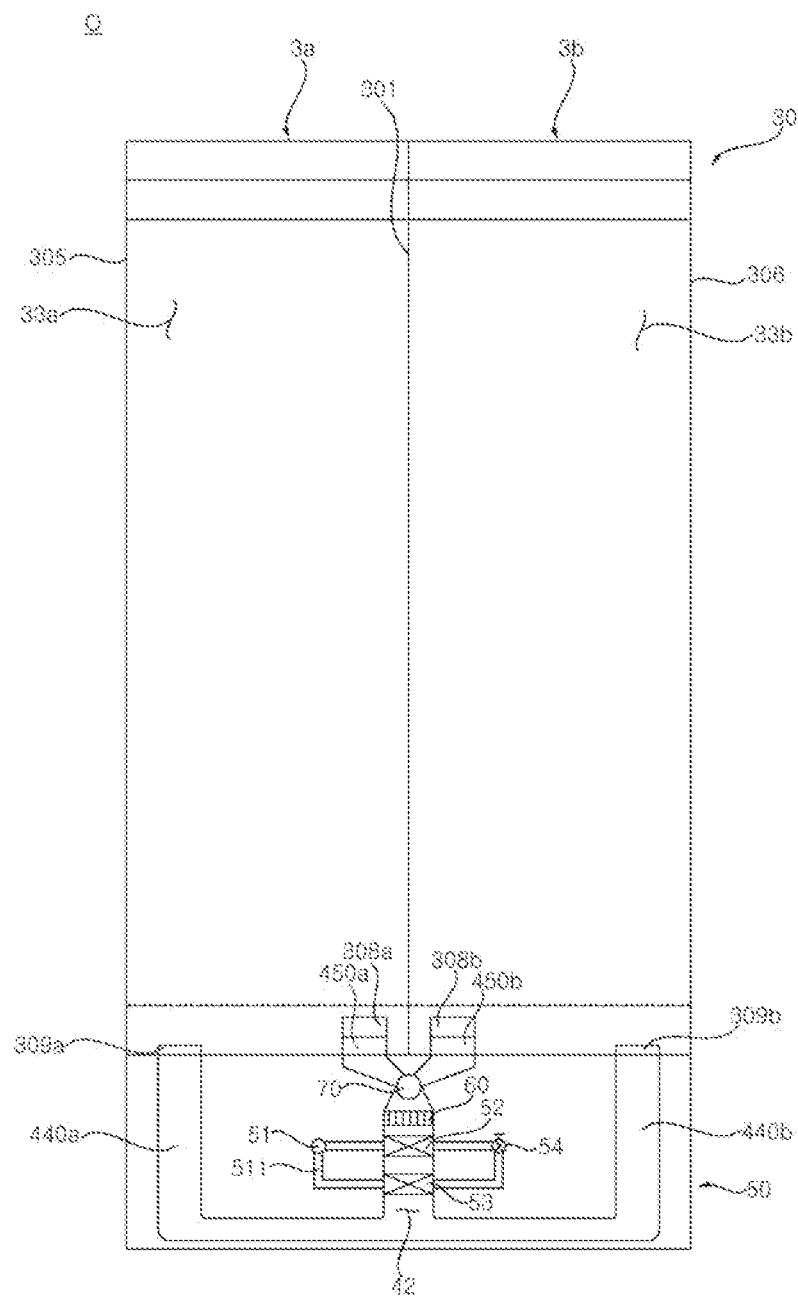
[FIG 55]

LAUNDRY TREATING APPARATUS

CROSS REFERENCE TO RELATED APPLICATIONS

This application claims the priority benefit of Korean Patent Application No. 10-2021-0069528, filed on May 28, 2021 in the Republic of Korea, Korean Patent Application No. 10-2021-0071149, filed on Jun. 1, 2021 in the Republic of Korea, Korean Patent Application No. 10-2021-0089232, filed on Jul. 7, 2021 in the Republic of Korea, Korean Patent Application No. 10-2021-0110913, filed on Aug. 23, 2021 in the Republic of Korea, Korean Patent Application No. 10-2021-0110914, filed on Aug. 23, 2021 in the Republic of Korea, Korean Patent Application No. 10-2021-0110915, filed on Aug. 23, 2021 in the Republic of Korea, Korean Patent Application No. 10-2021-0120154, filed on Sep. 9, 2021 in the Republic of Korea. Korean Patent Application No. 10-2021-0120155, filed on Sep. 9, 2021 in the Republic of Korea, Korean Patent Application No. 10-2021-0120161, filed on Sep. 9, 2021 in the Republic of Korea, and Korean Patent Application No. 10-2021-0126520, filed on Sep. 24, 2021 in the Republic of Korea, which are hereby incorporated by reference in their entirety for all purposes as if fully set forth herein.

BACKGROUND OF THE INVENTION

1. Field of the Invention

The present disclosure relates to a laundry treating apparatus, and more particularly to a laundry treating apparatus including a plurality of laundry treating machines.

2. Description of the Background Art

A washing machine, a dryer, and refreshers, which are provided for treating clothes, are installed in different spaces, such as a kitchen, a utility room, and an outdoor space, according to usage in a residential space.

Korean Laid-Open Patent Publication No. 10-2020-0109194 discloses a washing machine. The washing machine washes laundry by supplying water and detergent into a tub and a drum and by rotating the drum in which the laundry is placed. In the washing machine, water from an external water source is supplied into the tub or the drum, and a pump is used to circulate the water in the tub to the drum or to discharge the water in the tub to the outside. The washing machine is generally installed in the kitchen or the utility room for the supply and discharge of water.

The washing machine separately includes a heater for heating air, a blower fan, and a steam generator, to dry or sterilize the laundry.

Korean Patent No. 10-2120993 discloses a dryer. The dryer may dry the laundry, placed in the drum, by heating air using a heating means and a blower fan and by supplying the heated air into the drum. The dryer is generally disposed adjacent to the washing machine, so as to dry the washed laundry and to allow a user to easily load the laundry containing moisture into the dryer.

By using the steam generator for generating steam and spraying the steam into the drum, the dryer may sterilize the laundry or may remove wrinkles of the laundry. Water may be supplied into the dryer for generating the steam, and water not changed into steam may be reused or may be discharged to the outside. Further, in order to deodorize the dried laundry, the dryer may further have a deodorization function for filtering the circulated air.

Korean Patent No. 10-2254903 discloses a refresher. The refresher may perform functions, such as drying, deodorizing, de-wrinkling, de-static and/or sterilization (hereinafter referred to as "refreshing").

The refresher is used for treating clothes, such as suits and coats, which are frequently used by a user after washing. Generally, the user hangs the clothes, such as suits and coats, in a wardrobe. Accordingly, the refresher may be installed adjacent to the wardrobe, or may be installed instead of the wardrobe, in a dressing room, a living room, or a bedroom. Further, not only for the clothes or garments, the refresher may be used for all washable items, such as shoes, socks, gloves, hats, scarves, etc., which are frequently worn by users, as well as dolls, towels, blankets, etc., which are frequently used by users.

However, the existing laundry treating machines, which are installed in different spaces, have a problem in that a user needs to move the laundry items, which are sorted by a user, to the respective laundry treating machines performing corresponding laundry treating processes, thereby requiring a longer workflow, and making the clothes treating processes uncomfortable.

In addition, as the refresher is installed in a different place from the washing machine and the dryer, it is cumbersome for the user to move the washed wet clothes or the dried clothes to the place where the refresher is installed.

Furthermore, each of the existing laundry treating machines for treating laundry using hot air and steam separately requires water supply equipment, drainage equipment, an air heater, a steam generator, a pump, a blower fan, an air passage, a steam passage, etc., thereby causing a problem in that a space for receiving clothes is reduced. In addition, as each of the machines includes the heater, the steam generator, etc., there is a problem in that costs and energy consumption of the entire system may increase.

SUMMARY OF THE INVENTION

It is an object of the present disclosure to solve the above and other problems.

It is another object of the present disclosure to provide a laundry treating apparatus including a plurality of laundry treating machines.

It is yet another object of the present disclosure to provide a laundry treating apparatus including a washing machine, a dryer, and a refresher.

It is still another object of the present disclosure to provide a laundry treating apparatus capable of performing washing, drying, and refreshing of the laundry in the same space.

It is still another object of the present disclosure to provide a laundry treating apparatus capable of minimizing a user's workflow required for laundry treatment.

It is still another object of the present disclosure to provide a laundry treating apparatus capable of treating laundry which may not be subjected to high temperature drying in a space where washing and drying are performed.

It is still another object of the present disclosure to provide a laundry treating apparatus with improved workability in washing, drying, and refreshing processes of the laundry.

It is still another object of the present disclosure to provide a laundry treating apparatus with reduced vibrations generated in the entire system.

It is still another object of the present disclosure to provide a laundry treating apparatus capable of improving user convenience in manipulation by lowering the height of components, such as a door, a control panel, etc., which require manipulation by a user.

It is still another object of the present disclosure to provide a laundry treating apparatus having a hot air passage for supplying air to the washing machine, the dryer, and the refresher.

It is still another object of the present disclosure to provide a laundry treating apparatus capable of minimizing a length of a hot air passage for supplying air to the washing machine, the dryer, and the refresher.

It is still another object of the present disclosure to provide a refresher having an extended longitudinal width.

It is still another object of the present disclosure to provide a laundry treating apparatus having a refresher with an extended longitudinal width.

It is still another object of the present disclosure to provide a laundry treating apparatus having an extended vertical height of a laundry receiving space.

It is still another object of the present disclosure to provide a laundry treating apparatus having an extended vertical height of a laundry receiving space.

It is still another object of the present disclosure to provide a laundry treating apparatus having an extended vertical height of a laundry receiving space in the refresher.

It is still another object of the present disclosure to provide a laundry treating apparatus using a difference between a longitudinal width of the refresher and a longitudinal width of the washing machine/dryer.

It is still another object of the present disclosure to provide a laundry treating apparatus having a steam passage for supplying steam to the washing machine, the dryer, and the refresher.

It is still another object of the present disclosure to provide a laundry treating apparatus capable of minimizing a steam passage for supplying steam to the washing machine, the dryer, and the refresher.

It is still another object of the present disclosure to provide a laundry treating apparatus capable of supplying hot air to the plurality of laundry treating machines using a single heating device.

It is still another object of the present disclosure to provide a laundry treating apparatus capable of supplying steam to the plurality of laundry treating machines using a single heating device.

It is still another object of the present disclosure to provide a laundry treating apparatus capable of facilitating discharge of condensate generated by the heating device.

It is still another object of the present disclosure to provide a laundry treating apparatus capable of facilitating the supply of water for steam generation and discharge of the water.

It is still another object of the present disclosure to provide a laundry treating apparatus capable of minimizing a length of a hot air passage for supplying air to the dryer and the refresher.

It is still another object of the present disclosure to provide a laundry treating apparatus capable of optimizing the placement of a fan for supplying hot air to the dryer and the refresher.

It is still another object of the present disclosure to provide a laundry treating apparatus capable of minimizing heat loss of hot air supplied to the refresher.

It is still another object of the present disclosure to provide a laundry treating apparatus capable of minimizing a length of a supply air duct and an exhaust air duct which are connected to the refresher.

It is still another object of the present disclosure to provide a laundry treating apparatus capable of discharging condensate generated by the heating device, without using separate pump equipment.

It is still another object of the present disclosure to provide a laundry treating apparatus capable of managing condensate by using a drain pump of the washing machine.

It is still another object of the present disclosure to provide a laundry treating apparatus in which temperature of hot air supplied to the refresher is lower than that of the dryer.

It is still another object of the present disclosure to provide a laundry treating apparatus capable of using the condensate generated by the heating device.

It is still another object of the present disclosure to provide a laundry treating apparatus capable of minimizing vibrations generated in the washing machine.

It is still another object of the present disclosure to provide a laundry treating apparatus capable of reducing rocking of cabinets of the washing machine.

It is still another object of the present disclosure to provide a laundry treating apparatus in which the plurality of laundry treating machines are coupled to each other.

It is still another object of the present disclosure to provide a laundry treating apparatus capable of supplying hot air to an upper side of the refresher.

It is still another object of the present disclosure to provide a laundry treating apparatus capable of recovering hot air from the upper side of the refresher.

It is still another object of the present disclosure to provide a laundry treating apparatus capable of lowering the height of doors of the washing machine and the dryer.

It is still another object of the present disclosure to provide a laundry treating apparatus capable of lowering the height of a laundry loading opening, through which the laundry is loaded, and the height of a control panel.

It is still another object of the present disclosure to provide a laundry treating apparatus capable of allowing users to easily carry the washed laundry.

It is still another object of the present disclosure to provide a laundry treating apparatus capable of preventing air, heated and dehumidified by the heating device, from being directly discharged to users.

It is still another object of the present disclosure to provide a laundry treating apparatus having a passage formed at a high position for indoor dehumidification.

It is still another object of the present disclosure to provide a laundry treating apparatus having an aligned upper end.

It is still another object of the present disclosure to provide a laundry treating apparatus having an aligned front surface.

It is still another object of the present disclosure to provide a laundry treating apparatus having a height which is constant in the horizontal direction.

It is still another object of the present disclosure to provide a laundry treating apparatus having a constant longitudinal width.

It is still another object of the present disclosure to provide a laundry treating apparatus capable of preventing collision of the laundry treating apparatus with surrounding structures when the laundry treating apparatus is installed.

The objects of the present disclosure are not limited to the aforementioned objects and other objects not described herein will be clearly understood by those skilled in the art from the following description.

In accordance with an aspect of the present disclosure, the above and other objects can be accomplished by providing a laundry treating apparatus including a dryer including a first cabinet having a first laundry loading opening.

The dryer may have a first door for opening and closing the first laundry loading opening.

The dryer may include a first drum rotatably disposed in the first cabinet.

The laundry treating apparatus may include a washing machine including a second cabinet vertically disposed with respect to the first cabinet.

The second cabinet may include a second laundry loading opening.

The washing machine may include a second door for opening and closing the second laundry loading opening.

The washing machine may include a tub disposed in the second cabinet.

The washing machine may include a second drum rotatably disposed in the tub.

The laundry treating apparatus may include a refresher disposed on one side of the dryer.

The refresher may be disposed on one side of the washing machine.

The refresher may include a third cabinet having an opening.

The refresher may include a third door for opening and closing the opening.

A space for receiving laundry may be formed in the refresher.

The laundry treating apparatus may include a duct system connected to the dryer and the refresher.

The duct system may include a first supply air duct for supplying air into the first drum.

The duct system may include a second supply air duct for supplying air into an inner space of the refresher.

The duct system may include a heat exchange channel connected to the first supply air duct and the second supply air duct.

The laundry treating apparatus may include a heating device for heating air passing through the heat exchange channel.

The laundry treating apparatus may include a first laundry treating machine including a cabinet having a laundry loading opening, and a door for opening and closing the laundry loading opening.

The first laundry treating machine may include a drum rotatably disposed in the cabinet.

The laundry treating apparatus may include a second laundry treating machine including a cabinet having a laundry loading opening, and a door for opening and closing the laundry loading opening.

A space for receiving laundry may be formed in the second laundry treating machine.

The duct system may include a first supply air duct for supplying air into the drum of the first laundry treating machine.

The duct system may include a second supply air duct for supplying air into the inner space of the second laundry treating machine.

The duct system may include a heat exchange channel connected to the first supply air duct and the second supply air duct.

The heat exchange channel may include an inlet end through which air is introduced, and a discharge end through which the air is discharged.

The laundry treating apparatus may include an integrated frame, having a first laundry loading opening and a second laundry loading opening which are vertically spaced apart from each other, and having a horizontal partition wall disposed at a middle portion thereof.

A drying room may be formed between an upper panel and the horizontal partition wall of the integrated frame.

The first drum may be disposed in the drying room.

A washing room may be formed between a lower panel and the horizontal partition wall of the integrated frame.

The tub and the second drum may be disposed in the washing room.

The laundry treating apparatus may include a side frame disposed on one side of the integrated frame.

The second supply air duct may supply air into the side frame.

The laundry treating apparatus may include a single frame in which a vertical partition wall is disposed.

The horizontal partition wall may be disposed between the vertical partition wall and the one side panel of the single frame.

The washing room and the drying room may be vertically separated by the horizontal partition wall between the one side panel and the vertical partition wall.

A refreshing room for treating clothes may be formed between the vertical partition wall and the other panel of the single frame.

The dryer may be disposed on one side of the washing machine in a direction horizontal to the washing machine.

The refresher may be disposed over the dryer and the washing machine.

The laundry treating apparatus may include a supply air duct connecting the heating device and the refresher.

The supply air duct may supply the air, heated by the heating device, into the inner space of the refresher.

The heating device may be disposed under the first drum.

The washing machine may be disposed over the dryer.

The heating device may be disposed between the first drum and the tub.

The heating device may include a heat exchange unit for heating air supplied to the refresher.

The laundry treating apparatus may include a drawer disposed below the heat exchange unit.

The drawer may have a space for storing water.

The supply air duct may extend downwardly from the heating device.

The supply airduct may be connected to a supply air hole formed at a lower portion of the refresher.

The laundry treating apparatus may include an exhaust air duct extending upwardly form the heating device.

The exhaust air duct may be connected to an exhaust air hole formed at an upper portion of the refresher.

The heating device may be disposed on an upper side of the dryer.

The supply air duct may extend upwardly from the heating device.

The supply air duct may be connected to a supply air hole formed at an upper portion of the refresher.

The laundry treating apparatus may include an exhaust air duct extending downwardly from the heating device.

The exhaust air duct may be connected to an exhaust air hole formed at a lower portion of the refresher.

The dryer may be disposed over the washing machine.

The washing may include a drain pump for discharging water in the tub.

The heating device may be disposed under the tub.

The laundry treating apparatus may include a drain pan disposed under the heat exchange unit.

The laundry treating apparatus may include a drain pipe connecting the drain pan and the drain pump.

The washing machine may include an upper panel coupled to a lower portion of the dryer.

The washing machine may include a suspension connecting the cabinet and the tub of the washing machine.

The cabinet of the washing machine may include a side panel disposed between the tub and the cabinet of the refresher.

The side panel may face the cabinet of the refresher.

The side panel may be coupled to the cabinet of the refresher.

The heating device may be disposed over the first drum.

The laundry treating apparatus may include a storage cabinet disposed between the heating device and the cabinet of the refresher.

The heating device may be disposed above the first drum and the second drum.

The second drum may be open toward the second laundry loading opening, so that laundry placed therein may be unloaded through the second laundry loading opening.

The first drum may be disposed under the second drum.

The first drum may be open toward the first laundry loading opening, so that the laundry unloaded through the second laundry loading opening, may be loaded through the first laundry loading opening.

The laundry treating apparatus may include a dehumidification duct for discharging the air, heated by the heating device, outside of the laundry treating apparatus.

The dehumidification duct may be disposed above the door of the dryer and the door of the washing machine.

An upper end of a front surface of the laundry treating apparatus may be aligned horizontally.

An upper end of a front surface of any one, which is located uppermost, among the dryer, the washing machine, and the heating device, may be aligned with an upper end of a front surface of the refresher.

Other detailed matters of the exemplary embodiments are included in the detailed description and the drawings.

Effects of the Invention

According to at least one of the embodiments of the present disclosure, there is provided a laundry treating apparatus including a plurality of laundry treating machines.

According to at least one of the embodiments of the present disclosure, there is provided a laundry treating apparatus including a washing machine, a dryer, and a refresher.

According to at least one of the embodiments of the present disclosure, there is provided a laundry treating apparatus, in which the washing machine, the dryer, and the refresher are disposed in the same space, thereby performing washing, drying, and refreshing in the same space.

According to at least one of the embodiments of the present disclosure, there is provided a laundry treating apparatus, in which laundry may be treated in the same space regardless of the type of laundry.

According to at least one of the embodiments of the present disclosure, there is provided a laundry treating apparatus, in which when washing, drying, and refreshing are performed, a user's load (e.g., amount of work, workflow, etc.) for moving the laundry may be reduced.

According to at least one of the embodiments of the present disclosure, there is provided a laundry treating apparatus capable of treating laundry, which may not be subjected to high temperature drying, in the same space where washing and drying are performed.

According to at least one of the embodiments of the present disclosure, there is provided a laundry treating apparatus, in which the washing machine and the refresher share one surface, thereby reducing vibrations generated in the washing machine.

According to at least one of the embodiments of the present disclosure, there is provided a laundry treating apparatus, in which the heating device of the refresher is disposed between the washing machine and the dryer, thereby extending the height of a laundry receiving space in the refresher.

According to at least one of the embodiments of the present disclosure, a hot air passage is provided in a rear space of the refresher, such that the entire system may have a uniform longitudinal width.

According to at least one of the embodiments of the present disclosure, the heating device is disposed at a middle height of the refresher, thereby minimizing the length of a hot air supply passage for supplying hot air to each of the washing machine, the dryer, and the refresher.

According to at least one of the embodiments of the present disclosure, a steam generator is disposed at a middle height of the refresher, thereby minimizing the length of a steam supply passage for supplying steam to each of the washing machine, the dryer, and the refresher.

According to at least one of the embodiments of the present disclosure, hot air may be supplied to each of the washing machine, the dryer, and the refresher by using a single heating device.

According to at least one of the embodiments of the present disclosure, steam may be supplied to each of the washing machine, the dryer, and the refresher by using a single steam generator.

According to at least one of the embodiments of the present disclosure, condensate may be managed easily by discharging condensate, generated in an evaporator, through a drain pump of the washing machine.

According to at least one of the embodiments of the present disclosure, steam may be generated easily by supplying water, required for generating steam, through a water supply pipe of the washing machine.

According to at least one of the embodiments of the present disclosure, the heating device for supplying hot air to the refresher may be disposed on a lateral side, thereby increasing the height of an inner space of the refresher.

According to at least one of the embodiments of the present disclosure, hot air may be supplied to the refresher by using the heating device of the dryer, thereby increasing a volume of the inner space of the refresher.

According to at least one of the embodiments of the present disclosure, the heating device is disposed at a lower side of the laundry treating apparatus, thereby minimizing the length of the hot air passage connected to the dryer and the refresher.

According to at least one of the embodiments of the present disclosure, a supply air duct, connecting the heating device and the refresher, is reduced in length, thereby minimizing heat loss of the hot air supplied to the refresher.

According to at least one of the embodiments of the present disclosure, condensate generated in the evaporator may be discharged through the drain pump of the washing machine, thereby allowing easy management of the condensate.

According to at least one of the embodiments of the present disclosure, water in a tub and the condensate generated in the heating device are discharged through a single drain pump, thereby reducing the number of components required for drainage.

According to at least one of the embodiments of the present disclosure, a cabinet of the washing machine is coupled to a cabinet of the refresher, thereby reducing vibrations generated in the washing machine.

According to at least one of the embodiments of the present disclosure, the heating device is disposed over the washing machine and the dryer, such that hot air may be easily supplied to the upper side of the refresher.

According to at least one of the embodiments of the present disclosure, the heating device is disposed over the dryer and the washing machine, the height of doors of the dryer and the washing machine may be lowered.

According to at least one of the embodiments of the present disclosure, as the washing machine is disposed over the dryer, heavy laundry after washing may be dropped to a laundry loading opening of the dryer, thereby allowing a user to easily move the laundry.

According to at least one of the embodiments of the present disclosure, a dehumidification duct is disposed over the dryer and the washing machine, it is possible to prevent high temperature dry air, discharged through the dehumidification duct, from being directly discharged to a user.

According to at least one of the embodiments of the present disclosure, an upper end of the laundry treating apparatus is aligned, such that the plurality of laundry treating machines may be easily coupled to each other.

Further scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention FIG. 1 is a perspective view of a laundry treating apparatus according to at least one embodiment of the present disclosure.

FIG. 2 is a longitudinal cross-sectional view of a laundry treating apparatus according to at least one embodiment of the present disclosure.

FIG. 3 is a longitudinal cross-sectional view of a laundry treating apparatus according to at least one embodiment of the present disclosure.

FIG. 4 is a conceptual diagram illustrating a duct system of a laundry treating apparatus according to at least one embodiment of the present disclosure.

FIG. 5 is a perspective view of a heating device according to at least one embodiment of the present disclosure.

FIG. 6 is another perspective view of a heating device according to at least one embodiment of the present disclosure.

FIG. 7 is yet another perspective view of a heating device according to at least one embodiment of the present disclosure.

FIG. 8 is a perspective view explaining an operation of a heating device according to at least one embodiment of the present disclosure.

FIG. 9 is a cross sectional view illustrating a portion of a rear surface of a laundry treating apparatus according to at least one embodiment of the present disclosure.

FIG. 10 is a perspective view illustrating assembly of a laundry treating apparatus according to at least one embodiment of the present disclosure.

FIG. 11 is a rear perspective view of a laundry treating apparatus according to at least one embodiment of the present disclosure.

FIG. 12 is a top view of a laundry treating apparatus according to at least one embodiment of the present disclosure.

FIG. 13 is a rear perspective view of a laundry treating apparatus according to at least one embodiment of the present disclosure.

FIG. 14 is an enlarged view of a support block according to at least one embodiment of the present disclosure.

FIG. 15 is a cross-sectional view of a support block according to at least one embodiment of the present disclosure.

FIG. 16 is a front view illustrating an example of an operation of an auxiliary panel according to at least one embodiment of the present disclosure.

FIG. 17 is an illustration of an example of an operation of an auxiliary panel according to at least one embodiment of the present disclosure.

FIG. 18 is a front view of a laundry treating apparatus according to at least one embodiment of the present disclosure.

FIG. 19 is a perspective view of a laundry treating apparatus according to at least one embodiment of the present disclosure.

FIG. 20 is a conceptual diagram illustrating a duct system of a laundry treating apparatus according to at least one embodiment of the present disclosure.

FIG. 21 is a rear perspective view of a laundry treating apparatus according to at least one embodiment of the present disclosure.

FIG. 22 is a lower perspective view of a laundry treating apparatus according to at least one embodiment of the present disclosure.

FIG. 23 is a rear perspective view of a laundry treating apparatus according to at least one embodiment of the present disclosure.

FIG. 24 is a perspective view of a laundry treating apparatus according to at least one embodiment of the present disclosure.

FIG. 25 is a longitudinal cross-sectional view of a laundry treating apparatus according to at least one embodiment of the present disclosure.

FIG. 26 is a conceptual diagram illustrating a duct system of a laundry treating apparatus according to at least one embodiment of the present disclosure.

FIG. 27 is a partially enlarged view of a rear surface of a laundry treating apparatus according to at least one embodiment of the present disclosure.

FIG. 28 is an exploded view of a laundry treating apparatus according to at least one embodiment of the present disclosure.

FIG. 29 is a rear perspective view of a laundry treating apparatus according to at least one embodiment of the present disclosure.

FIG. 30 is a rear perspective view of a laundry treating apparatus according to at least one embodiment of the present disclosure.

FIG. 31 is a perspective view of a laundry treating apparatus according to at least one embodiment of the present disclosure.

FIG. 32 is a conceptual diagram illustrating a duct system of a laundry treating apparatus according to at least one embodiment of the present disclosure.

FIG. 33 is a perspective view of a heating device according to at least one embodiment of the present disclosure.

FIG. 34 is a rear perspective view of a laundry treating apparatus according to at least one embodiment of the present disclosure.

FIG. 35 is a lower perspective view of a laundry treating apparatus according to at least one embodiment of the present disclosure.

FIG. 36 is a rear perspective view of a laundry treating apparatus according to at least one embodiment of the present disclosure.

FIG. 37 is a perspective view of a laundry treating apparatus according to at least one embodiment of the present disclosure.

FIG. 38 is a longitudinal cross-sectional view of a laundry treating apparatus according to at least one embodiment of the present disclosure.

FIG. 39 is a conceptual diagram illustrating a duct system of a laundry treating apparatus according to at least one embodiment of the present disclosure.

FIG. 40 is a perspective view of a heating device according to at least one embodiment of the present disclosure.

FIG. 41 is a rear perspective view of a laundry treating apparatus according to at least one embodiment of the present disclosure.

FIG. 42 is a perspective view of a laundry treating apparatus according to at least one embodiment of the present disclosure.

FIG. 43 is a rear perspective view of a laundry treating apparatus according to at least one embodiment of the present disclosure.

FIG. 44 is a rear view of a laundry treating apparatus according to at least one embodiment of the present disclosure.

FIG. 45 is a perspective view of a laundry treating apparatus according to at least one embodiment of the present disclosure.

FIG. 46 is a conceptual diagram illustrating a duct system of a laundry treating apparatus according to at least one embodiment of the present disclosure.

FIG. 47 is a rear perspective view of a laundry treating apparatus according to at least one embodiment of the present disclosure.

FIG. 48 is a perspective view of a laundry treating apparatus according to at least one embodiment of the present disclosure.

FIG. 49 is a rear perspective view of a laundry treating apparatus according to at least one embodiment of the present disclosure.

FIG. 50 is a perspective view of a laundry treating apparatus according to at least one embodiment of the present disclosure.

FIG. 51 is a perspective view of a laundry treating apparatus according to at least one embodiment of the present disclosure.

FIG. 52 is a perspective view of a laundry treating apparatus according to at least one embodiment of the present disclosure.

FIG. 53 is a perspective view of a laundry treating apparatus according to at least one embodiment of the present disclosure.

FIG. 54 is a conceptual diagram illustrating a laundry treating apparatus according to at least one embodiment of the present disclosure.

FIG. 55 is a conceptual diagram illustrating a laundry treating apparatus according to at least one embodiment of the present disclosure.

DETAILED DESCRIPTION OF THE PREFERRED EMBODIMENTS

Hereinafter, the present disclosure will be described in detail with reference to the accompanying drawings, in which the same reference numerals are used throughout the drawings to designate the same or similar components, and a redundant description thereof will be omitted.

Terms "module" and "unit" for elements used in the following description are given simply in view of the ease of the description, and do not have a distinguishing meaning or role.

It will be noted that a detailed description of known arts will be omitted if it is determined that the detailed description of the known arts can obscure the embodiments of the invention. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

The laundry treating apparatus according to the embodiments of the present disclosure may include one or more laundry treating machines. The laundry treating machines refer to devices for washing, drying, and/or refreshing objects (e.g., clothes, towels, blankets, etc.).

The laundry treating apparatus may include a plurality of laundry treating machines of the same type. For example, the laundry treating apparatus may include two or more dryers 1. For example, the laundry treating apparatus may include two or more washing machines 2. For example, the laundry treating apparatus may include two or more refreshers 3.

The laundry treating apparatus may include different types of laundry treating machines. For example, the laundry treating apparatus may include the dryer 1, the washing machine 2, and the refresher 3.

The laundry treating apparatus may include laundry treating machines of the same type and laundry treating machines of types different from the type. For example, the laundry treating apparatus may include two or more washing machines, one dryer, and one refresher. For example, the laundry treating apparatus may include one washing machine, one dryer, and two or more refreshers.

The laundry treating apparatus of the present disclosure is not limited to the type and number of the laundry treating machines, and may include various combinations thereof. Hereinafter, the laundry treating apparatus including one dryer 1, one washing machine 2, and one refresher 3 will be described as an example, but the present disclosure is not limited thereto.

The dryer 1, the washing machine 2, and the refresher 3 may be referred to as any one of first to third laundry treating machines, respectively. For example, the dryer 1 may be referred to as the "first laundry treating machine," the washing machine 2 may be referred to as the "second laundry treating machine," and the refresher 3 may be referred to as the "third laundry treating machine."

Hereinafter, it will be understood that, although the terms first, second, third, etc., may be used herein to describe various elements, these elements should not be limited by these terms. These terms are only used to distinguish one element from another. These elements are not limited to the terms and may include other ordinal numbers. The elements may be used independently without including the ordinal numbers. For example, the elements of the dryer 1 may include the ordinal number "first," the elements of the washing machine 2 may include the ordinal number "second," and the elements of the refresher 3 may include the ordinal number "third." However, the elements of the dryer 1, the washing machine 2, and the refresher 3 are not limited to these terms, and may include other ordinal numbers or may be used independently without including the ordinal numbers.

A laundry treating apparatus may include a controller 81 for controlling operation of a dryer 1, a washing machine 2, a refresher 3, and a heating device 50. The controller 81 may be mounted in a Printed Circuit Board (PCB). The controller 81 may control the dryer 1, the washing machine 2, the refresher 3, and the heating device 50 based on an electric signal received from a control panel 8. The controller 81 may communicate with the control panel 8.

The dryer 1 and the washing machine 2 may be vertically disposed. The control panel 8 may be disposed between the dryer 1 and the washing machine 2. The control panel 8 and the refresher 3 may be vertically disposed.

A user may input a command to the laundry treating apparatus through the control panel 8. By manipulating the control panel 8, the user may control the operation of the dryer 1, the washing machine 2, and the refresher 3. By manipulating the control panel 8, the user may control the operation of the heating device 50. The control panel 8 may transmit an electrical signal, input by the user's manipulation, to the controller 81.

A space for providing the PCB may be formed in the control panel 8. A controller may be mounted in the PCB. The controller may be the controller 81.

Alternatively, the controller may be disposed on a rear surface of the control panel 8. The space for providing the PCB may be formed on the rear surface of the control panel 8. The controller 81 may be mounted in the PCB.

Alternatively, at least some of the dryer 1, the washing machine 2, the refresher 3, and a machine room S may include respective controllers for controlling each operation thereof. Even in this case, the respective controllers may be mounted in the PCB. The respective controllers may communicate with each other. In some cases, at least one controller may be an upper level controller that may control other controllers and devices.

The control panel 8 may display an operating state of the laundry treating apparatus. The user may check information on the operating state of the laundry treating apparatus through the control panel 8.

The laundry treating apparatus may include a heating device 50. The heating device 50 may supply hot air to the dryer 1. The heating device 50 may supply hot air to the refresher 3. The heating device 50 may supply hot air to the washing machine 2. The hot air, supplied to the respective laundry treating machines, may be drawn into the heating device 50 again for circulation.

However, without circulating the hot air supplied to each of the dryer 1, the washing machine 2, and the refresher 3, the laundry treating apparatus may discharge the hot air to the outside. That is, the laundry treating apparatus may discharge the hot air supplied to a tub 23 of the washing machine 2 to the outside of the washing machine 2, may discharge the hot air supplied to a first drum 13 of the dryer 1 to the outside of the dryer 1, and may discharge the hot air supplied to an inner space 33 of the refresher 3 to the outside of the refresher 3.

The laundry treating apparatus may include the machine room S (see FIG. 2). The machine room S may provide a space in which the heating device 50 is disposed. The machine room S may be a concept that refers to a space in which the heating device 50 and components other than the heating device 50 are disposed. In addition to the heating device 50, a pump, a blower fan, an air passage, a steam device, a stream passage, a dehumidification device, a controller, a motor, a fan housing, and the like may be disposed in the machine room S. The machine room S may provide the space in which the aforementioned movable elements (a pump, a blower fan, an air passage, a steam device, a stream passage, a dehumidification device, a controller, a motor, and a fan housing) are disposed.

In the present disclosure, the machine room S may refer to the space in which the heating device 50 is disposed, or may be an upper concept that encompasses the heating device 50.

The machine room S may include a separate case. When the machine room S includes the separate case, the machine room S may be separated from a first cabinet 10 and a second cabinet 20. A third cabinet, which may be part of the refresher 3, may be provided adjacent to the first cabinet 10 and the second cabinet 20. Unlike the example, the machine room S may be disposed in any one of first to third cabinets 10, 20, and 30. In the case where the machine room S is disposed in any one of the first to third cabinets 10, 20, and 30, the machine room S may be a concept that refers to a space in which various components including the heating device 50 are disposed. That is, in the case where the machine room S is disposed in any one of the first to third cabinets 10, 20, and 30, the machine room S may refer to a portion of the inner space of the first to third cabinets 10, 20, and 30.

The machine room S, the dryer 1, and the washing machine 2 may be vertically disposed. The machine room S may be disposed on an upper side of the dryer 1 and the washing machine 2. The machine room S may be disposed between the dryer 1 and the washing machine 2. The machine room S may be disposed on a lower side of the dryer 1 and the washing machine 2. Unlike the example, the machine room S and the refresher 3 may be vertically disposed. The machine room S may be disposed on the upper side or the lower side of the refresher 3.

The heating device 50 may supply hot air to the dryer 1. The heating device 50 may recover the hot air supplied to the dryer 1.

The heating device 50 may supply hot air to the washing machine 2. The heating device 50 may recover the hot air supplied to the washing machine 2.

The heating device 50 may supply hot air to the refresher 3. The heating device 50 may recover the hot air supplied to the refresher 3.

The heating device 50 may supply steam to the dryer 1. The heating device 50 may supply steam to the washing machine 2. The heating device 50 may supply steam to the refresher 3.

The heating device 50 may include a heat pump device. The heat pump device may include a compressor 51, a condenser 52, an evaporator 53, and an expansion device 54 (see FIG. 5). The heating device 50 may include a fan 60 (see FIG. 5). The heat pump device may be referred to as a "heat exchange unit."

The heating device 50 may include a heat exchange unit for heating air flowing through a heat exchange channel 42 (see FIG. 5). The heat exchange unit may be a heat pump device connected by a refrigerant passage. The heat exchange unit may be a heater using electricity as power. The heat exchange unit may be a heating device. The heat exchange unit may include the heater and a cooler. The cooler may be disposed on an upstream side of the beater. The cooler may be disposed in the heat exchange channel 42. The cooler may dehumidify and cool air passing through the heat exchange channel 42.

The heating device 50, the dryer 1, and the washing machine 2 may be vertically disposed. The heating device 50 may be disposed on the upper side of the dryer 1 and the washing machine 2, may be disposed between the dryer 1 and the washing machine 2, or may be disposed under the dryer 1 and the washing machine 2.

The heating device 50 and the refresher 3 may be vertically disposed. The heating device 50 may be disposed in a rear space of the refresher 3.

The heating device 50 may be disposed in the first cabinet 10. The heating device 50 may also be disposed in the second cabinet 20. The heating device 50 may also be disposed in the third cabinet 30.

The dryer 1, the washing machine 2, and the heating device 50 (or the machine room S) may be vertically arranged, and the refresher 3 may be disposed on a lateral side of the washing machine 2. The heating device 50 may be disposed on a lateral side of the refresher 3.

Hereinafter, a laundry treating apparatus A according to an aspect of the present disclosure will be described below with reference to FIG. 1.

The laundry treating apparatus A illustrated in FIG. 1 may be an example in which the dryer 1 is disposed over the washing machine 2 and the heating device 50 is disposed between the washing machine 2 and the dryer 1. However, a vertical arrangement of the dryer 1, the washing machine 2, and the heating device 50 is not limited thereto.

The refresher 3 may be disposed on a lateral side of the dryer 1 and the washing machine 2. For example, the refresher 3 may be disposed on the right side of the dryer 1 and the washing machine 2. However, an arrangement position of the refresher 3 is not limited to the above example, and the refresher 3 may be disposed on the right side of the dryer 1 and the washing machine 2.

A longitudinal width of the refresher 3 may be smaller than a front-rear dimension (e.g., front-rear width) of the dryer 1 and the washing machine 2.

A rear case 310, in which the hot air passage or the steam passage which will be described later is disposed, may be disposed behind the refresher 3.

The dryer 1 may include the first cabinet 10 having a first laundry loading opening 12 (see FIG. 2) formed on a front surface thereof, and a first door 11 rotatably coupled to the first cabinet 10.

By rotating the first door 11, a user may open the first laundry loading opening 12, and may put the laundry into the first drum 13 through the first laundry loading opening 12.

The washing machine 2 may include a second cabinet 20 having a second laundry loading opening 22 (see FIG. 2) formed on a front surface, and a second door 21 rotatably coupled to the second cabinet 20.

By rotating the second door 21, the user may open the second laundry loading opening 22, and may load the laundry into the second drum 24 through the second laundry loading opening 22.

The refresher 3 forms a space in which the laundry is received, and includes a third cabinet 30 having a third laundry loading opening 32 (see FIG. 3) and a third door 31 rotatably coupled to the cabinet 30. The third laundry loading opening 32 may be referred to as an "opening."

By rotating the third door 31, the user may open the third laundry loading opening 32 and may load the laundry into the third cabinet 30 through the third laundry loading opening 32.

Each of the first cabinet 10, the second cabinet 20, and the third cabinet 30 may include an upper panel, a lower panel, a front panel, a rear panel, and a side panel. The upper panel may be referred to as an "upper wall." The lower panel may be referred to as a "lower wall." The front panel may be referred to as a "front wall." The rear panel may be referred to as a "rear wall." The side panel may be referred to as a "side wall."

Each of the first cabinet 10, the second cabinet 20, and the third cabinet 30 may include a pair of side panels. The pair of side panels may be horizontally spaced apart from each other. The side panels may be referred to as "side walls." The first cabinet 10 may include a first inner wall 106 facing the refresher 3, and a first outer wall 105 spaced apart from the first inner wall 106. The second cabinet 20 may include a second inner wall 206 facing the refresher 3, and a second outer wall 205 spaced apart from the second inner wall 206. The third cabinet 30 may include a third inner wall 306 facing the dryer 1 and the washing machine 2, and a third outer wall 305 spaced apart from the third inner wall 306.

The first cabinet 10 may include a first upper panel 103, a first lower panel 104, a first front panel 101, a first rear panel 102, and first side panels 105 and 106 (i.e., first outer wall 105 and first inner wall 106).

The second cabinet 20 may include a second upper panel 203, a second lower panel 204, a second front panel 201, a second rear panel 202, and second side panels 205 and 206 (i.e., second outer wall 205 and second inner wall 206).

The third cabinet 30 may include a third upper panel 303, a third lower panel 304, a third front panel 301, a third rear panel 302, and third side panels 305 and 306 (i.e., third outer wall 305 and third inner wall 306). The third cabinet 30 may include the third door 31 instead of the third front panel 301.

The above description of the first to third cabinets 10, 20, and 30 may also be applied to the laundry treating apparatus described with reference to FIGS. 1 to 55.

A plate may be disposed in a space between the dryer 1 and the refresher 3 and in a space between the washing machine 2 and the refresher 3. The plate may be a damping material. The dryer 1, the washing machine 2, and the refresher 3 may be coupled to each other by the plate.

The first upper panel 103 of the dryer 1 and the third upper panel 303 of the refresher 3 may be disposed on the same horizontal plane. The third upper panel 303 of the refresher 3 and the upper wall 313 of the rear case 310 may be disposed on the same horizontal plane.

The dryer 1 may have a first upper surface 10c. The first upper surface 10c may be an upper surface of the first cabinet 10. The first upper surface 10c may be an upper surface of the first upper panel 103.

The refresher 3 may have a third upper surface 30c. The third upper surface 30c may be an upper surface of the third cabinet 30.

The first upper surface 10c and the third upper surface 30c may be aligned horizontally. The first upper surface 10c and the third upper surface 30c may be disposed on the same horizontal plane. However, a height of the first upper surface 10c may be different from a height of the third upper surface 30c, in which case a step may be formed between the first upper surface 10c and the third upper surface 30c.

In the description of the laundry treating apparatus of the present disclosure, the term "aligned" will be defined as follows. The term "aligned" may indicate that components are aligned on a substantially same plane. That is, although components A and B are not disposed on the same plane in a strict sense, it can be said that the components A and B are "aligned" on the same plane even when they are disposed on two planes with a predetermined distance between them. Further, in the description of the laundry treating apparatus of the present disclosure, the phrase "positioned on the same plane" includes a case where components are positioned on a substantially same plane. For example, if a first plane, on which component A is positioned, and a second plane, on which component B is positioned, are spaced apart side by side, it can be said that "components A and B are aligned" and "components A and B are positioned on the same plane."

The dryer 1 may have a first front surface 10a or 11a. The front surface 10a of the dryer 1 may refer to the front surface of the first cabinet 10. The first front surface 10a may be the front surface of the first front panel 101.

The first door 11 may have a first front surface 11a. The front surface 11a of the dryer 1 may refer to the front surface of the first door 11.

The first door 11 may protrude forwardly beyond the front surface of the first cabinet 10, in which case the front surface 11a of the first door 11 may be referred to as the front surface 11a of the dryer 1, or the front surface 10a of the first cabinet 10 may be referred to as the front surface 10a of the dryer 1.

The washing machine 2 may have a second front surface 20a or 21a. The front surface 20a of the washing machine 2 may refer to the front surface of the second cabinet 20. The second front surface 20a may be the front surface of the second front panel 201.

The second door 21 may have the second front surface 21a. The front surface 21a of the washing machine 2 may refer to the front surface of the second door 21.

The second door 21 may protrude forwardly beyond the front surface of the second cabinet 20, in which case the front surface 21a of the second door 21 may be referred to as the front surface 21a of the washing machine 2, and the front surface 20a of the second cabinet 20 may be referred to as the front surface 20a of the washing machine 2.

The refresher 3 may have a third front surface 31a. The front surface 31a of the refresher 3 may refer to the front surface of the third door 31.

The front surface 10a or 11a of the dryer 1 may be aligned with the front surface 31a of the refresher 3. The front surface 10a or 11a of the dryer 1 and the front surface 31a of the refresher 3 may be disposed on the same plane. The front surface 20a or 21a of the washing machine 2 may be aligned with the front surface 31a of the refresher 3. The front surface 20a or 21a of the washing machine 2 and the front surface 31a of the refresher 3 may be disposed on the same plane. The front surface 10a or 11a of the dryer 1 may be aligned with the front surface 20a or 21a of the washing machine 2. The front surface 10a or 11a of the dryer 1 and the front surface 20a or 21a of the washing machine 2 may be disposed on the same plane.

The front surface 31a of the refresher 3 may be aligned with the front surface 10a of the first cabinet 10 and the front surface 20a of the second cabinet 20. The front surface 31a of the refresher 3, the front surface 10a of the first cabinet 10, and the front surface 20a of the second cabinet 20 may be disposed on the same plane.

The front surface 31a of the refresher 3 may be aligned with the front surface 11a of the first door 11 and the front surface 21a of the second door 21. The front surface 31a of the refresher 3, the front surface 11a of the first door 11, and the front surface 21a of the second door 21 may be disposed on the same plane as the front surface 11a of the first door 11 and the front surface 21a of the second door 21.

The front surface 31a of the refresher 3 may be aligned with the front surfaces 11a and 21a of the doors 11 and 21 of the dryer 1 and the washing machine 2, respectively, and may also be aligned with the front surfaces 10a and 20a of the cabinets 10 and 20 of the dryer 1 and the washing machine 2, respectively. As illustrated in FIG. 12, in the case where the respective front surfaces 11a and 21a of the doors 11 and 21 of the dryer 1 and the washing machine 2 are disposed on the same plane as the front surfaces 10a and 20a of the cabinets 10 and 20, the front surface 31a of the refresher 3 may be aligned with the respective doors 11 and 21 of the dryer 1 and the washing machine 2, and the front surfaces 10a, 11a, 20a, and 21a of the cabinets 10 and 20.

An upper end 107 of the front surface 10a of the dryer 1 may be aligned with an upper end 307 of the front surface 31a of the refresher 3. The upper end 107 of the front surface 10a of the dryer 1 may be disposed on the same plane as the upper end 307 of the front surface 31a of the refresher 3.

The dryer 1 may have a first upper end 107. The first upper end 107 may refer to an upper end of the front surface 10a of the first cabinet 10. The first upper end 107 may refer to an upper end of the first front panel 101.

The refresher 3 may have a second upper end 307. The second upper end 307 may refer to an upper end of the third door 31.

The first upper end 107 and the second upper end 307 may be aligned horizontally. The first upper end 107 and the second upper end 307 may be disposed on the same horizontal plane. The first upper end 107 and the second upper end 307 may form a step in the horizontal direction. Even in this case, the first upper end 107 and the second upper end 307 may be aligned horizontally.

The first upper surface 10c may be disposed on the same horizontal plane as the first upper end 107. However, the first upper surface 10c may be disposed below the first upper end 107. The first upper surface 10c may be aligned with the first upper end 107 in a front-rear direction.

The third upper surface 30c may be disposed on the same horizontal plane as the second upper end 307. However, the third upper surface 30c may be disposed below the second upper end 307. The third upper surface 30*c* may be aligned with the second upper end 307 in a front-rear direction.

The laundry treating apparatus A may include a connector 92 (FIG. 1) having a width in a horizontal direction and coupled to each of the first upper end 107 and the second upper end 307. The connector 92 may be referred to as an "upper connector."

The laundry treating apparatus may include the upper connector 92 connecting the first cabinet 10 and the third cabinet 30, and a lower connector 90 (se FIG. 42) connecting the second cabinet 20 and the third cabinet 30. The upper connector 92 may connect any one of the first cabinet 10 and the second cabinet 20, which is disposed on an upper side, to the third cabinet 30. The lower connector 90 may connect any one of the first cabinet 10 and the second cabinet 20, which is disposed on a lower side, to the third cabinet 30.

The connector 92 may extend rearwardly from the upper ends 107 and 307. The connector 92 may connect the first upper end 107 and the second upper end 307. The connector 92 may connect the first upper surface 10*c* and the third upper surface 30*c*.

The laundry treating apparatus A may include a tower 9 including the dryer 1 and the washing machine 2. The tower 9 may include the heating device 50.

The tower 9 may be an assembly in which the dryer 1 and the washing machine 2 are arranged vertically. In the case where the heating device 50 is disposed on one side of the refresher 3, the tower 9 may be an assembly in which the dryer 1, the washing machine 2, and the heating device 50 are arranged vertically.

The dryer 1, the washing machine 2, and the heating device 50 may be vertically arranged, so as to form the tower 9. An arrangement order of the dryer 1, the washing machine 2, and the heating device 50 in the tower 9 may not be limited to FIG. 1. For example, the washing machine 2 may be disposed over the dryer 1, and the heating device 50 may be disposed above the dryer 1 and the washing machine 2.

The tower 9 may be disposed on a lateral side of the refresher 3.

A front surface of the tower 9 may be aligned with the front surface 31*a* of the refresher 3. The front surface of the tower 9 may be disposed on the same plane as the front surface 31*a* of the refresher 3. The front surface of the tower 9 may refer to the front surface 11*a* of the first door 11 and the front surface 21*a* of the second door 21. The front surface of the tower 9 may refer to the front surface 10*a* of the first cabinet 10, the front surface 20*a* of the second cabinet 20, and the front surface of the control panel 8.

An upper end 91 of the front surface of the tower 9 may be aligned with the upper end 307 of the front surface 31*a* of the refresher 3. The upper end 91 of the front surface of the tower 9 may be on the same horizontal plane as the upper end 307 of the front surface 31*a* of the refresher 3.

The upper end 91 of the front surface of the tower 9 may refer to the first upper end 107. However, in the case where the washing machine 2 is disposed over the dryer 1, the upper end 91 of the front surface of the tower 9 may refer to the upper end of the front surface of the washing machine 2. Further, in the case where the heating device 50 is disposed on the upper side of the dryer 1 and the washing machine 2, the upper end 91 of the front surface of the tower 9 may refer to the upper end of the front surface of the heating device 50.

An upper surface 9*c* of the tower 9 and the third upper surface 30*c* of the refresher 3 may be aligned horizontally.

The upper surface 9*c* of the tower 9 and the third upper surface 30*c* of the refresher 3 may be disposed on the same horizontal plane.

The connector 92 may connect the upper end 91 of the front surface of the tower 9 and the upper end 307 of the front surface of the refresher 3. The connector 92 may connect the upper surface 9*c* of the tower 9 and the third upper surface 30*c* of the refresher 3.

A third side panel 305 of the refresher 3 and a side wall 315 of the rear case 310 may be disposed on the same plane.

The front panel/first front panel 101 of the dryer 1, the front panel/second front panel 201 of the washing machine 2, and the control panel 8 may be disposed on the same plane. The front surface 10*a* of the dryer 1, the front surface 20*a* of the washing machine 2, and the control panel 8 may be disposed on the same plane.

The third door 31 of the refresher 3 may be disposed on the same plane as the front panel 101 of the dryer 1, the front panel 201 of the washing machine 2, and the control panel 8. Alternatively, the third door 31 of the refresher 3 may also be disposed on the same plane as the first door 11 of the dryer 1 and the second door 21 of the washing machine 2.

The second lower panel 204 of the washing machine 2 may be disposed on the same horizontal plane as the third lower panel 304 of the refresher 3.

Hereinafter, an internal structure of the dryer 1, the washing machine 2, and the heating device 50 will be described with reference to FIG. 2. FIG. 2 is a diagram illustrating an internal structure of the dryer 1, the washing machine 2, and the heating device 50 which are cut in a longitudinal direction.

The washing machine 2 includes the second cabinet 20, the second door 21 rotatably coupled to the second cabinet 20, the tub 23 disposed in the second cabinet 20, a second drum 24, which is rotatably disposed in the tub 23 and in which laundry is received, a motor 25 for transmitting power to the second drum 24, a drain pump 26 for discharging water, generated in the laundry treating apparatus A to the outside, a water supply valve 27 connected to an external water source, and a drawer 28 in which detergent is stored. The drawer 28 may be referred to as a "detergent box."

The drain pump 26 may be connected to the tub 23 by a first pipe 261. The drain pump 26 may discharge water, introduced through the first pipe 261 and a drain pipe 532, to the outside of the laundry treating apparatus A through a second pipe 262. However, the drain pipe 532 may be directly connected to the second pipe 262, in which case condensate generated in the evaporator 53 may be discharged to the outside of the laundry treating apparatus A through the drain pipe 532 and the second pipe 262.

The water supply valve 27 may open and close water supply pipes 278 and 279 (see FIG. 9) connecting the external water source and the washing machine 2. The water supply valve 27 may control a flow rate of water flowing into the washing machine 2 from the external water source. The water supply valve 27 may be connected to a first water supply pipe 271. The first water supply pipe 271 may be connected to the drawer 28 in which the detergent is stored. The water flowing into the drawer 28 through the first water supply pipe 271 may flow into the tub 23 along with the detergent in the drawer 28 through a second water supply pipe 272.

The dryer 1 includes the first cabinet 10, the first door 11 rotatably coupled to the first cabinet 10, and the first drum 13 which is rotatably disposed in the first cabinet 10 and in which the laundry is received.

The dryer 1 may include a motor 133 (see FIG. 5) for rotating the first drum 13. A pulley may be fixed to a rotating shaft of the motor 133. A belt may connect the pulley with a circumferential surface of the drum, such that torque of the motor 133 may be transferred to the drum 13 via the pulley and the belt.

The motor 133 may be disposed under the first drum 13. The motor 133 may be disposed in the heating device 50. The motor 133 may be disposed on a lateral side of the heat exchange channel 42. A case 570 (see FIG. 5) of the heating device 50 may be provided with a motor mounting portion 133s (see FIG. 6).

Unlike the example, the motor 133 may be directly coupled to the first drum 13 to rotate the first drum 13.

The heating device 50 may be disposed over the second upper panel 203. The heating device 50 may be disposed in the first cabinet 10.

The heating device 50 includes: a condenser 52 for performing heat exchange between high-temperature refrigerant and air to heat the air, a fan 60 for blowing air heated by passing through the condenser 52; and an evaporator 53 for performing heat exchange between the air flowing into the heating device 50 and low-temperature refrigerant to cool and dehumidify the air. The condenser 52 and the evaporator 53 may be referred to as a "heat exchange unit."

The air heated by passing through the condenser 52 (hereinafter referred to as "hot air") may be blown by the fan 60, and may be supplied to at least one of the dryers 1, the washing machine 2, or the refresher 3.

The heating device 40 may be connected to the first drum 13 by a first supply air duct 43. The hot air generated by the heating device 50 may be blown by the fan 60 to be supplied into the first drum 13 through the first supply air duct 43. The first supply air duct 43 may extend upwardly from the heating device 50.

The heating device 50 may be connected to the tub 23 through a third supply air duct 48. The hot air generated by the heating device 50 may be blown by the fan 60 to be supplied into the tub 23 through the third supply air duct 48. The third supply air duct 48 may extend downwardly from the heating device 50.

The hot air generated by the heating device 50 may be blown by the fan 60 to be supplied to the outside of the laundry treating apparatus A through a dehumidification duct 46. The dehumidification duct 46 may be disposed between a base plate 575 to be described below and the second upper panel 203. The air blown by the fan 60 may be supplied into an indoor space through the dehumidification duct 46. An opening member 463 may be disposed in front of the dehumidification duct 46. The opening member 463 may open and close the front side of the dehumidification duct 46. The opening member 463 may be rotatably coupled to the first cabinet 10 or the second cabinet 20.

The supply air ducts 43, 45, and 48 may be referred to as any one of first to third supply air ducts. For example, the supply air duct connected to the dryer 1 may be referred to as a first supply air duct 43; the supply air duct connected to the refresher 3 may be referred to as a second supply air duct 45, and the supply air duct connected to the washing machine 2 may be referred to as a third supply air duct 48. The supply air ducts 43, 45, and 48 may be referred to as "supply pipes." The respective first, second, and third supply air ducts 43, 45, and 48 may be referred to as any one of the "first to third supply pipes." For example, the first supply air duct 43 may be referred to as a first supply pipe; the second supply air duct 45 may be referred to as a second supply pipe; and the third supply air duct 48 may be referred to as a third supply pipe.

The air supplied to the dryer 1, the washing machine 2, or the refresher 3 may be recovered to the heating device 50.

The heating device 50 may be connected to the first drum 13 by a first exhaust air duct 41. The hot air flowing into the first drum 13 through the first supply air duct 43 may dry the laundry placed in the first drum 13, and then may return to the heating device 50 through the first exhaust air duct 41. The first exhaust air duct 41 may extend downwardly from the first drum 13.

The heating device 50 may be connected to the tub 23 by a third exhaust air duct 47. The hot air flowing into the tub 23 through the third supply air duct 48 may dry the laundry placed in the second drum 24, and then may return to the heating device 50 through the third exhaust air duct 41. The third exhaust air duct 47 may extend upwardly from the tub 23 and may have a hole 47s.

The exhaust air ducts 41, 44, and 47 may be referred to as any one of first to third exhaust air ducts. For example, the exhaust air duct connected to the dryer 1 may be referred to as a first exhaust air duct 41; the exhaust air duct connected to the refresher 3 may be referred to as a second exhaust air duct 44; and the exhaust air duct connected to the washing machine 2 may be referred to as a third exhaust air duct 47. The respective first, second, and third exhaust air ducts 41, 44, and 47 may be referred to as any one of "first to third return lines." For example, the first exhaust air duct 41 may be referred to as a first return line, the second exhaust air duct 47 may be referred to as a second return line, and a second exhaust air duct 44 may be referred to as a third return line.

The hot air generated by the heating device 50 may be supplied to the dryer 1, the washing machine 2, and the refresher 3, to dry the laundry placed in the respective laundry treating machines 1, 2, and 3, and then may return to the heating device 50. That is, the hot air generated by the heating device 50 may circulate within the laundry treating apparatus A. The hot air, recovered to the heating device 50 after drying the laundry received in each of the plurality of laundry treating machines 1, 2, and 3, may contain a greater amount of moisture than the air drying the laundry placed in one laundry treating machine.

By performing heat exchange between the air returning to the heating device 50 and a refrigerant, the evaporator 53 may reduce the temperature of the returning air and removes moisture contained in the air. The air returning to the heating device 50 may be heat exchanged with the evaporator 53 to generate condensate.

The heating device 50 may include a drain pan 531 disposed on a lower side of the evaporator 53. The drain pan 532 may receive the condensate generated in the evaporator 53.

The drain pan 531 may be connected to the drain pump 26 by the drain pipe 532. The drain pipe 532 may extend downwardly from the drain pan 531 to be connected to the drain pump 26.

The water collected in the drain pan 531 may flow to the drain pump 26 through the drain pipe 532, and may be discharged to the outside of the laundry treating apparatus A by the drain pump 26.

The dryer 1 may have a first rear surface 10b. The first rear surface 10b may refer to a rear surface of the first cabinet 10.

The washing machine 2 may have a second rear surface 20b. The second rear surface 20b may refer to a rear surface of the second cabinet 20.

The tower 9 may have widths W1 and W2 in a front-rear direction. A width from the front surfaces 11a and 21a of the doors 11 and 21 to the rear surfaces 10b and 20b may be defined as a first width W1. A width from the front surfaces 10a and 20a of the cabinets 10 and 20 to the rear surfaces 10b and 20b may be defined as a second width W2.

Each of the dryer 1 and the washing machine 2 may have the first width W1 and the second width W2. The dryer 1 and the washing machine 2 may have the same width in the front-rear direction.

The tower 9 may have a height 9H in an up-down direction. The height 9H of the tower 9 may be defined as a sum of the height of the dryer 1 and the height of the washing machine 2. However, in the case where the heating device 50 is disposed outside of the dryer 1 and the washing machine 2, the height 9H of the tower 9 may be defined as a sum of the height of the dryer 1, the height of the washing machine 2, and the height of the heating device 50.

Hereinafter, an internal structure of the refresher 3 will be described with reference to FIG. 3. FIG. 3 is a diagram illustrating an internal structure of the refresher 3 of the laundry treating apparatus A which is cut in a longitudinal direction.

The refresher 3 may include the third cabinet 30 forming a space in which the laundry is received.

The refresher 3 may include a hanger 36, on which clothes are hung, and an inner panel 34 defining a lower portion of an inner space 33 in which clothes are received. The inner panel 34 may be referred to as an "inner plate."

The inner plate 34 may be disposed below the tub 23. The inner plate 34 may be disposed below the second drum 24. However, in the case where the dryer 1 is disposed under the washing machine 2, the inner plate 34 may be disposed below the first drum 13. Accordingly, as the height of the position of the inner plate 34 is reduced, a volume of the inner space of the refresher 3 may increase.

The hanger 36 may be disposed between the third upper panel 303 and the third lower panel 304, and may be disposed closer to the third upper panel 303 than the third lower panel 304.

The hanger 36 may be disposed above the first drum 13. The hanger 36 may be disposed at a height corresponding to an upper portion of the first drum 13. However, in the case where the dryer 1 is disposed under the washing machine 2, the hanger 36 may be disposed above the tub 23 or may be disposed on an upper side of the second drum 24, and may be disposed at a height corresponding to the tub 23 or the upper portion of the second drum 24. Accordingly, as the height of the position of the hanger 36 increases, a volume of the inner space of the refresher 3 may increase.

The inner panel 34 may be disposed between the third upper panel 303 and the third lower panel 304, and may be disposed closer to the third lower panel 304 than the third upper panel 303.

Garments G received in the inner space 33 of the third cabinet 30 may be located between the hanger 36 and the inner panel 34.

The height H of the inner space 33 may refer to a height between the hanger 36 and the inner panel 34. The height H of the inner space 33 may refer to a vertical gap between the upper panel 303 and the inner panel 34. The height H of the inner space 33 may be extended compared to a case where the heating device 50 is disposed between the inner panel 34 and the third lower panel 304. Accordingly, unlike an existing refresher, the refresher 3 according to the present disclosure may receive garments G, such as a long coat or a suit, which occupy a great height in the vertical direction.

In addition, compared to the existing refresher, the refresher 3 according to the present disclosure may have a longitudinal width which may be extended according to the longitudinal width of the dryer 1 and the washing machine 2. Accordingly, the refresher 3 according to the present disclosure may receive a larger number of garments in the front-rear direction than the existing refresher. The longitudinal width W3 of the inner space 33 of the refresher 3 may refer to a width between the third door 31 and the third panel 302.

The refresher 3 may have a third rear surface 30b. The third rear surface 30b may refer to a rear surface of the third cabinet 30.

The refresher 3 may have longitudinal widths W3, W4, and W5. A width from an inner surface of the third door 31 to an inner surface of the third rear panel 302 may be defined as a third width W3. The third width W3 may be the longitudinal width of the inner space 33 of the refresher 3. A width from the front surface 31a of the third door 31 to the rear surface 30b of the third cabinet 30 may be defined as a fourth width W4. A width from the front surface 31a of the third door 31 to a rear surface 44b of the second exhaust air duct 44 may be defined as a fifth width W5. However, the first to fifth widths W1, W2, W3, W4, and W5 are randomly defined for convenience of explanation, and the respective widths W1, W2, W3, W4, and W5 defined above may be referred to as any one of the first to fifth widths.

The longitudinal width W3 of the inner space 33 of the refresher 3 may be smaller than the longitudinal widths W1 and W2 of the dryer 1 and the washing machine 2. The longitudinal width W4 of the third cabinet 30 may be smaller than the longitudinal widths W1 and W2 of the dryer 1 and the washing machine 2.

The width W5, which is a sum of the longitudinal widths of the refresher 3 and the duct 44 may be equal to the longitudinal widths W1 and W2 of the dryer 1 and the washing machine 2. However, it is also possible that the width W5, which is the sum of the longitudinal widths of the refresher 3 and the duct 44, may be equal to or smaller than the longitudinal widths W1 and W2 of the dryer 1 and the washing machine 2.

In the laundry treating apparatus A according to an aspect of the present disclosure, the supply air duct 45 and the exhaust air duct 44 are disposed behind the space 33 in which the laundry is placed, such that the front surface 31a of the refresher 3 and the front surface of the dryer 1 and the washing machine 2 may be aligned.

The refresher 3 may have a vertical height 3H. The height H3 of the refresher 3 may be defined as a length from the third upper surface 30c of the refresher 3 to the lower surface thereof.

The vertical height 3H of the refresher 3 may be equal to the vertical height H9 of the tower 9. However, it is also possible that the vertical height 3H of the refresher 3 may be equal to or lower than the vertical height H9 of the tower 9.

A storage space 35 may be formed between the inner panel 34 and the third lower panel 304. Garments, such as socks, underwear, hats, scarves, gloves, etc., which take up a relatively small volume, may be placed in the storage space 35. However, the storage space 35 may refer to a space in which the supply air duct 45 and the exhaust air duct 44 are disposed.

The inner panel 34 may be connected to the second supply air duct 45. The third cabinet 30 may be connected to the second exhaust air duct 44.

The inner panel 34 may include a first inner panel 341 spaced apart from an upper side of the third lower panel 304, and a second inner panel 342 extending diagonally upward from the first inner panel 341. The second inner panel 342 may extend at an incline upwardly from the first inner panel 341 toward the third rear panel 302.

The second supply air duct 45 may be connected to the second inner panel 342. The second inner panel 342 may have a supply air hole 308 that is open toward the inner space 33. The second supply air duct 45 may be connected to the supply air hole 308. The hot air supplied from the heating device 50 may be discharged to the inner space 33 through the supply air hole 308.

The second supply air duct 45 may include a first hot air duct 451 disposed at a rear side of the third rear panel 302, and a second hot air duct 452 disposed in front of the third rear panel 302.

The first hot air duct 451 may be disposed in the rear case 310. A second hot air duct 452 may be disposed in the storage space 35. The first hot air duct 451 and the second hot air duct 452 may be coupled to the third rear panel 302. The first hot air duct 451 may extend upwardly in the rear case 310 to be connected to the heating device 50. The second hot air duct 452 may extend upwardly to be connected to the second inner panel 342.

The second exhaust air duct 44 may be connected to the third rear panel 302. The third rear panel 302 may have an exhaust air hole 309 that is open toward the inner space 33. The second exhaust air duct 44 may be coupled to the third rear panel 302 so as to correspond to the exhaust air hole 309. The hot air discharged to the inner space 33 of the refresher 3 may dry the garments G, and then may flow into the second exhaust air duct 44 through the exhaust air hole 309.

The supply air hole 308 may be disposed at a lower portion of the refresher 3, and the exhaust air hole 309 may be disposed at an upper portion of the refresher 3. However, the positions of the supply air hole 308 and the exhaust air hole 309 are not limited to the above example. For example, the supply air hole 308 may be disposed at the upper portion of the refresher 3, and the exhaust air hole 309 may be disposed at the lower portion of the refresher 3. In this case, the supply air hole 308 may be disposed above the hanger 36. As the supply air hole 308 is disposed above the hanger 36, dust deposited on the garments G may be removed. Further, any one of the supply air hole 308 or the exhaust air hole 309 is disposed at the upper side, and the other one is disposed at the lower side, air supplied through the supply air hole 308 may be distributed evenly throughout the inner space 33, and then may return to the heating device 50 through the exhaust air hole 309.

The second exhaust air duct 44 may pass through the third rear panel 302 to extend into the rear case 310. After passing through the third rear panel 302, the second exhaust air duct 44 may extend downwardly in the rear case 310 to be connected to the heating device 50.

The refresher 3 may include rollers 39 protruding downwardly from the third lower panel 304. A plurality of rollers 39 may be disposed which are spaced apart from each other in the front-rear direction. A roller structure of the refresher 3 may also be applied to the second lower panel 204 of the washing machine 2. The rollers of the washing machine 2 and the refresher 3 may serve to support the weight of the laundry treating apparatus A when the laundry treating apparatus A is moved.

Hereinafter, a duct system of the laundry treating apparatus A according to the present disclosure will be described with reference to FIG. 4. In FIG. 4, a left side of a reference line Y shows a duct system of the dryer 1 and the washing machine 2, and a right side of the reference line Y shows a duct system of the refresher 3. The left side of the reference line Y in FIG. 4 is view conceptually illustrating a duct system of the dryer 1 and the washing machine 2 which are cut by a plane perpendicular to a left and right direction; and the right side of the reference line Y in FIG. 4 is a view conceptually illustrating a rear surface of the refresher 3 to show a duct system. The directions used in the description of FIG. 4 may be the same as those illustrated in FIG. 1.

The left side of the reference line Y in FIG. 4 may be referred to as a first conceptual diagram S1. The right side of the reference line Y in FIG. 4 may be referred to as a second conceptual diagram S2.

The "duct system" may be a concept that collectively refers to passages of hot air circulating in the laundry treating apparatus A. The "duct system" may be a concept that collectively refers to passages connecting the heating device 50, the dryer 1, the washing machine 2, and the refresher 3. The "duct system" may be a concept that collectively refers to passages of hot air heated by the heating device 50.

The heating device 50 heats air and supplies the heated air to each of the dryer 1, the washing machine 2, and the refresher 3.

The duct system may include the heat exchange channel 42 in which the air is heated. The duct system may include the first supply air duct 43 connecting the heating device 50 and the dryer 1. The duct system may include the second supply air duct 45 connecting the heating device 50 and the refresher 3. The duct system may include the third supply air duct 48 connecting the heating device 50 and the washing machine 2. The duct system may include the dehumidification duct 46 connected to the heating device 50. The air heated by passing through the heat exchange channel 42 is blown by the fan 60 to be supplied to at least any one of the first supply air duct 43, the second supply air duct 45, the third supply air duct 48, and the dehumidification duct 46.

The duct system may include the first exhaust air duct 41 connecting the heating device 50 and the dryer 1. The duct system may include the second exhaust air duct 44 connecting the heating device 50 and the refresher 3. The duct system may include the third exhaust air duct 47 connecting the heating device 50 and the washing machine 2. The heated air supplied to the dryer 1 may flow into the heat exchange channel 42 through the first exhaust air duct 41. The heated air supplied to the refresher 3 may flow into the heat exchange channel 42 through the second exhaust air duct 44. The heated air supplied to the washing machine 2 may flow into the heat exchange channel 42 through the third exhaust air duct 47.

The heat exchange channel 42, through the air flows, may be provided in the heating device 50. The heating device 50 may include a heat exchange unit disposed in the heat exchange channel 42. The heat exchange unit may heat the air flowing in the heat exchange channel 42. The heat exchange unit may include the condenser 52 and the evaporator 53.

The laundry treating apparatus A may include the fan 60. The fan 60 may blow the air in the heat exchange channel 42. The fan 60 may be disposed on a downstream side of the condenser 52. The air heated by heat exchange with the evaporator 53 and the condenser 52 may be blown by the fan 60. The fan 60 may be disposed in the heat exchange channel 42.

The air blown by the fan 60 may be supplied to at least any one of the dryer 1, the washing machine 2, the refresher 3, and the dehumidification duct 46.

The laundry treating apparatus A may include a blowing duct 420 surrounding the fan 60. The duct system may include the blowing duct 420. The fan 60 may be disposed in the blowing duct 420.

An inner space of the blowing duct 420 may be a portion of the heat exchange channel 42.

The fan 60 and the blowing duct 420 may be disposed at a discharge end 42B of the heat exchange channel 42. The discharge end 42B may be disposed at a downstream side of the condenser 52 and the evaporator 53.

The blowing duct 420 may include a first discharge port 425 connected to the first supply air duct 43. The blowing duct 420 may include a second discharge port 427 connected to the second supply air duct 45. The blowing duct 420 may include a third discharge port 426 connected to the third supply air duct 48. The blowing duct 420 may include a fourth discharge port 428 connected to the dehumidification duct 46.

The first discharge port 425 may protrude upwardly from the blowing duct 420. The first supply air duct 43 may connect the first drum 13 and the first discharge port 425.

The second discharge port 427 may protrude from the blowing duct 420 to a lateral side. The second supply air duct 45 may connect the third cabinet 30 and the second discharge port 427.

The third discharge port 426 may protrude downwardly from the blowing duct 420. The third supply air duct 48 may connect the tub 23 and the third discharge port 426.

The fourth discharge port 428 may protrude from the blowing duct 420 to the lateral side. The fourth discharge port 428 may protrude in a direction opposite to the second discharge port 427. The dehumidification duct 46 may be connected to the fourth discharge port 428.

A rotating body 71 of a switching device 70 (see FIG. 6) which will be described later may be disposed in the blowing duct 420. The rotating body 71 may be connected to a driving motor 711 to be rotated in the blowing duct 420. The air blown by the fan 60 may flow into at least any one of the first supply air duct 43, the second supply air duct 45, the third supply air duct 48, and the dehumidification duct 46 by the operation of the switching device 70.

The laundry treating apparatus A according to the present disclosure may also include a separate distribution device in addition to the switching device 70 which will be described later. The distribution device may distribute the air blown by the fan 60 to each of the dryer 1, the washing machine 2, the refresher 3, and the dehumidification duct 46. That is, the air blown by the fan 60 may be supplied at the same time to each of the dryer 1, the washing machine 2, the refresher 3, and the dehumidification duct 46. The distribution device may be disposed in the blowing duct 420 or may be disposed on a distribution passage connected to the blowing duct 420. The distribution device may be a valve. The distribution device may include an actuator and a switching damper. The laundry treating apparatus A may include both the switching device 70 and the distribution device at the same time, may include only the switching device 70, or may include only the distribution device.

The hot air flowing into the first drum 13 through the first supply air duct 43 may dry the laundry placed in the first drum 13, and then may flow into the heat exchange channel 42 through the first exhaust air duct 41. The first drum 13 may include a front cover 131 disposed on a front side, and a rear cover 132 disposed on a rear side. The first supply air duct 43 may be connected to the rear cover 132, and the first exhaust air duct 41 may be connected to the front cover 131.

The first exhaust air duct 41 may connect the first drum 13 and the heat exchange channel 42. The first exhaust air duct 41 may extend downwardly from the first drum 13 to be connected to the heat exchange channel 42.

An inlet end 42A of the heat exchange channel 42 may have a first inlet port 421 connected to the first exhaust air duct 41. The first inlet port 421 may extend upwardly from the heat exchange channel 42. The first inlet port 421 may extend upwardly from the case 570 of the heating device 50.

The laundry treating apparatus A may include a first opening and closing valve 41a disposed in the first exhaust air duct 41. The first opening and closing valve 41a may control a flow rate of air in the first exhaust air duct 41. The first opening and closing valve 41a may block an air flow in the first exhaust air duct 41. The first opening and closing valve 41a may block the air flow in the first exhaust air duct 41 when the hot air is not supplied into the first drum 13 through the first exhaust air duct 41.

The hot air flowing into third cabinet 30 through the second supply air duct 45 may dry the laundry placed in the third cabinet 30, and then may flow into the heat exchange channel 42 through the second exhaust air duct 44. The second supply air duct 45 and the second exhaust air duct 44 may be connected to the third rear panel 302 of the third cabinet 30.

The second exhaust air duct 44 may connect the third cabinet 30 and the heat exchange channel 42. The second exhaust air duct 44 may extend downwardly from an upper portion of the third cabinet 30 to be connected to the heat exchange channel 42.

The second exhaust air duct 44 may include a first duct section 441 disposed between the heating device 50 and the second cabinet 20. A first duct section 441 may be disposed between a base plate 575 (see FIG. 6) to be described later and the second upper panel 203 of the second cabinet 20. The first duct section 441 may extend forwardly and rearwardly in a separation space 55 (see FIG. 6) which will be described later.

The inlet end 42A of the heat exchange channel 42 may have a second inlet port 422 connected to the second exhaust air duct 44. The second inlet port 422 may extend downwardly from the heat exchange channel 42. The second inlet port 422 may extend downwardly from the case 570 of the heating device 50.

The laundry treating apparatus A may include a second opening and closing valve 44a disposed in the second exhaust air duct 44. The second opening and closing valve 44a may control a flow rate of air in the second exhaust air duct 44. The second opening and closing valve 44a may block an air flow in the second exhaust air duct 44. The second opening and closing valve 44a may block the air flow in the second exhaust air duct 44 when the hot air is not supplied into the third cabinet 30 through the second exhaust air duct 45. The second opening and closing valve 44a may be disposed in the first duct section 441.

The hot air flowing into the tub 23 through the third supply air duct 48 may dry the laundry placed in the tub 23, and then may flow into the heat exchange channel 42 through the third exhaust air duct 47.

The third exhaust air duct 47 may connect the tub 23 and the heat exchange channel 42. The third exhaust air duct 47 may extend upwardly from an upper portion of the tub 23 to be connected to the heat exchange channel 42.

A third inlet port 424 connected to the third exhaust air duct 47 may be formed at the inlet end 42A of the heat exchange channel 42. The third inlet port 424 may extend downwardly from the heat exchange channel 42. The third inlet port 424 may extend downwardly from the second exhaust air duct 44. The third inlet port 424 may extend downwardly from the first duct section 441.

The third inlet port 424 may protrude downwardly from a lower surface of the second exhaust air duct 44. The third exhaust air duct 47 may connect the tub 23 and the third inlet port 424. The air in the third exhaust air duct 47 may join the air in the second exhaust air duct 44 to flow into the heat exchange channel 42.

The laundry treating apparatus A may include a third opening and closing valve 47a disposed in the third exhaust air duct 47. The third opening and closing valve 47a may control a flow rate of air in the third exhaust air duct 47. The third opening and closing valve 47a may block an air flow in the third exhaust air duct 47. The third opening and closing valve 47a may block the air flow in the third exhaust air duct 47 when the hot air is not supplied into the tub 23 through the third supply air duct 48.

The hot air flowing through the dehumidification duct 46 may be supplied to the outside of the laundry treating apparatus A through an outlet 462 that is opened forward. The hot air flowing through the dehumidification duct 46 may be supplied to an indoor space through the outlet 462.

The dehumidification duct may include a second duct section 461 disposed between the heating device 50 and the second cabinet 20. The second duct section 461 may be disposed between the base plate 575 (see FIG. 6) to be described later and the second upper panel 203 of the second cabinet 20. The second duct section 461 may extend forwardly and rearwardly in the separation space 55 (see FIG. 6) which will be described later.

An outside air inlet port 423 connected to the heat exchange channel 42 may be formed at the inlet end 42A of the heat exchange channel 42. The outside air inlet port 423 may extend forwardly from the heat exchange channel 42. The outside air inlet port 423 may extend forwardly from the second exhaust air duct 44.

The outside air inlet port 423 may protrude forwardly from one side of the second exhaust air duct 44. The outside air inlet port 423 may allow the indoor space and the second exhaust air duct 44 to communicate with each other. The air in the outside air inlet port 423 may join the air in the second exhaust air duct 44 to flow into the heat exchange channel 42. The outside air inlet port 423 may have an outside air inlet 49 that is opened forward. The air drawn in through the outside air inlet 49 may join the air in the second exhaust air duct 44 to flow into the heat exchange channel 42.

The laundry treating apparatus A may include a fourth opening and closing valve 49a disposed at the outside air inlet port 423. The fourth opening and closing valve 49a may control a flow rate of air in the outside air inlet port 423. The fourth opening and closing valve 49a may block an air flow in the outside air inlet port 423. The fourth opening and closing valve 49a may block the air flow in the outside air inlet port 423 when the hot air is not supplied to the dehumidification duct 46.

Hereinafter, the heating device 50 will be described with reference to FIGS. 5 to 7. The description of the heating device 50, which will be described below with reference to FIGS. 5 to 7, may be applied commonly to all embodiments of the laundry treating apparatus described with reference to FIGS. 1 to 55. Even in this case, however, depending on relative arrangement positions of the laundry treating machines included in the laundry treating apparatus, a shape of the case 570, a shape of the blowing duct 420, a placement of a drum motor 133, an opening direction of the discharge ports 425, 426, 427, and 428, an opening direction of the inlet ports 421, 422, 423, and 424, and the like may vary.

Referring to FIG. 5, the heating device 50 may include the case 570, the compressor 51, the condenser 52, the evaporator 53, and the expansion device 54.

The compressor 51, the condenser 52, the evaporator 53, and the expansion device 54 may be connected by a refrigerant passage. The heat pump device may include the compressor 51, the condenser 52, the evaporator 53, and the expansion device 54.

The drain pan 531 may be disposed under the evaporator 53.

The case 570 may provide a space in which the compressor 51, the condenser 52, the fan 60, and the evaporator 53 are disposed. The compressor 51, the condenser 52, the fan 60, the evaporator 53, and the switching device 70 may be disposed in the case 570.

The case 570 may include a cover 573, a base plate 575 spaced apart from a lower side of the cover 573, a front wall 574 disposed in front of the condenser 53, a first side wall 571 disposed on one side of the condenser 53, and a second side wall 572 disposed on the other side of the condenser 53.

The drum motor 133 rotating the first drum 13 of the dryer 1 may be disposed in the case 570 of the heating device 50. The drum motor 133 may be disposed on an upper side of the case 570. A motor mounting portion 133s, on which the drum motor 133 is mounted, is provided in the case 570.

The condenser 52, the fan 60, and the evaporator 53 may be disposed on an upper side of the base plate 575.

The heat exchange channel 42 may be a space surrounded by the base plate 575, the front wall 574, the first side wall 571, and the second side wall 572. The cover 573 may not be provided, in which case an upper portion of the heat exchange channel 42 may be open. The heat exchange channel 42 may communicate with the fan 60 disposed at a rear side of the heating device 50. Air in the heat exchange channel 42 may be blown by the fan 60. The heat exchange channel 42 may be referred to as a "heating passage." The condenser 52 and the evaporator 53 may be disposed in the heat exchange channel 42. The heat exchange channel 42 may refer to a partially open space.

The heat exchange channel 42 may be a space surrounded by the cover 573, the base plate 575, the front wall 574, the first side wall 571, and the second side wall 572. The cover 573 may cover the upper portion of the heat exchange channel 42. The heat exchange channel 42 may refer to a space between the cover 573 and the base plate 575. The cover 573, the base plate 575, the front wall 574, the first side wall 571, and the second side wall 572 may form a "heating duct" surrounding the heat exchange channel 42. The heating duct may communicate with the fan 60, and air in the heating duct may be blown by the fan 60. The condenser 52 and the evaporator 53 may be disposed in the heating duct. The heat exchange channel 42 may refer to a duct shielded in all directions.

The heat exchange channel 42 may be formed in the heating device 50. The heat exchange channel 42 may be a portion of the inner space of the heating device 50.

The first inlet port 421 may be disposed in front of the heat exchange channel 42. The first inlet port 421 may cover the front side of the heat exchange channel 42. The first inlet port 421 may be connected to the front wall 574. The first inlet port 421 may be formed in the case 570. The first exhaust air duct 41 may be inserted into the first inlet port 421 and may be fixed thereto.

The heating device 50 may be disposed in the machine room S. The controller 81 may control the operation of components disposed in the machine room S. The machine room S may have a space in which the PCB is disposed, and the controller 81 may be mounted in the PCB.

The heating device 50 may include a steam generator 502 for generating steam and a dehumidifier 504 for removing moisture from air flowing through the heat exchange channel 42.

The steam generator 502 may generate steam by heating water. The steam generator 502 may be disposed between the condenser 52 and the fan 60. The steam generated by the steam generator 502 may be pressurized by the fan 60 to be supplied to each of the dryer 1, the washing machine 2, and the refresher 3. The steam generated by the steam generator 502 may be supplied to each of the first drum 13, the second drum 24, and the inner space 33 of the refresher 3.

The dehumidifier 504 may dehumidify air under room temperature conditions (about 25 degrees Celsius). The dehumidifier 504 may dehumidify air by using desiccant cooling. The dehumidifier 504 may be filled with zeolite. The zeolite filled in the dehumidifier 504 may be replaced periodically.

The dehumidifier 504 may be disposed between the condenser 52 and the fan 60. The dehumidifier 504 may dehumidify the air flowing through the heat exchange channel 42 even when the compressor 51 is not in operation.

The switching device 70 may control the direction of air blown by the fan 60. The switching device 70 may be disposed in the machine room S.

Referring to FIG. 6, the switching device 70 may control the supply of hot air to the dryer 1, the washing machine 21, the refresher 3, or the dehumidification duct 46.

The switching device 70 may include the rotating body 71 rotatably mounted in the blowing duct 70. The switching device 70 may include the driving motor 711 that rotates the rotating body 71. The rotating body 71 may be rotated by the driving motor 711 in the blowing duct 420. The fan 60 may be disposed in the rotating body 71.

The driving motor 711 may rotate the rotating body 71. A driving gear 712 may be fixed to the rotating shaft of the driving motor 711. The driving gear 712 may be a pinion gear or a spur gear.

A driven gear 713 may be rotated in engagement with the driving gear 712. The driven gear 713 may be fixed to the rotating body 71 or may be integrally formed with the rotating body 71. The driven gear 713 may be a ring gear. The driven gear 713 may be a ring-shaped rack.

The driving gear 712 and the driven gear 713 may be geared with each other. By the rotation of the driving gear 712, the driven gear 713 may be moved in a circumferential direction with respect to the rotational axis of the fan 60. When the driven gear 713 is moved in a circumferential direction, the rotating body 71 having the driven gear 713 fixed thereto may also be moved in the circumferential direction with respect to the rotational axis of the fan 60.

The driving motor 712 may be disposed outside of the blowing duct 420. One surface (e.g., rear surface) of the blowing duct 420 that faces the rotating body 71 may have a cut-out portion 714. The cut-out portion 714 may be formed at a position corresponding to the driven gear 713. A portion of the driving gear 712 may be inserted into the cut-out portion 714. The driving gear 712 and the driven gear 713 may be geared with each other in the cut-out portion 714.

A rotating shaft of the driving motor 711 may be disposed side by side with the rear surface of the blowing duct 420. Accordingly, a volume occupied by the driving motor 711 and the driving gear 712 in the front-rear direction may be reduced.

The driving motor 711 may be a motor capable of controlling the position, angle, and direction of rotation. For example, the driving motor may be a Brushless Direct Current (BLDC) motor. Alternatively, the driving motor 711 may be a step motor. The driving motor 711 may be electrically connected to the control panel 8 and/or the controller 81. Rotation of the driving motor 711 may be controlled by an electrical signal transmitted from the control panel 8 and/or the controller 81 to the driving motor 711. The control panel 8 and/or the controller 81 may control a hot air supplying direction by controlling the rotation angle of the driving motor 711.

Meanwhile, the driving motor 711 may rotate the rotating body 71 by various known methods used by the motor for rotating the rotating body. For example, the driving motor 711 may rotate the rotating body 71 by using a belt-pulley method, or by using a plurality of gears that are geared with each other, or the rotating shaft of the motor may be rotated together with the rotating body.

The blowing duct 420 may be connected to the first supply air duct 43, the second supply air duct 45, the third supply air duct 48, and the dehumidification duct 46.

The blowing duct 420 may be connected to a motor mount 564, to which a fan motor rotating the fan 60 is fixed. A motor mount 64 may be disposed on a rear surface of the blowing duct 420. The driving motor 711, the driving gear 712, and the driven gear 713 may be disposed radially outwardly from the motor mount 64.

The blowing duct 420 may include the first discharge port 425, the second discharge port 427, the third discharge port 426, and the fourth discharge port 428.

The first supply air duct 43 may be connected to the first discharge port 425. The first supply air duct 43 may be inserted into the first discharge port 425. The first discharge port 425 may be disposed facing upward in the blowing duct 420. The first discharge port 425 may provide a supply air hole that is vertically open.

The second supply air duct 45 may be connected to the second discharge port 427. The second supply air duct 45 may be inserted into the second discharge port 427. The second discharge port 427 may be disposed facing toward the lateral side in the blowing duct 420. The second discharge port 427 may provide a supply air hole that is horizontally open.

The third supply air duct 48 may be connected to the third discharge port 426. The third supply air duct 48 may be inserted into the third discharge port 426. The third discharge port 426 may be disposed facing downwardly in the blowing duct 420. The third discharge port 426 may provide a supply air hole that is vertically open.

The dehumidification duct 46 may be connected to the fourth discharge port 428. The dehumidification duct 46 may be inserted into the fourth discharge port 428. The fourth discharge port 428 may be disposed facing a direction opposite to the second discharge port 427. The fourth discharge port 428 may be disposed facing toward the lateral side in the blowing duct 420. The fourth discharge port 428 may provide a supply air hole that is horizontally open.

The heating device 50 may be connected to each of the first exhaust air duct 41, the second exhaust air duct 44, the third exhaust air duct 47, and the outside air inlet port 423. The third exhaust air duct 47 and the outside air inlet port 423 may be connected to the heating device 50 via the second exhaust air duct 44.

The heating device 50 may include the first inlet port 421 connected to the first exhaust air duct 41, and the second inlet port 422 connected to the second exhaust air duct 44. The first inlet port 421 may extend upwardly, and the second inlet port 422 may extend downwardly. The first inlet port 421 and the second inlet port 422 may protrude from the case 570 of the heating device 50.

Air drawn into the heating device 50 through the first exhaust air duct 41, the second exhaust air duct 44, the third exhaust air duct 47, and the outside air inlet port 423 may pass through the heat exchange channel 42 and flow into the fan 60 by the suction force of the fan 60.

Referring to FIG. 7, the air flowing through the first exhaust air duct 41, the second exhaust air duct 44, the third exhaust air duct 47, and the outside air inlet port 423 may meet in the heat exchange channel 42 to flow into the fan 60.

The third inlet port 424 connected to the third exhaust air duct 47 may protrude downwardly from the second exhaust air duct 44. The air in the third exhaust air duct 47 may join the air in the second exhaust air duct 44 to flow into the heat exchange channel 42.

The outside air inlet port 423 communicating with the indoor space may protrude forward from the second exhaust air duct 44. The air flowing into the outside air inlet port 423 through the outside air inlet 49 may join the air in the second exhaust air duct 44 to flow into the heat exchange channel 42.

The air flowing into the heat exchange channel 42 through the second exhaust air duct 44 may join the air flowing into the heat exchange channel 42 through the first exhaust air duct 41 to flow to the fan 60.

The heating device 50 may include a first support plate 576 extending downwardly from the base plate 575, and a second support plate 577 extending downwardly from the base plate 575 and spaced apart from the first support plate 576.

A separation space 55 may be formed between the first support plate 576 and the second support plate 577.

The second exhaust air duct 44, the third exhaust air duct 47, and the dehumidification duct 46 may be disposed in the separation space 55. The second exhaust air duct 44, the third exhaust air duct 47, and the dehumidification duct 46 may be formed between the first support plate 576 and the second support plate 577. The second exhaust air duct 44, the third exhaust air duct 47, and the dehumidification duct 46 may be disposed under the base plate 575.

The dehumidification duct 46 may be disposed under the base plate 575 and may extend forwardly to discharge the air forwardly through a hot air outlet 462. When an opening member 463 (see FIG. 10) which will be described later opens a front portion of the separation space 55, the air discharged through the hot air outlet 462 may be discharged forwardly from the laundry treating apparatus A.

A portion of the second exhaust air duct 44 disposed under the base plate 575 may be defined as the first duct section 441.

A portion of the dehumidification duct 46 disposed under the base plate 575 may be defined as the second duct section 461.

Hereinafter, a method of controlling a blowing direction of air by the switching device 70 will be described with reference to FIG. 8. In FIG. 8, (a) is a diagram illustrating an example of operation when air is supplied to the first supply air duct 43 by the operation of the switching device 70, and (b) is a diagram illustrating an example of operation when air is supplied to the first supply air duct 43 and the second supply air duct 45 at the same time by the operation of the switching device 70. The description of the switching device 70, which will be described with reference to FIG. 8, may be applied commonly to all embodiments of the laundry treating apparatus described with reference to FIGS. 1 to 55. Even in this case, however, an opening direction of the discharge ports 425, 426, 427, and 428, an arrangement and connection structure of the exhaust air ducts 41, 44, and 47, and the like may vary depending on the relative arrangement of the laundry treating machines included in the laundry treating apparatus.

The fan 60 may be a Sirocco fan. The fan 60 may rotate to blow air in a direction perpendicular to the rotating shaft 61. The fan 60 may blow air in a direction coming into contact with the rotation direction. The air blown by the fan 60 may be concentrated in a predetermined range of angles relative to the rotating shaft 61.

The fan 60 may include the rotating shaft 61 coupled to the fan motor and rotated thereby, a plurality of blades 62 spaced apart in a radially outward direction of the rotating shaft 61, and an outer body 63 coupled to the blades 62 and extending in a rotation direction of the fan 60. The outer body 63 may have an annular shape. The rotating shaft 61 and the blades 62 may be connected by the outer body 63. When the rotating shaft 61 rotates, the outer body 63 and the blades 62 may also be rotated together with the rotating shaft 61.

The rotating body 71 may include a rotating plate 71a having the driven gear 713, a scroll 71b coupled to the rotating plate 71a, and a shaft through hole 71c formed in the rotating plate 71a.

The rotating plate 71a may have a disk shape and may be disposed behind the fan 60. The driven gear 713 may be formed in an annular shape on one side surface of the rotating plate 71a. The driven gear 713 may be formed integrally with the rotating plate 71a. When the driven gear 713 is rotated in engagement with the driving gear 711, the rotating plate 71a may be rotated in the same direction as the rotation direction of the fan 60. The rotating plate 71a may have the shaft through hole 71c, through which the rotating shaft 61 passes. The rotating shaft 61 may pass through the shaft through hole 71c to be coupled to the fan motor.

The fan 60 may be disposed between the heat exchange channel 42 and the rotating plate 71a. That is, the rotating plate 71a may be disposed behind the heat exchange channel 42 and the fan 60. The rotating plate 71a may be disposed behind the fan 60 in the blowing duct 420.

The scroll 71b may be integrally formed with the rotating plate 71a When the rotating plate 71a is rotated, the scroll 71b may also be rotated together. The scroll 71b may extend in the rotation direction of the fan 60. The scroll 71b may be disposed to surround the fan 60. The fan 60 may be disposed in the scroll 71b.

The scroll 71b may include a blowing channel 72. The blowing channel 72 may be a cut-out portion of an outer circumferential surface of the scroll 71b. The scroll 71b may cover the outside of the fan 60, and the blowing channel 72 may be an outer region of the fan 60 which is not covered by the scroll 71b. The air blown by the fan 60 may be discharged to the outside of the blowing duct 420 through the blowing channel 72.

When the scroll 71b is rotated by the rotation of the rotating plate 71a, the blowing channel 72 may be changed in position. That is, by the rotation of the scroll 71b, the position of the blowing channel 72 may be changed relative to the rotating shaft 61. By rotating the scroll 71b to change the position of the blowing channel 72, the driving motor 711 may control the direction of air discharged from the blowing duct 420.

A longitudinal section of the blowing duct 420 may have a square shape. Accordingly, by the rotation of the scroll 71b, interference between the scroll 71 and the blowing duct may be avoided.

The blowing duct 420 may include a first wall 420a disposed on an upper side of the fan 60, a second wall 420b disposed on a lower side of the fan 60, a third wall 420c disposed on one side of the fan 60, and a fourth wall 420d disposed on the other side of the fan 60.

The first discharge port 425 may protrude upwardly from the first wall 420a. The second discharge port 427 may protrude toward the lateral side from the third wall 240c. The third discharge port 426 may protrude downwardly from the second wall 420b. The fourth discharge port 428 may protrude toward the lateral side from the fourth wall 420d.

Referring to (a) of FIG. 8, the driving motor 711 may rotate the rotating body 71 by a first angle, and when the rotating body 71 is rotated by the first angle, the air blown by the fan 60 may be supplied to the first supply air duct 43. In this case, the blowing channel 72 may communicate with only an inner space of the first discharge port 425. Accordingly, the air blown by the fan 60 may be supplied to only the dryer 1.

Referring to (b) of FIG. 8, the driving motor 711 may rotate the rotating body 71 by a second angle, and w % ben the rotating body 71 is rotated by the second angle, the air blown by the fan 60 may be supplied to the first supply air duct 43 and the second supply air duct 45 at the same time. In this case, the blowing channel 72 may communicate with an inner space of the first discharge port 425 and an inner space of the second discharge port 427. Accordingly, the air blown by the fan 60 may be supplied to the dryer 1 and the refresher 3 at the same time. The blowing channel 72 may include a first blowing channel 72a communicating with the inner space of the first discharge port 425, and a second blowing channel 72b communicating with the inner space of the second discharge port 427. The air blown by the fan 60 may be supplied to the dryer 1 through the first blowing channel 72a. The air blown by the fan 60 may be supplied to the refresher 3 through the second blowing channel 72b.

A use may control the switching device 70 by inputting a signal to the control panel 8. Once the signal is input to the control panel 8, the signal may be transmitted to the driving motor 711, to control a rotation angle of the driving motor 711. For example, when the user inputs, to the control panel 8, a signal for supplying hot air to the dryer 1, the driving motor 711 may rotate the rotating body 71 so that the blowing channel 72 may be moved to a position as illustrated in (a) of FIG. 8. For example, when the user inputs, to the control panel 8, a signal for supplying hot air to the dryer 1 and the refresher 3 at the same time, the driving motor 711 may rotate the rotating body 71 so that the blowing channel 72 may be moved to a position as illustrated in (b) of FIG. 8.

Hereinafter, a structure for supplying hot air and steam by the heating device 50 to each of laundry treating machines 1, 2, and 3 will be described with reference to FIG. 9.

The heating device 50 may be disposed on an upper side of the second upper panel 203. The heating device 50 may be disposed in the cabinet 10 of the dryer 1.

The switching device 70 may be disposed on the upper side of the second panel 203. The switching device 70 may be disposed in the cabinet 10 of the dryer 1.

The blowing duct 420 may be connected to the first supply air duct 43, the second supply air duct 45, and the third supply air duct 48.

The first supply air duct 43 may extend upwardly from the blowing duct 420. The first supply air duct 43 may be connected to the first drum 13.

The second supply air duct 45 may extend from the blowing duct 420 to a lateral side. The second supply air duct 45 may be connected to the refresher 3.

The third supply air duct 48 may extend downwardly from the blowing duct 420. The third supply air duct 48 may pass through the separation space 55 to extend into the second cabinet 20.

The laundry treating apparatus A may include a first steam supply pipe 502a connecting the steam generator 502 and the first drum 13, a second steam supply pipe 502b connecting the steam generator 502 and the refresher 3, and a third steam supply pipe 502c connecting the steam generator 502 and the tub 23.

The steam generator 502 may be disposed in the heating device 50. The steam generated by the steam generator 502 may be sprayed into the first drum 13 through the first steam supply pipe 502a. The steam generated by the steam generator 502 may be sprayed into the inner space 33 of the refresher 3 through the second steam supply pipe 502b. The steam generated by the steam generator 502 may be sprayed into the second drum 24 through the third steam supply pipe 502c.

The first steam supply pipe 502a may extend upwardly from the steam generator 502 to be connected to the first drum 13.

The second steam supply pipe 502b may extend from the steam generator 502 to the lateral side, to be connected to the refresher 3.

The third steam supply pipe 502c may extend downwardly from the steam generator 502 to be connected to the tub 23.

The steam generated by the steam generator 502 may flow to each of the first drum 13, the second drum 24, and the inner space 33 of the refresher 3 by the blowing force of the fan 60. That is, by pressurizing the steam generated by the steam generator 502, the fan 60 may cause the steam to flow to the first drum 13, the second drum 24, and the inner space 33 of the refresher 3.

A valve for controlling an amount of steam flow may be provided for each of the first steam supply pipe 502a, the second steam supply pipe 502b, and the third steam supply pipe 502c. By adjusting an opening degree of the valve, the controller 81 may adjust the amount of steam supplied to each of the first drum 13, the second drum 24, and the inner space 33 of the refresher 3.

The washing machine 2 may be connected to a cold water supply pipe 278 for supplying cold water to the tub 23, and a hot water supply pipe 279 for supplying hot water to the tub 23.

The steam generator 502 may be connected to a third water supply pipe 277 branching off from the cold water supply pipe 278 or the hot water supply pipe 279. The steam generator 502 may be connected to the third water supply pipe 277 branching off from the hot water supply pipe 279.

The steam generator 502 may be supplied with hot water through the third water supply pipe 277. The steam generator 502 may generate steam by heating the water supplied through the third water supply pipe 277.

Water supply ports 273 and 274 may be disposed closer to the second upper panel 203 than to the second lower panel 204. The steam generator 502 may be disposed between the second upper panel 203 and the first drum 13. Accordingly, as a distance between the steam generator 502 and the water supply pipes 278 and 279 becomes shorter, the third water supply pipe 277 may be reduced in length.

Hereinafter, a connection structure of the first cabinet 10 and the second cabinet 20 will be described with reference to FIG. 10.

The base plate 575 of the heating device 50 may be spaced from the upper side of the second upper panel 203 of the washing machine 2. The separation space 55 may be formed between the base plate 575 and the second upper panel 203.

The first side panels 105 and 106 of the dryer 1 may protrude downwardly below the base plate 575. The first side panels 105 and 106 may be referred to as the "first side walls."

The first side walls 105 and 106 may include a first outer wall 105 forming one side surface of the laundry treating apparatus A, and a first inner wall 106 facing the third cabinet 30.

The heating device 50 may include the first support plate 576 extending downwardly from the base plate 575. The first support plate 576 may be disposed inside the first outer wall 105.

The heating device 50 may include the second support plate 577 extending downwardly from the base plate 575. The second support plate 577 may be disposed inside the first inner wall 106.

The base plate 575 and the support plates 576 and 577 may be integrally formed with each other. The first outer wall 105 and the first support plate 576 may be integrally formed with each other. The first inner wall 106 and the second support plate 577 may be integrally formed with each other.

The first side walls 105 and 106 may include first protrusions 105a and 106a protruding downwardly. The first outer wall 105 may include a first outer protrusion 105a protruding downwardly. The first inner wall 106 may include a first inner protrusion 106a protruding downwardly. The first protrusions 105a and 106a may protrude downwardly from a lower end of the first side walls 105 and 106.

The second cabinet 20 may include first recesses 203a into which the first protrusions 105a and 106a are inserted. The first recesses 203a may be formed in the second upper panel 203. The first recesses 203a may be formed at positions vertically corresponding to the first protrusions 105a and 106a.

The support plates 576 and 577 may include second protrusions 576a and 577a protruding downwardly. The first support plate 576 may include a second outer protrusion 576a protruding downwardly. The second support plate 577 may include a second inner protrusion 577a protruding downwardly. The second protrusions 576a and 577a may protrude downwardly from a lower end of the support plates 576 and 577.

The second cabinet 20 may include second recesses 203b into which the second protrusions 576a and 577a are inserted. The second recesses 203b may be formed in the second upper panel 203. The second recesses 203b may be formed at positions vertically corresponding to the second protrusions 576a and 577a.

The first protrusions 105a and 106b and the second protrusions 576a and 577a may be referred to as "protrusions." The first recesses 203a and the second recesses 203b may be referred to as "recesses."

The first cabinet 10 and the second cabinet 20 may be coupled to each other as the protrusions 105a, 106b, 576a, and 577a are inserted into the recesses 203a and 203b.

The machine room S may be formed on the upper side of the base plate 575. Accordingly, the machine room S may be spaced from the upper side of the second upper panel 203.

The separation space 55 may be formed between the first support plate 576 and the second support plate 577.

The second exhaust air duct 44, the dehumidification duct 46, and the third exhaust air duct 47 may be disposed in the separation space 55. The second exhaust air duct 44, the dehumidification duct 46, and the third exhaust air duct 47 may be disposed between the second upper panel 203 and the base plate 575.

The third exhaust air duct 47 may protrude downwardly toward the second upper panel 203. The third exhaust air duct 47 may include a first connection duct 48a extending downwardly from the blowing duct 420, and a second connection duct 48b connected to the tub 23.

The first connection duct 48a may be disposed in the separation space 55.

The second connection duct 48b may extend downwardly from the second upper panel 203 to be connected to the tub 23. The second connection duct 48b may have a first insertion hole 48s, which is formed on the inside thereof, and into which the first connection duct 48a is inserted.

The first connection duct 48a is inserted into the first insertion hole 48s to be fixed to the second connection duct 48b.

The third inlet port 424 may be connected to the second exhaust air duct 44, and may be disposed in the separation space 55.

The third inlet port 424 may be inserted into a second insertion hole 47s, formed on the inside of the third exhaust air duct 47, to be fixed to the third exhaust air duct 47.

When the first cabinet 10 and the second cabinet 20 are assembled, the first connection duct 48a and the third inlet port 424 are inserted into the first insertion hole 48s and the second insertion hole 47s, respectively, to be fixed thereto, thereby facilitating the assembly and alignment of the first cabinet 10 and the second cabinet 20.

The laundry treating apparatus A may include an auxiliary panel 58 disposed behind the separation space 55.

The auxiliary panel 58 may shield a rear side of the separation space 55. The auxiliary panel 58 may be connected to the first rear panel 102 and the second rear panel 202. The first rear panel 102 and the second rear panel 202 may be connected to each other by the auxiliary panel 58.

The auxiliary panel 58 may include a duct through hole 59, through which the second exhaust air duct 44 passes. The second exhaust duct 44 may extend into the separation space 55 by passing through the auxiliary panel 58.

The auxiliary panel 58 may be coupled to the first side panels 105 and 106 and the support plates 576 and 577.

The opening member 463 may shield the front side of the separation space 55. The opening member 463 may be disposed in front of the dehumidification duct 46 and the outside air inlet port 423.

The laundry treating apparatus A may include a hinge 463a connected to the opening member 463, and a motor 463b rotating the hinge 463a.

The hinge 463a may be rotatably connected to the first front panel 101. The hinge 46a may extend in a left-right direction. The opening member 463 may be rotated in a front-rear direction with the hinge 463a serving as a rotational axis. The opening member 463 may be integrally formed with the hinge 463a. When the motor 463b rotates the hinge 463a, the opening member 463 may be rotated together with the hinge 463a. The opening member 463 may rotate forward to open the front side of the separation space 55. Once the opening member 463 opens the front side of the separation space 55, outside air of the laundry treating apparatus A may flow into the heat exchange channel 42 through the outside air inlet port 423, and the air passing through the dehumidification duct 46 may be discharged to the outside of the laundry treating apparatus A.

The controller 81 may be electrically connected to the motor 463b. The controller 81 may control the operation of the motor 463b. The user may open the separation space 55 by manipulating the control panel 8.

Hereinafter, a longitudinal width of the laundry treating apparatus A will be described with reference to FIG. 11. The description of the widths of the laundry 1, the washing machine 2, and the refresher 3, which will be described with reference to FIG. 11 may be applied commonly to all embodiments of the laundry treating apparatus described with reference to FIGS. 1 to 55.

The longitudinal width W4 of the refresher 3 may be smaller than the longitudinal width W1 of the tower 9. When the front surface 31a of the refresher 3 is aligned with the front surface of the tower 9, a gap X may be formed between the rear surface 30b of the refresher 3 and the rear surfaces 10b and 20b of the tower 9. The rear surface 30b of the refresher 3 may be disposed in front of the rear surfaces 10b and 20b of the tower 9, and may be disposed in front of the rear surfaces 10b and 20b of the tower 9 by the gap X.

A portion of the first inner wall 106 of the dryer 1 and a portion of the second inner wall 206 of the washing machine 2 may be disposed behind the rear surface 30b of the refresher 3. The portion of the first inner wall 106 and the portion of the second inner wall 296 may be exposed at the rear side of the third cabinet 30.

The laundry treating apparatus A may include the rear case 310 disposed at the rear side of the inner space 33 of the refresher 3. The rear case 310 may be disposed at the rear side of the third cabinet 30.

The rear case 310 may be connected to each of the dryer 1, the washing machine 2, and the refresher 3.

The rear case 310 may provide a space for accommodating the second supply air duct 45 and the second exhaust air duct 44. The second air duct 45 and the second exhaust air duct 44 may be accommodated in the rear case 310.

The second supply air duct 45 and the second exhaust air duct 44 for circulating hot air to the refresher 3 may be disposed at the rear side of the third cabinet 30.

The second supply air duct 45 and the second exhaust air duct 44 may be disposed behind the third rear panel 302.

The second supply air duct 45 may extend downwardly from the heating device 50 to be connected to the inner panel 34.

The second supply air duct 45 may fact the second inner wall 206 of the washing machine 2. The second supply air duct 45 may be disposed side by side with the second inner wall 206.

The second supply air duct 45 may include the first hot air duct 451 and the second hot air duct 452. The first hot air duct 451 may include a first connection part 451a connected to the heating device 50, a first extension part 451b extending downwardly from the first connection part 451a, and a second connection part 451c connected to the second hot air duct 452.

The first connection part 451a may pass through the first inner wall 106 of the first cabinet 10. The first connection part 451a may be connected to the blowing duct 420, and the air blown by the fan 60 may be introduced through the first connection part 451a. The first connection part 451a may extend horizontally from the heating device 50.

The first extension part 451b may be bent downwardly from the first connection part 451a. The first extension part 451b may extend downwardly from one end of the first connection part 451a. The first extension part 451b may face the second inner wall 206 of the washing machine 2, and may be disposed side by side with the second inner wall 206.

The second connection part 451c may be connected to the third rear panel 302 of the third cabinet 30. The second connection part 451c may be connected to the second hot air duct 452. That is, the third rear panel 302 may be disposed between the second hot air duct 452 and the second connection part 451c. The second connection part 451c may extend from the first extension part 451b in the front-rear direction.

Water supply ports 273 and 274 may be connected to the water supply pipes 278 and 279 which are connected to the external water source. The tub 23 may be supplied with water from the external water source through the water supply pipes 278 and 279.

The tub 23 may be supplied with cold water through the cold water supply pipe 278, and may be supplied with hot water through the hot water supply pipe 279.

The laundry treating apparatus A may include a cooling pipe 275 branching off from the cold water supply pipe 278 or the hot water supply pipe 279. The cooling pipe 275 may branch off from the cold water supply pipe 278.

The cooling pipe 275 may branch off from the cold water supply pipe 278 to be heat exchanged with the second supply air duct 45. The cooling pipe 275 may extend side by side with the second supply air duct 45 or may come into contact with the second supply air duct 45. Hot air flowing in the second supply air duct 45 may be heat exchanged with water flowing in the cooling pipe 275, such that temperature of the hot air may be reduced. The cooling pipe 275 may be disposed to be heat exchanged with the first extension part 451b or may come into contact with the first extension part 451b.

The cooling pipe 275 may be connected to the drain pump 26. Water branched off from the cold water supply pipe 278 and flowing into the cooling pipe 275 may be heat exchanged with the hot air flowing in the second supply air duct 45, and then may flow into the drain pump 26. The drain pump 26 may discharge the water, introduced through the cooling pipe 275, to the outside of the laundry treating apparatus A.

Clothes treated by the refresher 3 may be susceptible to damage when dried at a high temperature. It may be required to supply hot air at a relatively lower temperature to the clothes dried by the refresher 3 than the clothes treated by the dryer 1 and the washing machine 2. The hot air at a high temperature generated by the heating device 50 may be supplied immediately to the dryer 1 or the washing machine 2. By contrast, the high temperature hot air generated by the heating device 50 is required to be cooled before being supplied to the refresher 3. Accordingly, in the laundry treating apparatus A according to the present disclosure, hot air at a lower temperature than the hot air supplied to the dryer 1 and the washing machine 2 may be supplied to the refresher 3 by using the water supply pipes 275, 278, and 279, thereby preventing damage to the clothes placed in the refresher 3. In addition, by discharging water, used for reducing the temperature of the hot air supplied to the refresher 3, to the outside through the drain pump 26, it is possible to effectively manage the water used for cooling the hot air.

The second exhaust air duct 44 may include a first duct section 441 connected to the refresher 3, a second duct section 442 extending downwardly from the first duct section 441, and a fourth connection part 443 connected to the heating device 50.

The first duct section 441 may be connected to the third rear panel 302 of the third cabinet 30. The first duct section 441 may communicate with the inner space 33 of the refresher 3, and air circulating in the refresher 3 may flow to the first duct section 441. The first duct section 441 may be connected to the exhaust air hole 309. The first duct section 441 may extend rearwardly from the third cabinet 30. A position where the first duct section 441 and the third cabinet 30 are connected may be between the third upper panel 303 and the hanger 36. The exhaust air hole 309 may be formed between the third upper panel 303 and the hanger 36.

The second duct section 442 may be bent downwardly from the first duct section 441. The second duct section 442 may extend downwardly from the first duct section 441. The second duct section 442 may extend downwardly from one end of the first duct section 441. The second connection part 442 may face the first inner wall 106 of the dryer 1, and may be disposed side by side with the first inner wall 106.

The fourth connection part 443 may extend into the separation space 55. The fourth connection part 443 may extend in the front-rear direction from the second duct section 442. The fourth connection part 443 may be connected to the heating device 50 in the separation device 55.

The rear case 310 may have a longitudinal width W6. The longitudinal width W6 of the rear case 310 may be smaller than the longitudinal width W1 of the tower 9. The longitudinal width W6 of the rear case 310 may be equal to the gap X.

The rear surface 310b of the rear case 310 may be aligned with the rear surfaces 10b and 20b of the tower 9. The rear surface 310b of the rear case 310 may be disposed on the same plane as the rear surfaces 10b and 20b of the tower 9.

A sum (W4+W6) of the longitudinal width W6 of the rear case 310 and the longitudinal width W4 of the refresher 3 may be equal to the longitudinal width W1 of the tower 9. However, it is also possible that the sum (W4+W6) of the longitudinal width W6 of the rear case 310 and the longitudinal width W4 of the refresher 3 may be similar to or greater than the longitudinal width W1 of the tower 9.

In the laundry treating apparatus A according to an aspect of the present disclosure, the rear case 310 is disposed at a rear side of the refresher 3, such that a constant longitudinal width may be formed. That is, by providing the rear case 310 on the rear side of the refresher 3, not only the front surface 31a of the refresher 3 may be aligned with the front surface of the tower 9, but also the rear surface 310b of the rear case 310 may be aligned with the rear surfaces 10b and 20b of the tower 9.

The rear case 310 may have a vertical height 310H. The vertical height 310H may be equal to the height 3H of the refresher 3 and the height 9H of the tower 9. However, it is also possible that the height 310H of the rear case 310 may be similar to or greater than the height 3 of the refresher 3 and the height 9H of the tower 9.

The rear case 310 may be fixed to the refresher 3 by a fastening member 316 passing through a fastening plate 317 extending in the front-rear direction. There may be a plurality of fastening plates 317 which are vertically spaced apart from each other. The fastening plates 317 may extend in the front-rear direction to be connected to respective side walls of the rear case 310 and the third cabinet 30. The fastening member 316 may pass through the respective side walls of the rear case 310 and the third cabinet 30 and the fastening plate 317.

Hereinafter, an alignment structure of the front surface and rear surface of the laundry treating apparatus A will be described with reference to FIG. 12. The alignment structure of the laundry treating apparatus A, which will be described below with reference to FIG. 12, may be applied commonly to all embodiments of the laundry treating apparatus described with reference to FIGS. 1 to 55.

The front surface 31a of the refresher 3 and a front surface 9a of the tower 9 may be aligned horizontally. The front surface 31a of the refresher 3 and the front surface 9a of the tower 9 may be disposed on the same plane.

The doors 11 and 21 may be disposed in the cabinets 10 and 20, and the front surfaces 11a and 21a thereof may be disposed on the same plane as the front surfaces 10a and 20a of the cabinets 10 and 20. The front surface 11a and 21a of the doors 11 and 21 may be touch screens, and a user may open the doors 11 and 21 by touching the front surfaces 11a and 21a of the doors 11 and 21.

The front surface 31a of the refresher 3, the front surfaces 10a and 20a of the cabinets 10 and 20, and the front surfaces 11a and 21a of the doors 11 and 21 may be aligned horizontally. The front surface 31a of the refresher 3, the front surfaces 10a and 20a of the cabinets 10 and 20, and the front surfaces 11a and 21a of the doors 11 and 21 may be disposed on the same plane.

The rear surface 30b of the refresher 3 may be disposed in front of the rear surface 9b of the tower 9. The rear surface 9b of the tower 9 may include the rear surface 10b of the dryer 1 and the rear surface 20b of the washing machine 2.

The rear surface 310b of the rear case 310 may be aligned horizontally with the rear surface 9b of the tower 9. The rear surface 310b of the rear case 310 and the rear surface 9b of the tower 9 may be disposed on the same plane.

A space may be formed between the rear surface 30b of the refresher 3 and the rear surface 310b of the rear case 310, and the second supply air duct 45 and the second exhaust air duct 44 may be disposed in the space.

The laundry treating apparatus A may have a longitudinal width W. The longitudinal width W of the laundry treating apparatus A may be maintained constant in the horizontal direction.

Hereinafter, an alignment structure of a laundry treating apparatus A' according to another aspect of the present disclosure will be described with reference to FIG. 13.

A refresher 3' may have a vertical height H1. The height H1 of the refresher 3' may be a length between the third upper surface 30c of the third cabinet 30 and the lower surface 30d of the third cabinet 30.

A tower 9' may have a vertical height H2. The height H2 of the tower 9' may be a length between the upper surface 10c of the first cabinet 10 and the lower surface 20d of the second cabinet 20.

The height H1 of the refresher 3' may be greater than the height H2 of the tower 9'. The third upper surface 30c of the refresher 3' may be positioned above the upper surface 10c of the tower 9'. A height difference H3 may be formed between the third upper surface 30c of the refresher 3' and the upper surface 10c of the tower 9'.

The laundry treating apparatus A' may include an auxiliary panel 93 connected to the first cabinet 10 so as to be movable in the up-down direction. The auxiliary panel 93 may be mounted to the tower 9' to be movable in the up-down direction.

The auxiliary panel 93 may be moved upwardly from the first cabinet 10 to form an upper end 91' of the front surface of the tower 9'. The auxiliary panel 93 may be disposed in the cabinet 10 to be movable in the up-down direction. The auxiliary panel 93 may be disposed in the first front panel 101 so as to be withdrawable in the up-down direction. It can also be said that the auxiliary panel 93 may form the upper end of the front surface of the dryer 1. An upper end of the auxiliary panel 93 may be the upper end of the front surface of the tower 9'. The upper end of the auxiliary panel 93 may be the upper end of the front surface of the dryer 1.

The upper end 91' of the auxiliary panel 93 may be aligned horizontally with the upper end 307 of the front surface of the refresher 3'. The upper end 91' of the auxiliary panel 93 may be disposed on the same plane as the upper end 307 of the front surface of the refresher 3'.

A height H4 of the auxiliary panel 93 protruding upwardly from the first cabinet 10 may be equal to the height difference h3 between the third upper surface 30c of the refresher 3' and the upper surface 10c of the dryer 1. That is, the auxiliary panel 93 may protrude upwardly from the first cabinet 10 by the height difference h3 between the refresher 3' and the tower 9'.

The auxiliary panel 93 may protrude upwardly from the upper surface 10c of the first cabinet 10. A space facing the refresher 3' may be formed on the rear side of the auxiliary panel 93. Although not illustrated herein, a separate case or a storage box may be disposed on an upper side of the first cabinet 10, and the case or the storage box, which may be covered by the auxiliary panel 93, may be invisible from the front side.

The refresher 3' may have a longitudinal width W8. The longitudinal width W8 of the refresher 3' may be a length between the front surface 31a of the third door 31 and the rear surface 30b of the third cabinet 30.

The tower 9' may have a longitudinal width W7. The longitudinal width W7 of the tower 9' may be a length between the front surfaces 10a and 20a of the cabinets 10 and 20 or the front surfaces 11a and 21a of the doors 11 and 21 and the rear surfaces 10b and 20b of the cabinets 10 and 20.

The width W8 of the refresher 3' may be smaller than the width W7 of the tower 9'. The rear surface 30b of the refresher 3' may be disposed in front of the rear surfaces 10b and 20b of the tower 9'. A depth difference X may be formed between the rear surface 30b of the refresher 3' and the rear surfaces 10b and 20b of the tower 9'.

The laundry treating apparatus A' may include a support block 38 connected to the refresher 3 and extending in the front-rear direction. The support block 38 may be coupled to the rear panel 302 of the third cabinet 30. The support block 38 may protrude rearwardly from the rear surface 30b of the refresher 3'. The support block 38 may protrude from the rear surface 30b of the refresher 3' by a predetermined width W9. The width W9, by which the support block 38 protrudes from the rear surface 30b of the refresher 3', may be equal to the depth difference X between the refresher 3' and the tower 9'. That is, the support block 38 may protrude from the rear surface 30b of the refresher 3' by the depth difference X between the refresher 3' and the tower 9'.

A block receiving groove 37, which is recessed forwardly, may be formed in the rear panel 302 of the third cabinet 30. The block receiving groove 37 may extend in the up-down direction to provide a space for receiving the support block 38.

There may be a plurality of block receiving grooves 37 and support blocks 38 which are vertically spaced apart from each other. Any one of the support blocks 38 may be disposed at a position corresponding to the dryer 1 in the horizontal direction. The other one of the support blocks 38 may be disposed at a position corresponding to the washing machine 2 in the horizontal direction. The support block 38, disposed at a position corresponding to the dryer 1 in the horizontal direction, may be referred to as a "first support block." The support block 38, disposed at a position corresponding to the washing machine 2 in the horizontal direction, may be referred to as a "second support block."

The laundry treating apparatus A' may include a proximity sensor 389 for sensing proximity of an object located at the rear side of the refresher 3.

The proximity sensor 389 may be disposed on the rear panel 302 of the third cabinet 30. The proximity sensor 389 may sense proximity of an object approaching the rear panel 302 of the third cabinet 30.

The laundry treating apparatus A' may include aside support block 38' disposed on an opposite side surface 305 of the refresher 3' which is opposite to one side surface directed toward the tower 9', and extending in a direction opposite to a direction toward the tower 9'.

The side support block 38' may be disposed on the outer wall 305 of the third cabinet 30. A side block receiving groove 37' may be recessed in the outer wall 305 of the third cabinet 30. The side block receiving groove 37' may provide a space for receiving the side support block 38'.

The side support block 38' may extend in a direction opposite to the direction toward the tower 9', and may protrude toward one side of the outer wall 305.

The laundry treating apparatus A' may be disposed adjacent to a wall surface of an indoor space. In this case, the wall surface may be located on one side and the rear side of the refresher 3'. The support blocks 38 and 38' may prevent collision between the laundry treating apparatus A' and the wall surface when the laundry treating apparatus A' is installed in the indoor space. In addition, the support blocks 38 and 38' may absorb vibrations generated in the washing machine 2 when the laundry treating apparatus A' is installed in the indoor space. The vibrations generated in the washing machine 2 may be absorbed to the surface wall by the support block 38 and 38' being in contact with the surface wall. In addition, the support block 38 may prevent the third door 31 of the refresher 3' from being disposed behind the front surface of the tower 9' due to the depth difference X between the refresher 3' and the tower 9'. That is, the support block 38 is disposed between the rear surface 30b of the refresher 3' and the wall surface, thereby maintaining a separation space between the refresher 3' and the wall surface, such that the front surface 31a of the refresher 3' and the front surface of the tower 9' may be aligned.

Hereinafter, a structure for operating the support block 38 will be described with reference to FIGS. 14 and 15. FIG. 14 is an enlarged view of a portion of the rear surface 30b of the refresher 3', and FIG. 15 is a longitudinal cross-sectional view of a structure illustrated in FIG. 14.

The support block 38 may be rotatably coupled to the refresher 3'. The support block 38 may be rotatably coupled to the rear panel 302 of the third cabinet 30.

The laundry treating apparatus A' may include a rotating shaft 383 horizontally passing through the support block 38, and a motor 381 coupled to the rotating shaft 383 through a motor shaft 382. The motor 381 may referred to as a "block motor."

The rear panel 302 may have a longitudinal thickness, and a motor receiving space 384, in which the motor 381 is disposed, may be formed on the inside of the rear panel 302. The motor 381 may generate power for rotating the rotating shaft 383, and the rotating shaft 383 may be rotated by the rotation of the motor shaft 382.

The rotating shaft 383 may pass through one side wall 371 and an opposite side wall 372 of the block receiving groove 37. The one side wall 371 and the opposite side wall 372 may face each other in the horizontal direction.

The support block 38 may be rotated about the rotating shaft 383 in the forward and backward direction. The support block 38 may be rotated about the rotating shaft 383 in the backward direction, to protrude rearwardly from the refresher 3'. The support block 38 may be rotated about the rotating shaft 383 in the forward direction, to be received in the block receiving groove 37.

The support block 38 may protrude rearwardly from the rear surface 30b of the refresher 3' with a predetermined width W9. The support block 38 may protrude rearwardly by the depth difference X between the refresher 3' and the tower 9' (W9=D).

The support block 38 may include a first support 38a coupled to the refresher 3', and a second support 38b disposed on a lower end of the first support 38a and having an elastic body.

The first support 38a may be rotatably coupled to the third cabinet 30 in the block receiving groove 37.

The second support 38b may form the rear end of the first support 38a. The second support 38b maybe made of a material having a high elastic modulus. Accordingly, when the support block 38 collides with a material located at the rear side of the refresher 3', the shock applied to the laundry treating apparatus A' may be absorbed.

The rear end 38b of the support block 38 may be horizontally aligned with the rear surfaces 10b and 20b of the tower 9'.

The controller 81 may be electrically connected to the proximity sensor 389 and the motor 381. The controller 81 may receive, from the proximity sensor 389, information on the proximity of an object located at the rear side of the refresher 3'.

If the proximity measured by the proximity sensor 389 is greater than or equal to a predetermined reference value, the controller 81 may control the motor 381 so that the support block 38 may protrude rearwardly from the refresher 3. If the proximity measured by the proximity sensor 389 is greater than or equal to the reference value, the motor 381 may rotate the rotating shaft 383 so that the support block 38 may be rotated rearwardly. If the proximity measured by the proximity sensor 389 is less than the reference value, the motor 381 may rotate the rotating shaft 383 so that the support block 38 may be rotated forwardly, and the support block 38 may be received in the block receiving groove 37.

Hereinafter, a method of operating the auxiliary panel 93 will be described with reference to FIG. 16. FIG. 16 is a diagram explaining a principle whereby the auxiliary panel 93 of the laundry treating apparatus A' is operated according to a first operating embodiment.

The auxiliary panel 93 may be disposed so as to be withdrawable upwardly from the first cabinet 10. The first cabinet 10 may include the first front panel 101 having a predetermined thickness and having a space formed therein, and the auxiliary panel 93 may be disposed so as to be vertically movable in the first front panel 101.

The auxiliary panel 93 may include a panel body 932 disposed to be vertically movable in the first cabinet 10, a rack 933 extending downwardly from the panel body 932, and a sensing unit 931 disposed on an upper end of a front surface of the panel body 932.

The panel body 932 may protrude upwardly from the upper surface 10c of the dryer 1 to form the upper end 91' of the front surface of the tower 9'. The upper end 91' of the front surface of the tower 9' may refer to the upper end of the panel body 932.

The rack 933 may extend vertically, and may have a plurality of gear teeth which are vertically spaced apart from each other.

The sensing unit 931 may be disposed on the upper end of the panel body 932. The sensing unit 931 may be disposed to face the third door 31 in the horizontal direction.

The laundry treating apparatus A' may include a motor 94 for generating power, and a driving gear 95 coupled to the motor 94 to be rotated thereby.

The motor 94 may provide power for raising and lowering the auxiliary panel 93. The motor 94 may be referred to as a "panel motor."

The driving gear 95 may be rotated by receiving power from the motor 94. The driving gear 95 may be a spur gear or may be geared with the rack 933.

When the motor 94 rotates the driving gear 95, the rack 933 engaged with the driving gear 95 may be moved upwardly and downwardly. The panel body 932 may be integrally formed with the rack 933, or may be moved upwardly with the rack 933.

The driving gear 95 and the rack 933 may be referred to as a "power transmission device." The power transmission device may include the driving gear 95 and the rack 933, and may transmit the power generated by the motor 94 to the panel body 932.

The laundry treating apparatus A' may include a transmission unit 311 disposed on the upper end 307 of the third door 31 and configured to transmit a predetermined signal in the horizontal direction.

The transmission unit 311 may transmit an electromagnetic signal in the horizontal direction. The transmission unit 311 may transmit radio waves in the horizontal direction. The transmission unit 311 may transmit an infrared signal in the horizontal direction. The transmission unit 311 may generate a magnetic force in the horizontal direction. The transmission unit 311 may be a permanent magnet.

The sensing unit 931 may sense the signal transmitted from the transmission unit 311. The sensing unit 931 may be a Hall IC sensor. The sensing unit 931 may be an infrared sensing device. The sensing unit 931 may be a magnet.

For example, the sensing unit 931 and the transmission unit 311 may transmit and receive infrared signals. The sensing unit 931 may be a device for emitting infrared light in the horizontal direction and for detecting reflected infrared light that returns among the emitted rays. The transmission unit 311 may be a reflector. The sensing unit 931 may detect the infrared light which is emitted in the horizontal direction and returns by being reflected from the transmission unit 311. The sensing unit 931 may detect the infrared light which returns by being reflected from the transmission unit 311, when the upper end 91' of the auxiliary panel 93 and the upper end 307 of the third door 31 are horizontally aligned.

In another example, the sensing unit 931 and the transmission unit 311 may transmit and receive magnetic signals. The sensing unit 931 may be a Hall IC sensor, and may be a device for sensing a change in magnetic field. The transmission unit 311 may be a permanent magnet. The sensing unit 931 may sense a magnetic force generated by the transmission unit 311. Further, the sensing unit 931 and the transmission unit 311 may be permanent magnets having different polarities. The sensing unit 931 may sense the magnetism of the transmission unit 311, when the upper end 91' of the auxiliary panel 93 and the upper end 307 of the third door 31 are horizontally aligned.

The controller 81 may be electrically connected to the sensing unit 931 and the motor 94. The sensing unit 931 may sense a signal transmitted from the transmission unit 311, when the upper end 91' of the auxiliary panel 93 and the upper end 307 of the third door 31 are horizontally aligned. When the signal transmitted from the transmission unit 311 is sensed by the sensing unit 931, the controller 81 may stop the operation of the motor 94. Accordingly, when the upper end 91' of the tower 9' and the upper end 307 of the refresher 3 are horizontally aligned, the operation of the motor 94 is stopped, such that an upward and downward movement of the auxiliary panel 93 may be stopped.

Hereinafter, another method of operating an auxiliary panel 93' will be described with reference to FIG. 17. FIG. 17 is a diagram explaining a principle whereby the auxiliary panel 93' of the laundry treating apparatus A' is operated according to a second operating embodiment.

The method of operating the auxiliary panel 93' according to the second operating embodiment may be the same as the method of operating the auxiliary panel 93 according to the first embodiment, except a method of transmitting and receiving signals between a sensing unit 931' and a transmission unit 311'.

The sensing unit 931' may be disposed on an upper end 91' of the auxiliary panel 93' so as to face upwards. The transmission unit 311' may extend horizontally from the upper end 307 of the refresher 3 toward the tower 9', and may be disposed above the auxiliary panel 93'.

The sensing unit 931' may sense the signal transmitted from the transmission unit 311'. For example, the sensing unit 931' may sense contact with the transmission unit 311' as a current value flowing in the sensing unit 931' changes upon contact with the transmission unit 311'. In another example, the sensing unit 931' and the transmission unit 311' may be permanent magnets having different polarities, and when the sensing unit 931' and the transmission unit 311' approach each other, the sensing unit 931' may sense the magnetism of the transmission unit 311' and may be adhered to the transmission unit 311'.

The controller 81 may control the operation of a motor 94'. The motor 94' may rotate a driving gear 95' so as to move the rack 933' upwardly. When the rack 933' moves upwardly, the panel bod 932' being integrally formed with the rack 933' may also be moved upwardly with the rack 993'. When the panel body 932' is moved upwardly, the sensing unit 931' may come into contact with the transmission unit 311'. The sensing unit 931' being in contact with the transmission unit 311' may sense the signal transmitted from the transmission unit 311'. When the sensing unit 931' senses the signal transmitted from the transmission unit 311', the controller 81 may stop the operation of the motor 94'. Accordingly, when the upper end 91' of the tower 9' is horizontally aligned with the upper end 307 of the refresher 3, the operation of the motor 94' is stopped, such that an upward and downward movement of the auxiliary panel 93' may be stopped.

Hereinafter, a laundry treating apparatus A" according to yet another aspect of the present disclosure will be described with reference to FIG. 18.

The laundry treating apparatus A" may include upper cases 901 and 902 disposed on an upper side of a dryer 1" or a refresher 3".

The upper cases 901 and 902 may include a first upper case 901 disposed on an upper side of the dryer 1", and a second upper case 902 disposed on an upper case of the refresher 3". Any one of the first and second upper cases 901 and 902 may be provided. The first uppercase 901 may be included in the dryer 1". The second uppercase 902 may be included in the refresher 3". The first upper case 901 may form an upper end of a front surface of the dryer 1". The second upper case 902 may form an upper end of a front surface of the refresher 3".

The first upper case 901 may be a storage box having a space 901s formed therein. The second upper case 902 may be a storage box having a space 902s formed therein.

The laundry treating apparatus A" may include a first tower T1 including the dryer ", the washing machine 2", and the first upper case 901.

The laundry treating apparatus A" may include a second tower T2 including the refresher 3" and the second upper case 902.

The first upper case 901 may form an upper end 901a of a front surface of the first tower T1. The second upper case 902 may form an upper end 902a of a front surface of the second tower T2.

The upper end 901a of the front surface of the first tower T1 may be horizontally aligned with the upper end 902a of the front surface of the second tower T2. The upper end 901a of the front surface of the first tower T1 and the upper end 902a of the front surface of the second tower T2 may be disposed on the same plane.

A height H9 of the first tower T1 (FIG. 18) may be equal to a height H10 of the second tower T2. The first tower T1 and the second tower T2 may be disposed side by side with each other.

A height H5 of a washing unit 9" including the dryer 1' and the washing machine 2" may be smaller than a height H6 of the refresher 3". A height H7 of the first upper case 901 may be greater than a height H8 of the second upper case 902.

A sum (H5+H7) of the height H5 of the washing unit 9" and the height H7 of the first upper case 901 may be equal to a sum (H6+H8) of the height H6 of the refresher 3" and the height H8 of the second upper case 902.

By providing the upper cases 901 and 902 in the laundry treating apparatus A", a uniform height of the laundry treating apparatus A" may be maintained even when there is a height difference between the washing unit 9" and the refresher 3", and a space for accommodating accessories of the laundry treating apparatus A" may also be provided.

The description of the dryer 1, the washing machine 2, the refresher 3, and the heating device 50, which are described above with reference to FIGS. 1 to 18, may also be applied to laundry treating apparatuses according to the embodiments of the present disclosure described with reference to FIGS. 19 to 55.

Further, the description of components illustrated in FIGS. 1 to 18 may also be applied to FIGS. 19 to 55, even when the corresponding components are not illustrated in the description of the laundry treating apparatuses with reference to FIGS. 19 to 55. For example, even when the rear case 310 is not illustrated in FIGS. 19 to 55, the description of the rear case 310 described with reference to FIGS. 1 to 18 may also be applied to the description of the rear case 310 given with reference to FIGS. 19 to 55.

Hereinafter, laundry treating apparatuses B and B' according to other embodiments of the present disclosure will be described with reference to FIGS. 19 to 23.

Referring to FIG. 19, in the laundry treating apparatus B, the dryer 1 may be disposed under the washing machine 2, and the heating device 50 may be disposed at a lower portion of the dryer 1.

The second upper panel 203 of the washing machine 2 and the third upper panel 303 of the refresher 3 may be disposed on the same horizontal plane.

The first lower panel 104 of the dryer 1 and the third lower panel 304 of the refresher 3 may be disposed on the same horizontal plane.

The heating device 50 may be disposed in the dryer 1. The heating device 50 may be disposed in the first cabinet 10. The heating device 50 may be disposed on a lower portion of the first cabinet 10 and may be disposed under the first drum 13.

Referring to FIG. 20, the laundry treating apparatus B may include a duct system connecting the dryer 1, the washing machine 2, the refresher 3, and the heating device 50.

The blowing duct 420 may include a first discharge port 425 connected to the first supply air duct 43. The blowing duct 420 may include a second discharge port 427 connected to the second supply air duct 45. The blowing duct 420 may include a fourth discharge port 428 connected to the dehumidification duct 46. The third supply air duct 48 may branch off from the second supply air duct 45, and a third discharge port 426 may be formed at a portion where the third supply air duct 48 branches off from the second supply air duct 45.

The first discharge port 425 may protrude upwardly from the blowing duct 420. The first supply air duct 43 may connect the first drum 13 and the first discharge port 425.

The second discharge port 427 may protrude from the flowing duct 420 to the lateral side. The second supply air duct 45 may connect the refresher 3 and the second discharge port 427. The second supply air duct 45 may connect the supply air hole 308 and the second discharge port 427.

The third discharge port 426 may protrude upwardly from the second supply air duct 45. The third supply air duct 48 may connect the tub 23 and the third discharge port 426. The third supply air duct 48 may connect the tub 23 and the second supply air duct 45.

The fourth discharge port 428 may protrude from the blowing duct 420 to the lateral side. The fourth discharge port 428 may protrude in a direction opposite to the second discharge port 427. The dehumidification duct 46 may be connected to the fourth discharge port 428.

The hot air flowing into the first drum 13 through the first supply air duct 43 may dry the laundry placed in the first drum 13, and then may flow into the heat exchange channel 42 through the first exhaust air duct 41. The first drum 13 may include the front cover 131 disposed on a front side, and the rear cover 132 disposed on a rear side. The first supply air duct 43 may be connected to the rear cover 132, and the first exhaust air duct 41 may be connected to the front cover 131.

The first exhaust air duct 41 may connect the first drum 13 and the heat exchange channel 42. The first exhaust air duct 41 may extend downwardly from the first drum 13 to be connected to the heat exchange channel 42.

The first inlet port 421 connected to the first exhaust air duct 41 may be formed at the inlet end 42A of the heat exchange channel 42. The first inlet port 421 may extend upwardly from the heat exchange channel 42. The first inlet port 421 may extend upwardly from the case 570 of the heating device 50.

The laundry treating apparatus B may include the first opening and closing valve 41a disposed in the first exhaust air duct 41. The first opening and closing valve 41a may control a flow rate of air in the first exhaust air duct 41. The first opening and closing valve 41a may block an air flow in the first exhaust air duct 41. The first opening and closing valve 41a may block the air flow in the first exhaust air duct 41 when the hot air is not supplied into the first drum 13 through the first exhaust air duct 41.

The hot air flowing into third cabinet 30 through the second supply air duct 45 may dry the laundry placed in the third cabinet 30, and then may flow into the heat exchange channel 42 through the second exhaust air duct 44. The second supply air duct 45 may be connected to the third rear panel 302 of the third cabinet 30. The second exhaust air duct 44 may be connected to the heat exchange channel 42 by passing through the third inner wall 306.

The second exhaust air duct 44 may connect the exhaust air hole 309 and the heat exchange channel 42. The second exhaust air duct 44 may extend from the lower side of the third cabinet 30 to the lateral side, to be connected to the heat exchange channel 42.

The second inlet port 422 connected to the second exhaust air duct 44 may be formed at the inlet end 42A of the heat exchange channel 42. The second inlet port 422 may extend from the heat exchange channel 42 to the lateral side. The second inlet port 422 may extend from the third exhaust air duct 47 to the lateral side. The second inlet port 422 may extend from a first duct section 471 to the lateral side.

The second inlet port 422 may protrude from one side surface of the third exhaust air duct 47 to the lateral side. The second exhaust air duct 44 may connect the inner space 33 of the refresher 3 and the second inlet port 422. The second exhaust air duct 44 may connect the inner space 33 of the refresher 3 and the third exhaust air duct 47. The air in the second exhaust air duct 44 may join the air in the third exhaust air duct 47, to flow into the heat exchange channel 42.

The laundry treating apparatus B may include the second opening and closing valve 44a disposed in the second exhaust air duct 44. The second opening and closing valve 44a may control a flow rate of air in the second exhaust air duct 44. The second opening and closing valve 44a may block an air flow in the second exhaust air duct 44. The second opening and closing valve 44a may block the air flow in the second exhaust air duct 44 when the hot air is not supplied into the third cabinet 30 through the second supply air duct 45.

The hot air flowing into the tub 23 through the third supply air duct 48 may dry the laundry placed in the tub 23, and then may flow into the heat exchange channel 42 through the third exhaust air duct 47.

The third exhaust air duct 47 may connect the tub 23 and the heat exchange channel 42. The third exhaust air duct 47 may extend from an upper side of the tub 23, to be connected to the heat exchange channel 42.

The third exhaust air duct 47 may include the first duct section 471 located between the base plate 575 of the heating device 50 and the first lower panel 104. The first duct section 471 may be disposed in the separation space 55 of the heating device 50. The first duct section 441 may extend forward or backward in the separation space 55.

The third inlet port 424 connected to the third exhaust air duct 47 may be formed at the inlet end 42A of the heat exchange channel 42. The third inlet port 424 may extend downwardly from the heat exchange channel 42. The third inlet port 424 may extend downwardly from the case 570 of the heating device 50.

The laundry treating apparatus B may include the third opening and closing valve 47a disposed in the third exhaust air duct 47. The third opening and closing valve 47a may control a flow rate of air in the third exhaust air duct 47. The third opening and closing valve 47a may block an air flow in the third exhaust air duct 47. The third opening and closing valve 47a may block the air flow in the third exhaust air duct 47 when the hot air is not supplied into the tub 23 through the third supply air duct 48.

The outside air inlet port 423 may protrude forwardly from one side of the third exhaust air duct 47. The outside air inlet port 423 may allow the indoor space and the third exhaust air duct 47 to communicate with each other. The air in the outside air inlet port 423 may join the air in the third exhaust air duct 47 to flow into the heat exchange channel 42. The outside air inlet port 423 may have the outside air inlet 49 that is opened forward. The air drawn in through the outside air inlet 49 may join the air in the third exhaust air duct 47 to flow into the heat exchange channel 42.

Referring to FIG. 21, the heating device 50 may be disposed at the lower portion of the dryer 1, and may supply hot air to each of the dryer 1, the washing machine 2, and the refresher 3.

The second supply air duct 45 for supplying hot air to the refresher 3 may be disposed at the rear side of the third cabinet 30. The second exhaust air duct 44 may be disposed under the inner panel 34.

The second supply air duct 45 may be disposed behind the third rear panel 302.

The second supply air duct 45 may extend from the heating device 50 in a lateral direction, to be connected to the inner panel 34.

The second supply air duct 45 may pass through the first inner wall 106 of the dryer 1. The second supply air duct 45 may extend into the rear case 310 by passing through the first inner wall 106.

The first hot air duct 451 may be connected to the first inner wall 106. The first hot air duct 451 may be connected to the blowing duct 420, and air blown by the fan 60 may flow into the first hot air duct 451. The first hot air duct 451 may extend horizontally from the heating device 50.

The second hot air duct 452 may be bent upwardly from the first hot air duct 451. The second hot air duct 452 may extend upwardly from one end of the first hot air duct 451.

The supply air hole 308 of the refresher 3 may be disposed at the lower portion of the refresher 3. As the heating device 50 and the supply air hole 308 are disposed at the lower portion of the laundry treating apparatus B, the second supply air duct 45 connecting the heating device 50 and the supply air hole 308 may be reduced in length, thereby minimizing heat loss occurring when the air heated by the heating device 50 flows toward the supply air hole 308. In addition, the hot air supplied by the heating device 50 may be discharged to the inner space 33 through the supply air hole 308 disposed at the lower portion of the refresher 3, such that the hot air may be distributed uniformly over the upper side of the refresher 3.

The second exhaust air duct 44 may be disposed under the inner panel 34. The second exhaust air duct 44 may be connected to the exhaust air hole 309 formed in the inner panel 34.

The second exhaust air duct 44 may extend in the left-right direction, to be connected to the heating device 50. The second exhaust air duct 44 may be connected to the third exhaust air duct 47. The second exhaust air duct 44 may be connected to the third exhaust air duct 47 by passing through the support plate 577.

The third supply air duct 48 may branch off from the second supply air duct 45. The third supply air duct 48 may branch off from the first hot air duct 451. The third supply air duct 48 may branch off from the first hot air duct 451 at the rear side of the third cabinet 30.

The laundry treating apparatus B may include a control valve 453 disposed at a position where the third supply air duct 48 branches off from the second supply air duct 45.

The control valve 453 may control a flow direction of air flowing in the second supply air duct 45. The control valve 453 may control a flow direction of air flowing in the first hot air duct 451. The control valve 453 may open and close the second hot air duct 452 and the third supply air duct 48. The control valve 453 may open only either the second hot air duct 452 or the third supply air duct 48. The control valve 453 may open both the second hot air duct 452 and the third supply air duct 48. The control valve 453 may control a flow amount of air supplied to the second hot air duct 452 or the third supply air duct 48. The control valve 453 may distribute the air, blown by the fan 60 to the second supply air duct 45, to the second hot air duct 452 and the third supply air duct 48.

The controller 81 may control the control valve 453. By controlling the control valve 453, the controller 81 may supply the hot air, supplied from the fan 60 to the second supply air duct 450, into the inner space 33 of the refresher 3. By controlling the control valve 453, the controller 81 may supply the hot air, supplied from the fan 60 to the second supply air duct 45, into the tub 23.

The third supply air duct 48 may extend upwardly from the second supply air duct 45. The third supply air duct 48 may face the first inner wall 106. By extending upwardly from the second supply air duct 45, the third supply air duct 48 may pass through the second inner wall 206, to be connected to the tub 23. The second drum 24 may be supplied with hot air, heated by the heating device 50, through the third supply air duct 48.

The third exhaust air duct 47 may extend from the tub 23 to pass through the second inner wall 206.

The third exhaust air duct 47 may include a first connection part 47b passing through the second inner wall 206 to be connected to the tub 23, an extension part 47c extending downwardly from the first connection part 47b, and a second connection part 47d bent from the extension part 47c to be connected to the heating device 50.

The second exhaust air duct 44 may pass through the support plate 577. The second supply air duct 45 may pass through the first inner wall 106.

The fan 60 may be disposed closer to the first inner wall 106 than to the first outer wall 105. The fan 60 may be disposed adjacent to the refresher 3. The fan 60 may be disposed closer to the first rear panel 102 than to the first front panel 101. The fan 60 may be disposed behind the third rear panel 302 of the refresher 3. The fan 60 may be disposed between the first drum 13 and the first lower panel 104. The fan 60 may be disposed between the base plate 575 and the first drum 13.

The switching device 70 for controlling the supply of air to the first supply air duct 43 and the second supply air duct 45 may be disposed at a height corresponding to the lower portion of the refresher 3. The switching device 70 may be disposed under the first drum 13. The switching device 70 may be disposed between the first drum 13 and the first lower panel 104. The switching device 70 may be disposed between the first drum 13 and the base plate 575.

In the above arrangement structure, the length of the first supply air duct 43 and the second supply air duct 45 may be minimized. That is, the fan 60 and the switching device 70 are all disposed adjacent to the first drum 13 and the refresher 3, such that the length of the first supply air duct 43 and the second supply air duct 45 may be minimized, thereby reducing heat loss occurring when the air heated by the heating device 50 flows through the first supply air duct 43 and the second supply air duct 45.

The laundry treating apparatus B may include the steam generator 502. The steam generator 502 may generate steam by heating water. The steam generator 502 may be disposed in the heating device 50.

The steam generator 502 may be connected to the first drum 13 by the first steam supply pipe 502a. The steam generator 502 may be connected to the refresher 3 by the second steam supply pipe 502b. The steam generated by the steam generator 502 may be supplied into the first drum 13 through the first steam supply pipe 502a. The steam generated by the steam generator 502 may be supplied into the inner space 33 of the refresher 3 through the second steam supply pipe 502b.

Referring to FIG. 22, the heating device 50 may be disposed at the lower portion of the laundry treating apparatus B, and the duct system may be connected to the lower portion of the laundry treating apparatus B.

The base plate 575 of the heating device 50 may be disposed above the first lower panel 104. The separation space 55 may be formed under the base plate 575.

The separation space 55 may be disposed between the first support plate 576 and the second support plate 577.

The laundry treating apparatus B may include the auxiliary panel 58 and the first lower panel 104.

The auxiliary panel 58 may shield a rear side of the separation space 55. The auxiliary panel 58 may be connected to the first rear panel 102 and the first side panels 105 and 106.

The first lower panel 104 may shield a lower side of the separation space 55. The first lower panel 104 may be coupled to the support plates 576 and 577 and the auxiliary panel 58.

The first support plate 576 may include a first protrusion 576a protruding downwardly. The second support plate 577 may include a second protrusion 577a protruding downwardly. The first protrusion 576a and the second protrusion 577a may be referred to as "protrusions."

The first lower panel 104 may include recesses 104a, into which the protrusions 576a and 577a are inserted. The recesses 104a may be recessed downwardly from the upper surface of the first lower panel 104.

As the protrusions 576a and 577a are inserted into the recesses 104a, the first lower panel 104 may be coupled to the heating device 50.

The dehumidification duct 46 and the third exhaust air duct 47 may be disposed in the separation space 55. The third exhaust air duct 47 disposed in the separation space 55 may be defined as the first duct section 471, and the dehumidification duct 46 disposed in the separation space 55 may be defined as the second duct section 461.

The dehumidification duct 46 may extend forwardly and rearwardly. The hot air outlet 462 may be formed on a front side of the dehumidification duct 46. The air heated by the heating device 50 may be blown by the fan 60 to be supplied to the indoor space through the dehumidification duct 46.

The second exhaust air duct 44 may extend horizontally and may extend into the separation space 55. The second exhaust air duct 44 may pass through the third inner wall 306 and the second support plate 577. The second exhaust air duct 44 may be connected to the third exhaust air duct 47 in the separation space 55. The air in the second exhaust air duct 44 may join the air in the third exhaust air duct 47 to flow into the heat exchange channel 42.

Referring to FIG. 23, without branching off from the second supply air duct 450, the third supply air duct 480 may directly connect the heating device 50 and the washing machine 2.

The third supply air duct 480 and the third exhaust air duct 470 may be directly connected to the heating device 50. Without branching off from the second supply air duct 450, the third supply air duct 480 may be directly connected to the heating device 50. The third supply air duct 480 may be connected to the blowing duct 420.

The third discharge port 426 may protrude downwardly from the blowing duct 420. The third discharge port 426 may protrude downwardly from the second wall 420b of the blowing duct 420.

The third discharge port 426 may be connected to the third supply air duct 480. The air blown by the fan 60 may be supplied into the third supply air duct 480 connected to the third discharge port 426.

The third supply air duct 480 may include a first supply air portion 480a connected to the third discharge port 426, a second supply air portion 480b extending rearwardly from the first supply air portion 480a, and a third supply air portion 480c extending upwardly from the second supply air portion 480b.

The first supply air portion 480a may extend downwardly from the third discharge port 426. The first supply air portion 480a may extend vertically in the separation space 55.

The second supply air portion 480b may extend rearwardly in the separation space 55. A part of the second supply air portion 480b may be disposed in the separation space 55, and the other part of the second supply air portion 480b may be disposed outside of the separation space 55. A lower end of the second supply air portion 480b may be disposed behind the first rear panel 102.

The third supply air portion 480c may extend upwardly from the second supply air portion 480b, to be connected to the washing machine 2. An end of the third supply air portion 480c may be connected to the tub 23. The third supply air portion 480c may be disposed behind the first rear panel 102 and the second rear panel 202. The third supply air portion 480c may face the first rear panel 102 and the second rear panel 202.

The third exhaust air duct 470 may pass through the rear side of the washing machine 2 and the dryer 1, to be connected to the heating device 50. That is, without extending in the rear case 310, the third exhaust air duct 470 may extend vertically behind the first and second rear panels 102 and 202.

The third exhaust air duct 470 may include the first duct section 471 disposed in the separation space 55, and a duct extension part 472 connected to the first duct section 471.

The first duct section 471 may extend forwardly in the separation space 55. The first duct section 471 may be connected to the inlet end 42A of the heat exchange channel 42. The second exhaust air duct 440 may extend in the left-right direction under the inner panel 34, and may be connected to the first duct section 471 in the separation space 55. The air in the second exhaust air duct 440 may join the air in the first duct section 471 to flow into the heat exchange channel 42.

The first duct section 471 may include a communication hole 471a communicating with the duct extension part 472. The communication hole 471a may open rearwardly. The duct extension part 472 may be inserted into the communication hole 471a to be fixed to the first duct section 471.

The duct extension part 472 may include a first duct extension part 472a connected to the first duct section 471, and a second duct extension part 472*b* extending upwardly from the first duct extension part 472*a*.

The first duct extension part 472*a* may extend rearwardly from the first duct section 471, and may be disposed outside of the separation space 55. The first duct extension part 472*a* may be disposed behind the first rear panel 102.

The second duct extension part 472*b* may be bent upwardly from the first duct extension part 472*a*. The second duct extension part 472*b* may be connected to the tub 23. An end of the second duct extension part 472*b* may be connected to the tub 23. The second duct extension part 472*a* may be disposed behind the first rear panel 120 and the second rear panel 202. The second duct extension part 472*a* may face the first rear panel 102 and the second rear panel 202.

However, a structure of the supply air duct and the exhaust air duct which are connected to the washing machine 2 and the refresher 3 of the laundry treating apparatus B is not limited thereto. For example, it is also possible that the supply air duct is installed in the structure as illustrated in FIG. 21, and the exhaust air duct may be installed in the structure as illustrated in FIG. 23. In addition, it is also possible that the supply air duct is installed in the structure as illustrated in FIG. 23, and the exhaust air duct is installed in the structure as illustrated in FIG. 21.

Hereinafter, laundry treating apparatuses C and C" according to other embodiments of the present disclosure will be described with reference to FIGS. 24 to 30.

Referring to FIG. 24, in the laundry treating apparatus C, the dryer 1 may be disposed under the washing machine 2, and the heating device 50 may be disposed between the dryer 1 and the washing machine 2. The heating device 50 may be disposed between the first drum 13 and the tub 23.

The second upper panel 203 of the washing machine 2 and the third upper panel 303 of the refresher 3 may be disposed on the same horizontal plane.

The first lower panel 104 of the dryer 1 and the third lower panel 304 of the refresher 3 may be disposed on the same horizontal plane.

The laundry treating apparatus C may include a drawer 14 formed therein which has a space for storing water. The drawer 14 may be disposed in the first cabinet 10. The drawer 14 may be disposed adjacent to the refresher 3. The drawer 14 may be disposed at the upper portion of the dryer 1. The drawer 14 may be disposed above the first door 11.

The drawer 14 may have a first handle 141. By holding the first handle 141, a user may withdraw the drawer 14. By withdrawing the drawer 14 to the outside of the first cabinet 10, the user may remove the water stored therein.

The laundry treating apparatus C may include a detergent supply device 15 formed therein which has a space for storing detergent. The detergent supply device 15 may be disposed in the first cabinet 10. The detergent supply device 15 may be disposed farther from the refresher 3 than the drawer 14. The detergent supply device 15 may be horizontally spaced apart from the drawer 14. The detergent supply device 15 may be disposed at the upper portion of the dryer 1. The detergent supply device 15 may be disposed above the first door 11.

The detergent supply device 15 may have a second handle 151. By holding the second handle 151, the user may withdraw the detergent supply device 15. By withdrawing the detergent supply device 15 to the outside of the first cabinet 10, the user may fill the detergent supply device 15 with detergent.

The detergent stored in the detergent supply device 15 may be transferred by a detergent pump 152 (see FIG. 28) to a detergent box 28 (e.g. drawer) disposed at the upper portion of the washing machine 2.

Referring to FIG. 25, condensate generated in the heating device 50 may drop into the drawer 14.

The drain pump 26 may be disposed in the machine room S. The drain pump 26 may be separated from one side of the heat exchange channel 42. The drain pump 26 may be disposed in the case 570 of the heating device 50.

The first water supply pipe 271 may branch into the third water supply pipe 275. The third water supply pipe 275 branching off from the first water supply pipe 271 may be connected to the detergent supply device 15. The detergent supply device 15 may dissolve the detergent with water supplied through the third water supply pipe 275, and may transfer the dissolved detergent to the detergent box 28 by using the detergent pump 152 (see FIG. 28).

The machine room S may be disposed in the second cabinet 20. The machine room S may refer to a portion of the inner space of the second cabinet 20.

The dryer 1 may include the motor 133 for rotating the first drum 13. A pulley 134 may be fixed to the rotating shaft of the motor 133. A belt may connect the pulley 134 with a circumferential surface of the drum 13. The torque of the motor 133 may be transferred to the drum 13 via the pulley 134 and the belt.

The motor 133 may be disposed under the first drum 13. The motor 133 may be disposed on the upper side of the first lower panel 104. A space in which the motor 133 is disposed may be formed between the first drum 13 and the first lower panel 104.

The drawer 14 may be disposed between the first drum 13 and the tub 23. The drawer 14 may be disposed under the heating device 50. The drawer 14 may be disposed under the evaporator 53. The drawer 14 may be disposed under the drain pan 531.

The drawer 14 may be disposed in the first cabinet 10. The drawer 14 may be disposed at the upper portion of the first cabinet 10. The drawer 14 may be disposed between the first upper panel 103 and the first drum 13.

The drawer 14 may have a space 148 formed therein for storing condensate generated in the evaporator 53.

The drawer 14 may be separated from the front side of the first rear panel 102. A rear space 149, through which the first supply air duct 43 passes, may be formed between the drawer 13 and the first rear panel 102. The drawer 14 may include a rear wall 142 separated from the front side of the first rear panel 102 and facing the first rear panel 102. The rear space 149 may be formed between the first rear panel 102 and the rear wall 142.

The condensate generated in the evaporator 53 may be stored in an inner space 148 of the drawer 14. The condensate generated in the evaporator 53 may drop by gravity, to be received in the inner space of the drawer 14.

The drain pan 531 may be disposed between the evaporator 53 and the drawer 14. The condensate generated in the evaporator 53 may be temporarily stored in the drain pan 531, and then may drop into the inner space 148 of the drawer 14. However, the condensate generated in the evaporator 53 may directly drop into the drawer 14, without being stored in the drain pan 531. That is, in the case where the drain pan 531 is not provided, the drawer 14 may be disposed under the evaporator 53 to face the evaporator 53, and the condensate generated in the evaporator 53 may directly drop into the inner space 148 of the drawer 14.

The laundry treating apparatus C may include a drain pipe 532 connecting the drain pan 531 and the drawer 14. The drain pipe 532 may extend downwardly from the drain pan 531 to be connected to the drawer 14.

The drawer 14 may include the aforementioned rear wall 142, a head 145 separated from the front side of the rear wall 142, and a roof 144 extending forwardly from the rear wall 142.

The first handle 141 may be recessed into the head 145.

The laundry treating apparatus C may include a water level sensor 143 for measuring an amount of water stored in the drawer 14. The water level sensor 143 may be disposed on the rear wall 142 or may be fixed to the rear wall 142.

The roof 144 may be separated from the rear side of the head 145. The roof 144 may extend forwardly from an upper end of the rear wall 142.

The drain pan 531 may include a first hole 531a which opens downwardly. The drawer 14 may include a second hole 144a which opens upwardly. The first hole 531a and the second hole 144a may communicate with each other. The first hole 531a and the second hole 144a may vertically face each other.

The drain pipe 532 may pass through the first hole 531a and the second hole 144a. The drain pipe 532 may extend downwardly by passing through the first hole 531a, and may extend into the inner space 148 of the drawer 14 by passing through the second hole 144a. The first hole 531a and the second hole 133a may communicate with each other through the drain pipe 532. However, the first hole 531a and the second hole 144a, disposed to vertically face each other, may directly communicate with each other. Specifically, by providing the lower surface of the drain 531 at a position adjacent to the upper surface of the roof 144 so that the first hole 531 and the second hole 144a may vertically face each other, the first hole 531a and the second hole 144a may communicate with each other. In this case, the drain pan 532 may not be provided, and a separate packing may be provided between the drain pan 531 and the roof 144.

The condensate generated in the evaporator 53 may be temporarily stored in the drain pan 531, and then may be stored in the drawer 14 through the drain pipe 532.

The laundry treating apparatus C may include a second drain pipe 533 connecting the drain pump 26 and the drain pan 531. The drain pipe 532 connecting the drain pan 531 and the drawer 14 may be referred to as a "first drain pipe 532," and the drain pipe 533 connecting the drain pan 531 and the drain pump 26 may be referred to as a "second drain pipe."

The drain pump 26 may be disposed on one side of the drain pan 531, and the second drain pipe 533 may extend from the drain pan 531 in the lateral direction to be connected to the drain pump 26. The second drain pipe 533 may transfer the water, stored in the drain pan 531, to the drain pump 26. The drain pump 26 and the drain pan 531 may be disposed on the upper side of the base plate 575. The drain pump 26 may be disposed below the drain pan 531. The condensate stored in the drain pan 531 may flow into the drain pump 26 through the second drain pipe 533.

The laundry treating apparatus C may include a first valve 261a for controlling an amount of water flowing in the first pipe 261, and a second valve 533a for controlling an amount of water flowing in the second drain pipe 533.

The controller 81 may be electrically connected to the drain pump 26, the first valve 261a, and the second valve 533a.

The controller 81 may be electrically connected to the water level sensor 143, and may receive information on the amount of water, stored in the drawer 14, from the water level sensor 143. If a value measured by the water level sensor 143 is greater than or equal to a predetermined value, the controller 81 may transmit a signal to the control panel 8. The signal may display information, indicating that it is required to drain the water stored in the drawer 14, on the control panel 8. If the value measured by the water level sensor 143 is greater than or equal to a predetermined value, the control panel 8 may display information, indicating that it is required to drain the water in the drawer 14, on an external display. A user may identify information displayed on the control panel 8 and may remove the water stored in the drawer 14.

When the washing machine 2 is in operation, and the first valve 261a is open, the controller 81 may open the second valve 533a. That is, the controller 81 may open the second valve 533a so that during the operation of the washing machine 2, the condensate in the drain pan 531 may be discharged to the outside of the laundry treating apparatus C along with the water in the tub 23. The second valve 533a may be opened during a laundry-amount sensing cycle, a washing cycle, a spin-drying cycle, a rinsing cycle, and the like.

When the washing machine 2 is not in operation, and the first valve 261a is closed, the controller 81 may close the second valve 533a. That is, when the washing machine 2 is not in operation, the controller 81 may close the second valve 533a so that the condensate in the drain pan 531 may drop into the drawer 14 without flowing into the drain pump 26.

The amount of condensate stored in the drain pan 531 may be smaller than the amount of water flowing into the drain pump 26 through the first pipe 261. Accordingly, while the washing machine 2 is not in operation such that no water is introduced through the first pipe 261, if the drain pump 26 is operated to discharge the condensate in the drain pan 531, an impeller of the drain pump 26 may be rotated while not being immersed in a sufficient level of water. If the impeller is rotated while not being immersed in a sufficient level of water, the impeller may operate at idle, and an excessive heat may be generated in the impeller, thereby reducing the life span of the drain pump, as well as the energy efficiency. Accordingly, the laundry treating apparatus C of the present disclosure automatically discharges the condensate in the drain pan 531 by using the drain pump 26 only when the washing machine 2 is in operation, and when the washing machine 2 is not in operation, the laundry treating apparatus C allows the condensate to drop into the drawer 14 to store the condensate in the drawer 14.

A third valve 532a for opening and closing the first drain pipe 532 may be disposed in the first drain pipe 532. The controller 81 may be electrically connected to the third valve 532a.

When the washing machine 2 is in operation, the controller 81 may close the third valve 532a. Accordingly, when the washing machine 2 is in operation, the condensate in the drain pan 531 may be discharged by the drain pump 26.

When the washing machine 2 is not in operation, the controller 81 may open the third valve 532a. Accordingly, when the washing machine 2 is not in operation, the condensate in the drain pan 531 may drop into the drawer 14.

The drawer 14 may also be disposed between the first drum 13 and the first lower panel 104. The drawer 14 may be horizontally spaced apart from the drum motor 133. The drawer 14 may be disposed at the lower portion of the dryer 1. In this case, a large space on the lower side of the first drum 13 may be used for the drawer 14.

The washing machine 2 may include a partition wall 208 disposed in the second cabinet 20. The partition wall 208 may extend horizontally. The partition wall 208 may be disposed under the tub 23. The partition wall 208 may be disposed on the upper side of the second lower panel 204.

The machine room S may refer to a space between the partition wall 208 and the second lower panel 204. The drain pump 26 may be disposed under the partition wall 208. The drain pump 26 may be disposed in the machine room S. The first pipe 261 may extend downwardly from the tub 23 to pass through the partition wall 208. The first pipe 261 may pass through the partition wall 208 to extend into the machine room S. The first pipe 261 may be connected to the drain pump 26 in the machine room S.

A buffer material 209 may be disposed between the cover 573 and the partition wall 208. The buffer material 209 may be a damping material. The buffer material 209 may reduce vibrations generated in the washing machine 2. The washing machine 2 may include a suspension 231 connected to the tub 23. The suspension 231 may attenuate vibrations generated in the tub 23. The suspension 231 may be connected to the partition wall 208. The vibrations generated in the tub 23 and transmitted to the second case 20 may be reduced by the suspension 231 and the buffer material 209. The suspension 231 may also be connected to the cover 573.

Referring to FIG. 26, the laundry treating apparatus C may include a duct system connecting the dryer 1, the washing machine 2, the refresher 3, and the heating device 50.

The blowing duct 420 may include a first discharge port 425 connected to the first supply air duct 43. The blowing duct 420 may include a second discharge port 427 connected to the second supply air duct 45. The blowing duct 420 may include a third discharge port 426 connected to the third supply air duct 48. The blowing duct 420 may include a fourth discharge port 428 connected to the dehumidification duct 46.

The first discharge port 425 may protrude downwardly from the blowing duct 420. The first supply air duct 43 may connect the first drum 13 and the first discharge port 425.

The second discharge port 427 may protrude from the blowing duct 420 to a lateral side. The second supply air duct 45 may connect the supply air hole 308 and the second discharge port 427.

The third discharge port 426 may protrude upwardly from the blowing duct 420. The third supply air duct 48 may connect the tub 23 and the third discharge port 426.

The fourth discharge port 428 may protrude from the blowing duct 420 to a lateral side. The fourth discharge port 428 may protrude in a direction opposite to the second discharge port 427. The dehumidification duct 46 may be connected to the fourth discharge port 428.

The first supply air duct 41 may connect the first drum 13 and the heat exchange channel 42. The first exhaust air duct 41 may extend upwardly from the first drum 13 to be connected to the heat exchange channel 42.

The first inlet port 421 connected to the first exhaust air duct 41 may be formed at the inlet end 42A of the heat exchange channel 42. The first inlet port 421 may extend downwardly from the heat exchange channel 42. The first inlet port 421 may extend downwardly from the second exhaust air duct 44. The first inlet port 421 may extend downwardly from the first duct section 441.

The first inlet port 421 may protrude downwardly from the lower surface of the second exhaust air duct 44. The first exhaust air duct 41 may connect the first drum 13 and the first inlet port 421. The first exhaust air duct 41 may connect the first drum 13 and the second exhaust air duct 44. The air in the first exhaust air duct 41 may join the air in the second exhaust air duct 44 to flow into the heat exchange channel 42.

The laundry treating apparatus C may include the first opening and closing valve 41a disposed in the first exhaust air duct 41. The first opening and closing valve 41a may control a flow rate of air in the first exhaust air duct 41. The first opening and closing valve 41a may block an air flow in the first exhaust air duct 41. The first opening and closing valve 41a may block the air flow in the first exhaust air duct 41 when the hot air is not supplied into the first drum 13 through the first exhaust air duct 41.

The hot air flowing into third cabinet 30 through the second supply air duct 45 may dry the laundry placed in the third cabinet 30, and then may flow into the heat exchange channel 42 through the second exhaust air duct 44. The second supply air duct 45 and the second exhaust air duct 44 may be disposed behind the third cabinet 30.

The second exhaust air duct 44 may connect the third cabinet 30 and the heat exchange channel 42. The second exhaust air duct 44 may extend downwardly from the upper side of the third cabinet 30, to be connected to the heat exchange channel 42.

The second exhaust air duct 44 may include the first duct section 441 disposed between the heating device 50 and the second cabinet 20. The first duct section 441 may be disposed between the base plate 575 and the first upper panel 103 of the first cabinet 10. The first duct section 441 may extend forwardly and rearwardly in the separation space 55.

The second inlet port 422 connected to the second exhaust air duct 44 may be formed at the inlet end 42A of the heat exchange channel 42. The second inlet port 422 may extend downwardly from the heat exchange channel 42. The second inlet port 422 may extend downwardly from the case 570 of the heating device 50.

The laundry treating apparatus C may include the second opening and closing valve 44a disposed in the second exhaust air duct 44. The second opening and closing valve 44a may control a flow rate of air in the second exhaust air duct 44. The second opening and closing valve 44a may block an air flow in the second exhaust air duct 44. The second opening and closing valve 44a may block the air flow in the second exhaust air duct 44 when the hot air is not supplied into the third cabinet 30 through the second supply air duct 45. The second opening and closing valve 44a may be disposed in the first duct section 441.

The hot air flowing into the tub 23 through the third supply air duct 48 may dry the laundry placed in the tub 23, and then may flow into the heat exchange channel 42 through the third exhaust air duct 47.

The third exhaust air duct 47 may connect the tub 23 and the heat exchange channel 42. The third exhaust air duct 47, extending downwardly from the upper side of the tub 23, may be connected to the heat exchange channel 42.

The third inlet port 424 connected to the third exhaust air duct 47 may be formed at the inlet end 42A of the heat exchange channel 42. The third inlet port 424 may extend upwardly from the heat exchange channel 42. The third inlet port 424 may extend upwardly from the case 570 of the heating device 50.

The laundry treating apparatus C may include the third opening and closing valve 47a disposed in the third exhaust air duct 47. The third opening and closing valve 47a may control a flow rate of air in the third exhaust air duct 47. The third opening and closing valve 47a may block an air flow in the third exhaust air duct 47. The third opening and closing valve 47a may block the air flow in the third exhaust air duct 47 when the hot air is not supplied into the tub 23 through the third supply air duct 48.

The outside air inlet port 423 may protrude forwardly from one side of the second exhaust air duct 44. The outside air inlet port 423 may allow the indoor space and the second exhaust air duct 44 to communicate with each other. The air in the outside air inlet port 423 may join the air in the second exhaust air duct 44 to flow into the heat exchange channel 42. The outside air inlet port 423 may have the outside air inlet 49 that is opened forward. The air drawn in through the outside air inlet 49 may join the air in the second exhaust air duct 44 to flow into the heat exchange channel 42.

Referring to FIG. 27, the steam generator 502 disposed in the heating device 50 may supply steam to the dryer 1, the washing machine 2, and the refresher 3.

The heating device 50 may be disposed on an upper side of the first upper panel 103. The heating device 50 may be disposed in the second cabinet 20 of the washing machine 2.

The laundry treating apparatus C may include the third steam supply pipe 502c connecting the steam generator 502 and the tub 23, and the second steam supply pipe 502b connecting the steam generator 502 and the refresher 3.

The steam generator 502 may be disposed in the heating device 50. The steam generated by the steam generator 502 may be sprayed into the tub 23 through the third steam supply pipe 502c. The steam generated by the steam generator 502 may be sprayed into the inner space 33 of the refresher 3 through the second steam supply pipe 502b.

The second steam supply pipe 502b may extend from the steam generator 502 in a lateral direction, to be connected to the refresher 3.

The third steam supply pipe 502c may extend upwardly from the steam generator 502 to be connected to the tub 23.

The steam generated by the steam generator 502 may flow to each of the second drum 24 and the inner space 33 of the refresher 3 by the blowing force of the fan 60. That is, by pressurizing the steam generated by the steam generator 502, the fan 60 may cause the steam to flow to the second drum 24 and the inner space 33 of the refresher 3.

A valve for controlling an amount of steam flow may be provided for each of the second steam supply pipe 502b and the third steam supply pipe 502c. By adjusting an opening degree of the valve, the controller 81 may adjust the amount of steam supplied to each of the second drum 24 and the inner space 33 of the refresher 3.

The laundry treating apparatus C may include a second steam generator 506 disposed in the dryer 1. The laundry treating apparatus C may include a plurality of steam generators 502 and 506. The steam generator 502 disposed in the heating device 50 may be referred to as a "first steam generator," and the steam generator 506 disposed in the dryer 1 may be referred to as a "second steam generator."

The laundry treating apparatus C may include a first steam supply pipe 506a connecting the second steam generator 506 and the first drum 13, and a fourth steam supply pipe 506b connecting the second steam generator 506 and the refresher 3.

The second steam generator 506 may be disposed in the first cabinet 10. The steam generated by the second steam generator 506 may be sprayed into the first drum 13 through the first steam supply pipe 506a. The steam generated by the second steam generator 506 may be sprayed into the inner space 33 of the refresher 3 through the fourth steam supply pipe 506b.

The fourth steam supply pipe 506b may extend from the second steam generator 506 in a lateral direction, to be connected to the refresher 3.

A valve for controlling an amount of steam flow may be provided for each of the first steam supply pipe 506a and the fourth steam supply pipe 506b. By adjusting an opening degree of the valve, the controller 81 may adjust the amount of steam supplied to each of the first drum 13 and the inner space 33 of the refresher 3.

Referring to FIG. 28, the condensate generated in the heating device 50 may be stored in the drawer 14.

The separation space 55 may be formed between the base plate 575 and the first upper panel 103.

The second side panels 205 and 206 may include first protrusions 205a and 206a protruding downwardly. The second outer wall 205 may include a first outer protrusion 205a protruding downwardly. The second inner wall 106 may include a first inner protrusion 206a protruding downwardly. The first protrusions 205a and 206a may protrude downwardly from a lower end of the second side panels 205 and 206.

The first cabinet 10 may include first recesses 103a, into which the first protrusions 205a and 206a are inserted. The first recesses 103a may be formed in the first upper panel 103. The first recesses 103a may be formed at positions corresponding to the first protrusions 205a and 206a.

The support plates 576 and 577 may include second protrusions 576a and 577a protruding downwardly. The first support plate 576 may include a second outer protrusion 576a protruding downwardly. The second support plate 577 may include a second inner protrusion 577a protruding downwardly. The second protrusions 576a and 577a may protrude downwardly from a lower end of the support plates 576 and 577.

The first cabinet 10 may include second recesses 103b into which the second protrusions 576a and 577a are inserted. The second recesses 203b may be formed in the first upper panel 103. The second recesses 203b may be formed at positions corresponding to the second protrusions 576a and 577a.

The first protrusions 205a and 206b and the second protrusions 576a and 577a may be referred to as "protrusions." The first recess 103a and the second recess 203b may be referred to as "recesses."

The first cabinet 10 and the second cabinet 20 may be coupled to each other as the protrusions 205a, 206b, 576a, and 577a are inserted into the recesses 103a and 103b.

The first supply air duct 43 may protrude downwardly toward the first upper panel 103. The first supply air duct 43 may include a first connection duct 43a extending downwardly from the blowing duct 420, and a second connection duct 43b connected to the first drum 13.

The first connection duct 43a may be disposed in the separation space 55.

The second connection duct 43b may extend downwardly from the first upper panel 103 to be connected to the first drum 13. A first insertion hole 43s, into which the first connection duct 43a is inserted, may be formed on the inside of the second connection duct 43b.

The first connection duct 43a may be inserted into the first insertion hole 43s to be fixed to the second connection duct 43b.

The first inlet port 421 may be connected to the second exhaust air duct 44, and may be disposed in the separation space 55.

The first inlet port 421 may be inserted into a second insertion hole 41s, formed on the inside of the first exhaust air duct 41, to be fixed to the first exhaust air duct 41.

When the first cabinet 10 and the second cabinet 20 are assembled, the first connection duct 43a and the first inlet port 424 are inserted into the first insertion hole 43s and the second insertion hole 41s, respectively, to be fixed thereto, thereby facilitating the assembly and alignment of the first cabinet 10 and the second cabinet 20.

The drawer 14 may be disposed in the first cabinet 10 and may be disposed under the first upper panel 103.

The drawer 14 may be disposed on a front side of the first rear panel 102 and may be disposed in front of the first supply air duct 43. As the drawer 14 is disposed in front of the first supply air duct 43, interference between the first supply air duct 43 and the drawer 14 may be avoided.

The drawer 14 may be disposed below the first exhaust air duct 41. As the drawer 13 is disposed below the first exhaust air duct 41, interference between the first exhaust air duct 41 and the drawer 14 may be avoided. The first exhaust air duct 41 may extend upwardly from the first drum 13 and may avoid interference with the drawer 14 by bypassing the drawer 14 to the one side thereof. The first exhaust air duct 41 may curvedly extend along a vertical direction and may extend along the vertical direction from the outside of the drawer 14.

The first exhaust air duct 41 may include a port insertion part coupled to the first inlet port 421. The port insertion part may be connected to the first upper panel 103. The port insertion part may be disposed above the drawer 14.

The detergent supply device 15 may be disposed on one side of the drawer 14. The detergent supply device 15 may be horizontally spaced apart from the drawer 14. The detergent supply device 15 may be disposed under the first upper panel 103 and may be disposed in the first cabinet 10.

The detergent supply device 15 may be connected to the detergent pump 152 by the detergent supply pipe 153. The detergent supply device 15 may be connected to the third water supply pipe 275 branching off from the first water supply pipe 271. The detergent stored in the detergent supply device 15 may be dissolved in water supplied through the third water supply pipe 275. When the detergent pump 152 is operated, the detergent stored in the detergent supply device 15 may be fed into the detergent pump 152 through the detergent supply pipe 153. The detergent pump 152 may be connected to the detergent box 28 by a detergent transfer pipe 154. The detergent pump 152 may extrude the detergent, fed into the detergent pump 152, through the detergent transfer pipe 154 into the detergent box 28.

The second cabinet 20 may include a first drain hole 579, through which the drainpipe 532 passes. The first cabinet 10 may include a second drain hole 103c, through which the drain pipe 532 passes. The first drain hole 579 may be open at the top and bottom in a boss protruding downwardly from the base plate 575.

The drain pipe 532 may extend downwardly from the drain pan 531 to pass through the first drain hole 579. The drain pipe 532, having passed through the first drain hole 579, may extend downwardly to pass through the second drain hole 103c. The drain pipe 532, having passed through the second drain hole 103c, may extend toward the inner space 148 of the drawer 14.

The drain pipe 532, having passed through the first drain hole 579, may be disposed adjacent to the dehumidification duct 46 for heat exchange with the air flowing in the dehumidification duct 46. The drain pipe 532 may come into contact with the dehumidification duct 46. However, it is also possible that the drain pipe 532 is spaced apart from the dehumidification duct 46, and a separate heat transfer member may be disposed between the drain pipe 532 and the dehumidification duct 46. After passing through the first drain hole 579, the drain pipe 532 may come into contact with the dehumidification duct 46. After coming into contact with the dehumidification duct 46, the drain pipe 532 may pass through the second drain hole 130c. The condensate in the drain pipe 532 may pass through the first drain hole 579, and then may be heat exchanged with the air flowing in the dehumidification duct 46. The air flowing in the dehumidification duct 46 may be cooled by heat exchange with the condensate in the drain pipe 532.

Referring to FIG. 29, the heating device 50 may be disposed between the dryer 1 and the washing machine 2 and may supply hot air to each of the dryer 1, the washing machine 2, and the refresher 3.

The second supply air duct 45 and the second exhaust air duct 44, serving to circulate hot air in the refresher 3, may be disposed at a rear side of the third cabinet 30.

The second supply air duct 45 and the second exhaust air duct 44 may be disposed behind the third rear panel 302.

The second supply air duct 45 may extend downwardly from the heating device 50 to be connected to the supply air hole 308.

The second supply air duct 45 may face the first inner wall 106 of the dryer 1. The second supply air duct 45 may be disposed side by side with the first inner wall 106.

The first hot air duct 451 may include a first connection part 451a connected to the heating device 50, a first extension part 451b extending downwardly from the first connection part 451a, and a second connection part 451c connected to the second hot air duct 452.

The first connection part 451a may pass through the second inner wall 206 of the second cabinet 20. The first connection part 451a may be connected to the blowing duct 420, and the air blown by the fan 60 may be introduced through the first connection part 451a. The first connection part 451a may extend horizontally from the heating device 50.

The first extension part 451b may be bent downwardly from the first connection part 451a. The first extension part 451b may extend downwardly from one end of the first connection part 451a. The first extension part 451b may face the first inner wall 106 of the dryer 1 and may be disposed side by side with the first inner wall 106.

The second connection part 451c may be connected to the third rear panel 302 of the third cabinet 30. The second connection part 451c may be connected to the second hot air duct 452. The second connection part 451c may extend from the first extension part 451b in the front-rear direction.

The second exhaust air duct 44 may include a first duct section 441 connected to the exhaust air hole 309, a second duct section 442 extending downwardly from the first duct section 441, and a fourth connection part 443 connected to the heating device 50.

The first duct section 441 may be connected to the third rear panel 302 of the third cabinet 30. The first duct section 441 may communicate with the inner space 33 of the refresher 3, and air circulating in the refresher 3 may flow to the first duct section 441. The first duct section 441 may extend rearwardly from the third cabinet 30. A position where the first duct section 441 and the third cabinet 30 are connected may be between the third upper panel 303 and the hanger 36.

The second duct section 442 may be bent downwardly from the first duct section 441. The second duct section 442 may extend downwardly from the first duct section 441. The second duct section 442 may extend downwardly from one end of the first duct section 441. The second connection part 442 may face the second inner wall 206 of the washing machine 2 and may be disposed side by side with the second inner wall 206.

The fourth connection part 443 may extend into the separation space 55. The fourth connection part 443 may extend from the second duct section 442 in the left-right direction. The fourth connection part 443 may be connected to the heating device 50 in the separation device 55.

Referring to FIG. 30, the laundry treating apparatus C' according to another embodiment of the present disclosure may include the dryer 1, the refresher 3, and the heating device 50.

The laundry treating apparatus C' according to another embodiment of the present disclosure may not include a washing machine.

The heating device 50 may be disposed on the upper side of the dryer 1. The heating device 50 may be disposed on a lateral side of the refresher 3.

The heating device 50 may include the cover 573 disposed on an upper side of the heat exchange channel 42. The cover 573 may form an upper surface of the heating device 50.

The cover 573 may shield an upper portion of the heat exchange channel 42. The cover 573 may be disposed on an upper side of the condenser 52 and the evaporator 53.

A user may remove the cover 573 from the heating device 50. When the user removes the cover 573, the condenser 52, the evaporator 53, and the fan 60 may be exposed to the outside. The user may clean the condenser 52, the evaporator 53, and the fan 60 exposed to the outside. That is, as no structure is disposed on the upper side of the heating device 50, the user may clean the inner structures of the heating device 50 by removing the cover 573.

Hereinafter, laundry treating apparatuses D and D' according to other embodiments of the present disclosure will be described with reference to FIGS. 31 to 36.

Referring to FIG. 31, in the laundry treating apparatus D, the dryer 1 is disposed over the washing machine 2, and the heating device 50 may be disposed at a lower portion of the washing machine 2. The heating device 50 may be disposed under the tub 23.

The heating device 50 may be disposed in the second cabinet 20. The heating device 50 may be disposed on a lower side of the inner space of the second cabinet 20.

The drain pump 26 may be disposed in the machine room S. The drain pump 26 may be disposed in the case 570 of the heating device 50 (see FIG. 33).

The condensate collected in the drain pan 531 may be extruded by the drain pump 26 to be discharged to the outside of the laundry treating apparatus D through a second pipe 262.

Referring to FIG. 32, the laundry treating apparatus D includes a duct system connecting the dryer 1, the washing machine 2, the refresher 3, and the heating device 50.

The blowing duct 420 may include a first discharge port 425 connected to the first supply air duct 43. The blowing duct 420 may include a second discharge port 427 connected to the second supply air duct 45. The blowing duct 420 may include a third discharge port 426 connected to the third supply air duct 48. The blowing duct 420 may include a fourth discharge port 428 connected to the dehumidification duct 46.

The first discharge port 425 may protrude downwardly from the blowing duct 420. The first supply air duct 43 may connect the first drum 13 and the first discharge port 425.

The second discharge port 427 may protrude from the blowing duct 420 to a lateral side. The second supply air duct 45 may connect the supply air hole 308 and the second discharge port 427.

The third discharge port 426 may protrude upwardly from the blowing duct 420. The third supply air duct 48 may connect the tub 23 and the third discharge port 426.

The fourth discharge port 428 may protrude from the blowing duct 420 to a lateral side. The fourth discharge port 428 may protrude in a direction opposite to the second discharge port 427. The dehumidification duct 46 may be connected to the fourth discharge port 428.

The hot air flowing into the first drum 13 through the first supply air duct 43 may dry the laundry placed in the first drum 13, and then may flow into the heat exchange channel 42 through the first exhaust air duct 41. The first drum 13 may include the front cover 131 disposed on a front side, and the rear cover 132 disposed on a rear side. The first supply air duct 43 may be connected to the rear cover 132, and the first exhaust air duct 41 may be connected to the front cover 131.

The first exhaust air duct 41 may connect the first drum 13 and the heat exchange channel 42. The first exhaust air duct 41 may extend downwardly from the first drum 13 to be connected to the heat exchange channel 42.

The motor 133 rotating the first drum 13 may be disposed on the upper side of the second cabinet 20. The motor 133 may be disposed on one side of the first exhaust air duct 41. The motor 133 may be disposed side by side with the first exhaust air duct 41 in a horizontal direction.

After extending downwardly from the first drum 13, the first exhaust air duct 41 may be bent horizontally. The first exhaust air duct 41 may be disposed under the first drum 13. A portion of the first exhaust air duct 41 may extend horizontally in the first cabinet 10.

A space, in which the portion of the first exhaust air duct 41 and the motor 133 are received, may be formed under the first drum 13. The first exhaust air duct 41 extends horizontally under the first drum 13, and then may extend to the outside of the first cabinet 10.

The first inlet port 421 connected to the first exhaust air duct 41 may be formed at the inlet end 42A of the heat exchange channel 42. The first inlet port 421 may extend downwardly from the heat exchange channel 42. The first inlet port 421 may extend downwardly from the case 570 of the heating device 50.

The first exhaust air duct 41 may include the first duct section 411 disposed between the heating device 50 and the second cabinet 20. The first duct section 411 may be disposed between the base plate 575 and the second lower panel 204 of the second cabinet 20. The first duct section 411 may extend forwardly and rearwardly in the separation space 55.

The laundry treating apparatus D may include the first opening and closing valve 41a disposed in the first exhaust air duct 41. The first opening and closing valve 41a may control an amount of air flowing in the first exhaust air duct 41. The first opening and closing valve 41a may block an air flow in the first exhaust air duct 41. The first opening and closing valve 41a may block the air flow in the first exhaust air duct 41 when the hot air is not supplied into the first drum 13 through the first supply air duct 43.

The hot air flowing into third cabinet 30 through the second supply air duct 45 may dry the laundry placed in the third cabinet 30, and then may flow into the heat exchange channel 42 through the second exhaust air duct 44. The second supply air duct 45 may pass through the third rear panel 302 of the third cabinet 30. The second supply air duct 45 may connect the heat exchange channel 42 and the supply air hole 308. The second exhaust air duct 44 may pass through the third inner wall 306.

The second exhaust air duct 44 may connect the refresher 3 and the heat exchange channel 42. The second exhaust air duct 44 may connect the exhaust air hole 309 and the heat exchange channel 42. The second exhaust air duct 44 may extend from the lower portion of the third cabinet 30 to the lateral side to be connected to the heat exchange channel 42.

The second inlet port 422 connected to the second exhaust air duct 44 may be formed at the inlet end 42A of the heat exchange channel 42. The second inlet port 422 may extend downwardly from the heat exchange channel 42. The second inlet port 422 may extend downwardly from the first exhaust air duct 41. The second inlet port 422 may extend downwardly from the first duct section 411.

The second inlet port 422 may protrude downwardly form a lower surface of the first exhaust air duct 41. The second exhaust air duct 44 may connect the exhaust air hole 309 and the second inlet port 422. The second exhaust air duct 44 may connect the exhaust air hole 309 and the first exhaust air duct 41. The air in the second exhaust air duct 44 may join the air in the first exhaust air duct 41 to flow into the heat exchange channel 42.

The laundry treating apparatus D may include the second opening and closing valve 44a disposed in the second exhaust air duct 44. The second opening and closing valve 44a may control a flow rate of air in the second exhaust air duct 44. The second opening and closing valve 44a may block an air flow in the second exhaust air duct 44. The second opening and closing valve 44a may block the air flow in the second exhaust air duct 44 when the hot air is not supplied into the third cabinet 30 through the second supply air duct 45.

The hot air flowing into the tub 23 through the third supply air duct 48 may dry the laundry placed in the tub 23, and then may flow into the heat exchange channel 42 through the third exhaust air duct 47.

The third exhaust air duct 47 may connect the tub 23 and the heat exchange channel 42. The third exhaust air duct 47 may extend downwardly from the upper portion of the tub 23 to be connected to the heat exchange channel 42.

The third inlet port 424 connected to the third exhaust air duct 47 may be formed at the inlet end 42A of the heat exchange channel 42. The third inlet port 424 may extend upwardly from the heat exchange channel 42. The third inlet port 424 may extend upwardly from the case 570 of the heating device 50.

The laundry treating apparatus D may include the third opening and closing valve 47a disposed in the third exhaust air duct 47. The third opening and closing valve 47a may control a flow rate of air in the third exhaust air duct 47. The third opening and closing valve 47a may block an air flow in the third exhaust air duct 47. The third opening and closing valve 47a may block the air flow in the third exhaust air duct 47 when the hot air is not supplied into the tub 23 through the third supply air duct 48.

The outside air inlet port 423 may protrude forwardly from one side of the first exhaust air duct 41. The outside air inlet port 423 may allow the indoor space and the first exhaust air duct 41 to communicate with each other. The air in the outside air inlet port 423 may join the air in the first exhaust air duct 41 to flow into the heat exchange channel 42. The outside air inlet port 423 may have the outside air inlet 49 that is opened forward. The air drawn in through the outside air inlet 49 may join the air in the first exhaust air duct 41 to flow into the heat exchange channel 42.

Referring to FIG. 33, the drain pump 26 may be disposed in the heating device 50.

The drain pump 26 may be disposed in the heating device 50. The drain pump 26 may be disposed in the machine room S. The drain pump 26 may be disposed in the second cabinet 20. In the case where the machine room S is disposed in the second cabinet 20, the drain pump 26 may be disposed in the machine room S which is a portion of the inner space of the second cabinet 20. The drain pump 26 may be disposed between the cover 573 and the base plate 575. The drain pump 26 may be disposed under the tub 23 and may be disposed at the same height as the evaporator 53 or at a lower height than the evaporator 53.

The cover 573 may include a shielding wall 573a protruding downwardly. The shielding wall 573a may separate a space, in which the drain pump 26 is disposed, from the heat exchange channel 42. The shielding wall 573a may block the air in the heat exchange channel 42 from flowing toward the drain pump 26. The shielding wall 573a may be connected to the second side wall 572 and the front wall 574. The drain pump 26 may be disposed on one side of the shielding wall 573a, and the heat exchange channel 42 may be disposed on the other side of the shielding wall 573a. The drain pipe 532 may pass through the shielding wall 573a to be connected to the drain pump 26.

The drain pump 26 may be connected to the drain pan 531 through the drain pipe 532. The drain pump 26 may discharge the condensate, introduced through the drain pipe 532, to the outside of the laundry treating apparatus D through the second pipe 262. The drain pump 26 may discharge the water in the tub 23, introduced through the first pipe 261, to the outside of the laundry treating apparatus D through the second pipe 262.

The drain pump 26 may cool the hot air in the second supply air duct 45 by using the condensate introduced through the drain pipe 532.

The drain pump 26 may include a coolant supply pipe 265, through which water flowing into the drain pump 26 is discharged, and a coolant return pipe 268, through which the water discharged through the coolant supply pipe 265 flows into the drain pump 26.

The water in the tub 23 and the condensate in the drain pan 531 may flow into the drain pump 26 and may be extruded by the drain pump 26 to be discharged through the coolant supply pipe 265. The coolant supply pipe 265 may include a flow control valve 266 for controlling a flow amount of water discharged through the coolant supply pipe 265. The flow control valve 26 may be electrically connected to the controller 81. By adjusting an opening degree of the flow control valve 266, the controller 81 may control the flow amount of water discharged through the coolant supply pipe 265.

The coolant supply pipe 265 may include a heat exchanger 267 disposed to heat exchange with the second supply air duct 45. The coolant supply pipe 265 may extend from the drain pump 26 toward the second supply air duct 45, to surround the second supply air duct 45. A portion of the coolant supply pipe 265 that surrounds the second supply air duct 45 may be defined as the heat exchanger 267. The coolant supply pipe 265 may come into contact with the second supply air duct 45 or may be disposed to surround the second supply air duct 45. In addition, the coolant supply pipe 265 may be disposed adjacent to the second supply air duct 45, or a separate heat exchange member may be disposed between the coolant supply pipe 265 and the second supply air duct 45.

The heat exchanger 267 may be disposed to surround the second hot air duct 452. After surrounding the second hot air duct 452, the heat exchanger 267 may extend across the first hot air duct 451 toward the drain pump 26. Water flowing in the heat exchanger 267 may be heat exchanged with hot air flowing in the second supply air duct 45 and may cool the hot air.

The water flowing through the coolant supply pipe 265 may flow into the drain pump 26 through the coolant return pipe 268. The water, heat exchanged with the hot air in the second supply air duct 45 by the heat exchanger 267, may flow into the drain pump 26 through the coolant return pipe 268. The coolant supply pipe 265, the heat exchanger 267, and the coolant return pipe 268 may be integrally formed with each other. A check valve 269 for preventing backflow of water may be disposed in the coolant return pipe 268. The check valve 269 may prevent the water in the drain pump 26 from flowing backward to the heat exchanger 267 through the coolant return pipe 268. Accordingly, the water flowing into the drain pump 26 may be discharged to the coolant supply pipe 265 to return to the drain pump 26 through the coolant return pipe 268 and may be prevented from flowing backward.

The water flowing into the drain pump 26 through the coolant return pipe 268 may be discharged to the outside of the laundry treating apparatus D through the second pipe 262. The water used for cooling the second supply air duct 45 may be discharged to the outside of the laundry treating apparatus D by the drain pump 26.

The above description of the cooling structure using the drain pump 26 and the coolant supply pipe 265 may also be applied to a method of cooling the dehumidification duct 46. The coolant supply pipe 265 may extend from the drain pump 26 to surround the dehumidification duct 46 and may include the heat exchanger 267. The water flowing in the heat exchanger 267 may cool the hot air in the dehumidification duct 46. After cooling the hot air in the dehumidification duct 46, the water may return to the drain pump 26 through the coolant return pipe 268.

A detailed description of the method of cooling the dehumidification duct 46 may also be applied to a method of cooling the second supply air duct 45.

At least a portion of the second pipe 262 may be disposed adjacent to the second supply air duct 45. The second pipe 262 may extend from the drain pump 26 to the outside of the laundry treating apparatus D. and a part of the extended portion thereof may be heat exchanged with the second supply air duct 45. At least a portion of the second pipe 262 may be disposed to surround the second supply air duct 45 and may come into contact with the second supply air duct 45. The water flowing in the second pipe 262 may cool the hot air in the second supply air duct 45. At least a portion of the second pipe 262 may be disposed adjacent to the second supply air duct 45, and a separate heat transfer member may be disposed between the second pipe 262 and the second supply air duct 45.

At least a portion of the second pipe 262 may be disposed adjacent to the dehumidification duct 46. The second pipe 262 may extend from the drain pump 26 to the outside of the laundry treating apparatus D, and a part of the extended portion thereof may be disposed adjacent to the dehumidification duct 46. At least a portion of the second pipe 262 may be disposed to surround the dehumidification duct 46 and may come into contact with the dehumidification duct 46. The water flowing in the second pipe 262 may cool the hot air in the dehumidification duct 46. At least a portion of the second pipe 262 may be disposed adjacent to the dehumidification duct 46, and a separate heat transfer member may be disposed between the second pipe 262 and the dehumidification duct 46.

A method of cooling the hot air flowing in the second supply air duct 45 and the dehumidification duct 46 may selectively employ either the above method of using the coolant supply pipe 265 (hereinafter referred to as a "first method") or the above method of using the second pipe 262 (hereinafter referred to as a "second method"). However, as the method of cooling the hot air flowing in the second supply air duct 45 and the dehumidification duct 46, the laundry treating apparatus D of the present disclosure may use both the first and second methods at the same time.

The laundry treating apparatus D may include a circulation pipe 263 connected to the drain pump 26, and spraying the condensate, introduced into the drain pump 26 through the drain pipe 532, toward the evaporator 53.

The circulation pipe 263 may extend from the drain pump 26 toward the evaporator 53. The drain pump 26 may extrude the condensate, introduced through the drain pipe 532, into the circulation pipe 263. In addition, the drain pump 26 may also extrude the water in the tub 23, which is introduced through the first pipe 261, into the circulation pipe 263.

A nozzle 264 may be disposed at one end of the circulation pipe 263. The nozzle 264 may be disposed toward the evaporator 53. The condensate flowing through the circulation pipe 263 may be sprayed by the nozzle 264 onto the evaporator 53.

The condensate sprayed onto the evaporator 53 may clean the surface of the evaporator 53, and then may be collected in the drain pan 531. The condensate collected in the drain pan 531 may flow into the drain pump 26 again through the drain pipe 532.

The laundry treating apparatus D may include a valve 263a disposed in the circulation pipe 263. The valve 263a may be electrically connected to the controller 81. The controller 81 may control an opening degree of the valve 263a.

The laundry treating apparatus D may clean the evaporator 53 by using the circulation pipe 263 and the nozzle 264. Further, the laundry treating apparatus D may readily discharge the condensate used for cleaning to the outside thereof by using the drain pan 531 and the drain pipe 532. As described above, the cleaning method using the condensate may also be applied to a method of cleaning the condenser 52.

Referring to FIG. 34, the heating device 50 may supply hot air to each of the dryer 1, the washing machine 2, and the refresher 3.

The second supply air duct 45 for circulating hot air in the refresher 3 may be disposed at a rear side of the third cabinet 30. The second exhaust air duct 44 may be disposed under the inner panel 34.

The second supply air duct 45 may be disposed behind the third rear panel 302.

The second supply air duct 45 may extend from the heating device 50 in a lateral direction to be connected to the supply air hole 308.

The second supply air duct 45 may pass through the second inner wall 206 of the washing machine 2. The second supply air duct 45 may pass through the second inner wall 206 to extend into the rear case 310.

The first hot air duct 451 may pass through the second inner wall 206 of the second cabinet 20. The first hot air duct 451 may be connected to the blowing duct 420, and air blown by the fan 60 may flow into the first hot air duct 45. The first hot air duct 451 may extend horizontally from the heating device 50.

The second hot air duct 452 may be bent upwardly from the first hot air duct 451. The second hot air duct 452 may extend upwardly from one end of the first hot air duct 451. The second hot air duct 452 may be disposed in a storage space 35 of the refresher 3 and may be disposed under the inner panel 34.

The third rear panel 302 may be disposed between the second hot air duct 452 and the first hot air duct 451.

The supply air hole 308 for supplying hot air into the inner space 33 of the refresher 3 may be disposed at the lower portion of the refresher 3. As the heating device 50 and the supply air hole 308 are disposed on the lower side of the laundry treating apparatus D, the second supply air duct 45 connecting the heating device 50 and the supply air hole 308 may be reduced in length, thereby minimizing heat loss occurring when the air heated by the heating device 50 flows toward the supply air hole 308. In addition, the hot air supplied by the heating device 50 may be discharged to the inner space 33 through the supply air hole 308 disposed at the lower portion of the refresher 3, such that the hot air may be distributed uniformly over the upper side of the refresher 3.

The second exhaust air duct 44 may be disposed under the inner panel 34. The second exhaust air duct 44 may be connected to the exhaust air hole 309 formed in the inner panel 34.

The second exhaust air duct 44 may extend in the left-right direction, to be connected to the heating device 50. The second exhaust air duct 44 may be connected to the first exhaust air duct 41. The second exhaust air duct 44 may be connected to the first exhaust air duct 41 by passing through the support plate 577.

The first supply air duct 43 may extend upwardly from the heating device 50. The first supply air duct 43 may be coupled to the blowing duct 420. The first supply air duct 43 may face the second rear panel 202. The first supply air duct 43 may extend upwardly from the blowing duct 420 and may be connected to the first drum 13 by passing through the first rea panel 102. The first drum 13 may be supplied with the hot air, heated by the heating device 50, through the first supply air duct 43.

The first supply air duct 43 may include a first supply air portion 431 connected to the heating device 50, a second supply air portion 432 extending upwardly from the first supply air portion 431, and a third supply air portion 433 connected to the first drum 13.

The first supply air portion 431 may be coupled to the blowing duct 420. The first supply air portion 431 may be disposed in the separation space 55.

The second supply air portion 432 may extend upwardly from an end of the first supply air portion 431. The second supply air portion 432 may face the second rear panel 202 and the first rear panel 102.

The third supply air portion 433 may extend forwardly from an upper end of the second supply air portion 432. The third supply air portion 433 may be coupled to the first drum 13 by passing through the first rear panel 102. The third supply air portion 433 may be coupled to the rear cover 132.

The first exhaust air duct 41 may extend from the first drum 13 to pass through the first inner wall 106.

The first exhaust air duct 41 may include a first opening and closing valve 41*a* passing through the first inner wall 106 to be connected to the first drum 13, a second exhaust air portion 41*b* extending downwardly from the first opening and closing valve 41*a*, and a third exhaust air portion 41*c* bent from the second exhaust air portion 41*b* to extend to a lateral side.

The first opening and closing valve 41*a* may pass through the first inner wall 106 to extend horizontally. The first opening and closing valve 41*a* may extend forwardly and rearwardly in the first cabinet 10, to be coupled to the front cover 131.

The second exhaust air portion 41*b* may extend downwardly from the first opening and closing valve 41*a* or may face the second inner wall 206.

The third exhaust air portion 41*c* may be bent from the second exhaust air portion 41*b* to the lateral side and may be connected to the first duct section 411. The third exhaust air portion 41*c* may pass through the support plate 577 to be connected to the first duct section 411. However, the third exhaust air portion 41*c* may be a concept that encompasses the first duct section 411.

The second exhaust air duct 44 may pass through the support plate 577. The second supply air duct 45 may pass through the second inner wall 206.

The fan 60 may be disposed closer to the second inner wall 206 than to the second outer wall 205. The fan 60 may be disposed adjacent to the refresher 3. The fan 60 may be disposed closer to the second rear panel 202 than to the second front panel 201. The fan 60 may be disposed behind the third rear panel 302 of the refresher 3. The fan 60 may be disposed between the tub 23 and the second lower panel 204. The fan 60 may be disposed between the base plate 575 and the tub 23.

The switching device 70 for controlling the supply of air to the first supply air duct 43, the second supply air duct 45, and the third supply air duct 48 may be disposed at a height corresponding to the lower portion of the refresher 43. The switching device 70 may be disposed under the tub 23. The switching device 70 may be disposed between the tub 23 and the second lower panel 204. The switching device 70 may be disposed between the tub 23 and the base plate 575.

In the above arrangement structure, the length of the first supply air duct 43 and the second supply air duct 45 may be minimized. That is, the fan 60 and the switching device 70 are disposed adjacent to both the first drum 13 and the refresher 3, such that the length of the first supply air duct 43 and the second supply air duct 45 may be minimized, thereby reducing heat loss occurring when the air heated by the heating device 50 flows through the first supply air duct 43 and the second supply air duct 45.

The laundry treating apparatus D may include the steam generators 502 and 506. The stream generator 502 disposed in the heating device 50 may be referred to as a "first steam generator." and the steam generator 506 disposed in the dryer 1 may be referred to as a "second steam generator."

The steam generator 502 may be connected to the tub 23 by the third steam supply pipe 502*c*. The steam generator 502 may be connected to the refresher 3 by the second steam supply pipe 502*b*. The steam generated by the steam generator 502 may be supplied into the second drum 24 through the third steam supply pipe 502*c*. The steam generated by the steam generator 502 may be supplied into the inner space 33 of the refresher 3 through the second steam supply pipe 502*b*.

The steam generator 502 may be disposed adjacent to the fan 60. The steam generated by the steam generator 502 may be supplied into the second drum 24 and/or the inner space 33 of the refresher 3 by a blowing force of the fan 60.

In the above arrangement structure, the length of the second steam supply pipe 502*b* and the third steam supply pipe 502*c* may be minimized. That is, the fan 60 and the steam generator 502 are disposed adjacent to both the second drum 24 and the refresher 3, such that the length of the second steam supply pipe 502*b* and the third steam supply pipe 502*c* may be minimized, thereby reducing heat loss occurring when the steam generated by the steam generator 502 flows through the second steam supply pipe 502*b* and the third steam supply pipe 502*c*.

The laundry treating apparatus D may include the second steam generator 506. The second steam generator 506 may generate steam by heating water. The second steam generator 506 may be disposed in the first cabinet 10. The second steam generator 506 may be connected to the water supply pipes 278 and 279. The second steam generator 506 may be supplied with water through the water supply pipes 278 and 279.

The second steam generator 506 may be connected to the first drum 13 by the first steam supply pipe 506*a*. The second steam generator 506 may be connected to the refresher 3 by the fourth steam supply pipe 506*b*. The steam generated by the second steam generator 506 may be supplied into the first drum 13 through the first steam supply pipe 506*a*. The steam generated by the second steam generator 506 may be supplied into the inner space 33 of the refresher 3 through the fourth steam supply pipe 506*b*.

The fourth steam supply pipe 506*b* may be connected to the upper portion of the refresher 3. The steam flowing into the inner space 33 of the refresher 3 through the fourth steam supply pipe 506*b* may be distributed uniformly to the lower side thereof.

The second steam generator 506 may be disposed closer to the first inner wall 106 than to the first outer wall 105. The second steam generator 506 may be disposed closer to the first rear panel 102 than to the first front panel 101.

In the above arrangement structure, the length of the first steam supply pipe 506*a* and the fourth steam supply pipe 506*b* may be minimized. That is, the second steam generator 506 is disposed adjacent to both the first drum 13 and the refresher 3, such that the length of the first steam supply pipe 506*a* and the fourth steam supply pipe 506*b* may be minimized, thereby preventing loss of steam which occurs when the steam generated by the second steam generator 506 flows through the first steam supply pipe 506*a* and the fourth steam supply pipe 506*b*.

Referring to FIG. 35, the heating device 50 may be connected to the duct system.

The base plate 575 of the heating device 50 may be disposed above the second lower panel 204. The separation space 55 may be formed under the base plate 575.

The separation space 55 may be formed between the first support plate 576 and the second support plate 577.

The laundry treating apparatus D may include the auxiliary panel 58 and the second lower panel 204.

The auxiliary panel 58 may shield a rear side of the separation space 55. The auxiliary panel 58 may be connected to the second rear panel 202 and the second side panels 205 and 206.

The auxiliary panel 58 may include a duct through hole 58*a*, through which the first supply air duct 43 passes.

A portion of the first supply air duct 43 may be disposed in the separation space 55. A portion of the first supply air portion 431 may be disposed in the separation space 55.

The first supply air portion 431 may include a connection part 431*a* connected to the blowing duct 420, and an extension part 431*b* extending rearwardly from the connection part 431*a*.

The connection part 431*a* may extend upwardly and downwardly. The connection part 431*a* may extend downwardly from the blowing duct 420. The connection part 431*a* may extend downwardly from the first discharge port 425.

The extension part 431*b* may extend rearwardly from a lower end of the connection part 431*a*. The extension part 431*b* may pass through the duct through hole 58*a* to extend rearwardly.

The second supply air portion 432 may extend upwardly from a lower end of the extension part 431*b*. The second supply air portion 432 may extend upwardly behind the auxiliary panel 58.

The second lower panel 204 may shield a lower side of the separation space 55. The second lower panel 204 may be coupled to the support plates 576 and 577 and the auxiliary panel 58.

The first support plate 576 may include a first protrusion 576*a* protruding downwardly. The second support plate 577 may include a second protrusion 577*a* protruding downwardly. The first protrusion 576*a* and the second protrusion 577*a* may be referred to as "protrusions."

The second lower panel 204 may include recesses 204*a*, into which the protrusions 576*a* and 577*a* are inserted. The recesses 204*a* may be recessed downwardly from the upper surface of the second lower panel 204.

As the protrusions 576*a* and 577*a* are inserted into the recesses 204*a*, the second lower panel 204 may be coupled to the heating device 50.

The dehumidification duct 46 and the first exhaust air duct 41 may be disposed in the separation space 55. The first exhaust air duct 41 disposed in the separation space 55 may be defined as the first duct section 411, and the dehumidification duct 46 disposed in the separation space 55 may be defined as the second duct section 461.

The dehumidification duct 46 may extend forwardly and rearwardly. The hot air outlet 462 may be formed on a front side of the dehumidification duct 46. The air heated by the heating device 50 may be blown by the fan 60 to be supplied to the indoor space through the dehumidification duct 46.

The first exhaust air duct 41 may extend forwardly and rearwardly. The outside air inlet port 423 may be formed on a front side of the first exhaust air duct 41. The air in the indoor space may flow into the first exhaust air duct 41 through the outside air inlet port 423.

The second exhaust air duct 44 may extend horizontally and may extend into the separation space 55. The second exhaust air duct 44 may pass through the third inner wall 306 and the second support plate 577. The second exhaust air duct 44 may be connected to the first exhaust air duct 41 in the separation space 55. The air in the second exhaust air duct 44 may join the air in the first exhaust air duct 41 to flow into the heat exchange channel 42.

Referring to FIG. 36, the heating device 50 of the laundry treating apparatus D' may be connected to the dryer 1 by the supply air duct 430 and the exhaust air duct 410.

The first supply air duct 430 may branch off from the second supply air duct 450. Without being directly connected to the heating device 50, the first supply air duct 430 may branch off from the second supply air duct 450. When the first supply air duct 430 branches off from the second supply air duct 450, the first discharge port 425 may not be formed. The first supply air duct 430 may extend upwardly from the first hot air duct 451. The first supply air duct 430 may branch off from the first hot air duct 451.

The first exhaust air duct 410 may join the second exhaust air duct 440. Without being directly connected to the heating device 50, the first exhaust air duct 410 may join the second exhaust air duct 440.

The first supply air duct 430 may include the first supply air portion 436 connected to the second supply air duct 450, and the second supply air portion 437 connected to the first drum 13.

The first supply air portion 436 may extend upwardly from the second supply air duct 450. The first supply air portion 436 may be disposed behind the third rear panel 302. The first supply air portion 436 may face the second side panel 206.

The second supply air portion 437 may extend from an upper end of the first supply air portion 436 to the lateral side. The second supply air portion 437 may extend into the first cabinet 10. The second supply air portion 437 may be coupled to the rear cover 132 of the first drum 13.

The laundry treating apparatus D' may include a control valve 453 which is disposed at a position where the first supply air duct 430 branches off form the second supply air duct 450.

The control valve 453 may control a flow direction of air flowing in the second supply air duct 45. The control valve 453 may control a direction of air flowing in the first hot air duct 451. The control valve 453 may open and close the second hot air duct 452 and the first supply air duct 430. The control valve 453 may open only either the second hot air duct 452 or the first supply air duct 430. The control valve 453 may open both the second hot air duct 452 and the first supply air duct 430. The control valve 453 may control a flow amount of air supplied to the second hot air duct 452 or the first supply air duct 430. The control valve 453 may distribute the air, blown by the fan 60 to the second supply air duct 45, to the second hot air duct 452 and the first supply air duct 430.

The controller 81 may control the control valve 453. By controlling the control valve 453, the controller 81 may supply the hot air, supplied from, the fan 60 to the second supply air duct 450, into the inner space 33 of the refresher 3. By controlling the control valve 453, the controller 81 may supply the hot air, supplied from the fan 60 to the second supply air duct 45, into the first drum 13.

The first exhaust air duct 410 may pass through the rear side of the refresher 3 to join the second exhaust air duct 440. That is, the first exhaust air duct 410 may extend in the rear case 310. The first exhaust air duct 410 may pass through the third rear panel 302 to join the second exhaust air duct 440. The air flowing out of the first drum 13 may pass through the first exhaust air duct 410 to join the air flowing in the second exhaust air duct 440.

The first exhaust air duct 410 may include a first exhaust air portion 413 connected to the first drum 13, a second exhaust air portion 414 extending downwardly from the first exhaust air portion 413, and a third exhaust air portion 415 connected to the second exhaust air portion 440.

A part of the first exhaust air portion 413 may be disposed in the first cabinet 10. The first exhaust air portion 413 may be coupled to the first drum 13. A part of the first exhaust air portion 413 may extend forwardly and rearwardly in the first cabinet 10. The first exhaust air portion 413 may pass through the first inner wall 106 to extend into the rear case 310. The first exhaust air portion 413 may extend horizontally from the rear side of the third rear panel 302.

The second exhaust air portion 414 may extend downwardly from an end of the first exhaust air portion 413. The second exhaust air portion 414 may face the third rear panel 302. The second exhaust air portion 414 may be disposed in the rear case 310.

The third exhaust air portion 415 may extend forwardly from a lower end of the second exhaust air portion 414. The third exhaust air portion 415 may pass through the third rear panel 302 to extend forwardly. The third exhaust air portion 415 may join the second exhaust air duct 440.

However, a structure of the supply air duct and the exhaust air duct, which are connected to the dryer 1 and the refresher 3, is not limited to the above examples. For example, it is also possible that the supply air duct is installed in the structure as illustrated in FIG. 34, and the exhaust air duct is installed in the structure as illustrated in FIG. 36. In addition, it is also possible that the supply air duct is installed in the structure as illustrated in FIG. 36, and the exhaust air duct may be installed in the structure as illustrated in FIG. 34.

Hereinafter, laundry treating apparatuses E, E', and E" according to other embodiments of the present disclosure will be described with reference to FIGS. 37 to 44.

Referring to FIG. 37, in the laundry treating apparatus E, the dryer 1 may be disposed over the washing machine 2, the heating device 50 may be disposed over the dryer 1 and the washing machine 2. The heating device 50 may be disposed in the first cabinet 10 or may be disposed over the first drum 13.

The heating device 50 may be provided separately from the dryer 1. The heating device 50 may be disposed on the upper side of the first cabinet 10.

Referring to FIG. 38, the heating device 50 may be disposed above the tub 23 and the first drum 13.

The motor 133 rotating the first drum 13 may be disposed under the first drum 13. The motor 133 may be disposed in the first cabinet 10 and may be placed on the upper side of the first lower panel 104.

The machine room S may be a portion of the inner space of the first cabinet 10. The machine room S may refer to an upper space of the first cabinet 10. The heating space 50 may be disposed in the machine room S.

The laundry treating apparatus E may include a partition wall 108 disposed in the first cabinet 10. The heating device 50 may be disposed on an upper side of the partition wall 108.

The partition wall 108 may separate a space, in which the first drum 13 is disposed, from the machine room S. The partition wall 108 may be disposed between the heating device 50 and the first drum 13.

The partition wall 108 may be integrally formed with the first cabinet 10 or may be separated from the first cabinet 10.

The heating device 50 may be disposed between the partition wall 108 and the first upper panel 103. The machine room S may be formed between the partition wall 108 and the first upper panel 103. However, in the laundry treating apparatus according to another embodiment of the present disclosure, the heating device 50 may be disposed on the upper side of the first cabinet 10, in which case the heating device 50 may also be disposed on the upper side of the first upper panel 103 or may include a separate case.

Referring to FIG. 39, the laundry treating apparatus E includes a duct system connected to the dryer 1, the washing machine 2, and the refresher 3.

The blowing duct 420 may include a first discharge port 425 connected to the first supply air duct 43. The blowing duct 420 may include a second discharge port 427 connected to the second supply air duct 45. The blowing duct 420 may include a third discharge port 426 connected to the third supply air duct 48. The blowing duct 420 may include a fourth discharge port 428 connected to the dehumidification duct 46.

The first discharge port 425 may protrude downwardly from the blowing duct 420. The first supply air duct 43 may connect the first drum 13 and the first discharge port 425.

The second discharge port 427 may protrude from the blowing duct 420 to a lateral side. The second supply air duct 45 may connect the third cabinet 30 and the second discharge port 427.

The third discharge port 426 may protrude from the blowing duct 420 to the lateral side. The third supply air duct 48 may connect the tub 23 and the third discharge port 426.

The fourth discharge port 428 may protrude from the blowing duct 420 to the lateral side. The fourth discharge port 428 may protrude in a direction opposite to the second discharge port 427. The dehumidification duct 46 may be connected to the fourth discharge port 428.

The hot air flowing into the first drum 13 through the first supply air duct 43 may dry the laundry placed in the first drum 13, and then may flow into the heat exchange channel 42 through the first exhaust air duct 41. The first drum 13 may include the front cover 131 disposed on a front side, and the rear cover 132 disposed on a rear side. The first supply air duct 43 may be connected to the rear cover 132, and the first exhaust air duct 41 may be connected to the front cover 131.

The first exhaust air duct 41 may connect the first drum 13 and the heat exchange channel 42. The first exhaust air duct 41 may extend upwardly from the first drum 13 to be connected to the heat exchange channel 42.

The first inlet port 421 connected to the first exhaust air duct 41 may be formed at the inlet end 42A of the heat exchange channel 42. The first inlet port 421 may extend downwardly from the heat exchange channel 42. The first inlet port 421 may extend downwardly from the second exhaust air duct 44. The first inlet port 421 may extend downwardly from the first duct section 441.

The laundry treating apparatus E may include the first opening and closing valve 41a disposed in the first exhaust air duct 41. The first opening and closing valve 41a may control an amount of air flowing in the first exhaust air duct 41. The first opening and closing valve 41a may block an air flow in the first exhaust air duct 41. The first opening and closing valve 41a may block the air flow in the first exhaust air duct 41 when the hot air is not supplied into the first drum 13 through the first supply air duct 43.

The hot air flowing into third cabinet 30 through the second supply air duct 45 may dry the laundry placed in the third cabinet 30, and then may flow into the heat exchange channel 42 through the second exhaust air duct 44. The second supply air duct 45 and the second exhaust air duct 44 may be connected to the third rear panel 302 of the third cabinet 30.

The second supply air duct 45 may be connected to the upper portion of the refresher 3. The second supply air duct 45 may be connected to the supply air hole 308 formed at the upper portion of the refresher 3.

The upper panel 303 of the third cabinet 30 may be inclined downwardly toward the rear side. The upper panel 303 of the third cabinet 30 may extend at an incline downwardly toward the third rear panel 302.

The supply air hole 308 may be formed at the inclined portion of the upper panel 303. The supply air hole 308 may be opened so as to be inclined downwardly toward the inner space 33 of the refresher 3. The air supply hole 308 may be opened so as to be inclined relative to the horizontal direction.

The supply air hole 308 may be disposed between the third upper panel 303 and the hanger 36. The supply air hole 308 may be disposed above the hanger 36.

The second exhaust air duct 44 may be disposed below the second supply air duct 45. The exhaust air hole 309 may be disposed below the supply air hole 308.

The second exhaust air duct 44 may connect the exhaust air hole 309 and the heat exchange channel 42. The second exhaust air duct 44 may extend from the upper portion of the third cabinet 30 in the lateral direction, to be connected to the heat exchange channel 42.

The second exhaust air duct 44 may include the first duct section 441 disposed between the heating device 50 and the first drum 13. The first duct section 441 may be disposed between the base plate 575 and the partition wall 108. The first duct section 441 may extend forwardly and rearwardly in the separation space 55.

The second inlet port 422 connected to the second exhaust air duct 44 may be formed at the inlet end 42A of the heat exchange channel 42. The second inlet port 422 may extend downwardly from the heat exchange channel 42. The second inlet port 422 may extend downwardly from the case 570 of the heating device 50.

The laundry treating apparatus E may include the second opening and closing valve 44a disposed in the second exhaust air duct 44. The second opening and closing valve 44a may control a flow rate of air in the second exhaust air duct 44. The second opening and closing valve 44a may block an air flow in the second exhaust air duct 44. The second opening and closing valve 44a may block the air flow in the second exhaust air duct 44 when the hot air is not supplied into the third cabinet 30 through the second supply air duct 45. The second opening and closing valve 44a may be disposed on the upstream side of a position where the third exhaust air duct 47 and the second exhaust air duct 44 join each other.

The hot air flowing into the tub 23 through the third supply air duct 48 may dry the laundry placed in the tub 23, and then may flow into the heat exchange channel 42 through the third exhaust air duct 47.

The third exhaust air duct 47 may connect the tub 23 and the heat exchange channel 42. The third exhaust air duct 47 may extend upwardly from the upper portion of the tub 23 to be connected to the heat exchange channel 42.

The third exhaust air duct 47 may extend from the upper portion of the tub 23 in the lateral direction and may extend upwardly in the rear case 310.

The third exhaust air duct 47 may be connected to the second exhaust air duct 44. The third exhaust air duct 47 may join the second exhaust air duct 44 in the rear case 310. The air flowing in the third exhaust air duct 47 may join the air flowing in the second exhaust air duct 44.

The third inlet port 424 connected to the third exhaust air duct 47 may be formed in the second exhaust air duct 44. The third inlet port 424 may extend downwardly from the second exhaust air duct 44.

The third inlet port 424 may protrude downwardly from the lower surface of the second exhaust air duct 44. The third exhaust air duct 47 may connect the tub 23 and the third inlet port 424. The air in the third exhaust air duct 47 may join the air in the second exhaust air duct 44 to flow into the heat exchange channel 42.

The laundry treating apparatus E may include the third opening and closing valve 47a disposed in the third exhaust air duct 47. The third opening and closing valve 47a may control a flow rate of air in the third exhaust air duct 47. The third opening and closing valve 47a may block an air flow in the third exhaust air duct 47. The third opening and closing valve 47a may block the air flow in the third exhaust air duct 47 when the hot air is not supplied into the tub 23 through the third supply air duct 48.

The hot air flowing through the dehumidification duct 46 may be supplied to the outside of the laundry treating apparatus E through the outlet 462 that is opened forward. The hot air flowing through the dehumidification duct 46 may be supplied to an indoor space through the outlet 462.

The dehumidification duct 46 may include the second duct section 461 disposed between the heating device 50 and the first drum 13. The second duct section 461 may be disposed between the base plate 575 and the partition wall 108. The second duct section 461 may extend forwardly and rearwardly in the separation space 55.

The outside air inlet port 423 may protrude forwardly from one side of the second exhaust air duct 44. The outside air inlet port 423 may allow the indoor space and the second exhaust air duct 44 to communicate with each other. The air in the outside air inlet port 423 may join the air in the second exhaust air duct 44 to flow into the heat exchange channel 42. The outside air inlet port 423 may have the outside air inlet 49 that is opened forward. The air drawn in through the outside air inlet 49 may join the air in the second exhaust air duct 44 to flow into the heat exchange channel 42.

Referring to FIG. 40, the heating device 50 may include a heat pump device.

The heating device 50 of the laundry treating apparatus E in this embodiment of the present disclosure may not include the motor mounting portion 133s (see FIG. 5), unlike the other embodiment A.

The motor 133 rotating the drum 13 of the dryer 1 may be disposed at a lower portion of the dryer 1. The motor 133 may be disposed under the first drum 13.

Referring to FIG. 41, the heating device 50 may supply hot air to the dryer 1, the washing machine 2, and the refresher 3.

The heating device 50 may be disposed on an upper side of the partition wall 108. The heating device 50 may be disposed in the first cabinet 10 of the dryer 1.

The switching device 70 may be disposed on an upper side of the partition wall 108. The switching device 70 may be disposed in the first cabinet 10 of the dryer 1.

After passing through the separation space 55, the first supply air duct 43 may pass through the first rear panel 102. The first supply air duct 43 may pass through the first rear panel 102 to be connected to the first drum 13.

The second supply air duct 45 may extend from the blowing duct 420 to the lateral side to pass through the first inner wall 106. The second supply air duct 45 may be bent upwardly in the rear case 310. The second supply air duct 45 may be connected to the upper portion of the refresher 3.

The third supply air duct 48 may extend from the blowing duct to the lateral side. The third supply air duct 48 may be connected to the tub 23.

The third supply air duct 48 may include the first supply air portion 481 extending from the blowing duct 420 to the lateral side, the second supply air portion 482 extending downwardly from the first supply air portion 481, and the third supply air 483 extending from the second supply air portion 482 to the lateral side.

The first supply air portion 481 may be connected to the blowing duct 420 and may extend from the flowing duct 420 to the lateral side. The first supply air portion 481 may pass through the first inner wall 106 to extend into the rear case 310. The first supply air portion 481 may be disposed on the rear side of the third rear panel 302.

The second supply air portion 482 may extend downwardly from the end of the first supply air portion 481. The second supply air portion 482 may extend downwardly in the rear case 310. The second supply air portion 482 may face the first inner wall 106 and the second inner wall 206.

The third supply air portion 483 may extend from a lower end of the second supply air portion 482 to the lateral side. The third supply air portion 483 may extend in the rear case 310 to the lateral side, to pass through the second inner wall 206. The third supply air portion 483 may pass through the second inner wall 206 to be connected to the tub 23 in the second cabinet 20.

The third exhaust air duct 47 may join the second exhaust air duct 44. The third exhaust air duct 47 may extend upwardly to join the second exhaust air duct 44.

The third exhaust air duct 47 may include the first exhaust air portion 471 connected to the tub 23, and the second exhaust air portion 472 extending upwardly from the first exhaust air portion 471.

The first exhaust air portion 471 may be connected to the tub 23 and may pass through the second inner wall 206. The first exhaust air portion 471 may pass through the second inner wall 206 to extend to the lateral side in the rear case 310.

The second exhaust air portion 472 may extend upwardly from the end of the first exhaust air portion 471. The second exhaust air portion 472 may face the first inner wall 106 and the second inner wall 206.

The second exhaust air portion 472 may be connected to the second exhaust air duct 44. An upper end of the second exhaust air portion 472 may be connected to a lower portion of the second exhaust air duct 44. The second exhaust air duct 44 may include the third inlet port 424 protruding downwardly from the second exhaust air duct 44, and the second exhaust air portion 472 may be coupled to the third inlet port 424.

The second exhaust air duct 44 may be connected to the upper portion of the refresher 3. The second exhaust air duct 44 may extend to the lateral side in the rear case 310. The second exhaust air duct 44 may extend forwardly in the separation space 55, to be connected to the heat exchange channel 42.

The separation space 55 may be formed between the base plate 575 and the partition wall 208. The first duct section 441, the second duct section 461, and the first supply air duct 43 may be disposed in the separation space 55.

The steam generator 502 may be disposed in the heating device 50. The steam generated by the steam generator 502 may be sprayed into the first drum 13 through the first steam supply pipe 502a. The steam generated by the steam generator 502 may be sprayed into the inner space 33 of the refresher 3 through the second steam supply pipe 502b.

The steam generated by the steam generator 502 may flow to each of the first drum 13 and the inner space 33 of the refresher 3 by the blowing force of the fan 60. That is, by pressurizing the steam generated by the steam generator 502, the fan 60 may cause the steam to flow to the first drum 13 and the inner space 33 of the refresher 3.

A valve for controlling an amount of steam flow may be provided for each of the first steam supply pipe 502a and the second steam supply pipe 502b. By adjusting an opening degree of the valve, the controller 81 may adjust the amount of steam supplied to each of the first drum 13 and the inner space 33 of the refresher 3.

The laundry treating apparatus E may include the second steam generator 506 disposed in the washing machine 2. The laundry treating apparatus E may include a plurality of steam generators 502 and 506. The steam generator 502 disposed in the heating device 50 may be referred to as the "first steam generator," and the steam generator 506 disposed in the washing machine 2 may be referred to as the "second steam generator."

The laundry treating apparatus E may include a third steam supply pipe 506a connecting the second steam generator 506 and the tub 23, and a fourth steam supply pipe 506b connecting the second steam generator 506 and the refresher 3.

The second steam generator 506 may be disposed in the second cabinet 20. The steam generated by the second steam generator 506 may be sprayed into the second drum 24 through the third steam supply pipe 506. The steam generated by the second steam generator 506 may be sprayed into the inner space 33 of the refresher 3 through the fourth steam supply pipe 506b.

A valve for controlling an amount of steam flow may be provided for each of the third steam supply pipe 506a and the fourth steam supply pipe 506b. By adjusting an opening degree of the valve, the controller 81 may adjust the amount of steam supplied to each of the second drum 24 and the inner space 33 of the refresher 3.

Referring to FIG. 42, the heating device 50 may be disposed at the upper portion of the laundry treating apparatus E.

The second upper panel 203 of the washing machine 2 may be coupled to the first lower panel 104 of the dryer 1. The first lower panel 104 may be disposed over the second upper panel 203. The first lower panel 104 and the second upper panel 203 may be coupled to each other by a separate fastening member. Further, a protrusion may be formed on any one of the first lower panel 104 and the second upper panel 203, and a recess may be formed in the other one, such that the first panel 104 and the second upper panel 203 may be coupled to each other by a coupling method in which the protrusion is inserted into the recess.

The dryer 1 may reduce vertical vibrations in the washing machine 2. The first cabinet 10, disposed over the second cabinet 20, is coupled to the second cabinet 20, thereby reducing vibrations in the second cabinet 20.

The laundry treating apparatus E may include rollers 29 protruding downwardly from the second cabinet 20. The rollers 29 may protrude downwardly from the second lower panel 204.

The rollers 29 protruding downwardly from the second cabinet 20 may be referred to as "first rollers." Rollers 39 protruding downwardly from the third cabinet 30 may be referred to as "second rollers." The first rollers 29 and the second rollers 39 may be horizontally spaced apart from each other.

The rollers 29 and 39 may support the weight of the laundry treating apparatus E, and at least some of the rollers 29 and 39 may be rotated when the laundry treating apparatus A is moved.

The laundry treating apparatus E may include legs 39a protruding downwardly from the third cabinet 30. The legs 39a may protrude downwardly from the third outer wall 305.

The legs 39a may support the weight of the laundry treating apparatus E. A plurality of legs 39a may be spaced apart from each other in the front-rear direction.

The legs 39a protruding downwardly from the third cabinet 30 may also be provided for the washing machine 2. That is, the washing machine 2 may include legs protruding downwardly from the second cabinet 20.

The legs of the washing machine 2 may have the same structure as the legs 39a of the refresher 3. The legs of the washing machine 2 may protrude downwardly from the second outer wall 205. A plurality of legs 39a of the washing machine 2 may be spaced apart from each other in the front-rear direction.

The above rollers and legs may support the weight of the laundry treating apparatus E. Further, the rollers and legs may reduce the vibrations generated in the washing machine 2. The vibrations generated in the washing machine 2 may be absorbed into the ground by the rollers and the legs. The rollers and the legs may reduce shaking of the second cabinet 20.

The laundry treating apparatus E may include a plate 90 disposed between the second cabinet 20 and the third cabinet 30. The plate 90 may connect the second cabinet 20 and the third cabinet 30. The plate 90 may be referred to as a "connector." The plate 90 may be referred to as a "lower connector."

The plate 90 may include a first plate 96 disposed between the second inner wall 206 and the third inner wall 306, a second plate 97 connecting the second lower panel 204 and the third lower panel 304, and a grip 98 recessed upwardly from a lower surface of the second plate 92.

The first plate 96 may extend vertically between the second cabinet 20 and the third cabinet 30. The first plate 96 may come into contact with the second cabinet 20 and the third cabinet 30. The first plate 96 may be made of a material having high elasticity. The first plate 96 may include a damping material.

The first plate 96 may reduce vibrations generated in the washing machine 2. The first plate 96 may absorb vibrations generated in the washing machine 2. The first plate 96 may prevent shaking of the second cabinet 20. Particularly, when the second drum 24 rotates at a high speed, vibrations generated in the second drum 24 may cause the second inner wall 206 to rock from side to side. The first plate 96, disposed between the second inner wall 206 and the third inner wall 306, may prevent noise caused when the second inner wall 206 rocks and collides with the third inner wall 306.

The second plate 97 may extend horizontally under the second lower panel 204 and the third lower panel 304. The second plate 97 may be coupled to the second lower panel 204 and the third lower panel 304 by a fastening member 99 passing through the second plate 97.

The plate 90 and the third cabinet 30 may reduce the vibrations in the washing machine 2. The third cabinet 30 is disposed on a lateral side of the second cabinet 20 to attenuate horizontal vibrations generated in the washing machine 2. The plate 90 is disposed between the second cabinet 20 and the third cabinet 30, thereby amplifying the effect of reducing vibrations caused by the third cabinet 30. Particularly, the plate 90 may include a material having high elasticity or a damping material, thereby effectively reducing the vibrations generated in the washing machine 2. Further, the plate 90 may connect the second cabinet 20 and the third cabinet 30, thereby reducing vibrations generated in the second cabinet 20. The third cabinet 30 may support the second cabinet 20 on one side of the second cabinet 20.

The grip 98 may be recessed into the plate 90. The grip 98 may provide a space for a user to hold. The user may move the laundry treating apparatus E by holding the grip 98.

The opening member 463 may shield the front side of the separation space 55. The opening member 463 may be disposed at the front side of the dehumidification duct 46 and the outside air inlet port 423. The opening member 463 may shield the front side of the hot air outlet 462 and the outside air inlet 49.

The laundry treating apparatus E may include the hinge 463a connected to the opening member 463, and the motor 463b rotating the hinge 463a.

The hinge 463a may be rotatably coupled to the first front panel 101. The hinge 46a may extend in the left-right direction. The opening member 46 may be rotated in the front-rear direction with the hinge 463a serving as a rotational axis. The opening member 463 may be integrally formed with the hinge 463a. When the motor 463b rotates the hinge 463a, the opening member 463 may be rotated together with the hinge 463a. The opening member 463 may be rotated forward to open the front side of the separation space 55. Once the opening member 463 opens the front side of the separation space 55, outside air of the laundry treating apparatus A may flow into the heat exchange channel 42 through the outside air inlet port 423, and the air passing through the dehumidification duct 46 may be discharged to the outside of the laundry treating apparatus A.

The controller 81 may be electrically connected to the motor 463b. The controller 81 may control the operation of the motor 463b. The user may open the separation space 55 by manipulating the control panel 8.

The dehumidification duct 46 and the outside air inlet port 423 may be disposed above the first door 11 and the second door 21. As the dehumidification duct 46 and the outside air inlet port 423 are disposed at a higher position, it is possible to prevent high temperature and dry air, flowing through the dehumidification duct 46, from being directly exposed to the user. The dehumidification duct 46 and the outside air inlet port 423 may be disposed at a height corresponding to the upper portion of the refresher 3.

Referring to FIG. 43, the third supply air duct 480 may branch off from the second supply air duct 450.

Without being directly connected to the heating device 50, the third supply air duct 480 may branch off from the second supply air duct 450. When the third supply air duct 480 branches off from the second supply air duct 450, the third discharge port 426 may not be formed. The third supply air duct 480 may extend downwardly from the first hot air duct 451.

The second supply air duct 450 may extend from the flowing duct 420 to the lateral side. The second supply air duct 450 may extend horizontally at the rear side of the third rear panel 302.

The third supply air duct 480 may branch off from the second supply air duct 450 at the rear side of the third rear panel 302. The third supply air duct 480 may extend downwardly from the second supply air duct 450. The third supply air duct 480 may extend into the second cabinet 20 to be connected to the tub 23.

The laundry treating apparatus E' may include the control valve 453 disposed at a position where the third supply air duct 480 branches off from the second supply air duct 450.

The control valve 453 may control a flow direction of air flowing in the second supply air duct 450. The control valve 453 may control a flow direction of air flowing in the first hot air duct 451. The control valve 453 may open and close the second hot air duct 452 and the third supply air duct 480. The control valve 453 may open only either the second hot air duct 452 or the third supply air duct 480. The control valve 453 may open both the second hot air duct 452 and the third supply air duct 480. The control valve 453 may control an amount of air supplied to the second hot air duct 452 or the third supply air duct 480. The control valve 453 may distribute the air, blown by the fan 60 to the second supply air duct 450, to the second hot air duct 452 and the third supply air duct 480.

The controller 81 may control the control valve 453. By controlling the control valve 453, the controller 81 may supply the hot air, supplied to the second supply air duct 450, into the inner space 33 of the refresher 3. By controlling the control valve 453, the controller 81 may supply the hot air, supplied to the second supply air duct 450, into the second drum 24.

A structure of the supply air duct connected to the washing machine 2 and the refresher 3 may selectively employ the structure of the supply air duct described above with reference to FIG. 41 or FIG. 43. That is, the supply air duct connected to the washing machine 2 and the refresher 3 may be installed as illustrated in FIG. 41 or in FIG. 43.

Referring to FIG. 44, a storage cabinet 950 may be disposed between the refresher 3 and the tower 9.

The laundry treating apparatus E" may include the dryer 1, the washing machine 2, the refresher 3, and the heating device 50.

However, the arrangement position of the heating device 50 may not be limited to the upper side of the dryer 1 and the washing machine 2. That is, the heating device 50 may be disposed between the dryer 1 and the washing machine 2 or may be disposed under the dryer 1 and the washing machine 2. Further, the heating device 50 may be disposed over the first drum 13 and the tub 23, may be disposed between the first drum 13 and the tub 23, or may be disposed under the first drum 13 and the tub 23. In the laundry treating apparatus E" according to an embodiment of FIG. 44, a supply air duct 4500 and an exhaust air duct 4400 may connect the refresher 3 and the heating device 50 by extending across a rear space of the storage cabinet 950, even when an arrangement position of the heating device 50 is changed.

The laundry treating apparatus E" may include the storage cabinet 950 disposed on one side of the refresher 3. The storage cabinet 950 may be disposed between the dryer 1 and the refresher 3. The storage cabinet 950 may be disposed between the washing machine 2 and the refresher 3. The storage cabinet 950 may be disposed between the heating device 50 and the refresher 3. The storage cabinet 950 may be disposed between the first inner wall 106 and the third inner wall 306. The storage cabinet 950 may be disposed between the second inner wall 206 and the third inner wall 306.

The storage cabinet 950 may be positioned at various heights. For example, the storage cabinet 950 may be disposed only between the refresher 3 and the washing machine 2, in which case an empty space may be formed between the refresher 3 and the dryer 1. Further, the storage cabinet 950 may be disposed in a space between the refresher 3 and the washing machine 2 and a space between the refresher 3 and the dryer 1.

The storage cabinet 950 may include a first storage cabinet 951 and a second storage cabinet 952.

The first storage cabinet 951 may be disposed under the second storage cabinet 952. The first storage cabinet 951 may have a greater vertical height than the second storage cabinet 952.

The storage cabinet 950 may provide a space in which accessories of the laundry treating apparatus E" are accommodated. Hangers, a detergent box, a rinse bottle, a dust brush, and the like may be accommodated in the inner space of the storage cabinet 950. In addition, clothes or laundry may be received in the inner space of the storage cabinet 950.

The laundry treating apparatus E" may include the supply air duct 4500 and the exhaust air duct 4400 which connect the heating device 50 and the refresher 3. The supply air duct 4500 and the exhaust air duct 4400 may be connected to the upper portion of the refresher 3.

The supply air duct 4500 and the exhaust air duct 4400 may extend horizontally across the rear space of the storage cabinet 950. The supply air duct 4500 and the exhaust air duct 4400 may extend horizontally and may pass through the space formed at the rear side of the storage cabinet 950.

As the storage cabinet 950 is disposed between the refresher 3 and the heating device 50, the length of the supply air duct 4500 and the exhaust air duct 4400 may be extended. That is, a length L1 of the supply air duct 4500 of the laundry treating apparatus E" illustrated in FIG. 44 may be longer than a length of the supply air duct 45 of the laundry treating apparatus E illustrated in FIGS. 37 to 43. In addition, a length L2 of the exhaust air duct 4400 of the laundry treating apparatus E" illustrated in FIG. 44 may be longer than the exhaust air duct 44 of the laundry treating apparatus E illustrated in FIGS. 37 to 43.

The length L2 of the exhaust air duct 4400 may be longer than the length L1 of the supply air duct 4500. Air passing through the exhaust air duct 4400 may be cooled sufficiently before flowing into the heating device 50.

Clothes placed in the refresher 3 may be susceptible to high temperature than clothes dried in the dryer 1. When high temperature air, heated by the heating device 50 and supplied to the dryer 1, is supplied directly to the refresher 3, the clothes in the refresher 3 may be damaged. Accordingly, by extending the length of the supply air duct 4500 in the above structure, the air heated by the heating device 50 may be cooled to proper temperature by passing through the supply air duct 4500, and then the cooled air may be supplied to the refresher 3, thereby preventing damage to the clothes placed in the refresher 3. Further, by extending the length of the exhaust air duct 4400 in the above structure, the air in the refresher 3 may be cooled by passing through the exhaust air duct 4400, and then the cooled air may flow into the heating device 50, thereby increasing heat exchange efficiency of the heating device 50.

Hereinafter, laundry treating apparatuses F and F' according to other embodiments of the present disclosure will be described with reference to FIGS. 45 to 49.

Referring to FIG. 45, in the laundry treating apparatus F, the dryer 1 may be disposed under the washing machine 2, and the heating device 50 may be disposed over the dryer 1 and the washing machine 2. The heating device 50 may be disposed in the second cabinet 20 and may be disposed over the tub 23.

The heating device 50 may be disposed separately from the washing machine 2. The heating device 50 may be disposed on the upper side of the second cabinet 20.

Referring to FIG. 46, the laundry treating apparatus F may include a duct system connected to the dyer 1, the washing machine 2, and the refresher 3.

The blowing duct 420 may include the first discharge port 425 connected to the first supply air duct 43. The blowing duct 420 may include the second discharge port 427 connected to the second supply air duct 45. The blowing duct 420 may include the third discharge port 426 connected to the third supply air duct 48. The blowing duct 420 may include the fourth discharge port 428 connected to the dehumidification duct 46.

The first discharge port 425 may protrude from the blowing duct 420 to the lateral side. The first supply air duct 43 may connect the first drum 13 and the first discharge port 425.

The second discharge port 427 may protrude from the blowing duct 420 to the lateral side. The second supply air duct 45 may connect the supply air hole 308 and the second discharge port 427.

The third discharge port 426 may protrude downwardly from the blowing duct 420. The third supply air duct 48 may connect the tub 23 and the third discharge port 426.

The fourth discharge port 428 may protrude from the blowing duct 420 to the lateral side. The fourth discharge port 428 may protrude in a direction opposite to the second discharge port 427. The dehumidification duct 46 may be connected to the fourth discharge port 428.

The hot air flowing into the first drum 13 through the first supply air duct 43 may dry the laundry placed in the first drum 13, and then may flow into the heat exchange channel 42 through the first exhaust air duct 41. The first drum 13 may include the front cover 131 disposed on the front side, and the rear cover 132 disposed on the rear side. The first supply air duct 43 may be connected to the rear cover 132, and the first exhaust air duct 41 may be connected to the front cover 131.

The first exhaust air duct 41 may connect the first drum 13 and the heat exchange channel 42. The first exhaust air duct 41 may extend from the first drum 13 to be connected to the heat exchange channel 42.

The first exhaust air duct 41 may extend rearwardly under the first drum 13 and may extend upwardly in the rear case 310.

The motor 133 rotating the drum 13 of the dryer 1 may be disposed in the first cabinet 10. The motor 133 may be disposed under the first cabinet 10. The first exhaust air duct 41 may be disposed under the first drum 13 and may be horizontally spaced apart from the motor 133. The first exhaust air duct 41 and the motor 133 may be disposed side by side in the horizontal direction under the first drum 13.

The first exhaust air duct 41 may be connected to the second exhaust air duct 44. The first exhaust air duct 41 may join the second exhaust air duct 44 in the rear case 310. The air flowing in the first exhaust air duct 41 may join the air flowing in the second exhaust air duct 44.

The first inlet port 421 connected to the first exhaust air duct 41 may be formed in the second exhaust air duct 44. The first inlet port 421 may extend downwardly from the second exhaust air duct 44.

The laundry treating apparatus F may include the first opening and closing valve 41a disposed in the first exhaust air duct 41. The first opening and closing valve 41a may control a flow rate of air in the first exhaust air duct 41. The first opening and closing valve 41a may block an air flow in the first exhaust air duct 41. The first opening and closing valve 41a may block the air flow in the first exhaust air duct 41 when the hot air is not supplied into the first drum 13 through the first supply air duct 43.

The hot air flowing into third cabinet 30 through the second supply air duct 45 may dry the laundry placed in the third cabinet 30, and then may flow into the heat exchange channel 42 through the second exhaust air duct 44. The second supply air duct 45 and the second exhaust air duct 44 may be connected to the third rear panel 302 of the third cabinet 30.

The second supply air duct 45 may be connected to the upper portion of the refresher 3. The second supply air duct 45 may be connected to the supply air hole 308 formed at the upper portion of the refresher 3.

The upper panel 303 of the third cabinet 30 may be inclined downwardly toward the rear side. The upper panel 303 of the third cabinet 30 may extend at an incline downwardly toward the third rear panel 302.

The supply air hole 308 may be formed at the inclined portion of the upper panel 303. The supply air hole 308 may be opened so as to be inclined downwardly toward the inner space 33 of the refresher 3. The air supply hole 308 may be opened so as to be inclined relative to the horizontal direction.

The supply air hole 308 may be disposed between the third upper panel 303 and the hanger 36. The supply air hole 308 may be disposed above the hanger 36.

The second exhaust air duct 44 may be disposed below the second supply air duct 45. The exhaust air hole 309 may be disposed below the supply air hole 308.

The second exhaust air duct 44 may connect the refresher 3 and the heat exchange channel 42. The second exhaust air duct 44 may extend from the upper portion of the third cabinet 30 to the lateral side to be connected to the heat exchange channel 42.

The second exhaust air duct 44 may include the first duct section 441 disposed between the heating device 50 and the tub 23. The first duct section 441 may be disposed between the base plate 575 and the partition wall 208. The first duct section 441 may extend forwardly and rearwardly in the separation space 55.

The second inlet port 422 connected to the second exhaust air duct 44 may be formed at the inlet end 42A of the heat exchange channel 42. The second inlet port 422 may extend downwardly from the heat exchange channel 42. The second inlet port 422 may extend downwardly from the case 570 of the heating device 50.

The laundry treating apparatus F may include the second opening and closing valve 44a disposed in the second exhaust air duct 44. The second opening and closing valve 44a may control a flow rate of air in the second exhaust air duct 44. The second opening and closing valve 44a may block an air flow in the second exhaust air duct 44. The second opening and closing valve 44a may block the air flow in the second exhaust air duct 44 when the hot air is not supplied into the third cabinet 30 through the second supply air duct 45. The second opening and closing valve 44a may be disposed on the upstream side of a position where the first exhaust air duct 41 and the second exhaust air duct 44 join each other.

The hot air flowing into the tub 23 through the third supply air duct 48 may dry the laundry placed in the tub 23, and then may flow into the heat exchange channel 42 through the third exhaust air duct 47.

The third exhaust air duct 47 may connect the tub 23 and the heat exchange channel 42. The third exhaust air duct 47 may extend upwardly from the upper portion of the tub 23 to be connected to the heat exchange channel 42.

The third inlet port 424 connected to the third exhaust air duct 47 may be formed at the inlet end 42A of the heat exchange channel 42. The third inlet port 424 may extend downwardly from the heat exchange channel 42. The third inlet port 424 may extend downwardly from the second exhaust air duct 44. The third inlet port 424 may extend downwardly from the first duct section 441.

The third inlet port 424 may protrude downwardly from the lower surface of the second exhaust air duct 44. The third exhaust air duct 47 may connect the tub 23 and the third inlet port 424. The third exhaust air duct 47 may connect the tub 23 and the second exhaust air duct 44. The air in the third exhaust air duct 47 may join the air in the second exhaust air duct 44 to flow into the heat exchange channel 42.

The laundry treating apparatus F may include the third opening and closing valve 47a disposed in the third exhaust air duct 47. The third opening and closing valve 47a may control a flow rate of air in the third exhaust air duct 47. The third opening and closing valve 47a may block an air flow in the third exhaust air duct 47. The third opening and closing valve 47a may block the air flow in the third exhaust air duct 47 when the hot air is not supplied into the tub 23 through the third supply air duct 48.

The hot air flowing through the dehumidification duct 46 may be supplied to the outside of the laundry treating apparatus F through the outlet 462 that is opened forward. The hot air flowing through the dehumidification duct 46 may be supplied to an indoor space through the outlet 462.

The dehumidification duct 46 may include the second duct section 461 disposed between the heating device 50 and the second cabinet 20. The second duct section 461 may be disposed between the base plate 575 and the partition wall 208. The second duct section 461 may extend forwardly and rearwardly in the separation space 55.

The outside air inlet port 423 may protrude forwardly from one side of the second exhaust air duct 44. The outside air inlet port 423 may allow the indoor space and the second exhaust air duct 44 to communicate with each other. The air in the outside air inlet port 423 may join the air in the second exhaust air duct 44 to flow into the heat exchange channel 42. The outside air inlet port 423 may have the outside air inlet 49 that is opened forward. The air drawn in through the outside air inlet 49 may join the air in the second exhaust air duct 44 to flow into the heat exchange channel 42.

Referring to FIG. 47, the heating device 50 may supply hot air to the dryer 1, the washing machine 2, and the refresher 3.

The machine room S may be a portion of the inner space of the second cabinet 20. The machine room S may refer to an upper space of the second cabinet 20. The heating space 50 may be disposed in the machine room S.

The laundry treating apparatus F may include the partition wall 208 disposed in the second cabinet 20. The heating device 50 may be disposed on an upper side of the partition wall 208.

The partition wall 208 may separate a space, in which the tub 23 is disposed, from the machine room S. The partition wall 208 may be disposed between the heating device 50 and the tub 23.

The partition wall 208 may be integrally formed with the second cabinet 20 or may be separated from the second cabinet 20.

The heating device 50 may be disposed between the partition wall 208 and the second upper panel 203. The machine room S may be formed between the partition wall 208 and the second upper panel 203. However, in the laundry treating apparatus according to another embodiment of the present disclosure, the heating device 50 may be disposed on the upper side of the second cabinet 20, in which case the heating device 50 may also be disposed on the upper side of the second upper panel 203 or may include a separate case.

The heating device 50 may be disposed on an upper side of the partition wall 208. The heating device 50 may be disposed in the second cabinet 20 of the washing machine 2.

The switching device 70 may be disposed on an upper side of the partition wall 208. The switching device 70 may be disposed in the second cabinet 20 of the washing machine 2.

The first supply air duct 43 may extend from the blowing duct 420 to the lateral side. The first supply air duct 43 may be connected to the first drum 13.

The first supply air duct 43 may include the first supply air portion 431 extending from the blowing duct 420 to the lateral side, the second supply air portion 432 extending downwardly from the first supply air portion 431, and the third supply air portion 433 extending from the second supply air portion 432 to the lateral side.

The first supply air portion 431 may be connected to the blowing duct 420 and may extend from the blowing duct 420 to the lateral side. The first supply air portion 431 may extend into the rear case 310 by passing through the second inner wall 206. The first supply air portion 431 may be disposed at the rear side of the third rear panel 302.

The second supply air portion 482 may extend downwardly from the end of the first supply air portion 431. The second supply air portion 432 may extend downwardly in the rear case 310. The second supply air portion 432 may face the first inner wall 106 and the second inner wall 206.

The third supply air portion 433 may extend from a lower end of the second supply air portion 432 to the lateral side. The third supply air portion 433 may extend to the lateral side in the rear case 310, to pass through the first inner wall 106. The third supply air portion 433 may pass through the first inner wall 106 to be connected to the first drum 13 in the first cabinet 10.

The second supply air duct 45 may extend from the blowing duct to the lateral side. The second supply air duct 45 may be connected to the supply air hole 308.

The second supply air duct 45 may extend from the blowing duct 420 to the lateral side, to pass through the second inner wall 206. The second supply air duct 45 may be bent upwardly in the rear case 310. The second supply air duct 45 may be connected to the upper portion of the refresher 3.

The third supply air duct 48 may extend downwardly from the blowing duct 420. The third supply air duct 48 may pass through the separation space 55. By passing through the partition wall 208, the third supply air duct 48 may extend downwardly to be connected to the tub 23.

The first exhaust air duct 41 may join the second exhaust air duct 44. The first exhaust air duct 41 may extend upwardly to join the second exhaust air duct 44.

The first exhaust air duct 41 may include the first duct section 411 connected to the first drum 13, and the second exhaust air portion 412 extending upwardly from the first duct section 411.

The first duct section 411 may be connected to the first drum 13 and may pass through the first inner wall 106. The first duct section 411 may pass through the first inner wall 106 to extend to the lateral side in the rear case 310.

The second exhaust air portion 412 may extend upwardly from the end of the first duct section 411. The second exhaust air portion 412 may face the first inner wall 106 and the second inner wall 206.

The second exhaust air portion 412 may be connected to the second exhaust air duct 44. An upper end of the second exhaust air portion 412 may be connected to a lower portion of the second exhaust air duct 44. The second exhaust air duct 44 may include the first inlet port 421 protruding downwardly, and the second exhaust air portion 412 may be coupled to the first inlet port 421.

The second exhaust air duct 44 may be connected to the upper portion of the refresher 3. The second exhaust air duct 44 may extend to the lateral side in the rear case 310. The second exhaust air duct 44 may extend forwardly in the separation space 55, to be connected to the heat exchange channel 42.

The separation space 55 may be formed between the base plate 575 and the partition wall 208. The first duct section 441, the second duct section 461, and the third supply air duct 48 may be disposed in the separation space 55.

The steam generator 502 may be disposed in the heating device 50. The steam generated by the steam generator 502 may be sprayed into the inner space 33 of the refresher 3 through the second steam supply pipe 502b. The steam generated by the steam generator 502 may be sprayed into the second drum 24 through the third steam supply pipe 502c.

The second steam supply pipe 502b may extend from the steam generator 502 to the lateral side, to be connected to the refresher 3.

The third steam supply pipe 502c may extend downwardly from the steam generator 502 to be connected to the tub 23.

The steam generated by the steam generator 502 may flow to each of the second drum 24 and the inner space 33 of the refresher 3 by the blowing force of the fan 60. That is, by pressurizing the steam generated by the steam generator 502, the fan 60 may cause the steam to flow to the second drum 24 and the inner space 33 of the refresher 3.

A valve for controlling an amount of steam flow may be provided for each of the second steam supply pipe 502b and the third steam supply pipe 502c. By adjusting an opening degree of the valve, the controller 81 may adjust the amount of steam supplied to each of the second drum 24 and the inner space 33 of the refresher 3.

The laundry treating apparatus F may include the second steam generator 506 disposed in the dryer 1. The laundry treating apparatus F may include a plurality of steam generators 502 and 506. The steam generator 502 disposed in the heating device 50 may be referred to as a "first steam generator," and the steam generator 506 disposed in the dryer 1 may be referred to as a "second steam generator."

The laundry treating apparatus F may include the first steam supply pipe 506a connecting the second steam generator 506 and the first drum 13, and the fourth steam supply pipe 506b connecting the second steam generator 506 and the refresher 3.

The second steam generator 506 may be disposed in the first cabinet 10. The steam generated by the second steam generator 506 may be sprayed into the first drum 13 through the first steam supply pipe 506a. The steam generated by the second steam generator 506 may be sprayed into the inner space 33 of the refresher 3 through the fourth steam supply pipe 506b.

The fourth steam supply pipe 506b may extend from the second steam generator 506 to the lateral side, to be connected to the refresher 3.

A valve for controlling an amount of steam flow may be provided for each of the first steam supply pipe 506a and the fourth steam supply pipe 506b. By adjusting an opening degree of the valve, the controller 81 may adjust the amount of steam supplied to each of the first drum 13 and the inner space 33 of the refresher 3.

The water supply ports 273 and 274 may be disposed closer to the partition wall 208 than to the second lower panel 204. The first steam generator 502 may be disposed between the second upper panel 203 and the partition wall 208. Accordingly, as a distance between the first steam generator 502 and the water supply pipes 278 and 279 becomes shorter, the water supply pipes 278 and 279 connected to the first steam generator 502 may be reduced in length.

Referring to FIG. 48, the laundry unloaded through the second laundry loading opening 22 of the washing machine 2 may drop to the first door 11 of the dryer 1 to be loaded through the first laundry loading opening 12.

The first door 11 may be moved vertically. The first door 11 may be vertically rotated about a predetermined rotational axis which extends horizontally.

The first door 11 may be moved in a first direction Q to open the first laundry loading opening 12. The first direction Q may be a direction in which the first door 11 is rotated about a rotational axis which extends horizontally.

The first door 11 may have a first handle 11b. The first handle 11b may be recessed radially inwardly from an outer circumferential surface of the first door 11. By holding the first handle 11b, the user may rotate the first door 11.

The second door 21 may be moved horizontally. The second door 21 may be horizontally rotated about a predetermined rotational axis which extends vertically.

The second door 21 may be moved in a second direction P to open the second laundry loading opening 22. The second direction P may be a direction in which the second door 21 is rotated about a rotational axis which extends vertically.

The second door 21 may have a second handle 21b. The second handle 21b may be recessed radially inwardly from an outer circumferential surface of the second door 21. By holding the second handle 21b, the user may rotate the second door 21.

After a washing operation of the washing machine 2 is finished, the user may open the second door 21 to unload the laundry in the second drum 24 from the second cabinet 20 through the second laundry loading opening 22. The user may open the first door 11 after the washing operation of the washing machine 2 is finished. The user may move the wet laundry, which is unloaded from the washing machine 2, to a lower position and load the laundry into the first drum 13. According to the laundry treating apparatus F of the present disclosure, the user moves the wet, heavy laundry unloaded from the washing machine 2 to a lower position, such that the user's workload may be reduced compared to a case where the user moves the wet, heavy laundry to a higher position. In addition, the heating device 50 is disposed over the washing machine 2, such that the height of the laundry loading openings 12 and 22 is lowered, thereby allowing the user to easily unload the laundry from the second drum 24 through the second laundry loading opening 22 and move the laundry to the first laundry loading opening 12. In addition, by dropping the laundry, unloaded through the second laundry loading opening 22, toward the first door 11, the user may load the laundry placed on the top of the first door 1I into the first drum 13.

The opening member 463 may shield the front side of the separation space 55. The opening member 463 may be disposed at the front side of the dehumidification duct 46 and the outside air inlet port 423. The opening member 463 may shield the front side of the hot air outlet 462 and the outside air inlet 49.

The laundry treating apparatus F may include the hinge 463a connected to the opening member 463, and the motor 463b rotating the hinge 463a.

The hinge 463a may be rotatably coupled to the second front panel 201. The hinge 463a may extend in the left-right direction. The opening member 463 may be rotated in the front-rear direction with the hinge 463a serving as a rotational axis. The opening member 463 may be integrally formed with the hinge 463a. When the motor 463b rotates the hinge 463a, the opening member 463 may be rotated together with the hinge 463a. The opening member 463 may be rotated forward to open the front side of the separation space 55. Once the opening member 463 opens the front side of the separation space 55, outside air of the laundry treating apparatus F may flow into the heat exchange channel 42 through the outside air inlet port 423, and the air passing through the dehumidification duct 46 may be discharged to the outside of the laundry treating apparatus F.

The controller 81 may be electrically connected to the motor 463b. The controller 81 may control the operation of the motor 463b. The user may open the separation space 55 by manipulating the control panel 8.

The dehumidification duct 46 and the outside air inlet port 423 may be disposed above the first door 11 and the second door 21. As the dehumidification duct 46 and the outside air inlet port 423 are disposed at a higher position, it is possible to prevent high temperature and dry air, flowing through the dehumidification duct 46, from being directly exposed to the user. The dehumidification duct 46 and the outside air inlet port 423 may be disposed at a height corresponding to the upper portion of the refresher 3.

Referring to FIG. 49, the first supply air duct 430 may branch off from the second supply air duct 450.

Without being directly connected to the heating device 50, the first supply air duct 430 may branch off from the second supply air duct 450. When the first supply air duct 430 branches off from the second supply air duct 450, the first discharge port 425 may not be formed. The first supply air duct 430 may extend downwardly from the first hot air duct 451.

The second supply air duct 450 may extend from the flowing duct 420 to the lateral side. The second supply air duct 450 may extend horizontally at the rear side of the third rear panel 302.

The first supply air duct 430 may branch off from the second supply air duct 450 at the rear side of the third rear panel 302. The first supply air duct 430 may extend downwardly from the second supply air duct 450. The first supply air duct 430 may extend into the first cabinet 10 to be connected to the first drum 13.

The laundry treating apparatus F' may include the control valve 453 disposed at a position where the first supply air duct 430 branches off from the second supply air duct 450.

The control valve 453 may control a flow direction of air flowing in the second supply air duct 450. The control valve 453 may control a flow direction of air flowing in the first hot air duct 451. The control valve 453 may open and close the second hot air duct 452 and the first supply air duct 430. The control valve 453 may open only either the second hot air duct 452 or the first supply air duct 430. The control valve 453 may open both the second hot air duct 452 and the first supply air duct 430. The control valve 453 may control an amount of air supplied to the second hot air duct 452 or the first supply air duct 430. The control valve 453 may distribute the air, blown by the fan 60 to the second supply air duct 450, to the second hot air duct 452 and the first supply air duct 430.

The controller 81 may control the control valve 453. By controlling the control valve 453, the controller 81 may supply the hot air, supplied from the fan 60 to the second supply air duct 450, into the inner space 33 of the refresher 3. By controlling the control valve 453, the controller 81 may supply the hot air, supplied from the fan 60 to the second supply air duct 450, into the first drum 13.

However, a structure of the supply air duct connected to the dryer 1 and the refresher 3 may selectively employ the structure of the supply air duct described above with reference to FIG. 47 or 49. That is, the supply air duct connected to the dryer 1 and the refresher 3 may be installed as illustrated in FIG. 47 or in FIG. 49.

Referring to FIG. 50, a laundry treating apparatus J according to another embodiment of the present disclosure will be described below.

The laundry treating apparatus J according to another embodiment of the present disclosure may include an integrated frame 961, and the refresher 3 disposed on one side of the integrated frame 961.

The refresher 3 may include a third cabinet 962 disposed on one side of the integrated frame 961. The third cabinet 962 or a portion of the third cabinet 962 may be referred to as a "side frame."

The laundry treating apparatus J may include a horizontal partition wall 965 disposed at a middle position of the integrated frame 961.

A washing room 963, in which the tub 23 and the second drum 24 are disposed, may be formed between a lower panel 967 and the horizontal partition wall 965 of the integrated frame 961.

The second laundry loading opening 22 may be formed on a front surface of the integrated frame 961, and the laundry treating apparatus J may include the second door 968 for opening and closing the second laundry loading opening 22.

A drying room 964, in which the first drum 13 is disposed, may be formed between an upper panel 966 and the horizontal partition wall 965.

The first laundry loading opening 12 may be formed on the front surface of the integrated frame 961, and the laundry treating apparatus J may include the first door 969 for opening and closing the first laundry loading opening 12.

The horizontal partition wall 965 may separate the washing room 963 from the dry room 964. Based on the horizontal partition wall 965, the washing room 963 may be formed on a lower side and the drying room 964 may be formed on an upper side. However, it is also possible that based on the horizontal partition wall 965, the washing room 963 may be formed on the upper side and the drying room 964 may be formed on the lower side.

The horizontal partition wall 965 may be separated from the integrated frame 961. The horizontal partition wall 965 may be assembled to the integrated frame 961, and before the horizontal partition wall 965 is assembled to the integrated frame 961, the washing room 963 and the drying room 964 may communicate with each other.

The horizontal partition wall 965 may also separate the dryer 1 as the upper side of the horizontal partition wall 965, and the washing machine 2 as the lower side of the horizontal partition wall 965. However, the washing machine 2 may be located on the upper side of the horizontal partition wall 965, and the dryer 1 may be located on the lower side of the horizontal partition wall 965.

The heating device 50 may be disposed on the upper side of the horizontal partition wall 965. The heating device 50 may be disposed in the drying room 964. However, an arrangement position of the heating device 50 is not limited to the foregoing. The heating device 50 and the horizontal partition wall 965 may be disposed in the vertical direction.

Referring to FIG. 51, a laundry treating apparatus K according to another embodiment of the present disclosure will be described below.

The laundry treating apparatus K according to another embodiment of the present disclosure may include a single frame 970.

The laundry treating apparatus K may include a vertical partition wall disposed in the single frame 970, and a horizontal partition wall 972 disposed between the vertical partition wall 971 and one side panel 978 of the single frame 970.

Based on the horizontal partition wall 972, a washing room 973 and a drying room 974 may be vertically divided between the one side panel 978 and the vertical partition wall 971.

The washing room 973 may be formed between a lower panel 977 of the single frame 970 and the horizontal partition wall 972.

The second laundry loading opening 22 may be formed on a front side of the single frame 970, and the laundry treating apparatus K may include the second door 973a for opening and closing the second laundry loading opening 22.

The drying room 974 may be formed between an upper panel 976 of the single frame 970 and the horizontal partition wall 972.

The first laundry loading opening 12 may be formed on the front side of the single frame 970, and the laundry treating apparatus K may include the first door 974a for opening and closing the first laundry loading opening 12.

A refreshing room 975 for treating clothes may be formed between the vertical partition wall 971 and the other side panel 979.

A third laundry loading 32 may be formed on the front side of the single frame 970, and the laundry treating apparatus K may include a third door 975a for opening and closing a third laundry loading 32.

The vertical partition wall 971 may separate the washing room 973 from the refreshing room 975. The vertical partition wall 971 may separate the drying room 974 from the refreshing room 975. Based on the vertical partition wall 971, the washing room 973 and the drying room 974 may be formed on one side, and the refreshing room 975 may be formed on the other side. That is, the washing room 973 and the drying room 974, which communicate with each other, are formed between the vertical partition wall 971 and the one side panel 978, and the refreshing room 975 may be formed between the vertical partition wall 971 and the other side panel 979.

The vertical partition wall 971 may be separated from the single frame 970. The vertical partition wall 971 may be assembled to the single frame 970, and the washing room 973, the drying room 974, and the refreshing room 975 may communicate with each other before the vertical partition wall 971 is assembled to the single frame 970.

The horizontal partition wall 972 may separate the washing room 973 from the drying room 974. Based on the horizontal partition wall 972, the washing room 973 may be formed on a lower side, the drying room 974 may be formed on an upper side. However, based on the horizontal partition wall 972, the drying room 974 may be formed on the lower side, and the washing room 973 may be formed on the upper side.

The horizontal partition wall 972 may be separated from the single frame 970. The horizontal partition wall 972 may be assembled to the single frame 970, and the washing room 973 and the drying room 974 may communicate with each other before the horizontal partition wall 972 is assembled to the single frame 970.

The horizontal partition wall 972 may also separate the dryer 1 as the upper side of the horizontal partition wall 972, and the washing machine 2 as the lower side of the horizontal partition wall 972. However, it is also possible that the washing machine 2 may be disposed on the upper side of the horizontal partition wall 972, and the dryer 1 may be disposed on the lower side of the horizontal partition wall 972.

The heating device 50 may be disposed on the upper side of the horizontal partition wall 972. The heating device 50 may be disposed in the drying room 974. However, an arrangement position of the heating device 50 is not limited to the foregoing. The heating device 50 and the horizontal partition wall 972 may be arranged vertically.

Referring to FIG. 52, a laundry treating apparatus L according to another embodiment of the present disclosure will be described below.

The laundry treating apparatus L may include the dryer 1, the washing machine 2, a first refresher 3, the heating device 50, and a second refresher 3'.

The dryer 1 and the washing machine 2 may be disposed under the second refresher 3'. The dryer 1 and the washing machine 2 may be disposed on a lateral side of the first refresher 3.

The second refresher 3' may be disposed over the dryer 1 and the washing machine 2. The second refresher 3' may be disposed on a lateral side of the first refresher 3.

However, an arrangement position of the dryer 1, the washing machine 2, the first refresher 3, and the second refresher 3' is not limited to the foregoing. For example, the dryer 1 and the washing machine 2 may be disposed side by side on the upper side of the second refresher 3'. Further, the dryer 1, the washing machine 2, the first refresher 3, and the second refresher 3' may be arranged horizontally.

A vertical height of the second refresher 3' may be smaller than a vertical height of the first refresher 3. A transverse width of the second refresher 3' may be greater than a transverse width of the first refresher 3. The transverse width of the second refresher 3' may be greater than a transverse width of the dryer 1 and the washing machine 2.

Garments, such as dress shirts, coats, trousers, etc., which occupy a small height, may be accommodated in the second refresher 3'.

The vertical height of the second refresher 3' may be smaller than the vertical height of the first refresher 3.

Garments, such as long coats, gowns, etc., which occupies a great height, may be accommodated in the first refresher 3.

The heating device 50 may be disposed in the second refresher 3'. The heating device 50 may be disposed on the upper side of the dryer 1. However, an arrangement position of the heating device 50 is not limited to the foregoing. For example, the heating device 50 may be disposed in the dryer 1, or may be disposed in the washing machine 2, or may be disposed in the first refresher 3. In addition, the heating device 50 may be disposed on the upper side of the second refresher 3' or may be disposed on the lower side of the dryer 1 and the washing machine 2.

The heating device 50 may supply hot air and stream to each of the dryer, the washing machine 2, the first refresher 3, and the second refresher 3'.

Referring to FIG. 53, a laundry treating apparatus M according to another embodiment of the present disclosure will be described below.

The laundry treating apparatus M may include an outer cabinet 990 formed therein, in which the dryer 1, the washing machine 2, and the refresher 3 are disposed.

The dryer 1, the washing machine 2, and the refresher 3 may be fixed to the inside of the outer cabinet 990. The tower 9 and the refresher 3 may be fixed to the inside of the outer cabinet 990.

The outer cabinet 990 may include an upper frame 991, a lower frame 992 separated from a lower side of the upper frame 991, a first side frame connecting the upper frame 991 and the upper frame 991, and a second side frame 994 connecting the upper frame 991 and the lower frame 992 and spaced apart from the first side frame 993.

The upper frame 991 may be connected to the upper portion of the tower 9 and the upper portion of the refresher 3.

An upper mount 999*b* may be fixed to a lower side of the upper frame 991. The upper mount 999*b* may be made of an elastic body. The upper mount 999*b* may be disposed between the tower 9 and the upper frame 991. The upper mount 999*b* may be disposed between the refresher 3 and the upper frame 991.

The lower frame 992 may be connected to the lower portion of the tower 9 and the lower portion of the refresher 3.

A lower mount 992*c* may be fixed to the lower side of the lower frame 12. The lower mount 992*c* may be made of an elastic body. The lower mount 992*c* may be disposed between the tower 9 and the lower frame 992. The lower mount 992*c* may be disposed between the refresher 3 and the lower frame 992.

The outer cabinet 990 may include a grip 992*a* recessed upwardly from a lower surface of the lower frame 992. By holding the grip 992*a*, a user may move the laundry treating apparatus M.

The outer cabinet 990 may include rollers 995 protruding downwardly from the lower surface of the lower frame 992. When the user moves the laundry treating apparatus M by holding the grip 992*a*, the rollers 995 may roll along the floor surface while supporting the weight of the laundry treating apparatus M. Bearings may be used as the rollers.

The first side frame 993 may be connected to a side wall of the tower 9.

The second side frame 994 may be connected to a side wall of the refresher 3.

A first plate 999*a* may be disposed between the tower 9 and the refresher 3. The first plate 999*a* may be made of an elastic body and may be a damping material.

A first side plate 999*d* may be disposed between the tower 9 and the first side frame 993. The first side plate 999*d* may be made of an elastic body and may be a damping material.

A second side plate 999*e* may be disposed between the refresher 3 and the second side frame 994. The second side plate 999*e* may be made of an elastic body and may be a damping material.

The outer cabinet 990 may include outer doors 997 and 998 rotatably connected to the side frames 993 and 994.

The outer doors 997 and 998 may include a first outer door 997 rotatably connected to the first side frame 993, and a second outer door 998 rotatably connected to the second side frame 994.

The first outer door 997 may be rotated at the front side of the tower 9. The first outer door 997 may shield the front side of the tower 9 so that the tower 9 may not be seen from the outside.

The first outer door 997 may include an upper door 997*a* rotatably disposed at the front side of a first laundry treating machine 1 (dryer in FIG. 53), and a lower door 997*b* rotatably disposed at the front side of a second laundry treating machine 2 (washing machine in FIG. 53).

Each of the upper door 997a and the lower door 997b may be rotatably connected to the first side frame 993. The upper door 997a and the lower door 997b may be separate parts.

The upper door 997a may be connected to the first side frame 993 by a hinge 996 and may include a first handle 997c. The first handle 997c may be recessed into one surface of the upper door 997a.

The upper door 997a may shield the front side of the first laundry treating machine 1 or 2, so that the first laundry treating apparatus 1 or 2 may not be seen from the outside. The upper door 997a may shield the upper side of the control panel 8 so that the control panel 8 may not be seen from the outside. However, only a portion of the upper door 997a, which corresponds to the control panel 8, may be made of a transparent material, in which case the control panel 8 may be visible from the outside even when the door 997 is closed.

The lower door 997b may be connected to the first side frame 993 by the hinge 996 and may include a second handle 997d. The second handle 997d may be recessed into one surface of the lower door 997b The lower door 997b may shield the front side of the second laundry treating machine 1 or 2 so that the second laundry treating machine 1 or 2 may not be seen from the outside.

The second door 998 may be rotated at the front side of the refresher 3. The second door 998 may shield the front side of the refresher 3 so that the refresher 3 may not be seen from the outside.

The second door 998 may be rotatably connected to the second side frame 994 by the hinge 996 and may include the third handle 998a. The third handle 998a may be recessed into one surface of the second door 998.

Referring to FIG. 54, a laundry treating apparatus N according to another embodiment of the present disclosure will be described below.

The laundry treating apparatus N may include a plurality of dryers 1a and 1b. The plurality of dryers 1a and 1b may include a first dryer 1a, and a second dryer 1b disposed on one side of the first dryer 1a.

The first dryer 1a may include a first drying cabinet 100a and a first drying drum 13a rotatably disposed in the first drying cabinet 100a.

The second dryer 1b may include a second drying cabinet 100b and a second drying drum 13b rotatably disposed in the second drying cabinet 100b.

The first drying cabinet 100a and the second drying cabinet 100b may be coupled to each other or may be integrally formed with each other.

The heating device 50 may be disposed under the plurality of dryers 1a and 1b. An arrangement position of the heating device 50 is not limited to the foregoing, and the heating device 50 may be disposed on an upper side of the dryers 1a and 1b, may be disposed in a space between the plurality of dryers 1a and 1b, may be disposed on the rear side of the plurality of dryers 1a and 1b, or may be disposed on a lateral side of the plurality of dryers 1a and 1b.

The heating device 50 may include a heat pump device. The heat pump device may include the compressor 51, the condenser 52, the evaporator 53, the expansion device 54, the fan 60, the switching device 70, and a refrigerant tube 511. The heating device 50 may include the heat exchange channel 42 in which air supplied to the drying drums 13a and 13b is heated. The condenser 52 and the evaporator 53 may be disposed in the heat exchange channel 42.

The first drying drum 13a may be connected to a first hot air supply pipe 430a connected to the heating device 50. The first drying drum 13a may be connected to a first hot air return line 410a connected to the heating device 50. The hot air flowing into the first drying drum 13a through the first hot air supply pipe 430a may flow out of the first drying drum 13a through the first hot air return line 410a.

The second drying drum 13b may be connected to a second hot air supply pipe 430b connected to the heating device 50. The second drying drum 13b may be connected to a second hot air return line 410b connected to the heating device 50. The hot air flowing into the second drying drum 13b through the second hot air supply pipe 430b may flow out of the second drying drum 13b through the second hot air return line 410b.

The switching device 70 may be connected to the first hot air supply pipe 430a and the second hot air supply pipe 430b. The switching device 70 may control an amount of hot air flowing into the first hot air supply pipe 430a and the second hot air supply pipe 430b.

The hot air flowing through the first hot air supply pipe 430a may flow into the first drying drum 13a to dry the laundry placed in the first drying drum 13a.

The hot air flowing through the second hot air supply pipe 430b may flow into the second drying drum 13b to dry the laundry placed in the second drying drum 13b.

The hot air flowing into the first drying drum 13a may flow to the first hot air return line 410a. The hot air flowing into the second drying drum 13b may flow to the second hot air return line 410b.

The air flowing through the first hot air return line 410a and the second hot air return line 410b may flow into the heat exchange channel 42. The air flowing into the heat exchange channel 42 may be heat exchanged with the evaporator 53 and the condenser 52. The air, having passed through the heat exchange channel 42, may be supplied again to the drying drum 13a and 13b by the fan 60.

Referring to FIG. 55, a laundry treating apparatus O according to another embodiment of the present disclosure will be described in detail.

The laundry treating apparatus O may include a plurality of refreshers 3a and 3b. The plurality of refreshers 3a and 3b may include a first refresher 3a, and a second refresher 3b disposed on one side of the first refresher 3a.

The laundry treating apparatus O may include a cabinet 30 forming a space in which the laundry is received. The first refresher 3a and the second refresher 3b may be disposed in the cabinet 30. Further, the cabinet 30 may form the exterior of the first refresher 3a and the second refresher 3b which are integrally formed with each other. The first refresher 3a and the second refresher 3b, which are integrally formed with each other, may be separated by a partition wall 301.

A first space 33a, in which the laundry is received, may be formed in the first refresher 3a, and a second space 33b, in which the laundry is received, may be formed in the second refresher 3b.

The laundry treating apparatus O may include the partition wall 301 for partitioning the first space 33a and the second space 33b. The partition wall 301 may be integrally formed with the cabinet 30.

The first refresher 3a may include a first supply air hole 308a and a first exhaust air hole 309a.

The second refresher 3b may include a second supply air hole 308b and a second exhaust air hole 309b.

The heating device 50 may be disposed on a lower side of the plurality of refreshers 3a and 3b. An arrangement position of the heating device 50 is not limited to the foregoing, and the heating device 50 may be disposed on an upper side of the refreshers 3a and 3b, may be disposed in a space between the plurality of refreshers 3a and 3b, or may be disposed on a rear side or a lateral side of the plurality of refreshers 3a and 3b.

The heating device 50 may include a heat pump device. The heat pump device may include the compressor 51, the condenser 52, the evaporator 53, the expansion device 54, the fan 60, the switching device 70, and a refrigerant tube 511.

The first refresher 3a may include a first hot air supply pipe 450a connecting the first supply air hole 308a and the heating device 50. The first refresher 3a may include a first hot air return line 440a for connecting the first exhaust air hole 309a and the heating device 50. The hot air supplied into the first space 33a through the first hot air supply pipe 450a may flow out of the first space 33a through the first hot air return line 440a.

The second refresher 3b may include a second hot air supply pipe 450b connecting the second supply air hole 308b and the heating device 50. The second refresher 3b may include a second hot air return line 440b for connecting the second exhaust air hole 309b and the heating device 50. The hot air supplied into the second space 33b through the second hot air supply pipe 450b may flow out of the second space 33b through the second hot air return line 440b.

The switching device 70 may be connected to the first hot air supply pipe 450a and the second hot air supply pipe 450b. The switching device 70 may control an amount of hot air flowing into the first hot air supply pipe 450a and the second hot air supply pipe 450b.

The hot air flowing through the first hot air supply pipe 450a may flow into the first space 33a through the first supply air hole 308a.

The hot air flowing through the second hot air supply pipe 450b may flow into the second space 33b through the second supply air hole 308b.

The hot air flowing into the first space 33a may flow to the first hot air return line 440a through the first supply air hole 309a.

The hot air flowing into the second space 33b may flow to the second hot air return line 440b through the second exhaust air hole 309b.

The heating device 50 may include the heat exchange channel 42 in which air supplied to each of the inner spaces 33a and 33b of the refreshers 3a and 3b is heated. The condenser 52 and the evaporator 53 may be disposed in the heat exchange channel 42.

The hot air flowing through the first hot air return line 440a and the second hot air return line 440b may flow into the heat exchange channel 42.

The air flowing into the heat exchange channel may be heated by passing through the evaporator 53 and the condenser 52.

The hot air heated in the heat exchange channel 42 may be supplied to the inner spaces 33a and 33b of the refreshers 3a and 3b by the fan 60 to be circulated therein.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

A laundry treating apparatus may include a first laundry treating machine including a first cabinet and a first drum rotatably disposed in the first cabinet; a second laundry treating machine including a second cabinet, which is vertically disposed with respect to the first cabinet, and a second drum rotatably disposed in the second cabinet; a third laundry treating machine including a third cabinet disposed on one side of the first cabinet and the second cabinet, and having a space for receiving laundry; and a heating device disposed on one side of the third cabinet and vertically disposed with respect to the first drum and the second drum, and heating air supplied into an inner space of the third cabinet.

The laundry treating apparatus may be configured as above, wherein the heating device comprises a heat exchange unit heating the air supplied into the inner space of the third cabinet; a heat exchange channel in which the heat exchange unit is disposed; and a fan disposed on a downstream side of the heat exchange channel, and supplying air, having passed through the heat exchange channel, into the inner space of the third cabinet, wherein the heat exchange unit, the heat exchange channel, and the fan are disposed on one side of the third cabinet.

The laundry treating apparatus may be configured as above, further comprising a supply air duct connecting the heating device and the third laundry treating machine, and supplying the air, heated by the heating device, into the inner space of the third cabinet; and an exhaust air duct connecting the heating device and the third laundry treating machine, and supplying the air in the inner space of the third cabinet to the heating device, wherein the supply air duct and the exhaust air duct extend from the heating device to the lateral side toward the third cabinet.

The laundry treating apparatus may be configured as above, wherein the heating device is disposed between the first drum and the second drum, and is disposed at a height corresponding to a middle portion of the third cabinet.

The laundry treating apparatus may be configured as above, further comprising a supply air duct supplying the air, heated by the heating device, into the inner space of the third cabinet; and an exhaust air duct supplying the air in the inner space of the third cabinet to the heating device, wherein the supply air duct is connected to a supply air hole formed at an upper portion of the third laundry treating machine, and the exhaust air duct is connected to an exhaust air hole formed at a lower portion of the third laundry treating machine.

The laundry treating apparatus may be configured as above, further comprising a motor disposed in the first cabinet and rotating the first drum, wherein the motor is disposed in the heating device.

The laundry treating apparatus may be configured as above, further comprising a supply air duct supplying the air, heated by the heating device, into the inner space of the third cabinet, wherein the third laundry treating machine includes an inner plate which has a supply air hole connected with the supply air duct, and which is disposed at a lower height than the first drum and the second drum.

The laundry treating apparatus may be configured as above, wherein the third laundry treating machine comprises a lower panel separated from a lower side of the inner plate; and a storage space formed between the inner plate and the lower panel.

The laundry treating apparatus may be configured as above, wherein the third laundry treating machine comprises a hanger disposed at an upper portion of the inner space of the third cabinet, wherein the hanger is disposed at a height corresponding to an upper portion of any one of the first drum and the second drum, which is disposed over the other.

The laundry treating apparatus may be configured as above, further comprising an upper connector connecting any one of the first cabinet and the second cabinet, which is disposed over the other, with the third cabinet; and a lower connector connecting any one of the first cabinet and the second cabinet, which is disposed under the other, with the third cabinet.

The laundry treating apparatus may be configured as above, wherein an upper end of a front surface of any one of the first cabinet and the second cabinet, which is disposed over the other, is aligned horizontally with an upper end of a front surface of the third cabinet.

The laundry treating apparatus may be configured as above, further comprising a rear case disposed at a rear side of the third cabinet, wherein a longitudinal width of the third cabinet is smaller than longitudinal widths of the first cabinet and the second cabinet, and rear surfaces of the first cabinet and the second cabinet are aligned with a rear surface of the rear case.

The laundry treating apparatus may be configured as above, wherein the second laundry treating machine comprises a tub disposed in the second cabinet; a drain pump disposed at a lower side of the tub; and a drain pipe connected to the drain pump and extending to the outside of the laundry treating apparatus, wherein the heating device comprises a heat exchange channel for dehumidifying the air supplied into the inner space of the third cabinet; an evaporator disposed in the heat exchange channel; a drain pan disposed under the evaporator; and a drain pipe connecting the drain pan and the drain pipe.

The laundry treating apparatus may be configured as above, further comprising a steam generator generating steam supplied into the inner space of the third cabinet, and disposed in the heating device.

The laundry treating apparatus may be configured as above, wherein the second laundry treating machine comprises a tub which is disposed in the second cabinet, and in which water is stored; and a water supply pipe for supplying water into the tub, wherein the steam generator is connected to the water supply pipe.

The laundry treating apparatus may be configured as above, further comprising a control panel configured to control operation of the first, second, and third laundry treating machines, wherein the control panel is disposed on one side of the third cabinet.

A laundry treating apparatus may include a first laundry treating machine including a first cabinet and a drum rotatably disposed in the first cabinet; a second laundry treating machine including a second cabinet, which is disposed on one side of the first cabinet and having a space for receiving laundry, and including a hanger disposed in the second cabinet; and a heating device vertically disposed with respect to the drum, and heating air supplied into an inner space of the second cabinet.

The laundry treating apparatus may be configured as above, wherein the heating device comprises a heat exchange channel which is disposed on an upper side of the drum and in which the air supplied into the inner space of the second cabinet is heated; a heat exchange unit disposed in the heat exchange channel; and a cover removably disposed on an upper side of the heat exchange channel, and opening and closing the heat exchange channel.

The laundry treating apparatus may be configured as above, further comprising a third laundry treating apparatus including a third cabinet disposed on one side of the first cabinet and a second drum rotatably disposed in the third cabinet, wherein the first, second, and third laundry treating machines are horizontally arranged.

A laundry treating apparatus may include a first laundry treating machine including a first cabinet and a first drum rotatably disposed in the first cabinet; a second laundry treating machine including a second cabinet vertically disposed with respect to the first cabinet, and a second drum rotatably disposed in the second cabinet; and a third laundry treating machine including a third cabinet disposed on one side of the first cabinet and the second cabinet, and having a space for receiving laundry.

A laundry treating apparatus may include an integrated frame having a first laundry loading opening and a second laundry loading opening which are vertically spaced apart from each other, and having a horizontal partition wall formed at a middle portion; a first door for opening and closing the first laundry loading opening, a second door for opening and closing the second laundry loading opening; a refresher having a drying room in which a first drum is rotatably disposed between an upper panel and the horizontal partition wall of the integrated frame, a washing room having a tub, which is disposed between a lower panel and the horizontal partition wall of the integrated frame, and a second drum which is rotatably disposed in the tub, a side frame disposed on one side of the integrated frame and having an opening and a space for receiving laundry, and a third door for opening and closing the opening; a duct system including a first supply air duct for supplying air into the first drum, a second supply air duct for supplying air into the side frame, and a heat exchange channel connected to the first supply air duct and the second supply air duct; and a heating device for heating air passing through the heat exchange channel.

The laundry treating apparatus may be configured as above, wherein the heating device is disposed in the drying room or in the side frame.

The laundry treating apparatus may be configured as above, wherein the heating device is disposed between the horizontal partition wall and the first drum.

A laundry treating apparatus may include a single frame which has a vertical partition wall formed therein, and a horizontal partition wall disposed between the vertical partition wall and one side panel, and in which a washing room and a drying room are vertically separated by the horizontal partition wall between the one side panel and the vertical partition wall, and a refreshing room is disposed between the vertical partition wall and an opposite side panel; a first drum for receiving laundry is rotatably mounted in the drying room, a tub is disposed in the washing machine, a second drum for receiving the laundry is rotatably mounted in the tub, and the single frame has a first laundry loading opening through which the laundry is loaded into the first drum, a second laundry loading opening through which the laundry is loaded into the second drum, an opening through which the laundry is introduced into the refreshing room, and first, second, and third doors coupled to the single frame, and opening and closing the first and second laundry treating openings and the opening, respectively; a duct system including a first supply air duct for supplying air to the first drum, a second supply air duct for supplying air to the refreshing room, and a heat exchange channel connected to the first supply duct and the second supply air duct; and a heating device for heating air passing through the heat exchange channel.

The laundry treating apparatus may be configured as above, wherein the heating device is disposed in the drying room or the refreshing room.

The laundry treating apparatus may be configured as above, wherein the drying room is disposed over the washing room, and the heating device is disposed between the horizontal partition wall and the first drum.

A laundry treating apparatus may include a first laundry treating machine including a cabinet having a laundry loading opening, a door for opening and closing the laundry loading opening, and a drum rotatably disposed in the cabinet and receiving laundry; a second laundry treating machine including a cabinet having a laundry loading opening, a door for opening and closing the laundry loading opening, and having a space for receiving laundry; a duct system including a first supply air duct for supplying air into the drum of the first laundry treating machine, a second supply air duct for supplying air into an inner space of the second laundry treating machine, and a heat exchange channel having an inlet end where air is introduced, and a discharge end w % here the air is discharged, with the first and second supply air ducts being connected to the discharge end; and a heating device for heating air passing through the heat exchange channel.

The laundry treating apparatus may be configured as above, wherein the heating device is disposed in the cabinet of the first laundry treating machine.

The laundry treating apparatus may be configured as above, wherein the heating device is disposed under the drum.

The laundry treating apparatus may be configured as above, wherein the duct system comprises a first inlet port which is formed at the inlet end of the heat exchange channel, and through which the air flows into the heat exchange channel; and a second inlet port which is formed at the inlet end of the heat exchange channel, through which the air flows into the heat exchange channel, and is spaced apart from the first inlet port.

The laundry treating apparatus may be configured as above, wherein the duct system comprises a first exhaust air duct connected to the first inlet port and discharging the air in the drum; a second exhaust air duct connected to the second inlet port and discharging the air in the inner space of the second laundry treating machine.

The laundry treating apparatus may be configured as above, comprising a first opening and closing valve disposed in the first exhaust air duct and opening and closing the first exhaust air duct; and a second opening and closing valve disposed in the second exhaust air duct and opening and closing the second exhaust air duct.

The laundry treating apparatus may be configured as above, further comprising a switching device for selectively opening the first supply air duct and the second supply air duct.

The laundry treating apparatus may be configured as above, wherein the heating device is a heat pump device including a compressor, an evaporator, and a condenser which are connected by a refrigerant tube.

The laundry treating apparatus may be configured as above, wherein the evaporator and the condenser are disposed in the heat exchange channel.

The laundry treating apparatus may be configured as above, wherein the heating device comprises a heater for heating the air passing through the heat exchange channel, wherein the heater is disposed in the heat exchange channel.

The laundry treating apparatus may be configured as above, further comprising a cooler disposed in the heat exchange channel, wherein the cooler is disposed on an upstream side of the heater.

The laundry treating apparatus may be configured as above, further comprising a fan disposed in the heat exchange channel.

A laundry treating apparatus may include a dryer including a cabinet having a first laundry loading opening, a first door for opening and closing the first laundry loading opening, and a first drum rotatably disposed in the first cabinet and receiving laundry, a washing machine including a second cabinet disposed vertically with respect to the first cabinet and having a second laundry loading opening, a second door opening and closing the second laundry loading opening, a tub disposed in the second cabinet, and a second drum rotatably disposed in the tub and receiving laundry; a refresher including a third cabinet disposed on one side of the washing machine and the dryer and having an opening, a third door for opening and closing the opening, and having a space for receiving the laundry; a duct system including a first supply air duct for supplying air into the first drum, a second supply air duct for supplying air into an inner space of the refresher, and a heat exchange channel connected to the first supply air duct and the second supply air duct; and a heating device for heating air passing through the heat exchange channel.

The laundry treating apparatus may be configured as above, wherein the heating device is disposed in any one of the dryer and the refresher.

The laundry treating apparatus may be configured as above, wherein the heating device is disposed in the first cabinet.

The laundry treating apparatus may be configured as above, wherein the first cabinet is disposed over the second cabinet, and the heating device is disposed between the first drum and the second cabinet.

The laundry treating apparatus may be configured as above, wherein the heating device is disposed over an upper panel of the second cabinet.

The laundry treating apparatus may be configured as above, wherein the first cabinet comprises a machine room, which is a space formed under the first drum, and the heating device is disposed in the machine room.

The laundry treating apparatus may be configured as above, further comprising a driving motor for rotating the first drum, wherein the driving motor is disposed in the machine room.

The laundry treating apparatus may be configured as above, wherein the heating device comprises a compressor, a condenser, and an evaporator which are connected by a refrigerant tube.

The laundry treating apparatus may be configured as above, wherein the evaporator and the condenser are disposed in the heat exchange channel and heat exchange the air, passing through the heat exchange channel, with a refrigerant.

The laundry treating apparatus may be configured as above, wherein the heating device comprises a base plate, on which the condenser and the evaporator are disposed; both side walls connected to the base plate and standing on both sides of the condenser and the evaporator; and a cover disposed on an upper side of the condenser and the evaporator, wherein the heat exchange channel are surrounded by the base plate and the both side walls.

The laundry treating apparatus may be configured as above, wherein the heating device comprises a base plate, on which the condenser and the evaporator are disposed; a first support plate protruding downwardly from the base plate; and a second support plate protruding downwardly from the base plate and facing the first support plate, wherein a space, in which a portion of the duct system is disposed, is formed between the first support plate and the second support plate.

The laundry treating apparatus may be configured as above, wherein the first support plate and the second support plate are disposed over the second cabinet.

The laundry treating apparatus may be configured as above, wherein the first support plate and the second support plate have protrusions protruding downwardly toward the second cabinet, and the second cabinet comprises a second upper panel disposed under the first support plate and the second support plate; and recesses which are formed in the second upper panel, and into which the protrusions are inserted.

The laundry treating apparatus may be configured as above, wherein the heat exchange channel comprises an inlet end through which the air in the first drum and the air in the inner space of the refresher are introduced; and a discharge end through which the air, having passed through the heat exchange channel, is supplied to the first supply air duct or the second supply air duct, wherein the duct system comprises a first inlet port which is formed at the inlet end and through which the air in the first drum is introduced; a second inlet port which is formed a the inlet end and through which the air in the inner space of the refresher is introduced; a first discharge port formed at the discharge end and connected to the first supply air duct; and a second discharge port formed at the discharge end and connected to the second supply air duct.

The laundry treating apparatus may be configured as above, wherein the duct system comprises a first exhaust air duct connecting the first drum and the first inlet port; and a second exhaust air duct connecting the inner space of the refresher and the second inlet port.

The laundry treating apparatus may be configured as above, wherein the refresher comprises a supply air hole connected to the second supply air duct; and an exhaust air duct connected to the second exhaust air duct, wherein the supply air hole is formed at a lower portion of the refresher, and the exhaust air hole is formed at an upper portion of the refresher.

The laundry treating apparatus may be configured as above, wherein the supply air hole is disposed below a height of the heating device, and the exhaust air hole is disposed above the height of the heating device.

The laundry treating apparatus may be configured as above, further comprising a fan disposed in the duct system.

The laundry treating apparatus may be configured as above, wherein the fan is disposed in the heat exchange channel.

The laundry treating apparatus may be configured as above, wherein the duct system further comprises a blowing duct disposed on the discharge side of the heat exchange channel, and having a fan disposed therein, wherein the blowing duct comprises a first discharge port connected to the first supply air duct; and a second discharge port connected to the second supply air duct.

The laundry treating apparatus may be configured as above, wherein the blowing duct has a square shape with cross-sections of upper, lower, left, and right walls, wherein the first discharge port and the second discharge port are formed in different walls among the upper, lower, left, and right walls.

The laundry treating apparatus may be configured as above, further comprising a switching device disposed in the blowing duct, and controlling a flow direction of air blown by the fan.

The laundry treating apparatus may be configured as above, wherein the switching device comprises a rotating body rotatably disposed in the blowing duct, and selectively communicating with the first discharge port or the second discharge port; and a driving motor for rotating the rotating body.

The laundry treating apparatus may be configured as above, wherein the rotating body comprises a rotating plate coupled to the driving motor; and a scroll coupled to the rotating plate and having the blowing channel formed therein.

The laundry treating apparatus may be configured as above, wherein the duct system comprises a third supply air duct connected to the heat exchange channel and supplying air into the tub; a third exhaust air duct through which the air in the tub is introduced into the heat exchange channel; a third discharge port connecting the heat exchange channel and the third supply air duct, and a third inlet port connecting the heat exchange channel and the third exhaust air duct.

The laundry treating apparatus may be configured as above, wherein the duct system further comprises a second exhaust air duct connecting the inner space of the refresher and the heat exchange channel, wherein the third inlet port is formed in the second exhaust air duct.

The laundry treating apparatus may be configured as above, wherein the duct system further comprises an outside air inlet port through which outside air is introduced, and which is connected to the heat exchange channel; and a dehumidification duct discharging air, heat exchanged in the heat exchange channel, to the outside of the laundry treating apparatus.

The laundry treating apparatus may be configured as above, wherein the duct system further comprises a second exhaust air duct connecting the inner space of the refresher and the heat exchange channel, wherein the outside air inlet port is formed in the second exhaust air duct.

The laundry treating apparatus may be configured as above, wherein the duct system further comprises a fourth discharge port connecting the heat exchange channel and the dehumidification duct, wherein the dehumidification duct is disposed under the heating device and extends forwardly from the fourth discharge port, and has an outlet for discharging the heat-exchanged air to the outside.

The laundry treating apparatus may be configured as above, wherein the duct system further comprises a second exhaust air duct connecting the inner space of the refresher and the heat exchange channel, wherein the second exhaust air duct has a duct section disposed in a space formed under the heat exchange channel, and extending forwardly and backwardly in the space.

The laundry treating apparatus may be configured as above, wherein the heat exchange channel comprises a discharge end through which the air, having passed through the heat exchange channel, is supplied to the first supply air duct and the second supply air duct, wherein the duct system comprises a first discharge port connected to the first supply air duct and formed on an upper side of the discharge end; and a second discharge port connected to the second supply air duct and formed on a lateral side of the discharge end.

The laundry treating apparatus may be configured as above, wherein the heat exchange channel comprises a inlet end through which the air in the first drum or the air in the inner space of the refresher is introduced, wherein the duct system comprises a first inlet port formed on an upper side of the inlet end; and a second inlet end formed on a lower side of the inlet end.

A laundry treating apparatus may include a dryer having a drum for receiving laundry; a washing machine disposed on one side of the dryer in a direction horizontal to the dryer; a refresher disposed over the dryer and the washing machine, and having an inner space for receiving laundry; a duct system including a first supply air duct supplying air into the drum, a second supply air duct supplying air into the inner space of the refresher, an inlet end through which air is introduced, a discharge end through which the air is discharged, the first supply air duct and the second supply air duct being connected to the discharge end; and a heating device for heating air passing through the heat exchange channel.

A laundry treating apparatus may include a dryer having a cabinet and a drum rotatably disposed in the cabinet; a refresher disposed on one side of the dryer and having an inner space for receiving laundry; a heating device disposed under the drum and heating air supplied into the drum; and a supply air duct connecting the heating device and the refresher, and supplying the air, heated by the heating device, into the inner space of the refresher.

The laundry treating apparatus may be configured as above, wherein the heating device is disposed in the cabinet, and the supply air duct extends from the heating device to a lateral side to be connected to the refresher.

The laundry treating apparatus may be configured as above, wherein the refresher has a supply air hole formed at a lower portion of the inner space thereof, and the supply air duct communicates with the supply air hole and is connected to the lower portion of the refresher.

The laundry treating apparatus may be configured as above, wherein the refresher comprises an inner panel disposed on a lower side of the inner space and having the supply air hole formed therein, wherein the inner panel comprises a first inner panel disposed horizontal to the lower side of the inner space; and the second inner panel bent upwardly from the first inner panel, wherein the supply air hole is formed in the second inner panel.

The laundry treating apparatus may be configured as above, wherein the refresher comprises a third cabinet forming the inner space, wherein the supply air duct comprises a first hot air duct connected to the heating device and disposed at a rear side of the third cabinet; and a second hot air duct connecting the first hot air duct and the inner panel and disposed in the third cabinet.

The laundry treating apparatus may be configured as above, further comprising a fan pressurizing air heated by the heating device, wherein the fan is disposed on one side of the refresher and is disposed under the drum.

The laundry treating apparatus may be configured as above, wherein the cabinet comprises a first side panel disposed adjacent to the refresher; and a second side panel disposed farther from the refresher than the first side panel, wherein the fan is disposed in the cabinet and is disposed closer to the first side panel than to the second side panel.

The laundry treating apparatus may be configured as above, wherein the supply air duct comprises a first supply air duct connecting the heating device and the drum and extending upwardly from the heating device; and a second supply air duct connecting the heating device and the refresher and extending from the heating device to a lateral side.

The laundry treating apparatus may be configured as above, further comprising a blowing duct which is connected to the first supply air duct and the second supply air duct, and in which the fan is received; and a switching device disposed in the blowing duct and controlling a flow direction of air blown by the fan, wherein the blowing duct is disposed under the drum and disposed at a height corresponding to a lower portion of the refresher.

The laundry treating apparatus may be configured as above, further comprising a first exhaust air duct connecting the drum and the heating device; and a second exhaust air duct connecting the inner space of the refresher and the heating device, wherein the second exhaust air duct is disposed at the lower portion of the refresher.

The laundry treating apparatus may be configured as above, further comprising an inner panel disposed under the inner space; and an exhaust air hole formed in the inner panel and connected to the second exhaust air duct, wherein the second exhaust air duct extends under the inner panel to the lateral side toward the heating device.

A laundry treating apparatus may include a dryer having a first cabinet and a first drum rotatably disposed in the first cabinet; a washing machine disposed over the dryer and having a second cabinet, a tub disposed in the second cabinet, and a second drum rotatably disposed in the tub; a refresher having a third cabinet disposed on one side of the washing machine and the dryer, and having an inner space in which laundry is received; and a heating device heating air supplied into the inner space of the refresher, wherein the heating device is disposed under the first drum.

The laundry treating apparatus may be configured as above, wherein the refresher has a supply air hole disposed at a lower portion of the inner space, wherein the supply air duct communicates with the supply air hole and is connected to a lower portion of the refresher.

The laundry treating apparatus may be configured as above, wherein the refresher comprises an inner panel disposed under the inner space, extending bent upwards, and having the supply air hole.

The laundry treating apparatus may be configured as above, further comprising a first supply air duct connecting the heating device and the first drum, and extending upwardly from the heating device; a second supply air duct connecting the heating device and the refresher, and extending from the heating device to the lateral side; and a third supply air duct branching off from the second supply air duct and connected to the tub.

The laundry treating apparatus may be configured as above, wherein the third supply air duct branches off from the second supply air duct outside of the first cabinet.

The laundry treating apparatus may be configured as above, further comprising a first exhaust air duct connecting the first drum and the heating device; a second exhaust air duct connecting the inner space of the refresher and the heating device; and a third exhaust air duct connecting the tub and the heating device, wherein the second exhaust air duct is connected to the third exhaust air duct.

The laundry treating apparatus may be configured as above, wherein the heating device comprises a heat exchange unit heating air introduced through the first, second, and third exhaust air ducts; and a base plate on which the heat exchange unit is mounted, wherein a separation space is formed between the base plate and the first cabinet, and a portion of the third exhaust air duct is disposed in the separation space.

The laundry treating apparatus may be configured as above, further comprising an outside air inlet port communicating with the outside of the laundry treating apparatus and disposed in the separation space; and a dehumidification duct, through which air heated by the heat exchange unit is supplied, and which extends forwardly in the separation space.

A laundry treating apparatus may include a dryer having a first cabinet and a first drum rotatably disposed in the first cabinet; a washing machine disposed over the dryer and having a second cabinet, a tub disposed in the second cabinet, and a second drum rotatably disposed in the tub, a refresher having a third cabinet disposed on one side of the washing machine and the dryer, and having an inner space in which laundry is received; a heating device disposed under the first drum and heating air supplied into the first drum; and a supply air duct connecting the heating device and the third cabinet, and supplying air heated by the heating device into an inner space of the third cabinet.

A laundry treating apparatus may include a dryer having a first cabinet and a first drum rotatably disposed in the first cabinet; a washing machine having a second cabinet disposed over the first cabinet, a tub disposed in the second cabinet, and a second drum rotatably disposed in the tub; a refresher having a third cabinet disposed on a lateral side of the washing machine and the dryer, and having an inner space in which laundry is received; a heating device including a heat exchange unit disposed between the first drum and the tub, and heating air supplied to the refresher; and a drawer disposed below the heat exchange unit and having a space in which water is stored.

The laundry treating apparatus may be configured as above, wherein the heating device comprises a drain pan disposed under the heat exchange unit and disposed above the drawer.

The laundry treating apparatus may be configured as above, wherein the drain pan has a first hole which opens downwardly, and the drawer has a second hole which opens upwardly, wherein the first hole and the second hole vertically face each other.

The laundry treating apparatus may be configured as above, further comprising a drain pipe extending downwardly from the drain pan and connecting the drain pan and the drawer.

The laundry treating apparatus may be configured as above, comprising a drain pump for discharging water in the tub, a first drain pipe connecting the tub and the drain pump; a first drain pipe connecting the drain pan and the drawer; and a second drain pipe connecting the drain pan and the drain pump.

The laundry treating apparatus may be configured as above, wherein the heating device comprises a base plate on which the drain pump and the drain pan are disposed, wherein the drain pump is disposed below the drain pan.

The laundry treating apparatus may be configured as above, further comprising a first valve for controlling an amount of water flowing in the first drain pipe; a second valve for controlling an amount of water flowing in the first drain pipe; a third valve for controlling an amount of water flowing in the second drain pipe; and a controller electrically connected to the first, second, and third valves, wherein while the washing machine is in operation, the controller opens the first and third valves and closes the second valve.

The laundry treating apparatus may be configured as above, further comprising a detergent supply device having a space in which detergent is stored, wherein the detergent supply device is horizontally spaced apart from the drawer between the heating device and the first drum.

A laundry treating apparatus may include a dryer having a first cabinet and a first drum rotatably disposed in the first cabinet; a heating device disposed on an upper side of the dryer, and heating air supplied into the first drum; a refresher disposed on one side of the first cabinet and the heating device, and having an inner space in which laundry is received; a supply air duct extending downwardly from the heating device and connected to a supply air hole formed at a lower portion of the refresher; and an exhaust air duct extending upwardly from the heating device and connected to an exhaust air hole formed at an upper portion of the refresher.

The laundry treating apparatus may be configured as above, wherein the heating device is disposed at a height between the supply air hole and the exhaust air hole The laundry treating apparatus may be configured as above, wherein the heating device comprises a heat exchange channel in which air introduced through the exhaust air duct is heated; a condenser disposed in the heat exchange channel; an evaporator disposed on an upstream side above the condenser in the heat exchange channel, and a cover removably disposed over the condenser and the evaporator.

The laundry treating apparatus may be configured as above, further comprising a drawer disposed under the evaporator and having a space in which water is stored.

The laundry treating apparatus may be configured as above, wherein the drawer is disposed at an upper portion of the dryer and is disposed in the first cabinet.

The laundry treating apparatus may be configured as above, further comprising a washing machine including a second cabinet disposed over the first cabinet, a tub disposed in the second cabinet, and a second drum rotatably mounted in the tub, wherein the heating device is disposed between the first drum and the tub.

The laundry treating apparatus may be configured as above, wherein the heating device is disposed at a lower portion of the washing machine and disposed in the second cabinet.

The laundry treating apparatus may be configured as above, wherein the heating device comprises a heat exchange unit for heat exchanging the air introduced through the exhaust air duct; and a drain pan disposed under the heat exchange unit, wherein the washing machine comprises a drain pump connected to the tub and the drain pan.

The laundry treating apparatus may be configured as above, wherein a machine room, in which the heating device is disposed, is formed in the second cabinet, wherein the drain pump is disposed in the machine room.

The laundry treating apparatus may be configured as above, wherein the supply air duct comprises a first supply air duct extending downwardly from the heating device and connected to the first drum; and a second supply air duct extending from the heating device to a lateral side and connected to a supply air hole formed at a lower portion of the refresher; and a third supply air duct extending upwardly from the heating device and connected to the tub, wherein the exhaust air duct comprises a first exhaust air duct extending upwardly from the first drum and connected to the heating device; a second exhaust air duct extending downwardly from the exhaust air hole and connected to the heating device; and a third exhaust air duct extending downwardly from the tub and connected to the heating device.

The laundry treating apparatus may be configured as above, wherein the second supply air duct comprises a first connection part extending from the heating device to the lateral side; a first extension part extending downwardly from the first connection part; and a second connection part extending forwardly from the first extension part, wherein the second exhaust air duct comprises a third connection part extending rearwardly from the exhaust air hole; a second extension part extending downwardly from the third connection part; and a fourth connection part extending from the second extension part to the lateral side and connected to the heating device.

A laundry treating apparatus may include a dryer having a first cabinet and a first drum rotatably disposed in the first cabinet; a heating device disposed on an upper side of the dryer, and heating air supplied into the first drum; a refresher disposed on one side of the first cabinet and the heating device, and having an inner space in which laundry is received; a supply air duct extending upwardly from the heating device and connected to a supply air hole formed at an upper portion of the refresher; and an exhaust air duct extending downwardly from the heating device and connected to an exhaust air hole formed at a lower portion of the refresher.

A laundry treating apparatus may include a dryer having a first cabinet and a first drum rotatably disposed in the first cabinet; a washing machine having a second cabinet disposed under the dryer, a tub disposed in the second cabinet, a second drum rotatably mounted in the tub, and a drain pump for discharging water in the tub; a refresher disposed on one side of the washing machine and the dryer, and having an inner space in which laundry is received; a heating device including a heat exchange unit disposed under the tub, and heating air supplied into the inner space of the refresher; a drain pan disposed under the heat exchange unit; and a drain pipe connecting the drain pan and the drain pump.

The laundry treating apparatus may be configured as above, wherein a machine room, in which the heating device is disposed, is formed under the tub, wherein the drain pump is disposed in the machine room.

The laundry treating apparatus may be configured as above, wherein the heating device is disposed in the second cabinet and disposed at a lower portion of the second cabinet.

The laundry treating apparatus may be configured as above, wherein the heating device comprises a base plate where the heat exchange unit is mounted, wherein the drain pump is disposed on an upper side of the base plate.

The laundry treating apparatus may be configured as above, wherein the heating device comprises a heat exchange channel in which the heat exchange unit is disposed; and a shielding wall for separating a space, in which the drain pump is disposed, from the heat exchange channel.

The laundry treating apparatus may be configured as above, further comprising a first supply air duct disposed on a downstream side of the heat exchange unit and connecting the heat exchange channel and the first drum; a second supply air duct disposed on the downstream side of the heat exchange unit and connecting the heat exchange channel and the refresher; a first exhaust air duct disposed on an upstream side of the heat exchange unit and connecting the first drum and the heat exchange channel; and a second exhaust air duct disposed on an upstream side of the heat exchange unit and connecting the refresher and the heat exchange channel, wherein the heat exchange unit is heat exchanged with air flowing into the heat exchange channel through the first exhaust air duct and the second exhaust air duct.

The laundry treating apparatus may be configured as above, further comprising a first drain pipe connecting the tub and the drain pump; a second drain pipe which is connected to the drain pump, and through which water in the tub is discharged outside of the laundry treating apparatus, wherein at least a portion of the second drain pipe is disposed to surround the second supply air duct.

The laundry treating apparatus may be configured as above, comprising a coolant supply pipe connected to the drain pump; a heat exchanger connected to the coolant supply pipe and disposed to surround the second supply air duct; and a coolant return pipe connecting the heat exchanger and the drain pump.

The laundry treating apparatus may be configured as above, further comprising an outside air inlet port connected to the heat exchange channel; and a dehumidification duct connected to the heat exchange channel on a downstream side of the heat exchange unit, and communicating with the outside of the laundry treating apparatus, wherein the dehumidification duct is disposed below the drain pump.

The laundry treating apparatus may be configured as above, further comprising a first drain pipe connecting the tub and the drain pump; and a second drain pipe connected to the drain pump and discharging water in the tub to the outside of the laundry treating apparatus, wherein at least a portion of the second drain pipe is disposed to surround the dehumidification duct.

The laundry treating apparatus may be configured as above, comprising a coolant supply pipe connected to the drain pump; a heat exchanger connected to the coolant supply pipe and disposed to surround the dehumidification duct; and a coolant return pipe connecting the heat exchanger and the drain pump.

The laundry treating apparatus may be configured as above, wherein the heating device comprises a compressor connected to the heat exchange unit by a refrigerant passage, wherein the heat exchange unit comprises a condenser for heating air in the heat exchange unit; and an evaporator disposed on an upstream side of the condenser and dehumidifying the air in the heat exchange channel, wherein the drain pan is disposed under the evaporator.

The laundry treating apparatus may be configured as above, further comprising a circulation pipe connected to the drain pump, and spraying condensate, introduced into the drain pump through the drain pipe, toward the evaporator.

The laundry treating apparatus may be configured as above, further comprising a partition wall disposed in the second cabinet, and disposed under the tub, wherein the drain pump and the heating device are disposed under the partition wall.

The laundry treating apparatus may be configured as above, further comprising a drain pipe connecting the tub and the drain pump, wherein the drain pipe is connected to the drain pump by passing through the partition wall.

The laundry treating apparatus may be configured as above, wherein the heating device comprises a cover disposed above the drain pump and disposed under the partition wall, wherein a buffer material is disposed between the partition wall and the cover.

A laundry treating apparatus may include a dryer having a first cabinet and a first drum rotatably disposed in the first cabinet; a washing machine having a second cabinet disposed on a lateral side of the first cabinet, a tub disposed in the second cabinet, and a second drum rotatably mounted in the tub; a refresher having a third cabinet disposed on a lateral side of the second cabinet, and having an inner space in which laundry is received; and a heating device for heating air supplied into the first drum and the inner space of the refresher.

The laundry treating apparatus may be configured as above, wherein the second cabinet is disposed between the first cabinet and the third cabinet, and the heating device is disposed in the second cabinet.

The laundry treating apparatus may be configured as above, further comprising a storage box having a space formed therein, wherein a height of the second cabinet is greater than a height of the first cabinet, and the storage box is disposed under the first cabinet.

The laundry treating apparatus may be configured as above, further comprising a second refresher disposed on a lateral side of the third cabinet and having an inner space in which clothes are received, wherein a height of the third cabinet is greater than the first cabinet and the second cabinet, and the refresher is disposed over the first cabinet and the second cabinet.

A laundry treating apparatus may include a dryer having a first cabinet and a first drum rotatably disposed in the first cabinet; a washing machine having a second cabinet disposed under the first cabinet and having an upper panel coupled to a lower portion of the first cabinet, a tub disposed in the second cabinet, a second drum rotatably mounted in the tub, and a suspension for attenuating vibrations generated in the tub; and a refresher having a third cabinet disposed on a lateral side of the washing machine, and having an inner space in which laundry is received, wherein the second cabinet comprises a side panel disposed between the tub and the third cabinet to face the third cabinet, and coupled to the third cabinet.

The laundry treating apparatus may be configured as above, further comprising a plate disposed between the side panel and the third cabinet to connect the side panel and the third cabinet.

The laundry treating apparatus may be configured as above, wherein the plate comprises a first plate extending vertically between the side panel and the third cabinet, wherein the first plate is a damping material.

The laundry treating apparatus may be configured as above, wherein the plate further comprises a fastening member for fastening the second cabinet and the third cabinet, wherein the plate comprises a second plate extending horizontally under the second cabinet and the third cabinet, wherein the fastening member passes through the second plate and the second cabinet and passes through the second plate and the third cabinet.

The laundry treating apparatus may be configured as above, further comprising rollers protruding downwardly from a lower panel disposed under the tub, in which at least some of the rollers rotate.

The laundry treating apparatus may be configured as above, further comprising a plurality of legs protruding downwardly from the side panel of the washing machine and spaced apart from each other in a front-rear direction.

The laundry treating apparatus may be configured as above, further comprising a heating device heating air, supplied into the first drum and the inner space of the refresher, and disposed above the first drum and the tub.

The laundry treating apparatus may be configured as above, wherein the heating device is disposed on one side of the third cabinet, is arranged vertically with respect to the tub and the first drum, and is disposed at a height corresponding to an upper portion of the refresher.

The laundry treating apparatus may be configured as above, further comprising a first supply air duct extending downwardly from the heating device and connected to the first drum; and a second supply air duct extending from the heating device to a lateral side and connected to an upper portion of the refresher.

The laundry treating apparatus may be configured as above, further comprising a first exhaust air duct extending upwardly from the first drum and connected to the heating device; and a second exhaust air duct connected to the heating device and extending from the upper portion of the refresher to the lateral side.

A laundry treating apparatus may include a dryer having a first cabinet and a first drum rotatably disposed in the first cabinet; a washing machine having a second cabinet disposed under the first cabinet, a tub disposed in the second cabinet, and a second drum rotatably mounted in the tub; a refresher having a third cabinet disposed on one side of the dryer and the washing machine, and having an inner space in which laundry is received; a heating device disposed over the first drum and heating air supplied into the first drum; a first supply air duct supplying air, heated by the heating device, into the first drum and connected to the first drum; and a second supply air duct supplying the air, heated by the heating device, into the inner space of the refresher and connected to an upper portion of the refresher.

The laundry treating apparatus may be configured as above, wherein the first supply air duct extends downwardly from the heating device to be connected to the first drum, and the second supply air duct extends from the heating device to the lateral side to be connected to the upper portion of the refresher.

The laundry treating apparatus may be configured as above, wherein the refresher comprises a first upper plate extending horizontally along the upper side of the inner space; a second upper plate extending at an incline downwardly from the first upper plate; and a supply air hole which is connected to the second supply air duct, is formed on the second upper plate, and which is open toward the inner space.

The laundry treating apparatus may be configured as above, further comprising a first exhaust air duct extending upwardly from the first drum, to be connected to the heating device; and a second exhaust air duct extending from the upper portion of the refresher to the lateral side, to be connected to the heating device.

The laundry treating apparatus may be configured as above, wherein the second supply air duct is disposed at a position above the second exhaust air duct.

The laundry treating apparatus may be configured as above, further comprising a third exhaust air duct for discharging air in the tub, wherein the third exhaust air duct extends from the tub to join the second exhaust air duct.

The laundry treating apparatus may be configured as above, further comprising a third supply air duct which supplies the air heated by the heating device into the tub, and extends vertically in a space formed at a rear side of the refresher.

A laundry treating apparatus may include a dryer having a first cabinet and a first drum rotatably disposed in the first cabinet; a washing machine having a second cabinet disposed vertically with respect to the first cabinet, a tub disposed in the second cabinet, and a second drum rotatably mounted in the tub; a refresher having a third cabinet spaced apart from one side of the dryer and the washing machine, and having an inner space in which laundry is received; a heating device for heating the air supplied into the drum and disposed vertically with respect to the first drum and the tub; a storage cabinet disposed between the heating device and the third cabinet; a first supply air duct connecting the heating device and the first drum; and as second supply air duct connecting the heating device and the refresher and extending across a rear space of the storage cabinet.

The laundry treating apparatus may be configured as above, further comprising a first exhaust air duct connecting the first drum and the heating device; and a second exhaust air duct connecting the refresher and the heating device, and extending across the rear space of the storage cabinet.

The laundry treating apparatus may be configured as above, wherein an extended length of the second supply air duct is shorter than an extended length of the second exhaust air duct.

A laundry treating apparatus may include a dryer having a first cabinet with a first laundry loading opening and a first drum disposed in the first cabinet and providing a laundry receiving space; a washing machine having a second cabinet disposed over the first cabinet and having a second laundry loading opening, a tub disposed in the second cabinet, and a second drum mounted in the tub and providing a laundry receiving space; and a heating device disposed above the first drum and the second drum and heating air supplied into the first drum, wherein the second drum is open toward the second laundry loading opening so that the received laundry is unloaded through the second laundry loading opening.

The laundry treating apparatus may be configured as above, comprising a first door having a first handle, rotatably coupled to the first cabinet, and opening and closing the first laundry loading opening; and a second door having a second handle, rotatably coupled to the second cabinet, and opening and closing the second laundry loading opening disposed above the first laundry loading opening, wherein the second door is disposed under the heating device.

The laundry treating apparatus may be configured as above, wherein the first door is rotated downwardly from the first cabinet, to open the first laundry loading opening.

The laundry treating apparatus may be configured as above, wherein the heating device is disposed in the second cabinet and is disposed at an upper portion of the second cabinet.

The laundry treating apparatus may be configured as above, further comprising a partition wall disposed between the heating device and the second drum, wherein the heating device is disposed over the partition wall.

The laundry treating apparatus may be configured as above, further comprising a dehumidification duct, through which the air, heated by the heating device, is introduced, and which communicates with the outside of the second cabinet, wherein the dehumidification duct is disposed over the second laundry loading opening.

The laundry treating apparatus may be configured as above, further comprising a refresher disposed on one side of the dryer and the washing machine, and having a space for receiving laundry, wherein the refresher is disposed on one side of the heating device and is supplied with the air heated by the heating device.

The laundry treating apparatus may be configured as above, wherein the second drum is rotatably disposed in the second cabinet, and the refresher has a third cabinet facing one side of the second cabinet and coupled to the second cabinet.

The laundry treating apparatus may be configured as above, wherein a height of the refresher is greater than a height of the washing machine, and the second drum is disposed at a height corresponding to an upper portion of the refresher.

The laundry treating apparatus may be configured as above, further comprising a first supply air duct connecting the heating device and the first drum, wherein the first supply air duct extends vertically from a rear side of the refresher.

The laundry treating apparatus may be configured as above, further comprising a first exhaust air duct connecting the first drum and the heating device; and a second exhaust air duct connecting the refresher and the heating device, wherein the first exhaust air duct, disposed between the first drum and the heating device, is connected to the second exhaust air duct.

The laundry treating apparatus may be configured as above, further comprising a second supply air duct connecting the heating device and the refresher, wherein the heating device is positioned at a height corresponding to the upper portion of the refresher, and the second supply air duct extends from the heating device to the lateral side, to be connected to the upper portion of the refresher.

The laundry treating apparatus may be configured as above, further comprising a second exhaust air duct connecting the heating device and the refresher, wherein the heating device is positioned at a height corresponding to the upper portion of the refresher, and the second supply air duct extends from the upper portion of the refresher to the lateral side, to be connected to the heating device.

A laundry treating apparatus may include a dryer having a first cabinet and a first drum rotatably mounted in the first cabinet; a washing machine having a second cabinet disposed over the first cabinet, a tub disposed in the second cabinet, and a second drum rotatably mounted in the tub; a heating device heating air supplied into the first drum, and disposed above the first drum and the second drum; and a refresher having a space for receiving laundry, wherein the refresher has a third cabinet disposed on one side of the washing machine and the heating device, facing one side of the second cabinet, and coupled to the second cabinet.

The laundry treating apparatus may be configured as above, further comprising plate disposed between the second cabinet and the third cabinet, and coupled to the second cabinet and the third cabinet, wherein the plate includes a damping material.

The laundry treating apparatus may be configured as above, wherein the second cabinet comprises a second lower panel disposed on an upper side of the first cabinet; and a second side panel disposed on one side of the third cabinet, wherein the second lower panel is coupled to the upper panel of the first cabinet, and the second side panel is coupled to the side panel of the third cabinet.

A laundry treating apparatus may include a dryer having a first cabinet, a first door rotatably coupled to the first cabinet, and a first drum rotatably mounted in the first cabinet; a washing machine having a second cabinet disposed over the first cabinet, a second door rotatably coupled to the second cabinet, a tub disposed in the second cabinet, and a second drum rotatably mounted in the tub; a heating device including a heat exchange unit disposed over the tub and heating air; and a dehumidification duct discharging the air, heated by the heating device, to the outside of the first cabinet and the second cabinet, and disposed above the second door.

The laundry treating apparatus may be configured as above, further comprising an outside air inlet port communicating with the second cabinet; a heat exchange channel which is connected to the outside air inlet port, in which the heat exchange unit is disposed, and which is disposed on an upper side of the tub; and a fan disposed in the heat exchange channel and connected to the dehumidification duct, wherein the dehumidification duct and the outside air inlet port are disposed between the heat exchange channel and the tub.

The laundry treating apparatus may be configured as above, further comprising a partition wall disposed between the dehumidification duct and the tub.

The laundry treating apparatus may be configured as above, wherein the heating device comprises a base plate on which the heat exchange unit is mounted, wherein a separation space, in which the dehumidification duct is disposed, is formed between the base plate and the partition wall.

A laundry treating apparatus may include a first laundry treating apparatus including a first cabinet having a first laundry loading opening formed on a front side thereof, a first door coupled to the front side of the first cabinet to open and close the first laundry loading opening, and a first drum rotatably mounted in the first cabinet; a second laundry treating apparatus including a second cabinet disposed over the first cabinet and having a second laundry loading opening formed on a front side thereof, a second door coupled to the front side of the second cabinet to open and close the second laundry loading opening, and a second drum rotatably mounted in the second cabinet; and a third laundry treating apparatus including a third cabinet having an opening, through which laundry is loaded, and a third door for opening and closing the opening, and disposed on one side of the first and second laundry treating apparatuses, wherein an upper end of a front surface of the second laundry treating apparatus is aligned with an upper end of a front surface of the third laundry treating apparatus.

The laundry treating apparatus may be configured as above, wherein the upper end of the front surface of the second laundry treating apparatus and the upper end of the front surface of the third laundry treating apparatus are disposed on a same horizontal plane.

The laundry treating apparatus may be configured as above, wherein the second cabinet forms the upper end of the front surface of the second laundry treating apparatus, and the third door forms the upper end of the front surface of the third laundry treating apparatus.

The laundry treating apparatus may be configured as above, further comprising a connector having a horizontal width and connected to each of the upper end of the front surface of the second laundry treating apparatus and the upper end of the front surface of the third laundry treating apparatus.

The laundry treating apparatus may be configured as above, wherein the front surface of the second laundry treating apparatus and the front surface of the third laundry treating apparatus are disposed on the same horizontal plane.

The laundry treating apparatus may be configured as above, wherein the second laundry treating apparatus comprises an upper case disposed over the second cabinet and forms the upper end of the front surface of the second laundry treating apparatus, wherein an upper end of a front surface of the upper case and the upper end of the front surface of the third laundry treating apparatus are aligned horizontally.

The laundry treating apparatus may be configured as above, wherein the second laundry treating apparatus comprises an auxiliary panel coupled to the second cabinet to be movable in a vertical direction, and forming the upper end of the front surface of the second laundry treating apparatus, wherein a height of an upper surface of the second cabinet is lower than a height of an upper surface of the third laundry treating apparatus, and the upper end of the front surface of the auxiliary panel and the upper end of the front surface of the third laundry treating apparatus are aligned horizontally.

The laundry treating apparatus may be configured as above, further comprising a motor for generating power; a power transmission device connecting the motor and the auxiliary panel; a sensing unit disposed on an upper end of the front surface of the auxiliary panel and electrically connected to the motor; and a transmission unit disposed on the upper end of the front surface of the third laundry treating apparatus and transmitting a predetermined signal in a horizontal direction, wherein when the sensing unit and the transmission unit are aligned horizontally, the motor terminates operation.

The laundry treating apparatus may be configured as above, further comprising a motor for generating power; a power transmission device connecting the motor and the auxiliary panel; a sensing unit disposed on an upper end of the front surface of the auxiliary panel and electrically connected to the motor; and a transmission unit extending horizontally from the upper end of the front surface of the third laundry treating apparatus, disposed above the auxiliary panel, and transmitting a predetermined signal downwardly, wherein when the signal transmitted from the transmission unit arrives at the sensing unit, the motor terminates operation.

A laundry treating apparatus may include a dryer including a first cabinet having a first laundry loading opening formed on a front side thereof, a first door coupled to the front side of the first cabinet to open and close the first laundry loading opening, and a first drum rotatably mounted in the first cabinet; a washing machine including a second cabinet vertically disposed with respect to the first cabinet and having a second laundry loading opening formed on a front side thereof, a second door coupled to the front side of the second cabinet to open and close the second laundry loading opening, a tub disposed in the second cabinet, and a second drum rotatably mounted in the tub; a refresher disposed on one side of the dryer and the washing machine, and including a third cabinet having an opening formed on a front side thereof and a space for receiving laundry, and a third door for opening and closing the opening; and a heating device disposed on one side of the refresher with a predetermined height and vertically disposed with respect to the dryer and the washing machine, and heating air supplied into an inner space of the third cabinet, wherein an upper end of a front surface of any one, which is located uppermost, among the dryer, the washing machine, and the heating device, is aligned with an upper end of a front surface of the refresher.

The laundry treating apparatus may be configured as above, wherein the upper end of the front surface of any one, which is located uppermost, among the dryer, the washing machine, and the heating device, is disposed on a same horizontal plane as the upper end of the front surface of the refresher.

The laundry treating apparatus may be configured as above, wherein the dryer is disposed over the washing machine, the heating device is disposed below an upper end of a front surface of the dryer, and the upper end of the front surface of the dryer is aligned horizontally with an upper end of a front surface of the refresher.

The laundry treating apparatus may be configured as above, wherein the washing machine is disposed over the dryer, the heating device is disposed below an upper end of a front surface of the washing machine, and the upper end of the front surface of the washing machine is aligned horizontally with the upper end of the front surface of the refresher.

The laundry treating apparatus may be configured as above, wherein the heating device is disposed over the first cabinet and the second cabinet, and has a cover disposed on a same horizontal plane as an upper surface of the refresher.

A laundry treating apparatus may include a first laundry treating apparatus including a first cabinet having a laundry loading opening formed on a front side thereof, a first door coupled to the front side of the first cabinet to open and close the laundry loading opening, and a drum rotatably mounted in the first cabinet; and a second laundry treating apparatus including a second cabinet disposed on one side of the first laundry treating apparatus and having an opening formed on a front side thereof and a space for receiving laundry, and a second door coupled to the front side of the second cabinet to open and close the opening, wherein a front surface of the first laundry treating apparatus is aligned with a front surface of the second laundry treating apparatus.

The laundry treating apparatus may be configured as above, wherein the front surface of the first laundry treating apparatus is disposed on a same horizontal plane as the front surface of the second laundry treating apparatus.

The laundry treating apparatus may be configured as above, further comprising a heating device disposed on one side of the second laundry treating apparatus and vertically disposed with respect to the first laundry treating apparatus, and heating air supplied into an inner space of the second laundry treating apparatus; and a supply air duct connecting the heating device and the second cabinet, wherein a longitudinal width of the first laundry treating apparatus is greater than a longitudinal width of the second laundry treating apparatus, and the supply air duct is disposed at a rear side of the second laundry treating apparatus and is aligned with a rear surface of the first laundry treating apparatus.

The laundry treating apparatus may be configured as above, further comprising a rear case disposed on the rear side of the second laundry treating apparatus and receiving the supply air duct, wherein a rear surface of the first laundry treating apparatus is horizontally aligned with a rear surface of the rear case.

The laundry treating apparatus may be configured as above, further comprising a third laundry treating apparatus including a third cabinet vertically disposed with respect to the first cabinet, and a second drum rotatably disposed in the third cabinet, wherein the front surface of the second laundry treating apparatus is aligned with a front surface of the third laundry treating apparatus.

The laundry treating apparatus may be configured as above, wherein an upper end of a front surface of any one of the first laundry treating apparatus and the third laundry treating apparatus, which is disposed over the other, is horizontally aligned with an upper end of the front surface of the second laundry treating apparatus.

A laundry treating apparatus may include a first laundry treating apparatus including a first cabinet having a laundry loading opening formed on a front side thereof, a first door coupled to the front side of the first cabinet to open and close the laundry loading opening, and a drum rotatably mounted in the first cabinet; a second laundry treating apparatus including a second cabinet disposed on one side of the first laundry treating apparatus and having an opening formed on a front side thereof and a space for receiving laundry, and a second door coupled to the front side of the second cabinet to open and close the opening; and a support block coupled to the second laundry treating apparatus, and extending in a front-rear direction, wherein a longitudinal width of the space is smaller than a longitudinal width of the first laundry treating apparatus, and the support block is disposed at a rear side of the space.

The laundry treating apparatus may be configured as above, wherein the support block extends rearwardly from a rear surface of the second laundry treating apparatus, and a rear end of the support block is aligned with a rear surface of the first laundry treating apparatus.

The laundry treating apparatus may be configured as above, further comprising a third laundry treating apparatus including a third cabinet disposed over the first cabinet, and a second drum rotatably disposed in the third cabinet, wherein the support block comprises a first support block disposed at a height corresponding to the first laundry treating apparatus, and a second support block disposed at a height corresponding to the third laundry treating apparatus.

The laundry treating apparatus may be configured as above, further comprising a rotating shaft horizontally passing through the support block, wherein the second laundry treating apparatus comprises a rear panel connected to the support block; and a block receiving groove which is recessed into the rear panel, and in which the support block is received, wherein the rotating shaft is rotatably disposed in the block receiving roove, and the support block rotates about the rotating shaft in a front-rear direction.

The laundry treating apparatus may be configured as above, further comprising a motor coupled to the rotating shaft and rotating the rotating shaft; a proximity sensor for sensing proximity of an object located at the rear side of the second laundry treating apparatus; and a controller electrically connected to the proximity sensor and the motor, and receiving information on the proximity from the proximity sensor, wherein in response to the proximity being greater than or equal to a predetermined reference value, the controller controls the motor so that the support block protrudes rearwardly of the second laundry treating apparatus.

The laundry treating apparatus may be configured as above, further comprising a side support block disposed on an opposite side surface of the second laundry treating apparatus which is opposite to one side surface of the second laundry treating apparatus directed toward the first laundry treating apparatus, and extending in a direction opposite to a direction toward the first laundry treating apparatus.

The laundry treating apparatus may be configured as above, wherein the support block comprises a first support coupled to the second laundry treating apparatus and extending rearwardly of the second laundry treating apparatus; and a second support disposed on a rear end of the first support and having an elastic body.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A laundry treating apparatus comprising:
    a first laundry treating machine including:
        a first cabinet; and
        a first drum rotatably disposed in the first cabinet;
    a second laundry treating machine including:
        a second cabinet vertically disposed with respect to the first cabinet;
        a second drum rotatably disposed in the second cabinet;
        a tub disposed in the second cabinet; and
        a water supply pipe configured to supply water into the tub;
    a third laundry treating machine including a third cabinet disposed at a lateral side of the first cabinet and the second cabinet, the third cabinet having an inner space for receiving laundry;
    a heating device disposed at a lateral side of the third cabinet, the heating device being configured to heat air supplied into the inner space of the third cabinet; and
    a steam generator configured to generate steam to be supplied into the inner space of third cabinet, the steam generator being disposed in the heating device, and the steam generator being connected to the water supply pipe; and
    a supply air duct arranged to connect the heating device and the third laundry treating machine, the supply air duct being configured to supply the air heated by the heating device into the inner space of the third cabinet.

2. The laundry treating apparatus of claim 1, wherein the heating device comprises:
    a heat exchange unit configured to heat the air supplied into the inner space of the third cabinet;
    a heat exchange channel in which the heat exchange unit is disposed; and
    a fan disposed on a downstream side of the heat exchange channel, the fan configured to supply air having passed through the heat exchange channel into the inner space of the third cabinet,
    wherein the heat exchange unit, the heat exchange channel and the fan are located at the lateral side of the third cabinet.

3. The laundry treating apparatus of claim 1, further comprising
    an exhaust air duct connecting the heating device and the third laundry treating machine, the exhaust air duct configured to supply the air in the inner space of the third cabinet to the heating device,
    wherein the supply air duct and the exhaust air duct extend from the heating device toward the third cabinet.

4. The laundry treating apparatus of claim 3, wherein the supply air duct is connected to a supply air hole formed at an upper portion of the third laundry treating machine, and
    wherein the exhaust air duct is connected to an exhaust air hole formed at a lower portion of the third laundry treating machine.

5. The laundry treating apparatus of claim 4, wherein the third laundry treating machine further includes an inner plate, the supply air hole being formed in the inner plate, and
    wherein the inner plate is disposed at a lower height than the first drum and the second drum.

6. The laundry treating apparatus of claim 5, wherein the third laundry treating machine further includes:
    a lower panel spaced apart from the inner plate in a vertical direction; and
    a storage space formed between the inner plate and the lower panel.

7. The laundry treating apparatus of claim 1, wherein an upper end of a front surface of any one of the first cabinet and the second cabinet is aligned horizontally with an upper end of a front surface of the third cabinet.

8. The laundry treating apparatus of claim 1, further comprising a rear case disposed at a rear side of the third cabinet,
    wherein a width of the third cabinet is smaller than widths of the first cabinet and the second cabinet, and
    wherein rear surfaces of the first cabinet and the second cabinet are aligned with a rear surface of the rear case.

9. The laundry treating apparatus of claim 1, wherein the heating device is arranged vertically between the first drum and the second drum and is disposed at a height corresponding to a middle portion of the third cabinet.

10. The laundry treating apparatus of claim 1, further comprising:
    an upper connector connecting any one of the first cabinet and the second cabinet with the third cabinet; and
    a lower connector connecting an other of the first cabinet and the second cabinet with the third cabinet.

11. The laundry treating apparatus of claim 1, further comprising a motor for rotating the first drum, the motor being disposed in the heating device.

12. The laundry treating apparatus of claim 1, wherein the third laundry treating machine comprises a hanger disposed at an upper portion of the inner space of the third cabinet, wherein the hanger is positioned higher than at least one of the first drum and the second drum.

13. The laundry treating apparatus of claim 1, wherein the second laundry treating machine further includes:
 a drain pump disposed at a lower side of the tub; and
 a pipe connected to the drain pump, the pipe extending outside of the laundry treating apparatus,
 wherein the heating device includes:
 a heat exchange channel for dehumidifying the air supplied into the inner space of the third cabinet;
 an evaporator disposed in the heat exchange channel;
 a drain pan disposed under the evaporator; and
 a drain pipe connecting the drain pan and the drain pump.

14. The laundry treating apparatus of claim 1, further comprising a control panel configured to control operation of the first laundry treating machine, the second laundry treating machine, and the third laundry treating machine.

15. A laundry treating apparatus comprising:
 a first laundry treating machine including:
  a first cabinet; and
  a drum rotatably disposed in the first cabinet;
 a second laundry treating machine including a second cabinet disposed at a lateral side of the first cabinet, the second laundry treating machine having an inner space for receiving laundry, and the second laundry treating machine including a hanger disposed in the inner space,
 a heating device configured to heat air supplied into an inner space of the second cabinet, and the heating device vertically disposed with respect to the drum;
 a third laundry treating machine including a third cabinet disposed at a lateral side of the second cabinet, a tub disposed in the third cabinet, and a water supply pipe configured to supply water into the tub;
 a steam generator configured to generate steam to be supplied into an inner space of the second cabinet, the steam generator being disposed in the heating device, and the steam generator being connected to the water supply pipe; and
 a supply air duct arranged to connect the heating device and the second laundry treating machine, and the supply air duct being configured to supply the air heated by the heating device into the inner space of the second cabinet.

16. The laundry treating apparatus of claim 15, wherein the heating device comprises:
 a heat exchange unit configured to heat the air supplied into the inner space of the second cabinet;
 a heat exchange channel in which the heat exchange unit is disposed; and
 a cover removably disposed on an upper side of the heat exchange unit, and opening and closing the heat exchange channel.

17. The laundry treating apparatus of claim 15,
 wherein the third laundry treating machine further includes a second drum rotatably disposed in the third cabinet, and
 wherein the first laundry treating machine, the second laundry treating machine and the third laundry treating machine are horizontally arranged with each other.

* * * * *